US008876600B2

(12) United States Patent
Joko et al.

(10) Patent No.: US 8,876,600 B2
(45) Date of Patent: Nov. 4, 2014

(54) DISPLAY DEVICE FOR GAMING MACHINE AND GAMING MACHINE INCLUDING THE SAME

(75) Inventors: Satoshi Joko, Tokyo (JP); Hiroatsu Ike, Tokyo (JP); Kenta Kitamura, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 308 days.

(21) Appl. No.: 13/474,956

(22) Filed: May 18, 2012

(65) Prior Publication Data

US 2013/0310171 A1 Nov. 21, 2013

(51) Int. Cl.
*A63F 13/00* (2014.01)
*G07F 17/32* (2006.01)

(52) U.S. Cl.
USPC .......................................................... 463/31

(58) Field of Classification Search
CPC ......... A63F 13/00; A63F 13/02; A63F 13/08; G07F 17/3211
USPC .......................................................... 463/31
See application file for complete search history.

(56) References Cited

U.S. PATENT DOCUMENTS

| | | | | |
|---|---|---|---|---|
| 4,503,637 A * | 3/1985 | Parente | | 49/141 |
| 2008/0188283 A1 | 8/2008 | Okada | | |

FOREIGN PATENT DOCUMENTS

| | | |
|---|---|---|
| JP | 2004275586 A * | 10/2004 |
| JP | 4241253 | 2/2005 |
| JP | 4709072 | 12/2007 |
| JP | 4614927 | 3/2008 |
| JP | 2008-099945 | 5/2008 |
| JP | 2008-194123 | 8/2008 |
| JP | 2008194123 A * | 8/2008 |
| JP | 2008-237499 | 10/2008 |
| JP | 2008-279111 | 11/2008 |
| JP | 2009-022550 | 2/2009 |
| JP | 2009-022551 | 2/2009 |

* cited by examiner

*Primary Examiner* — David L Lewis
*Assistant Examiner* — Shauna-Kay Hall
(74) *Attorney, Agent, or Firm* — Lexyoume IP Meister, PLLC

(57) ABSTRACT

A display device for a gaming machine according to an embodiment of the present invention includes: a display panel configured to display images for a game; a shutter assembly configured to cover and uncover the display panel at least in part, the shutter assembly including a first sliding door configured to move along a first guide and a second sliding door configured to move along a second guide; and a driving unit configured to drive the first sliding door, wherein the shutter assembly is configured to make friction between the second sliding door and the second guide greater than friction between the first sliding door and the first guide.

16 Claims, 114 Drawing Sheets

FIG.53

| | 1st REEL | 2nd REEL | 3rd REEL | 4th REEL | 5th REEL |
|---|---|---|---|---|---|
| CODE | SYMBOL | SYMBOL | SYMBOL | SYMBOL | SYMBOL |
| 00 | BAR | 2BAR | BAR | 2BAR | BAR |
| 01 | BLANK | BLANK | BLANK | BLANK | BLANK |
| 02 | 7 | 7 | 7 | 7 | 7 |
| 03 | BLANK | BLANK | BLANK | BLANK | BLANK |
| 04 | 3BAR | 3BAR | 3BAR | 3BAR | 3BAR |
| 05 | BLANK | BLANK | BLANK | BLANK | BLANK |
| 06 | BONUS | BONUS | BONUS | BONUS | BONUS |
| 07 | BLANK | BLANK | BLANK | BLANK | BLANK |
| 08 | 2BAR | BAR | 2BAR | BAR | 2BAR |
| 09 | BLANK | BLANK | BLANK | BLANK | BLANK |
| 10 | 3BAR | 3BAR | 3BAR | 3BAR | 3BAR |
| 11 | BLANK | BLANK | BLANK | BLANK | BLANK |
| 12 | 2BAR | BAR | 2BAR | BAR | 2BAR |
| 13 | BLANK | BLANK | BLANK | BLANK | BLANK |
| 14 | 7 | 7 | 7 | 7 | 7 |
| 15 | BLANK | BLANK | BLANK | BLANK | BLANK |
| 16 | 2BAR | BAR | 2BAR | BAR | 2BAR |
| 17 | BLANK | BLANK | BLANK | BLANK | BLANK |
| 18 | BAR | 2BAR | BAR | 2BAR | BAR |
| 19 | BLANK | BLANK | BLANK | BLANK | BLANK |
| 20 | 7 | 7 | 7 | 7 | 7 |
| 21 | BLANK | BLANK | BLANK | BLANK | BLANK |

FIG.54

| | 1st REEL | 2nd REEL | 3rd REEL | 4th REEL | 5th REEL |
|---|---|---|---|---|---|
| CODE | SYMBOL | SYMBOL | SYMBOL | SYMBOL | SYMBOL |
| 00 | BAR | 2BAR | BAR | 2BAR | BAR |
| 01 | BLANK | BLANK | BLANK | BLANK | BLANK |
| 02 | 7 | 7 | 7 | 7 | 7 |
| 03 | BLANK | BLANK | BLANK | BLANK | BLANK |
| 04 | 3BAR | 3BAR | 3BAR | 3BAR | 3BAR |
| 05 | BLANK | BLANK | BLANK | BLANK | BLANK |
| 06 | BONUS | BONUS | BONUS | BONUS | BONUS |
| 07 | BLANK | BLANK | BLANK | BLANK | BLANK |
| 08 | 2BAR | BAR | 2BAR | BAR | 2BAR |
| 09 | BLANK | BLANK | BLANK | BLANK | BLANK |
| 10 | 3BAR | 3BAR | CHANCE | 3BAR | 3BAR |
| 11 | BLANK | BLANK | BLANK | BLANK | BLANK |
| 12 | 2BAR | BAR | 2BAR | BAR | 2BAR |
| 13 | WILD | WILD | WILD | WILD | WILD |
| 14 | WILD | WILD | WILD | WILD | WILD |
| 15 | WILD | WILD | WILD | WILD | WILD |
| 16 | 2BAR | BAR | 2BAR | BAR | 2BAR |
| 17 | BLANK | BLANK | BLANK | BLANK | BLANK |
| 18 | BAR | 2BAR | BAR | 2BAR | BAR |
| 19 | BLANK | BLANK | BLANK | BLANK | BLANK |
| 20 | 7 | 7 | 7 | 7 | 7 |
| 21 | BLANK | BLANK | BLANK | BLANK | BLANK |

FIG.63

| | 1st REEL | 2nd REEL | 3rd REEL | 4th REEL | 5th REEL |
|---|---|---|---|---|---|
| CODE | RANDOM NO. | RANDOM NO. | RANDOM NO. | RANDOM NO. | RANDOM NO. |
| 00 | 0~NU1A | 0~NU2A | 0~NU3A | 0~NU4A | 0~NU5A |
| 01 | NL1A~NU1B | NL2A~NU2B | NL3A~NU3B | NL4A~NU4B | NL5A~NU5B |
| 02 | NL1B~NU1C | NL2B~NU2C | NL3B~NU3C | NL4B~NU4C | NL5B~NU5C |
| 03 | NL1C~NU1D | NL2C~NU2D | NL3C~NU3D | NL4C~NU4D | NL5C~NU5D |
| 04 | NL1D~NU1E | NL2D~NU2E | NL3D~NU3E | NL4D~NU4E | NL5D~NU5E |
| 05 | NL1E~NU1F | NL2E~NU2F | NL3E~NU3F | NL4E~NU4F | NL5E~NU5F |
| 06 | NL1F~NU1G | NL2F~NU2G | NL3F~NU3G | NL4F~NU4G | NL5F~NU5G |
| 07 | NL1G~NU1H | NL2G~NU2H | NL3G~NU3H | NL4G~NU4H | NL5G~NU5H |
| 08 | NL1H~NU1I | NL2H~NU2I | NL3H~NU3I | NL4H~NU4I | NL5H~NU5I |
| 09 | NL1I~NU1J | NL2I~NU2J | NL3I~NU3J | NL4I~NU4J | NL5I~NU5J |
| 10 | NL1J~NU1K | NL2J~NU2K | NL3J~NU3K | NL4J~NU4K | NL5J~NU5K |
| 11 | NL1K~NU1L | NL2K~NU2L | NL3K~NU3L | NL4K~NU4L | NL5K~NU5L |
| 12 | NL1L~NU1M | NL2L~NU2M | NL3L~NU3M | NL4L~NU4M | NL5L~NU5M |
| 13 | NL1M~NU1N | NL2M~NU2N | NL3M~NU3N | NL4M~NU4N | NL5M~NU5N |
| 14 | NL1N~NU1O | NL2N~NU2O | NL3N~NU3O | NL4N~NU4O | NL5N~NU5O |
| 15 | NL1O~NU1P | NL2O~NU2P | NL3O~NU3P | NL4O~NU4P | NL5O~NU5P |
| 16 | NL1P~NU1Q | NL2P~NU2Q | NL3P~NU3Q | NL4P~NU4Q | NL5P~NU5Q |
| 17 | NL1Q~NU1R | NL2Q~NU2R | NL3Q~NU3R | NL4Q~NU4R | NL5Q~NU5R |
| 18 | NL1R~NU1S | NL2R~NU2S | NL3R~NU3S | NL4R~NU4S | NL5R~NU5S |
| 19 | NL1S~NU1T | NL2S~NU2T | NL3S~NU3T | NL4S~NU4T | NL5S~NU5T |
| 20 | NL1T~NU1U | NL2T~NU2U | NL3T~NU3U | NL4T~NU4U | NL5T~NU5U |
| 21 | NL1U~NU1V | NL2U~NU2V | NL3U~NU3V | NL4U~NU4V | NL5U~NU5V |
| 22 | NL1V~LAST | NL2V~LAST | NL3V~LAST | NL4V~LAST | NL5V~LAST |

FIG.64

| TYPE OF GAME RESULTS | CONTROL DATA | IMAGE DATA |
|---|---|---|
| TYPE 1 | CONTROL DATA 1 | IMAGE DATA 1 |
| TYPE 2 | CONTROL DATA 2 | IMAGE DATA 2 |
| TYPE 3 | CONTROL DATA 3 | IMAGE DATA 3 |
| TYPE 4 | CONTROL DATA 4 | IMAGE DATA 4 |
| ⋮ | ⋮ | ⋮ |
| TYPE N | CONTROL DATA N | IMAGE DATA N |

FIG.65

| CONTROL DATA | 1st POSITION | 2st POSITION | ··· | M-th POSITION |
|---|---|---|---|---|
| CONTROL DATA 1 | POSITION 11 | POSITION 21 | ··· | POSITION M1 |
| | TIMING 11 | TIMING 21 | ··· | TIMING M1 |
| CONTROL DATA 2 | POSITION 12 | POSITION 22 | ··· | POSITION M2 |
| | TIMING 12 | TIMING 22 | ··· | TIMING M2 |
| CONTROL DATA 3 | POSITION 13 | POSITION 23 | ··· | POSITION M3 |
| | TIMING 13 | TIMING 23 | ··· | TIMING M3 |
| CONTROL DATA 4 | POSITION 14 | POSITION 24 | ··· | POSITION M4 |
| | TIMING 14 | TIMING 24 | ··· | TIMING M4 |
| ⋮ | ⋮ | ⋮ | ⋮ | ⋮ |
| CONTROL DATA N | POSITION 1N | POSITION 2N | ··· | POSITION MN |
| | TIMING 1N | TIMING 2N | ··· | TIMING MN |

FIG.66

| DISPLAY DATA | OBJECT IMAGE | DISPLAY POSITION | DISPLAY TIMING |
|---|---|---|---|
| DISPLAY DATA 1 | OBJECT IMAGE 1 | DISPLAY POSITION 1 | DISPLAY TIMING 1 |
| DISPLAY DATA 2 | OBJECT IMAGE 2 | DISPLAY POSITION 2 | DISPLAY TIMING 2 |
| DISPLAY DATA 3 | OBJECT IMAGE 3 | DISPLAY POSITION 3 | DISPLAY TIMING 3 |
| DISPLAY DATA 4 | OBJECT IMAGE 4 | DISPLAY POSITION 4 | DISPLAY TIMING 4 |
| ⋮ | ⋮ | ⋮ | ⋮ |
| DISPLAY DATA N | OBJECT IMAGE N | DISPLAY POSITION N | DISPLAY TIMING N |

FIG.91

| CODE | 1st REEL RANDOM NO. | 2nd REEL RANDOM NO. | 3rd REEL RANDOM NO. | 4th REEL RANDOM NO. | 5th REEL RANDOM NO. |
|---|---|---|---|---|---|
| 00 | 0~BU1A | 0~BU2A | 0~BU3A | 0~BU4A | 0~BU5A |
| 01 | BL1A~BU1B | BL2A~BU2B | BL3A~BU3B | BL4A~BU4B | BL5A~BU5B |
| 02 | BL1B~BU1C | BL2B~BU2C | BL3B~BU3C | BL4B~BU4C | BL5B~BU5C |
| 03 | BL1C~BU1D | BL2C~BU2D | BL3C~BU3D | BL4C~BU4D | BL5C~BU5D |
| 04 | BL1D~BU1E | BL2D~BU2E | BL3D~BU3E | BL4D~BU4E | BL5D~BU5E |
| 05 | BL1E~BU1F | BL2E~BU2F | BL3E~BU3F | BL4E~BU4F | BL5E~BU5F |
| 06 | BL1F~BU1G | BL2F~BU2G | BL3F~BU3G | BL4F~BU4G | BL5F~BU5G |
| 07 | BL1G~BU1H | BL2G~BU2H | BL3G~BU3H | BL4G~BU4H | BL5G~BU5H |
| 08 | BL1H~BU1I | BL2H~BU2I | BL3H~BU3I | BL4H~BU4I | BL5H~BU5I |
| 09 | BL1I~BU1J | BL2I~BU2J | BL3I~BU3J | BL4I~BU4J | BL5I~BU5J |
| 10 | BL1J~BU1K | BL2J~BU2K | BL3J~BU3K | BL4J~BU4K | BL5J~BU5K |
| 11 | BL1K~BU1L | BL2K~BU2L | BL3K~BU3L | BL4K~BU4L | BL5K~BU5L |
| 12 | BL1L~BU1M | BL2L~BU2M | BL3L~BU3M | BL4L~BU4M | BL5L~BU5M |
| 13 | BL1M~BU1N | BL2M~BU2N | BL3M~BU3N | BL4M~BU4N | BL5M~BU5N |
| 14 | BL1N~BU1O | BL2N~BU2O | BL3N~BU3O | BL4N~BU4O | BL5N~BU5O |
| 15 | BL1O~BU1P | BL2O~BU2P | BL3O~BU3P | BL4O~BU4P | BL5O~BU5P |
| 16 | BL1P~BU1Q | BL2P~BU2Q | BL3P~BU3Q | BL4P~BU4Q | BL5P~BU5Q |
| 17 | BL1Q~BU1R | BL2Q~BU2R | BL3Q~BU3R | BL4Q~BU4R | BL5Q~BU5R |
| 18 | BL1R~BU1S | BL2R~BU2S | BL3R~BU3S | BL4R~BU4S | BL5R~BU5S |
| 19 | BL1S~BU1T | BL2S~BU2T | BL3S~BU3T | BL4S~BU4T | BL5S~BU5T |
| 20 | BL1T~BU1U | BL2T~BU2U | BL3T~BU3U | BL4T~BU4U | BL5T~BU5U |
| 21 | BL1U~BU1V | BL2U~BU2V | BL3U~BU3V | BL4U~BU4V | BL5U~BU5V |
| 22 | BL1V~LAST | BL2V~LAST | BL3V~LAST | BL4V~LAST | BL5V~LAST |

FIG.93

| | 1st REEL | 2nd REEL | 3rd REEL | 4th REEL | 5th REEL |
|---|---|---|---|---|---|
| CODE | RANDOM NO. | RANDOM NO. | RANDOM NO. | RANDOM NO. | RANDOM NO. |
| 00 | 0~CU1A | 0~CU2A | 0~CU3A | 0~CU4A | 0~CU5A |
| 01 | CL1A~CU1B | CL2A~CU2B | CL3A~CU3B | CL4A~CU4B | CL5A~CU5B |
| 02 | CL1B~CU1C | CL2B~CU2C | CL3B~CU3C | CL4B~CU4C | CL5B~CU5C |
| 03 | CL1C~CU1D | CL2C~CU2D | CL3C~CU3D | CL4C~CU4D | CL5C~CU5D |
| 04 | CL1D~CU1E | CL2D~CU2E | CL3D~CU3E | CL4D~CU4E | CL5D~CU5E |
| 05 | CL1E~CU1F | CL2E~CU2F | CL3E~CU3F | CL4E~CU4F | CL5E~CU5F |
| 06 | CL1F~CU1G | CL2F~CU2G | CL3F~CU3G | CL4F~CU4G | CL5F~CU5G |
| 07 | CL1G~CU1H | CL2G~CU2H | CL3G~CU3H | CL4G~CU4H | CL5G~CU5H |
| 08 | CL1H~CU1I | CL2H~CU2I | CL3H~CU3I | CL4H~CU4I | CL5H~CU5I |
| 09 | CL1I~CU1J | CL2I~CU2J | CL3I~CU3J | CL4I~CU4J | CL5I~CU5J |
| 10 | CL1J~CU1K | CL2J~CU2K | CL3J~CU3K | CL4J~CU4K | CL5J~CU5K |
| 11 | CL1K~CU1L | CL2K~CU2L | CL3K~CU3L | CL4K~CU4L | CL5K~CU5L |
| 12 | CL1L~CU1M | CL2L~CU2M | CL3L~CU3M | CL4L~CU4M | CL5L~CU5M |
| 13 | CL1M~CU1N | CL2M~CU2N | CL3M~CU3N | CL4M~CU4N | CL5M~CU5N |
| 14 | CL1N~CU1O | CL2N~CU2O | CL3N~CU3O | CL4N~CU4O | CL5N~CU5O |
| 15 | CL1O~CU1P | CL2O~CU2P | CL3O~CU3P | CL4O~CU4P | CL5O~CU5P |
| 16 | CL1P~CU1Q | CL2P~CU2Q | CL3P~CU3Q | CL4P~CU4Q | CL5P~CU5Q |
| 17 | CL1Q~CU1R | CL2Q~CU2R | CL3Q~CU3R | CL4Q~CU4R | CL5Q~CU5R |
| 18 | CL1R~CU1S | CL2R~CU2S | CL3R~CU3S | CL4R~CU4S | CL5R~CU5S |
| 19 | CL1S~CU1T | CL2S~CU2T | CL3S~CU3T | CL4S~CU4T | CL5S~CU5T |
| 20 | CL1T~CU1U | CL2T~CU2U | CL3T~CU3U | CL4T~CU4U | CL5T~CU5U |
| 21 | CL1U~CU1V | CL2U~CU2V | CL3U~CU3V | CL4U~CU4V | CL5U~CU5V |
| 22 | CL1V~LAST | CL2V~LAST | CL3V~LAST | CL4V~LAST | CL5V~LAST |

DISPLAY DEVICE FOR GAMING MACHINE AND GAMING MACHINE INCLUDING THE SAME

BACKGROUND (a) Field

The present invention generally relates to a display device for a gaming machine and a gaming machine including the same.

(b) Description of the Related Art

A gaming machine executes a game to rearrange symbols, and awards a benefit to the player according to a result of the rearranged symbols. Various gaming machines have been developed to meet players' various preferences, so various features such as symbol patterns, gaming scenarios, side effects such as background sound and additional visual display, and reel spinning schemes have been varied.

A gaming machine operator wants the players to frequently play the games, thereby increasing their profits. However, visual effects that are provided by varying the above features are general effects that can be provided by gaming machines of other operators. Accordingly, there are limits to continuously attracting the players' attention through only the above features.

SUMMARY

A display device for a gaming machine according to an embodiment of the present invention includes: a display panel configured to display images for a game; a shutter assembly configured to cover and uncover the display panel at least in part, the shutter assembly including a first sliding door configured to move along a first guide and a second sliding door configured to move along a second guide; a driving unit configured to drive the first sliding door, wherein the shutter assembly is configured to make friction between the second sliding door and the second guide greater than friction between the first sliding door and the first guide.

Each of the first sliding door and the second sliding door may include a roller configured to contact the first guide or the second guide, and the roller of the second sliding door may include a material having coefficient of friction greater than coefficient of friction of a material of the roller of the second sliding door.

One of the first sliding door and the second sliding door may include a catching member configured to catch another of the first sliding door and the second sliding door such that the second sliding door follows movement of the first sliding door.

The shutter assembly may further include a third sliding door configured to move along the first guide and driven by the driving unit and a fourth sliding door configured to move along the second guide, and the third sliding door and the fourth sliding door are arranged in a way reversed to the first sliding door and the second sliding door, respectively.

The shutter assembly may be configured to make friction between the second sliding door and the second guide greater than friction between the first sliding door and the first guide.

The driving unit may include a motor and a power transmission member that is configured to transmit power generated by the motor to the first sliding door and includes a belt and a pair of pulleys coupled to the belt.

The shutter assembly may further include a belt catcher coupled to the first sliding door and the belt, and the belt catcher may include a pair of protrusions forming a recess to receive the belt, and at least one of the pair of protrusions may include teeth.

The driving unit may further include a photosensor including a light emitter and a light receiver, and the belt catcher may further include a detection member configured to be disposed between the light emitter and the light receiver when the belt catcher overlaps the photosensor.

The driving unit may further include a magnetic sensor coupled to one of the pair of pulleys, the magnetic sensor configured to detect rotation of the one of the pair of pulleys to inform of a position of the first sliding door.

The first guide may include an upper guide channel between the belt and the first sliding door, the first guide channel has a trench, and the belt catcher fixed to the first sliding door through the trench.

The second sliding door may include the catching member, and the catching member catches opposite edges of the first sliding door when the first sliding member moves in reverse directions.

The second sliding door moves along with the first sliding door when the first sliding door and the second sliding door substantially fully overlap each other, and the second sliding door stops otherwise.

A gaming machine according to an embodiment of the present invention includes: a display device configured to display images for a game; an input device configured to receive input from a player; a controller configured to execute the game and to control the display device; wherein the display device includes: a display panel; a shutter assembly configured to cover and uncover the display panel at least in part, the shutter assembly including a first sliding door configured to move along a first guide and a second sliding door configured to move along a second guide; a driving unit configured to drive the first sliding door, wherein at least one of the first sliding door and the second sliding door includes a catching member configured to catch another of the first sliding door and the second sliding door such that the second sliding door follows movement of the first sliding door after the catching member catches the another of the first sliding door and the second sliding door, wherein the second sliding door includes the catching member, and the catching member catches opposite edges of the first sliding door when the first sliding member moves in reverse directions, wherein the second sliding door moves along with the first sliding door when the first sliding door and the second sliding door substantially fully overlap each other, and the second sliding door stops otherwise, the shutter assembly is configured to make friction between the second sliding door and the second guide greater than friction between the first sliding door and the first guide.

Each of the first sliding door and the second sliding door may include a roller configured to contact the first guide or the second guide, and the roller of the second sliding door may include a material having coefficient of friction greater than coefficient of friction of a material of the roller of the second sliding door.

One of the first sliding door and the second sliding door may include a catching member configured to catch another of the first sliding door and the second sliding door such that the second sliding door follows movement of the first sliding door.

The shutter assembly may further include a third sliding door configured to move along the first guide and driven by the driving unit and a fourth sliding door configured to move along the second guide, and the third sliding door and the fourth sliding door are arranged in a way reversed to the first sliding door and the second sliding door, respectively.

BRIEF DESCRIPTION OF THE DRAWINGS

FIGS. 53 and 54 are symbol code tables according to an embodiment of the present invention.

FIG. 63 shows an example of a symbol code determination table for a normal mode game according to an embodiment of the present invention.

FIG. 64 to FIG. 66 show examples of control data and image data according to an embodiment of the present invention.

FIG. 91 shows an example of symbol code determination tables for a bonus mode game according to an embodiment of the present invention.

FIG. 93 shows an example of symbol code determination tables for a chance mode game according to an embodiment of the present invention.

DETAILED DESCRIPTION

Figure 1:
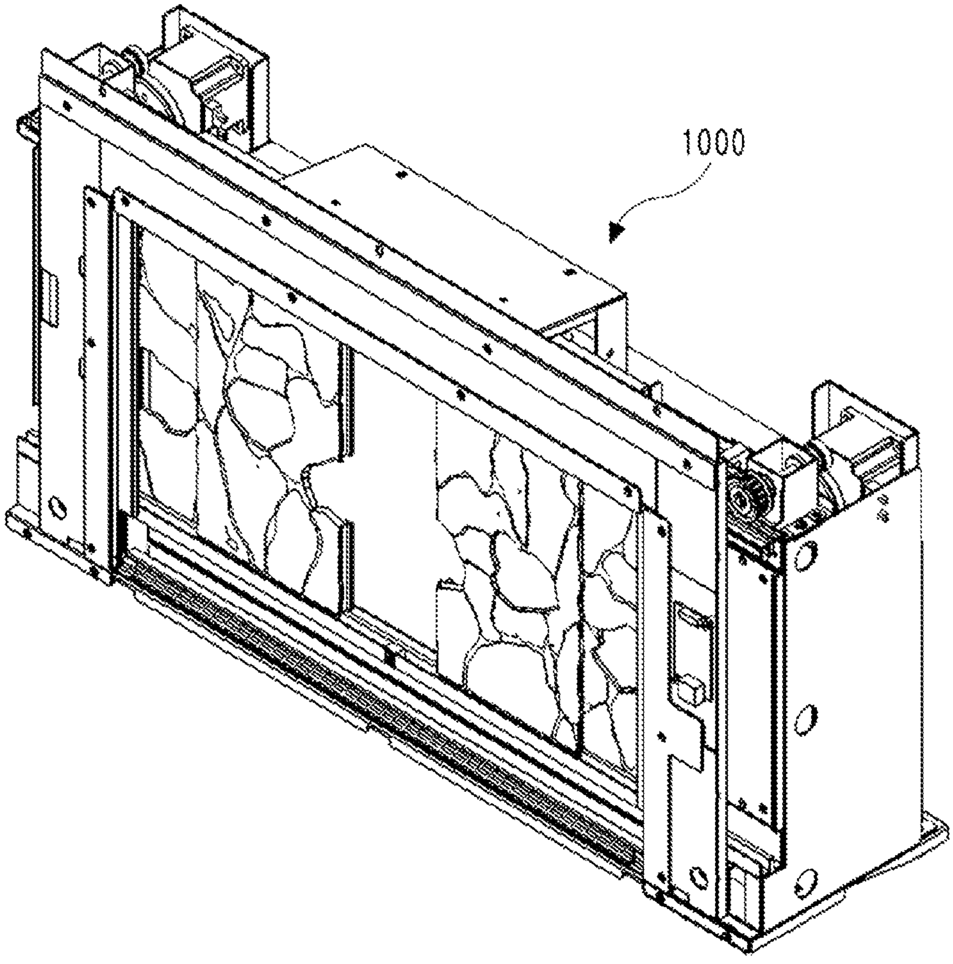
FIG. 1 is a schematic perspective view of a display device for a gaming machine according to an embodiment of the present invention.

In the following detailed description, only some of embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Outline of Display Device for Gaming Machine

A display device for a gaming machine according to embodiments of the present invention is described with reference to FIG. 1 and FIG. 2.

Figure 2:
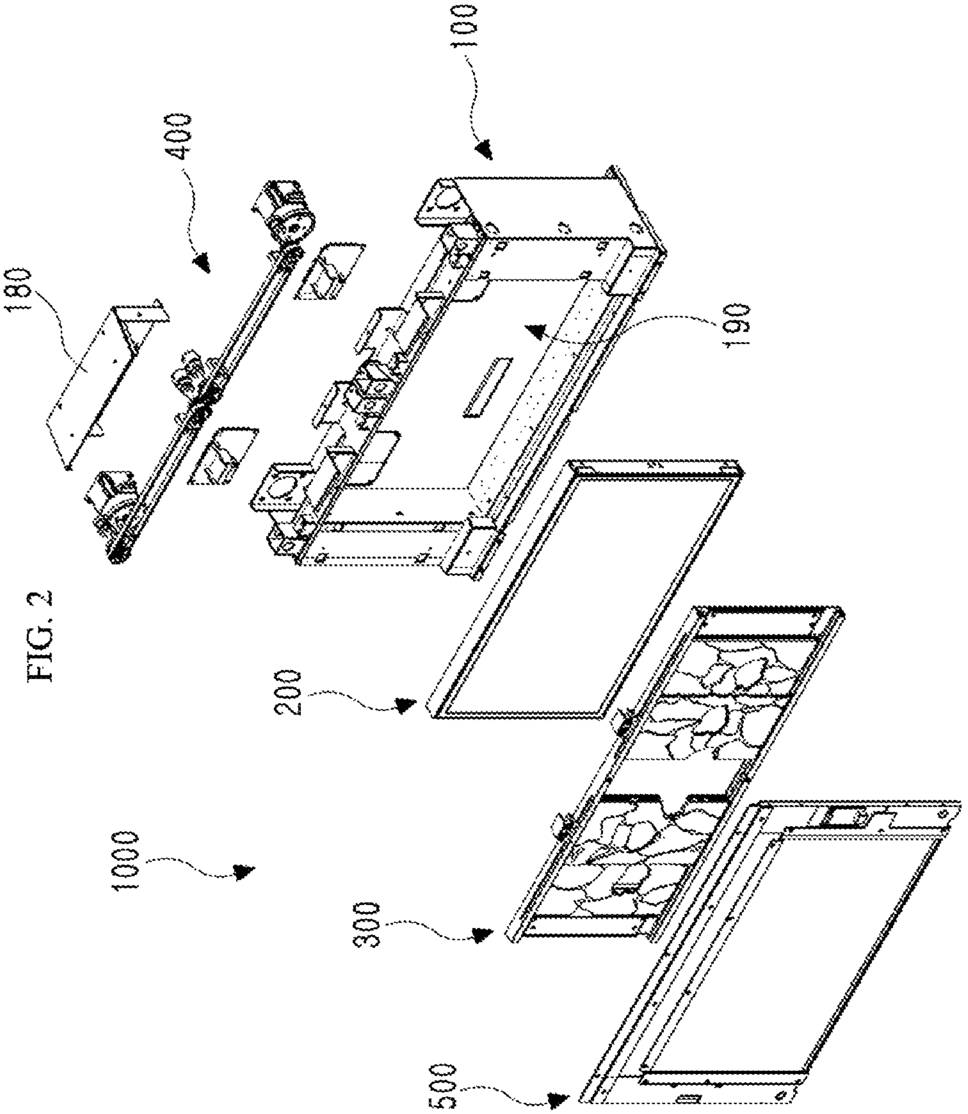
FIG. 2 is a schematic exploded view of the display device shown in FIG. 1.

FIG. 1 is a schematic perspective view of a display device for a gaming machine according to an embodiment of the present invention, and FIG. 2 is a schematic exploded view of the display device shown in FIG. 1.

Referring to FIG. 1 and FIG. 2, a display device 1000 for a gaming machine according to embodiments of the present invention includes a frame 100, a display panel assembly 200, a shutter assembly 300, a driving unit 400, and a touch panel assembly 500.

The shutter assembly 300 may be disposed in front of the display panel assembly 200, and may be driven by the driving unit 400 to selectively cover the display panel assembly 200. The frame 100 may support the display panel assembly 200, the shutter assembly 300, the driving unit 400, and the touch panel assembly 500. For example, the frame 100 may form a space 190 therein so that the display panel assembly 200 may be received in the space 190 of the frame 100.

The display device 1000 may have a rough bilateral symmetry, but embodiments of the present invention are not limited thereto.

The display device 1000 may be coupled to a gaming machine (not shown). For example, the display device 1000 may be used as a secondary display of a gaming machine.

Now, exemplary structures of the frame 100, the display panel assembly 200, the shutter assembly 300, and the driving unit 400 are described with reference to corresponding figures.

Frame

First, the frame 100 according to embodiments of the present invention is described in detail with reference to FIG. 3 to FIG. 13.

Figure 3:
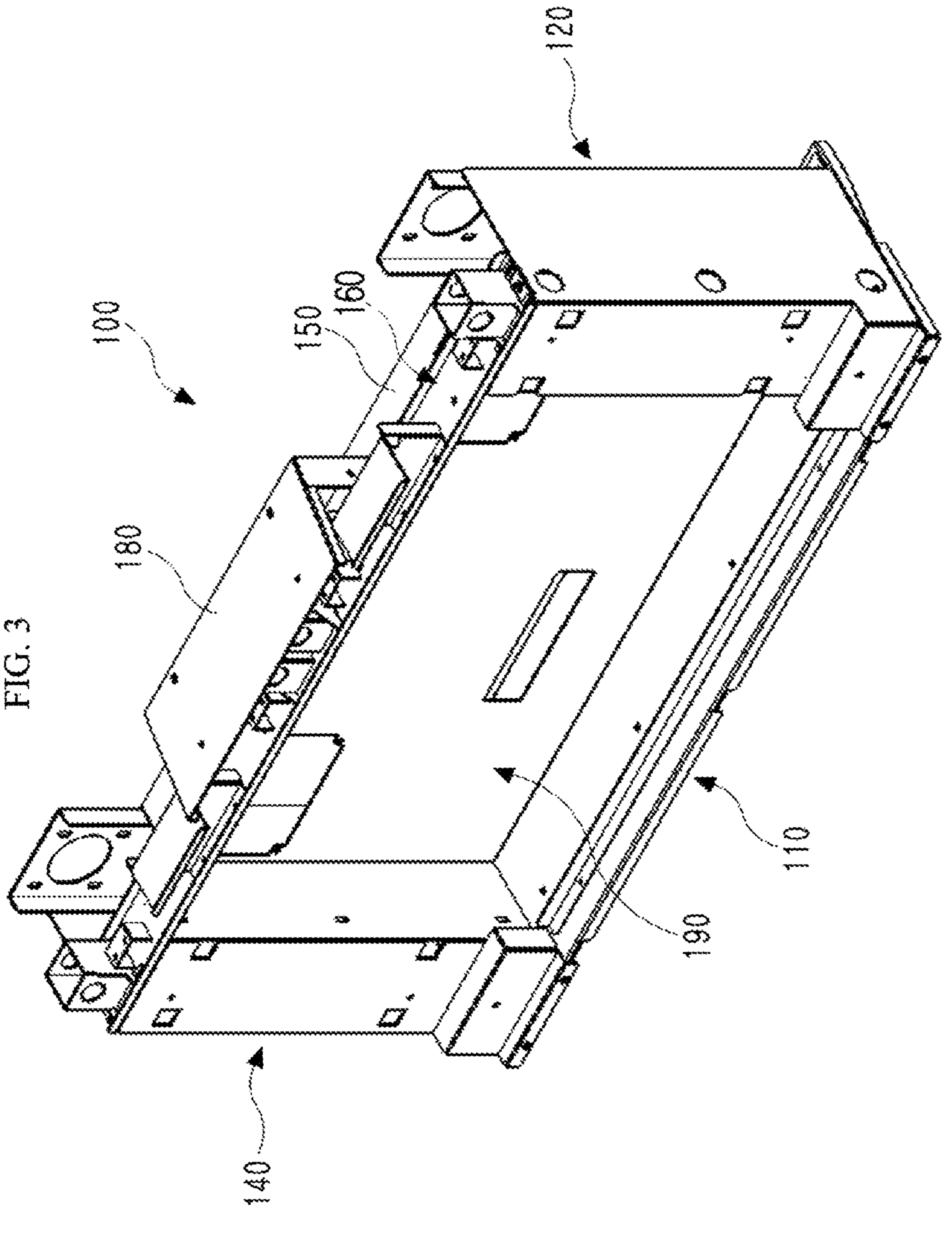
FIG. 3 is a schematic perspective view of the frame shown in FIG. 1 and FIG. 2 according to an embodiment of the present invention.
Figure 4:
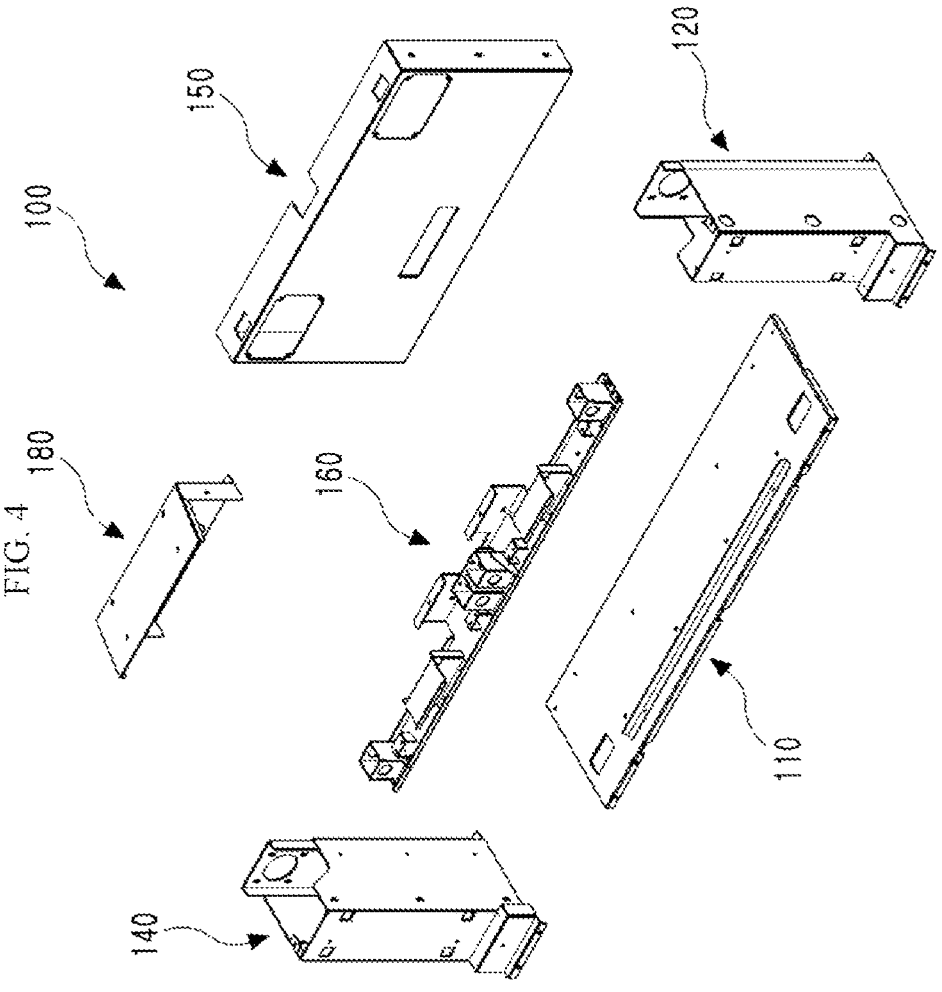
FIG. 4 is a schematic exploded view of the frame shown in FIG. 3.
Figure 5:
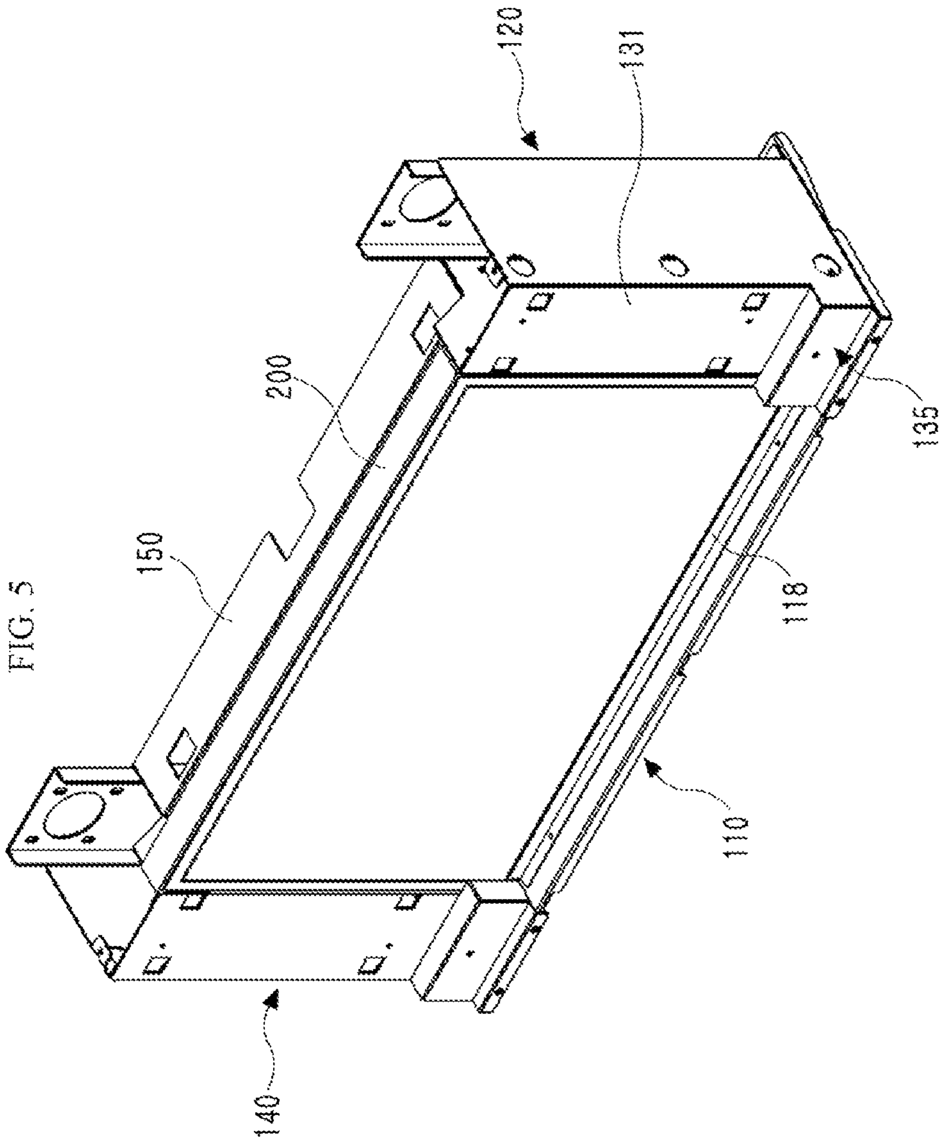
FIG. 5 is a schematic perspective view of parts of the frame and the display panel assembly.
Figure 6:
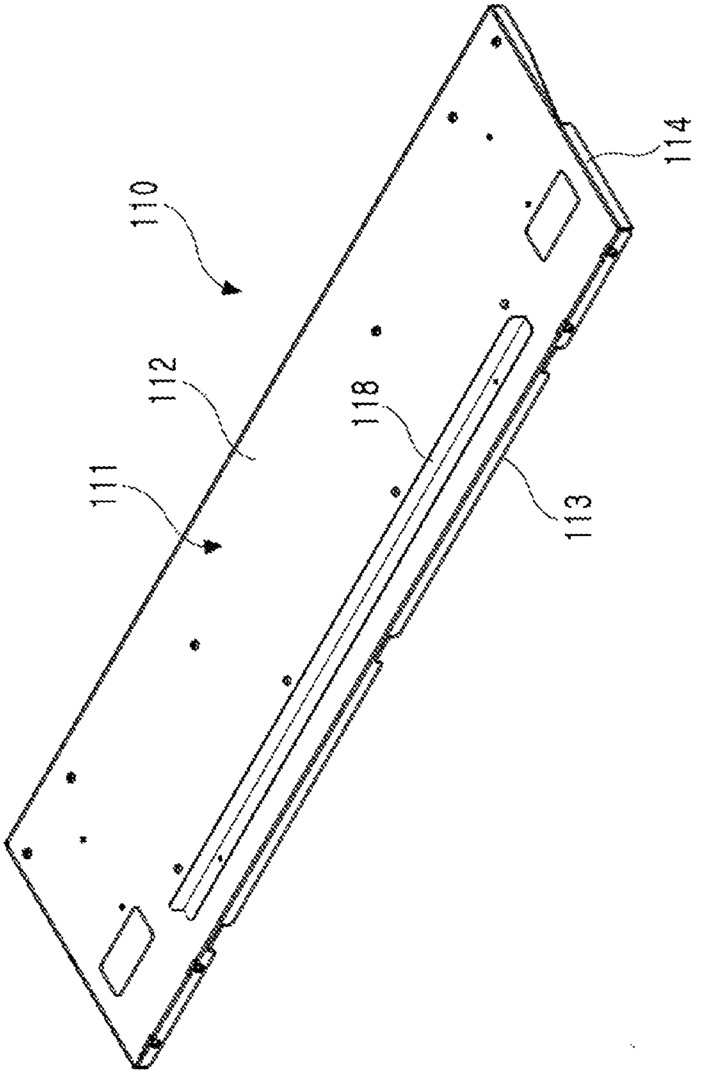
FIG. 6 and FIG. 7 are schematic perspective views of a base assembly of the frame shown in FIG. 3 according to an embodiment of the present invention.
Figure 7:
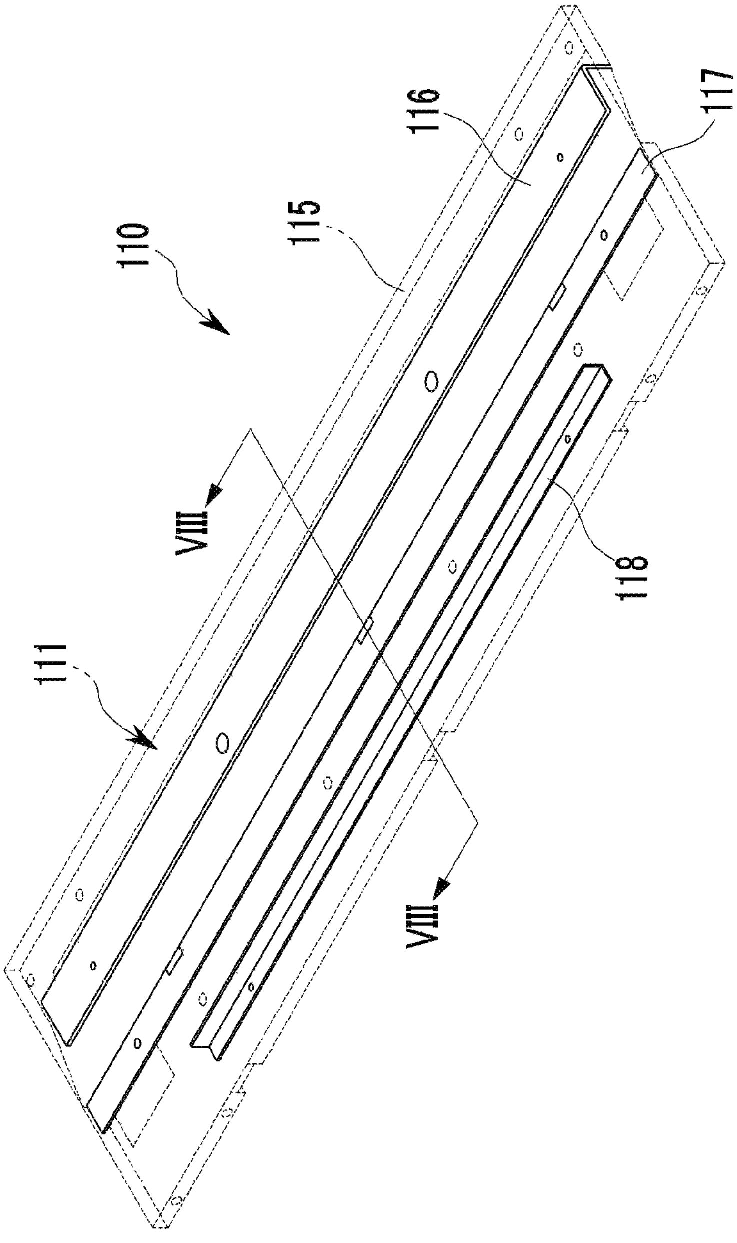
Figure 8:
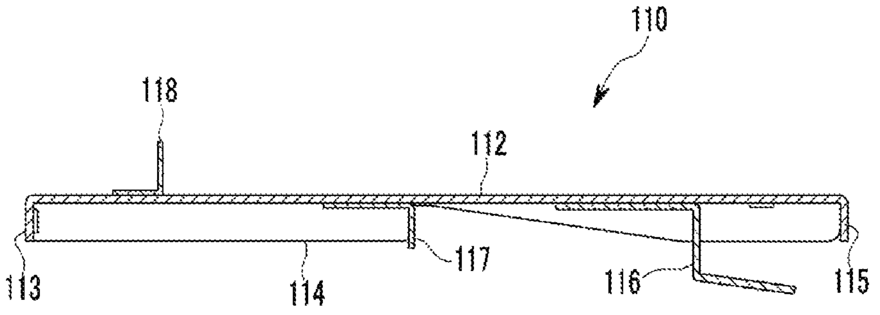
FIG. 8 is a sectional view of the base assembly shown in FIG. 6 and FIG. 7 taken along line VIII-VIII.
Figure 9:
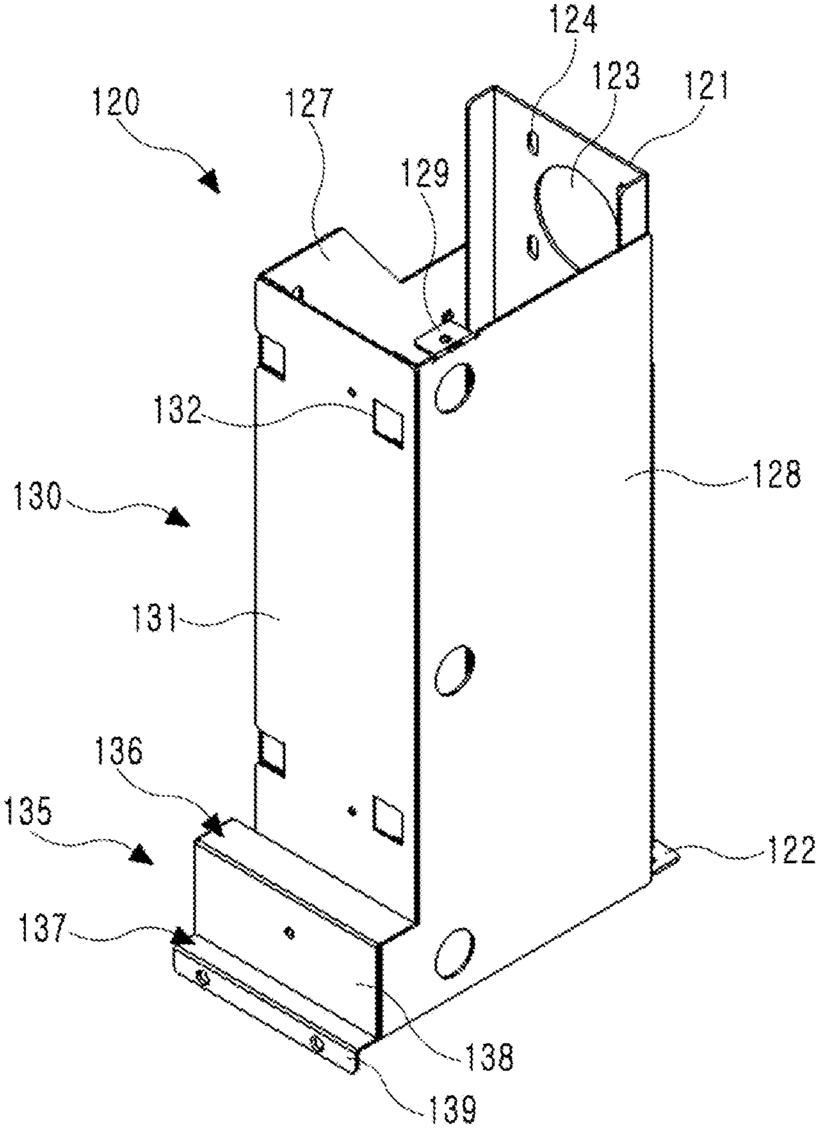
FIG. 9 is a schematic perspective view of a right column of the frame shown in FIG. 3 according to an embodiment of the present invention.
Figure 10:
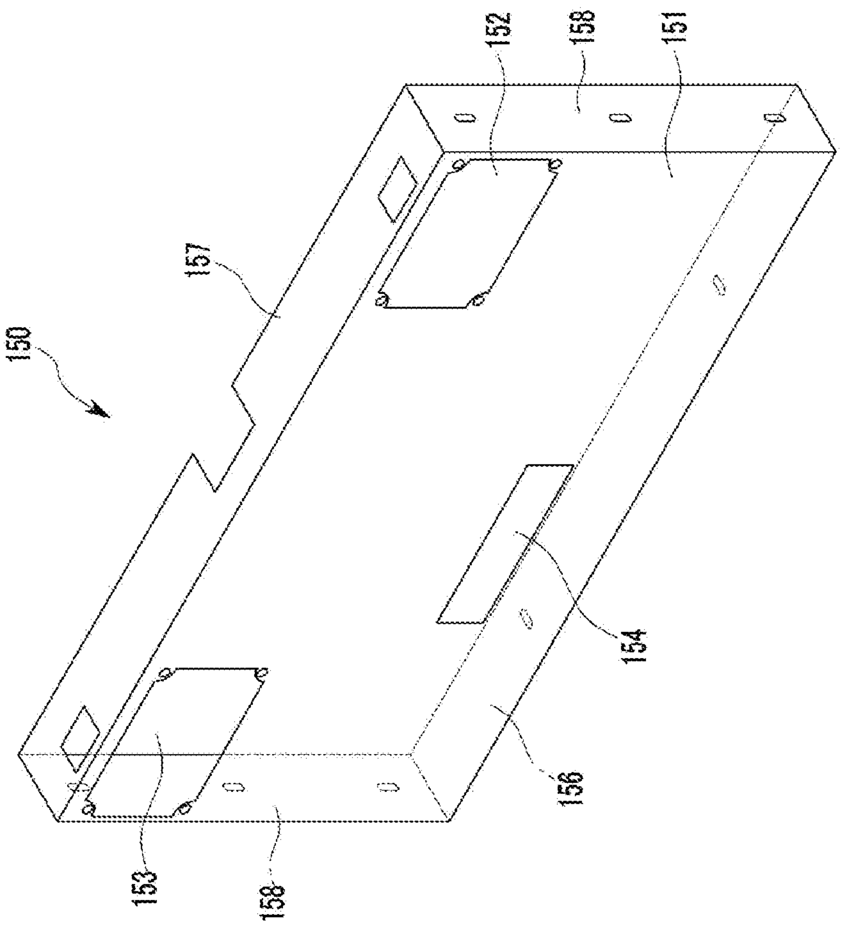
FIG. 10 is a schematic perspective view of a rear plate of the frame shown in FIG. 3 according to an embodiment of the present invention.
Figure 11:
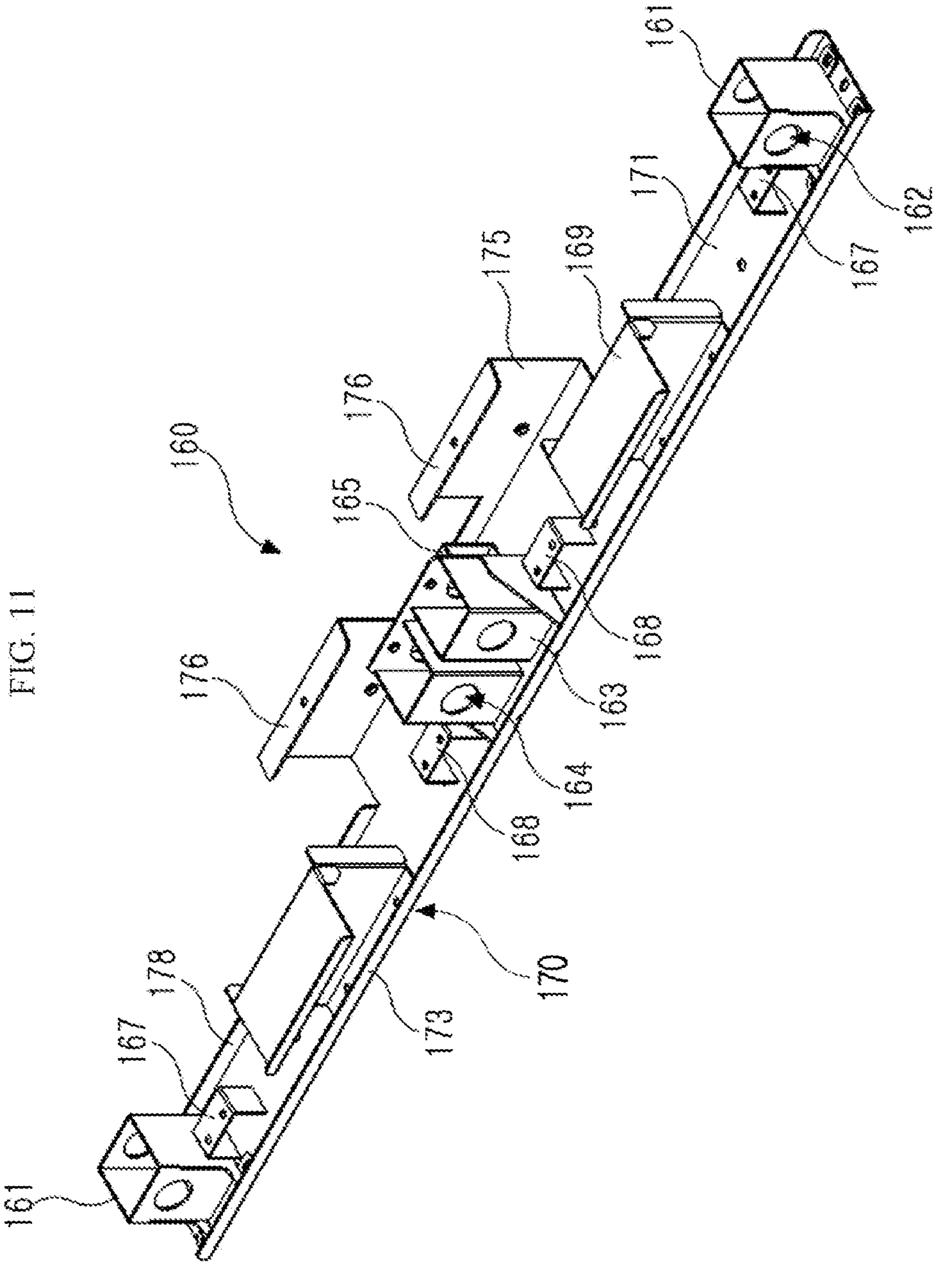
FIG. 11 is a schematic perspective view of a top assembly of the frame shown in FIG. 3 according to an embodiment of the present invention.
Figure 12:
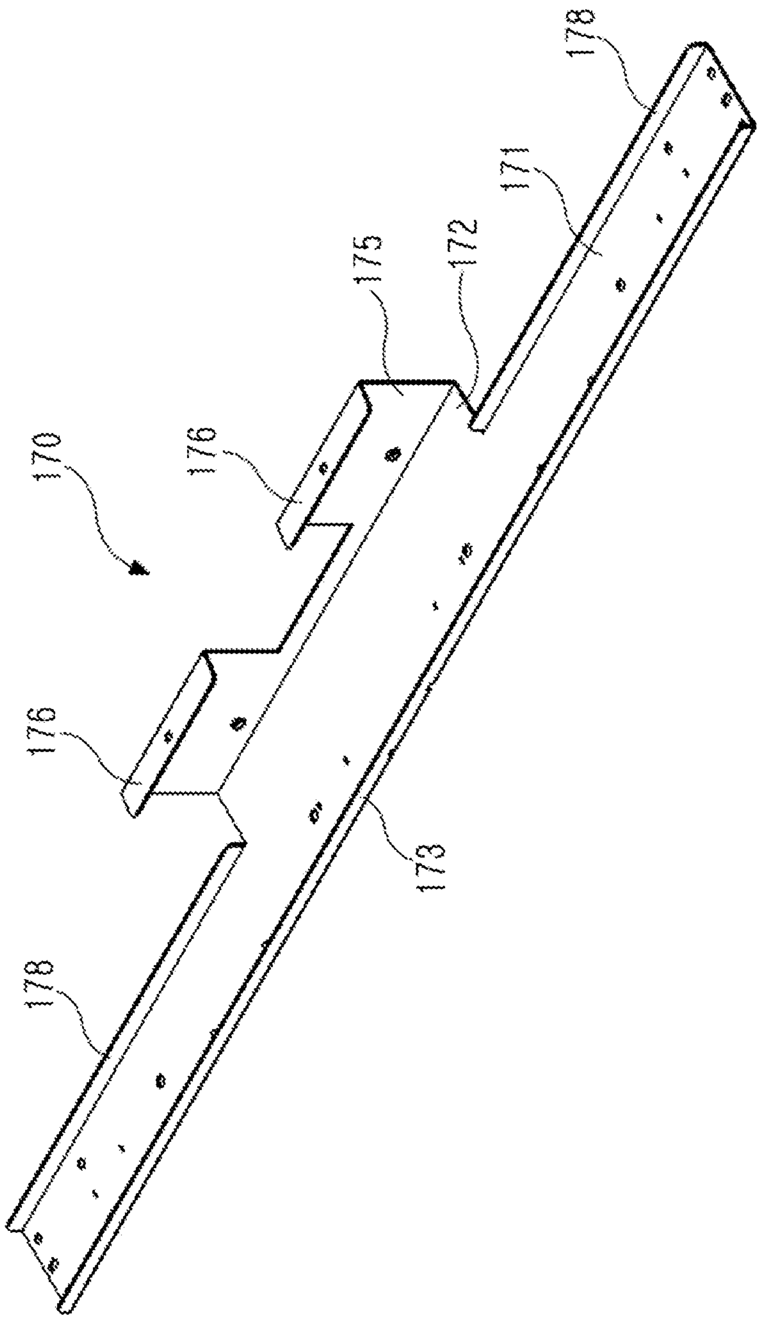
FIG. 12 is a schematic perspective view of a top plate of the top assembly shown in FIG. 11 according to an embodiment of the present invention.
Figure 13:
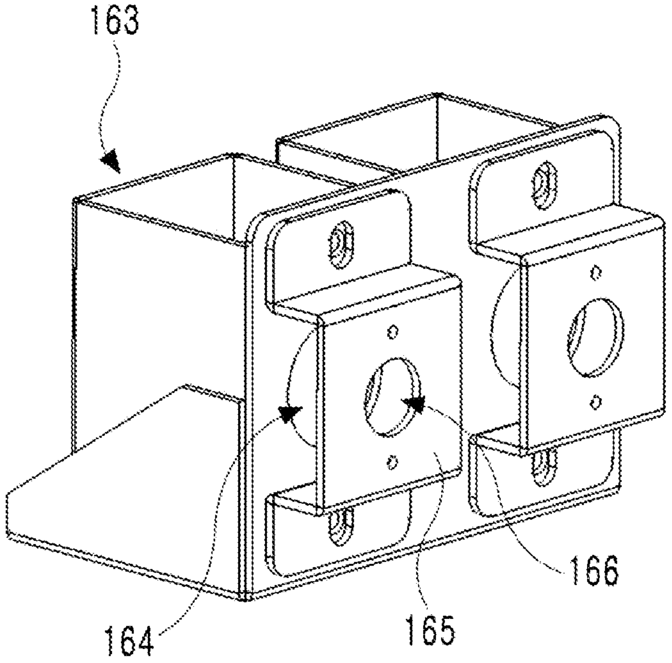
FIG. 13 is a schematic rear perspective view of idle pulley supports and magnetic sensor supports of the top plate of the top assembly shown in FIG. 11 according to an embodiment of the present invention.

FIG. 3 is a schematic perspective view of the frame shown in FIG. 1 and FIG. 2 according to an embodiment of the present invention, FIG. 4 is a schematic exploded view of the frame shown in FIG. 3, FIG. 5 is a schematic perspective view of parts of the frame and the display panel assembly, FIG. 6 and FIG. 7 are schematic perspective views of a base assembly of the frame shown in FIG. 3 according to an embodiment of the present invention, FIG. 8 is a sectional view of the base assembly shown in FIG. 6 and FIG. 7 taken along line VIII-VIII, FIG. 9 is a schematic perspective view of a right column of the frame shown in FIG. 3 according to an embodiment of the present invention, FIG. 10 is a schematic perspective view of a rear plate of the frame shown in FIG. 3 according to an embodiment of the present invention, FIG. 11 is a schematic perspective view of a top assembly of the frame shown in FIG. 3 according to an embodiment of the present invention, FIG. 12 is a schematic perspective view of a top plate of the top assembly shown in FIG. 11 according to an embodiment of the present invention, and FIG. 13 is a schematic rear perspective view of idle pulley supports and magnetic sensor supports of the top plate of the top assembly shown in FIG. 11 according to an embodiment of the present invention.

Referring to FIG. 3 and FIG. 4, the frame 100 according to embodiments of the present invention may include a base assembly 110, a right column 120, a left column 140, a rear plate 150, a top assembly 160, and a cover plate 180. The frame 100 according to embodiments of the present invention may have a bilateral symmetry. For example, the right column 120 and the left column 140 may be bilaterally symmetrical, and each of the base assembly 110, the rear plate 150, the top assembly 160, and the cover plate 180 may have a bilateral symmetry by itself. However, embodiments of the present invention are not limited thereto.

The right column 120, the left column 140, and the rear plate 150 may be coupled to the base assembly 110. The top assembly 160 may be coupled to the right column 120 and the left column 140, and the cover plate 180 may be coupled to the top assembly 160. The base assembly 110, the right column 120, the left column 140, the rear plate 150, and the top assembly 160 may form the space 190 configured to receive the display panel assembly 200, and FIG. 5 shows the display panel assembly 200 received in the space 190 of the frame 100.

Referring to FIG. 6 to FIG. 8, the base assembly 110 according to embodiments of the present invention may include a base plate 111, a first support 116, a second support 117, and a threshold 118. The first support 116, the second support 117, and the threshold 118 may be fixed to the base plate 111.

The base plate 111 may include a horizontal portion 112 and a plurality of vertical portions 113, 114 and 115 connected to the horizontal portion 112. The horizontal portion 112 may have a flat surface, and may have a shape of a rectangle that has a pair of transverse edges and a pair of longitudinal edges shorter than the transverse edges. The vertical portions 113, 114 and 115 may be connected to respective edges of the horizontal portion 112, and may have rectilinear or curved bottom edges. For example, a front vertical portion 113 may be connected to a front edge of the horizontal portion 112, and a rear vertical portion 115 may be connected to a rear edge of the horizontal portion 112, while a pair of lateral vertical portions 114 may be connected to lateral edges of the horizontal portion 112. The vertical portions 113, 114 and 115 may serve as supports for the horizontal portion 112, and the front vertical portion 113 may be coupled with the right column 120 and the left column 140.

The first support 116 and the second support 117 may be coupled to or fixed to a bottom surface of the horizontal portion 112 of the base plate 111, and may extend along a longitudinal direction. The first support 116 may be folded twice to include a horizontal portion, a vertical portion, and an inclined portion connected in series. The horizontal portion of the first support 116 may face the bottom surface of the horizontal portion 112 of the base plate 111, and may be fixed thereto. At least a part of the vertical portion and the inclined portion of the first support 116 may project below the vertical portions 113, 114 and 115 of the base plate 111. The second support 117 may be disposed in front of the first support 116, and may be folded once to have a horizontal portion and a vertical portion connected to the horizontal portion. The horizontal portion of the second support 117 may face the bottom surface of the horizontal portion 112 of the base plate 111, and may be fixed thereto.

A bottom edge of the first support 116 may be disposed lower than a bottom edge of the second support 117 and the bottom edges of the base plate 111, and the horizontal portion 112 of the base plate 111 and thus the display device 1000 disposed thereon may become inclined frontward when the display device 1000 is placed on a horizontal surface.

The threshold 118 may be coupled to or fixed to a top surface of the horizontal portion 112 of the base plate 111, and may extend in the longitudinal direction. The threshold 118 may be folded once to have a horizontal portion and a vertical portion connected thereto. The horizontal portion of the threshold 118 may face the top surface of the horizontal portion 112 of the base plate 111, and may be fixed thereto. The vertical portion of the threshold 118 may project upward so that the threshold 118 may be configured to set a front boundary of the space 190 of the frame 100, which receives the display panel assembly 200, as shown in FIG. 5.

The right column 120 and the left column 140 may be affixed to the base plate 111 of the base assembly 110, and may include supports for the display device assembly 300, the driving unit 400, the touch panel assembly 500, and the top assembly 160.

Referring to FIG. 9, the right column 120 according to embodiments of the present invention may include a front plate 130, a rear plate 121, an inner plate 127, and an outer plate 128. The front plate 121 and the rear plate 125 facing each other may be fixed to the inner plate 127 and the outer plate 128 facing each other.

The front plate 130 may include an upper portion 131 and a lower portion 135 connected to the upper portion 131. The upper portion 131 of the front plate 131 may stand vertically, and may be rectangular. The upper portion 131 may be coupled to the shutter assembly 300, and may have a plurality of holes, for example, four rectangular holes 132 disposed near corners thereof. The lower portion 135 may project frontward from a lower edge of the upper portion 131, and may be folded at least once, for example, three times. The lower portion 135 may include a shutter support 136 configured to support the shutter assembly 300, and may further include a touch panel support 137 configured to support the touch panel assembly 500. The lower portion 135 may further include coupling members, for example, a first vertical surface 138 configured to be coupled to the touch panel assembly 500 and a second vertical surface 139 configured to be coupled to the base plate 111 of the base assembly 110. The second vertical surface 139 of the front plate 130 of the right column 120 and the front vertical portion 113 of the base plate 111 of the base assembly 110 may be affixed together by fasteners, for example, flat head screws, but embodiments of the present invention are not limited thereto.

Referring to FIG. 9 and FIG. 5, an inner edge of the lower portion 135 of the front plate 130 may project inwards from an inner edge of the upper portion 131 so that the lower portion 135 may fence the display panel assembly 200 placed in the space 190 of the frame 100.

The rear plate 121 may stand vertically, and may include a coupling member 122 configured to be coupled with the base plate 111 of the base assembly 110. The coupling member 124 may be, for example, a horizontal extension protruding rearwards, and may be affixed to the horizontal portion 112 of the base plate 111 of the base assembly 110 by fasteners, for example, screws, but embodiments of the present invention are not limited thereto. The rear plate 121 may support at least a portion of the driving unit 400. For example, the rear plate 121 may have a central supporting hole 123 and a plurality of peripheral supporting holes 124 surrounding the central supporting hole 123 near an upper edge thereof. The central supporting hole 123 may be circular and much larger than the peripheral supporting holes 124 that may have a shape of a round rectangle. However, the shapes and the sizes of the central supporting hole 123 and the peripheral supporting holes 124 may not be limited thereto.

The inner plate 127 and the outer plate 128 may stand vertically. The inner plate 127 may be coupled with the rear plate 150. The outer plate 128 may include a coupling member 129 configured to be coupled with the top assembly 160. The coupling member 124 may be, for example, a small horizontal extension protruding inwards.

The left column 140 may have a structure having a substantially bilateral symmetry with the right column 120, and thus detailed description thereof is omitted.

The rear plate 150 of the frame 100 may be affixed to the base plate 111 of the base assembly 110 and to the inner plate 127 of the right column 120 as well as an inner plate of the left column 140. The rear plate 150 may also support portions of the driving unit 400.

Referring to FIG. 10, the rear plate 150 may have a shape of a rectangular box without a lid, which stands laterally so that a bottom surface of the box may face frontwards. The rear plate 150 may include a front portion 151, a bottom portion 156, a top portion 157, and a pair of later portions 158. The front portion 151 may stand vertically, and may have a plurality of through holes 152, 153 and 154. The thorough holes 152, 153 and 154 may include a pair of upper through holes 152 and 153 and a lower through hole 154, and each of the through holes 152, 153 and 154 may be nearly rectangular. The bottom portion 156 and the top portion 157 may be laid horizontal, and the bottom portion 156 may be fixed to the horizontal portion 112 of the base plate 111 of the base assembly 110. The pair of lateral portions 158 may stand vertically, and may be fixed to the inner plate 127 of the right column 120 as well as the inner plate of the left column 140.

The top assembly 160 may include supports for the driving unit 400 and the cover plate 180, and may be affixed to the outer plate 128 of the right column 120 as well as an outer plate of the left column 140.

Referring to FIG. 11, the top assembly 160 may include a top plate 170, and a plurality of pairs of supports 161, 163, 165, 167 and 168 and a pair of cover plates 169 coupled to or fixed to the top plate 170.

Referring to FIG. 11 and FIG. 12, the top plate 170 may include a flat horizontal portion 171, a front portion 173, an inner rear portion 175, and a pair of outer rear portions 178. The horizontal portion 171 may extend in the longitudinal direction, and may be coupled to the coupling member 129 of the right column 120 as well as a coupling member of the left column 140 near its ends. The horizontal portion 171 may include an extension 172 that may protrude rearwards. The front portion 173 may be folded upward from a substantially rectilinear front edge of the horizontal portion 171. The inner rear portion 175 may be folded upward from a rear edge of the extension 172 of the horizontal portion 171, and may be bifurcated into a pair of branches that may be folded frontwards to form a pair of coupling portions 176 configured to be coupled to the cover plate 180. The pair of outer front portions 178 may be folded upward from remaining portions of the rear edge of the horizontal portion 171.

Referring to FIG. 11, the plurality of pairs of supports 161, 163, 165, 167 and 168 may include two pairs of pulley supports 161 and 163, a pair of magnetic sensor supports 165, and two pairs of photosensor supports 167 and 168. A pair of pulley supports 161 and 163, a magnetic sensor support 165, and a pair of photosensor supports 167 and 168 may be disposed left to a center of the top plate 170, and the other pair of pulley supports 161 and 163, the other magnetic sensor support 165, and the other pair of photosensor supports 167 and 168 may be disposed right to the center of the top plate 170 substantially in a bilaterally symmetrical manner.

Each pair of the two pairs of pulley supports 161 and 163 may include a driving pulley support 161 and an idle pulley support 163. The driving pulley support 161 may be disposed near an end of the horizontal portion 171 of the top plate 170, and may be affixed to the horizontal portion 171. The driving pulley support 161 may include four vertical walls, for example, a front wall, a rear wall, an inner wall, and an outer wall. The front wall and the rear wall of the driving pulley support 161 may have concentric circular through holes 162 configured to support a pulley assembly (not shown). The idle pulley support 163 may be disposed near the center of the horizontal portion 171 of the top plate 170, and may be affixed to the horizontal portion 171. The idle pulley support 163 may also include four vertical walls, for example, a front wall, a rear wall, an inner wall, and an outer wall. The front wall and the rear wall of the idle pulley support 163 may have concentric circular through holes 164 configured to support another pulley assembly (not shown). The idle pulley supports 163 of left and right pairs of the pulley supports 163 may form a single structure that a pair of brackets are placed laterally on a structure resembling a desk bookshelf or a file holder.

Referring to FIG. 11 and FIG. 13, each of the pair of magnetic sensor supports 165 may be coupled to the rear wall of a corresponding idle pulley support 163. The magnetic sensor support 165 may include a bracket that may have a circular through hole 166 configured to support a magnetic sensor (not shown). The through hole 166 of the magnetic sensor support 165 may concentric with the through holes 164 of the corresponding idle pulley support 163, and may be smaller than the through holes 164 of the corresponding idle pulley support 163.

Referring to FIG. 11, each of the two pairs of photosensor supports 167 and 168 may be affixed to the horizontal portion 171 of the top plate 170, and may include a bracket. Each pair of the two pairs of photosensor supports 167 and 168 may include an outer photosensor support 167 and an inner photosensor support 168. The outer photosensor support 167 may be disposed adjacent to a corresponding driving pulley support 161, and may be located closer to the center of the top plate 170 than the corresponding driving pulley support 161. The inner photosensor support 168 may be disposed adjacent to a corresponding idle pulley support 163, and may be located closer to the center of the top plate 170 than the corresponding idle pulley support 163.

Each of the pair of cover plates 169 may be affixed to the horizontal portion 171 of the top plate 170, and may be disposed between a corresponding pair of the outer photosensor support 167 and the inner photosensor support 168. The cover plate 169 may be folded three times such that a portion of the cover plate 169 protrudes frontwards from the top plate 170.

Display Panel Assembly

Next, the display panel assembly 200 according to embodiments of the present invention is described in detail with reference to FIG. 14.

Figure 14:
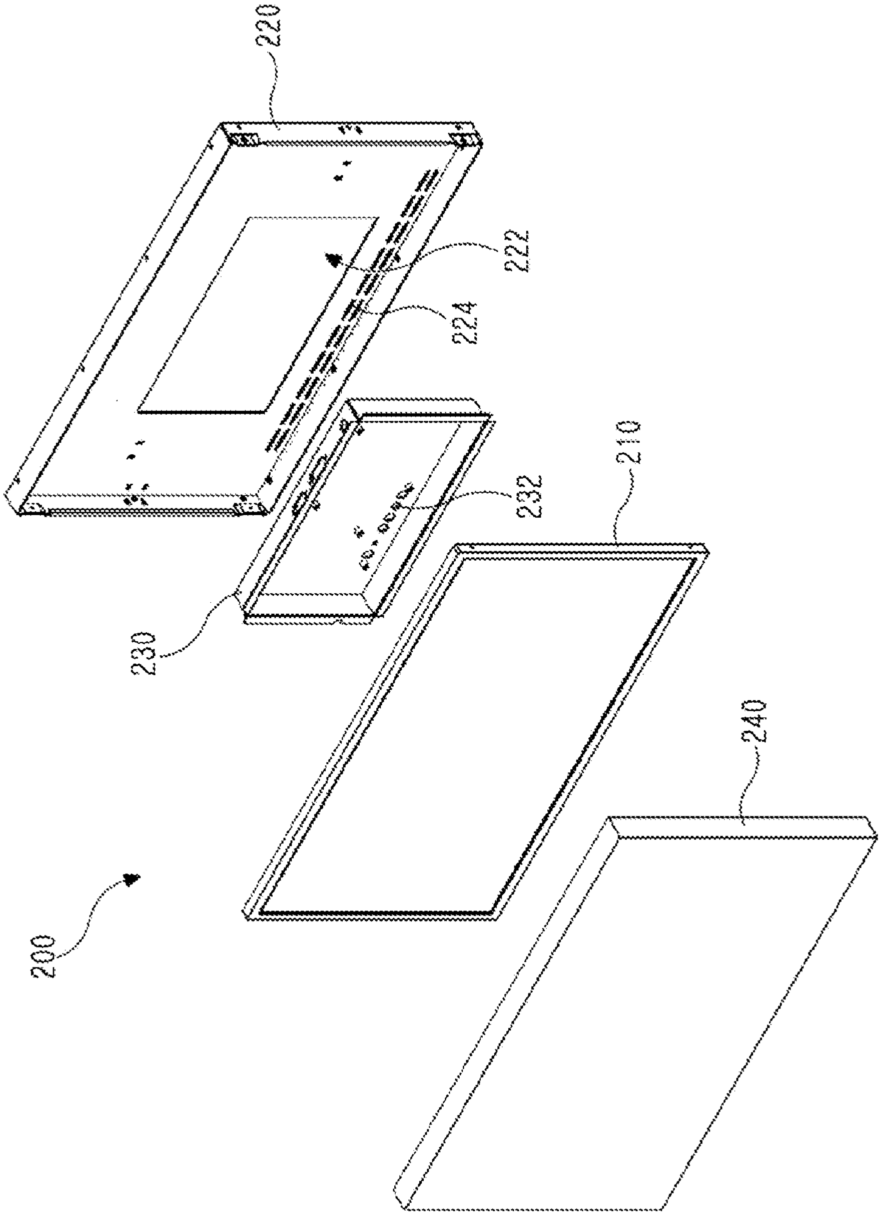
FIG. 14 is a schematic exploded view of the display panel assembly according to an embodiment of the present invention.

FIG. 14 is a schematic exploded view of the display panel assembly according to an embodiment of the present invention.

Referring to FIG. 14, the display panel assembly may include a display panel 210, a main bracket 220, a subsidiary bracket 230, and a cover 240.

The display panel 210 may include a flat panel display, for example, a liquid crystal display (LCD), an organic light emitting display (OLED), a plasma display panel (PDP), and so on. However, embodiments are not limited thereto.

The main bracket 220 may receive the display panel 210, and may have a large center hole 222 and a plurality of heat dissipations 224. The center hole 222 may receive the subsidiary bracket 230. The plurality of heat dissipations 224 may be configured to dissipate heat generated by the display panel 210, and may be located under the center hole 222. The subsidiary bracket 230 may fit the center hole 222 of the main bracket 220, and may have a plurality of holes 232 through which cables for the display panel 210 may pass.

The cover 240 may cover and protect the display panel 210, the main bracket 220, and the subsidiary bracket 230.

Shutter Assembly

Next, the shutter assembly 300 according to embodiments of the present invention is described in detail with reference to FIG. 15 to FIG. 24.

Figure 15:
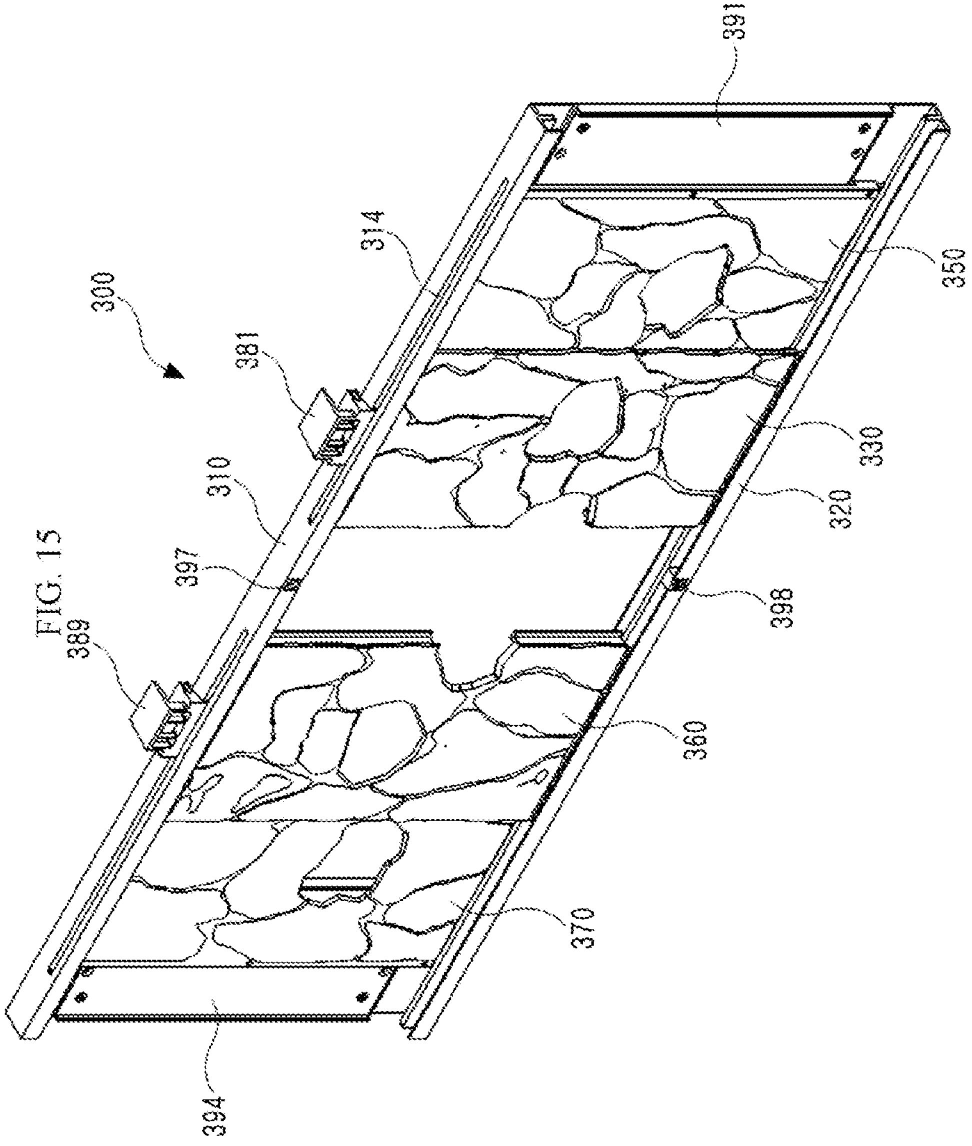
FIG. 15 is a schematic perspective view of the shutter assembly the shutter assembly 300 according to an embodiment of the present invention.
Figure 16:
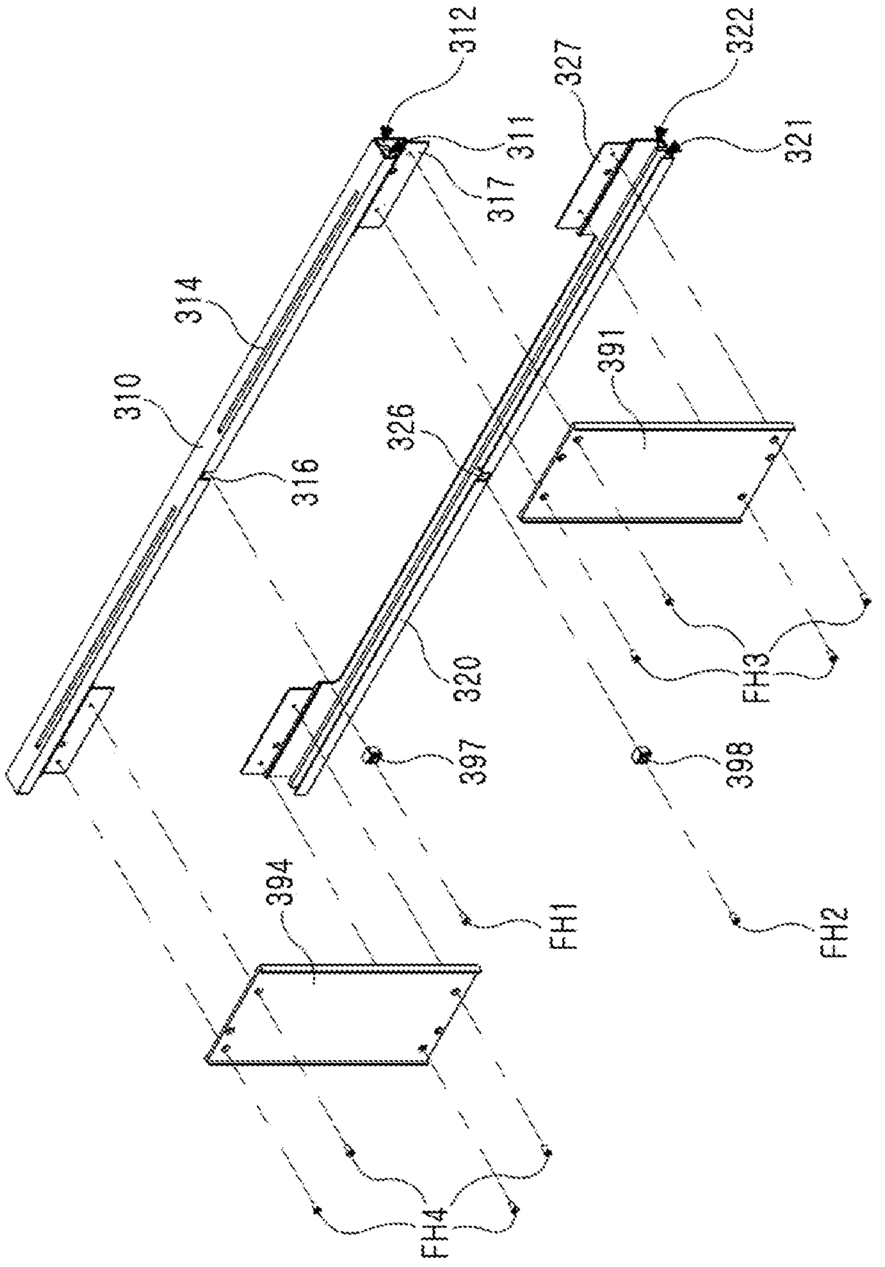
FIG. 16 is a schematic exploded view of parts of the shutter assembly shown in FIG. 15 according to an embodiment of the present invention.
Figure 17:
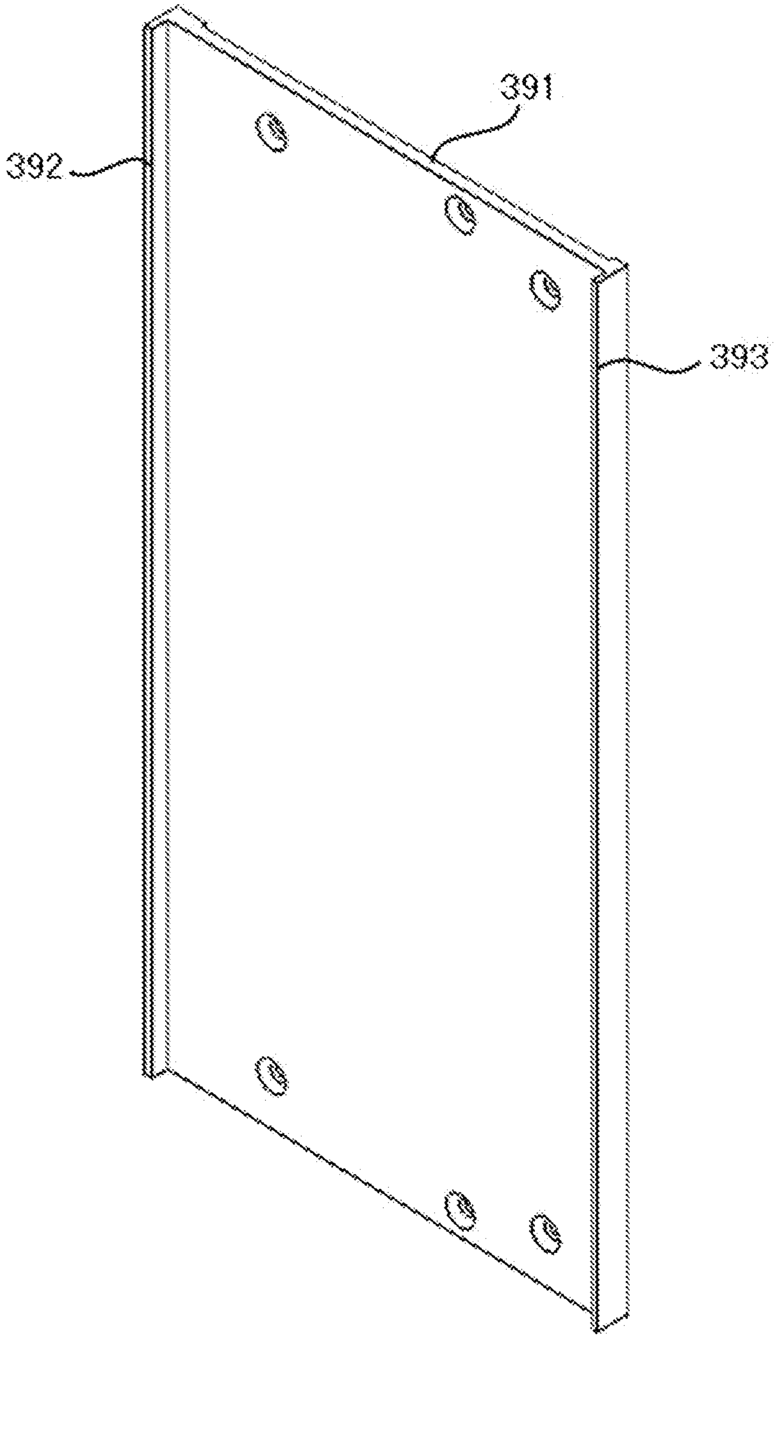
FIG. 17 is a sectional view of an upper track of the shutter assembly shown in FIG. 15 taken along line XVII-XVII.
Figure 18:
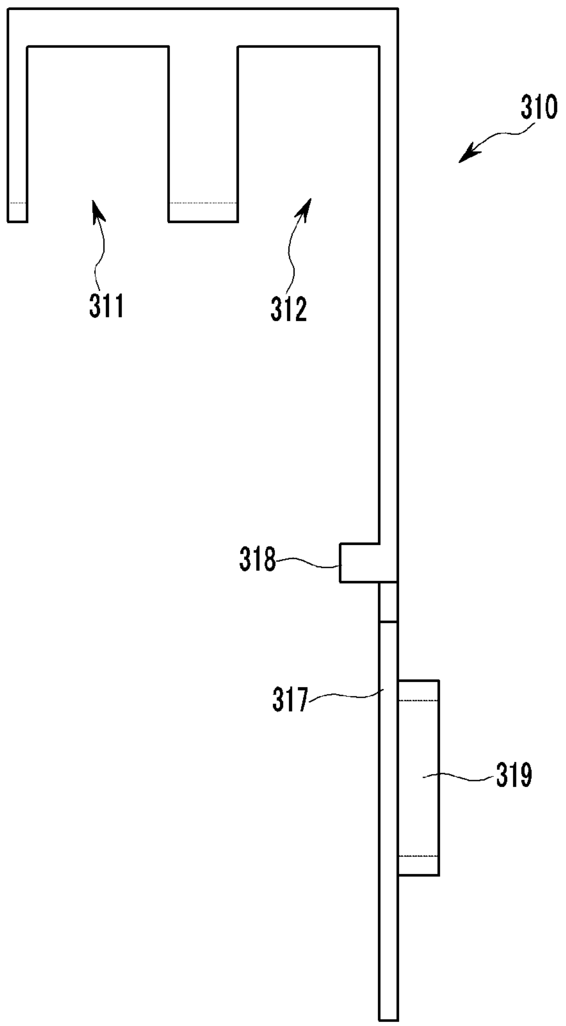
FIG. 18 is a rear view of an extension of the upper track of the shutter assembly shown in FIG. 15.
Figure 19:
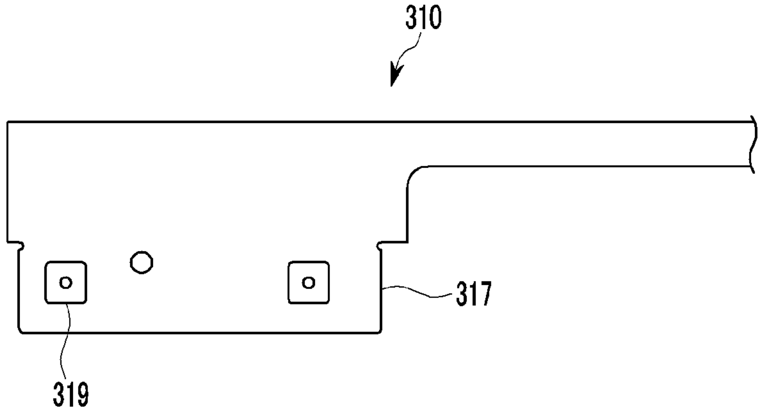
FIG. 19 is a schematic perspective view of a right connecting plate of the shutter assembly shown in FIG. 15 according to an embodiment of the present invention.
Figure 20:
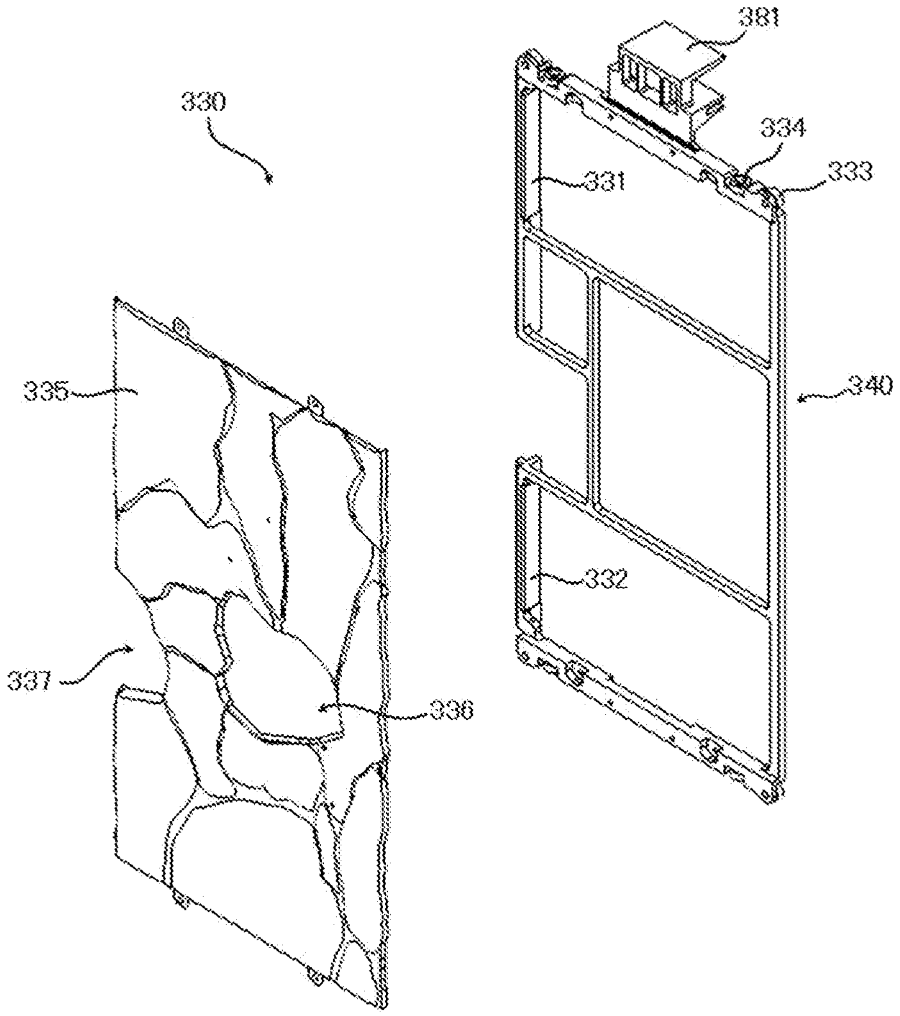
FIG. 20 is a schematic partially-exploded view of a right inner sliding door and a belt catcher in the shutter assembly shown in FIG. 15 according to an embodiment of the present invention.
Figure 21:
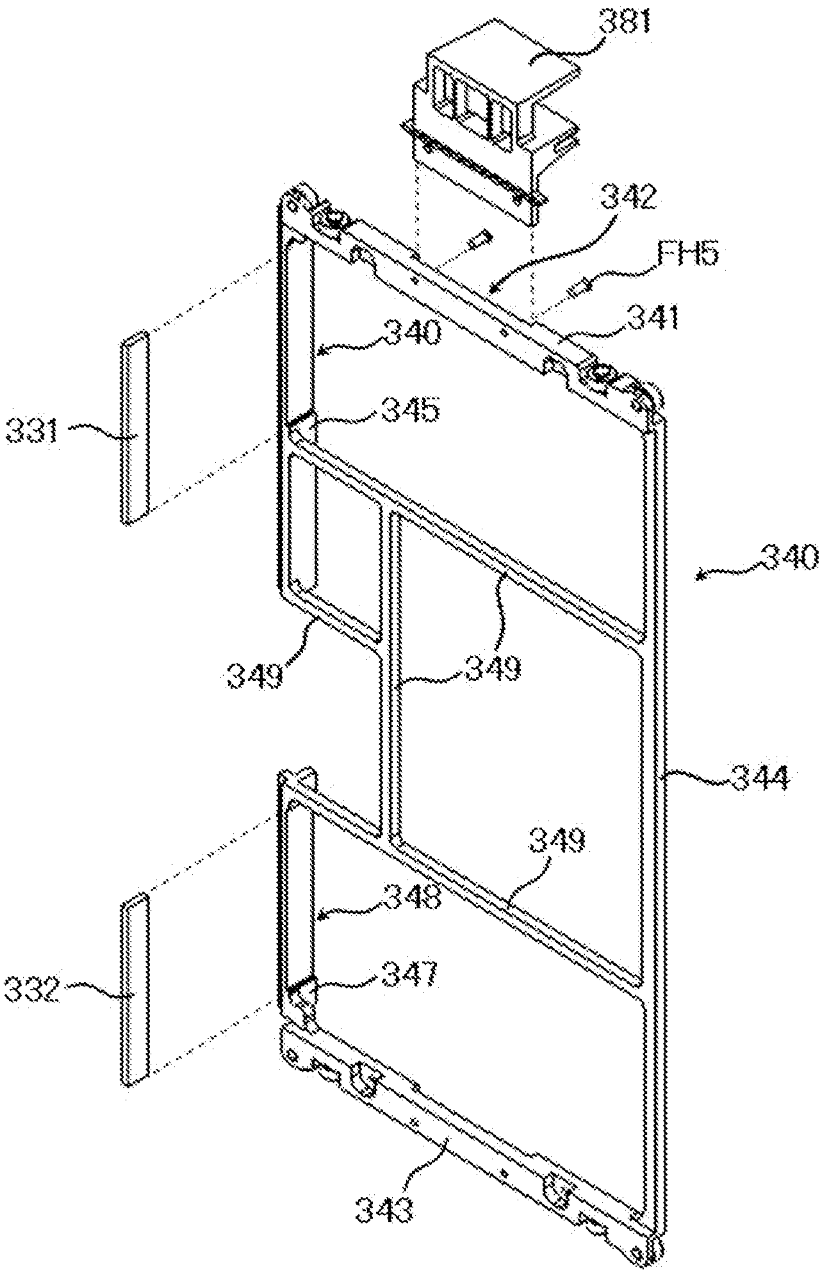
FIG. 21 is a schematic exploded view of parts of the right inner sliding door and the belt catcher shown in FIG. 20 according to an embodiment of the present invention.
Figure 22:
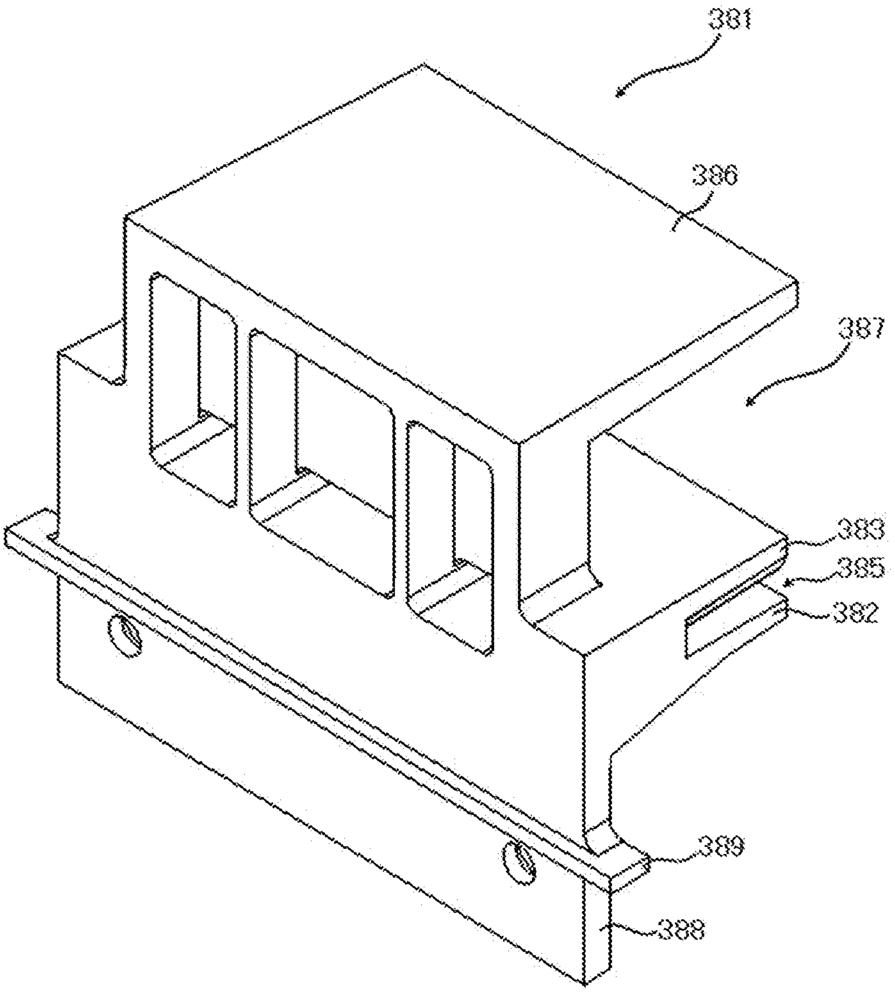
FIG. 22 is a schematic perspective view of the belt catcher shown in FIG. 21 according to an embodiment of the present invention.
Figure 23:
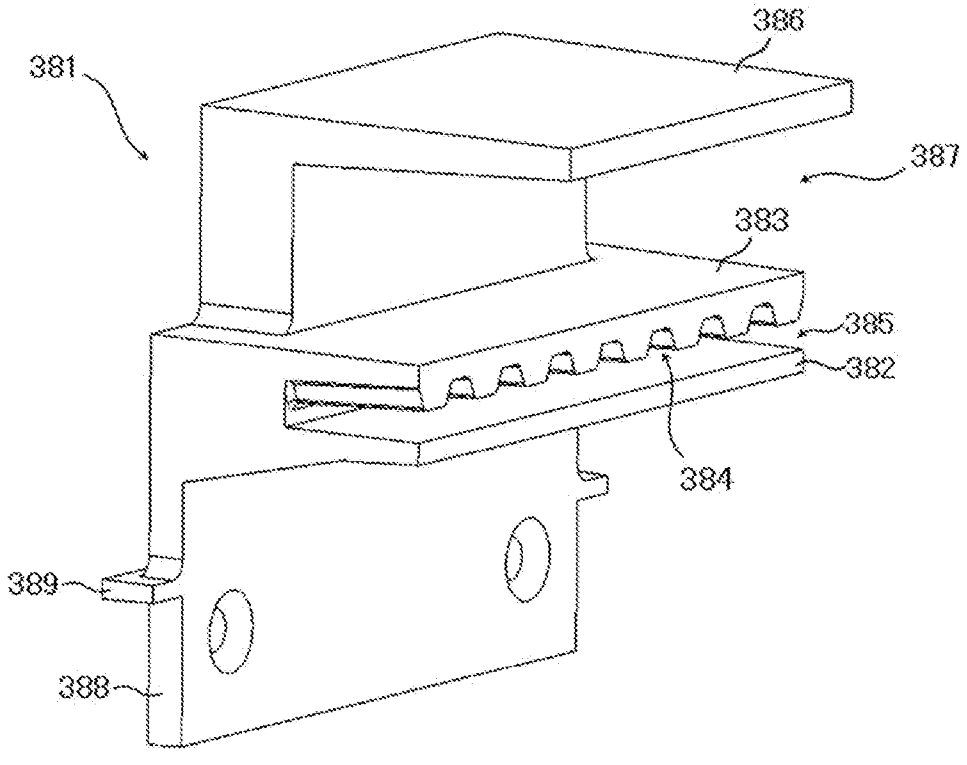
FIG. 23 is a schematic rear perspective view of the belt catcher shown in FIG. 22 according to an embodiment of the present invention.
Figure 24:
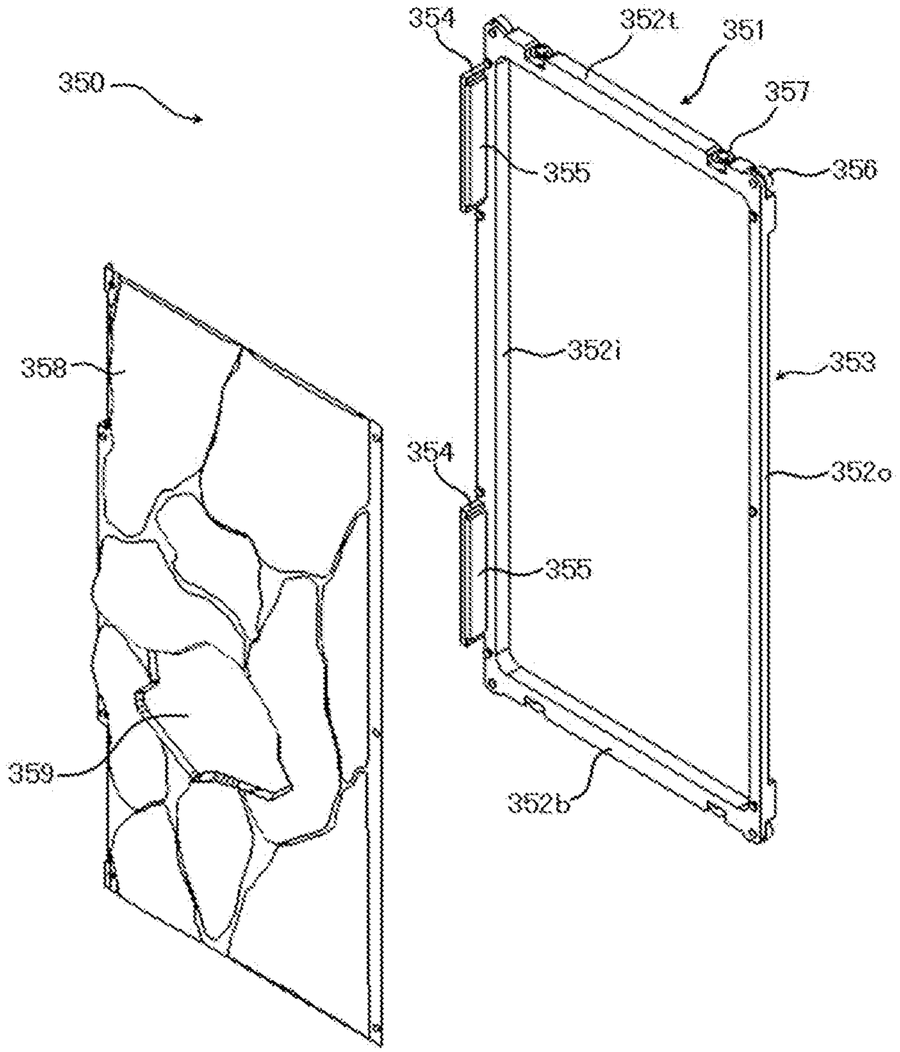
FIG. 24 is a schematic partially-exploded view of a right outer sliding door in the shutter assembly shown in FIG. 15 according to an embodiment of the present invention.

FIG. 15 is a schematic perspective view of the shutter assembly the shutter assembly 300 according to an embodiment of the present invention, FIG. 16 is a schematic exploded view of parts of the shutter assembly shown in FIG. 15 according to an embodiment of the present invention, FIG. 17 is a sectional view of a upper track of the shutter assembly shown in FIG. 15 taken along line XVII-XVII, FIG. 18 is a rear view of an extension of the upper track of the shutter assembly shown in FIG. 15, FIG. 19 is a schematic perspective view of a right connecting plate of the shutter assembly shown in FIG. 15 according to an embodiment of the present invention, FIG. 20 is a schematic partially-exploded view of a right inner sliding door and a belt catcher in the shutter assembly shown in FIG. 15 according to an embodiment of the present invention, FIG. 21 is a schematic exploded view of parts of the right inner sliding door and the belt catcher shown in FIG. 20 according to an embodiment of the present invention, FIG. 22 is a schematic perspective view of the belt catcher shown in FIG. 21 according to an embodiment of the present invention, FIG. 23 is a schematic rear perspective view of the belt catcher shown in FIG. 22 according to an embodiment of the present invention, and FIG. 24 is a schematic partially-exploded view of a right outer sliding door in the shutter assembly shown in FIG. 15 according to an embodiment of the present invention.

Referring to FIG. 15, the shutter assembly 300 according to embodiments of the present invention may include a pair of tracks 310 and 320, two pairs of sliding doors 330, 350, 360 and 370, a pair of belt catchers 381 and 389, a pair of connecting plates 391 and 394, and a pair of stoppers 397 and 398. The shutter assembly 300 may be coupled to or fixed to the right column 120 and the left column 140. The shutter assembly 300 according to embodiments of the present invention may have a bilateral symmetry except for the positions of movable elements such as the two pairs of sliding doors 330, 350, 360 and 370 and the pair of belt catchers 381 and 389. For example, the two pairs of sliding doors 330, 350, 360 and 370 may include a right pair of sliding doors 330 and 350 and a left pair of sliding doors 360 and 370 that may be bilaterally symmetrical to the right pair of sliding doors 330 and 350 when ignoring their positions. Similarly, the pair of connecting plates 391 and 394 may include a right connecting plate 391 and a left connecting plate 394 that may be bilaterally symmetrical to the right connecting plate 391. Each of pair of tracks 310 and 320 may have a bilateral symmetry by itself. However, embodiments of the present invention are not limited thereto. For example, the shutter assembly 300 may include only a pair of sliding doors, for example, a right pair of sliding doors 330 and 350, and correspondingly, a belt catcher 381.

Referring to FIG. 16, the pair of tracks 310 and 320 may include an upper track 310 and a lower track 320 that may face each other. The upper track 310 and the lower track 320 may be connected by the right connecting plate 391 and the left connecting plate 394, and to be coupled to the right column 120 and the left column 140 of the frame 100 along with the right connecting plate 391 and the left connecting plate 394. The pair of stoppers 397 and 398 may include an upper stopper 397 for the upper track 310 and a lower stopper 398 for the lower track 320.

Referring to FIG. 16 and FIG. 17, the upper track 310 may include a pair of guide channels, for example, a front guide channel 311 and a rear guide channel 312 that are configured to guide the sliding doors 330, 350, 360 and 370. The front guide channel 311 and the rear guide channel 312 may be formed by a plurality of elongated walls, for example, a front wall, an intermediate wall, a rear wall, and top walls. The front wall may have a stopper hole 316 near its center, and the upper stopper 397 may be fixed to the intermediate wall through the stopper hole 316 by a fastener, for example, a flat head screw FH1. The top wall of the front guide channel 311 has a pair of trenches 314 elongated along the front guide channel 311, which allow the belt catchers 381 and 389 to be coupled to the sliding doors 330 and 360.

The upper track 310 may further include a pair of extensions 317 that may extend downward near both ends of the upper track 310. The pair of extensions 317 may be fixed to the right column 120 and the left column 140 of the frame 100. For example, a right one of the extensions 317 may be affixed to the front plate 130 of the right column 120 along with the right connecting plate 391 by a fastener, for example, by a bolt and a nut. Referring to FIGS. 17 and 18, the extension 317 may include a front protrusion 318 and a pair of rear protrusions 319. The front protrusion 318 may be configured to obstruct the sliding doors 350 and 370 from getting out of limited ranges in the rear guide channel 312, and may extend horizontally in a transverse direction. The pair of rear protrusions 319 may be received in the holes 132 of the front plate 130 of the right column 120 when the upper track 310 and the right column 120 are affixed together.

Referring to FIG. 16, the lower track 330 may have structure similar to the upper track 310. In detail, the lower track 330 may include a pair of guide channels, for example, a front guide channel 321 and a rear guide channel 322 that may be aligned with the front guide channel 311 and the rear guide channel 312, respectively, so that they are configured to guide the sliding doors 330, 350, 360 and 370. The lower stopper 398 may be fixed to a center of the front guide channel 321 through a stopper hole 326 by a fastener, for example, a flat head screw FH2. The lower track 330 may further include a pair of extensions 327 that may extend upward near both ends of the lower track 330, and may be fixed to the right column 120 and the left column 140 of the frame 100.

However, the lower track 330 may have no trench.

Referring to FIG. 19, the right connecting plate 391 may include a pair of thresholds, for example, an inner threshold 392 and an outer threshold 393 that may obstruct the sliding door 350 from getting out of limited ranges in the rear guide channel 312. The left connecting plate 394 may also include a pair of thresholds that may obstruct the sliding door 370 from getting out of limited ranges in the rear guide channel 312. The right connecting plate 391 and the left connecting plate 394 may be fixed to the extensions 317 and 327 by fasteners, for example, a plurality of flat head screws FH3 and FH4.

Referring to FIG. 15 again, each pair of sliding doors 330 and 350 or 360 and 370 may include a inner sliding door 330 or 360 and a rear door 350 or 370. For example, the right pair of sliding doors 330 and 350 may include a right inner sliding door 330 and a right rear door 350, and the left pair of sliding doors 360 and 370 may include a left inner sliding door 360 and a left rear door 370. The inner sliding doors 330 and 360 may be guided by the front channels 311 and 321 of the upper and lower tracks 310 and 320, while the outer sliding doors 350 and 370 may be guided by the rear channels 312 and 322 of the upper and lower tracks 310 and 320. According to another embodiment, the inner sliding doors 330 and 360 may be guided by the rear channels 312 and 322, and the outer sliding doors 350 and 370 may be guided by the front channels 311 and 321.

Referring to FIG. 20, each of the inner sliding doors 330 and 360, for example, the right inner sliding door 330 may include a door frame 340 and a door cover 335. The right inner sliding door 330 may further include a pair of cushioning members 331 and 332 and four pairs of rollers 333 and 334 that are coupled to the door frame 340.

The door cover 335 may be attached in front of the door frame 340, and may have a pattern or unevenness related to a game. The pattern on the door cover 335 of the right inner sliding door 330 may be continuous to a pattern on a door cover of the left inner sliding door 360. Furthermore, the door cover 335 may have a complete hole 336 and/or an incomplete hole 337 that may allow a game player to see a portion of a game image shown in the display panel 210. The incomplete hole 137 may be located adjacent to an inner edge of the door cover 335, and may form a complete hole along with another incomplete hole of the left front door 360.

Referring to FIG. 21, the door frame 340 may include a top bar 341, a bottom bar 343, an outer bar 344, a pair of inner bars 345 and 347, and a plurality of intermediate bars 349. The door frame 340 may not overlap the holes 336 and 337 of the door cover 335.

The top bar 341 and the bottom bar 343 may face each other, and the door cover 335 may be fixed to the top bar 341 and the bottom bar 343. The belt catcher 381 may be fixed to the top bar 341 near a center of the top bar 341 by fasteners, for example, a pair of flat head screws FH5. The top bar 342 may have a depression 342 on its rear surface, configured to receive the belt catcher 381.

The outer bar 344 and the pair of inner bars 345 and 347 may face each other, and may be connected to the top bar 341 and the bottom bar 343. The pair of inner bars 345 and 347 may include an upper inner bar 345 and a lower inner bar 347 aligned in a vertical direction. The inner bars 345 and 347 may protrude rearwards to form protrusions, and the inner bars 345 and 347 will be also referred to as catching protrusions hereinafter. The pair of cushioning members 331 and 332 may be attached to right (or inner) surfaces of the catching protrusions 345 and 347. The catching protrusions 345 and 347 may have depressions 346 and 347 on the right surfaces thereof, which may receive the cushioning members 331 and 332.

The plurality of intermediate bars 349 may be connected between the inner bars 345 and 347 and the outer bar 344 and between inner bars 349.

Each pair of the plurality of pairs of rollers 333 and 334 may be coupled to the top bar 341 or the bottom bar 343 near an end thereof. Each pair of the rollers 333 and 334 may include a horizontal roller 333 and a vertical roller 334. The horizontal roller 333 may have a horizontal shaft fixed to the top bar 341 or the bottom bar 343, and the vertical roller 334 may have a vertical shaft fixed to the top bar 341 or the bottom bar 343. The horizontal roller 333 may be closer to a corner of the door frame 340 than the vertical roller 334.

Referring to FIG. 22 and FIG. 23, the belt catcher 381 may include a pair of lower and upper protrusions 382 and 383 that may protrude rearwards to define a recess 385 configured to catch a belt (not shown) for power transmission. The upper protrusion 383 may have teeth 384 configured to clamp the belt. The belt catcher 381 may further include a detection piece 386 that may protrude rearwards to define a space 387 along with the upper protrusion 383. The belt catcher 381 may further include a vertical extension 388 configured to be coupled to the top bar 341 of the door frame 340, and the vertical extension 388 may include an elongated horizontal protrusion 389 configured to be disposed on a top surface of the top bar 341 as a threshold in the vertical direction when the belt catcher 381 is coupled to the top bar 341.

Referring to FIG. 24, each of the outer sliding doors 350 and 370, for example, the right outer sliding door 350 may include a door frame 351 and a door cover 358. The right outer sliding door 350 may further include a pair of cushioning members 355 and four pairs of rollers 356 and 357 that are coupled to the door frame 351.

The door cover 358 may be attached in front of the door frame 351, and may have a pattern or unevenness related to a game. The pattern on the door cover 358 of the right outer sliding door 350 may be continuous to the pattern on the door cover 335 of the right inner sliding door 330 so that the patterns on the door covers 335 and 358 of the doors 330, 350, 360 and 370 may form a large single pattern. Furthermore, the door cover 358 may have a hole 359 that may allow a game player to see a portion of a game image shown in the display panel 210. The height of the hole 359 of the door outer sliding door 350 may be different from the holes 336 and 337 of the inner sliding door 330. Therefore, the hole 359 of the outer sliding door 350 may not overlap the holes 336 and 337 of the inner sliding door 330 when the inner sliding door 330 and the outer sliding door 350 overlap each other.

The door frame 351 may include a top bar 352*t*, a bottom bar 352*b*, an outer bar 352*o*, and an inner bar 352*i*. The top bar 352*t* and the bottom bar 352*b* may face each other, and the door cover 358 may be fixed to the top bar 352*t* and the bottom bar 352*b*. The outer bar 352*o* and the inner bar 352*i* may face each other, and may be connected to the top bar 352*t* and the bottom bar 352*b*. The inner bar 352*i* may include a pair of catching protrusions 354 protruding frontwards, and the pair of cushioning members 355 may be attached to right (or inner) surfaces of the catching protrusions 354.

The catching protrusions 354 of the right outer sliding door 350 may overlap the catching protrusions 345 and 347 or the outer bar 344 of the right inner sliding door 330 so that the right outer sliding door 350 may follow the right inner sliding door 330 when the right inner sliding door 330 moves along the guide channels 311, 312, 321 and 322 of the tracks 310 and 320 after the right inner sliding door 330 and the right outer sliding door 350 are assembled in the upper track 310 and the lower track 320. The cushioning members of the right outer sliding door 350 and the cushioning members 331 and 332 of the right inner sliding door 330 may reduce the impact generated when the catching protrusions 345 and 347 or the outer bar 344 of the right inner sliding door 330 bumps against the catching protrusions 354 of the right outer sliding door 350.

When the inner sliding doors 330 and 360 may be guided by the rear channels 312 and 322, and the outer sliding doors 350 and 370 may be guided by the front channels 311 and 321, the protruding directions of the catching protrusions 354 of the right outer sliding door 350 and the catching protrusions 345 and 347 of the right inner sliding door 330 may be reversed. For example, the catching protrusions 345 and 347 of the right inner sliding door 330 may protrude frontwards, while the catching protrusions 354 of the right outer sliding door 350 may protrude rearwards.

Each pair of the plurality of pairs of rollers 356 and 357 may be coupled to the top bar **352*t* or the bottom bar 352*b* near an end thereof. Each pair of the rollers 356 and 357 may include a horizontal roller 356 and a vertical roller 357. The horizontal roller 356 may have a horizontal shaft fixed to the top bar 352*t* or the bottom bar 352*b*, and the vertical roller 357 may have a vertical shaft fixed to the top bar 352*t* or the bottom bar 352*b*. The horizontal roller 356 may be closer to a corner of the door frame 351 than the vertical roller 357**.

Driving Unit

Next, the driving unit 400 according to embodiments of the present invention is described in detail with reference to FIG. 25 to FIG. 36.

Figure 25:
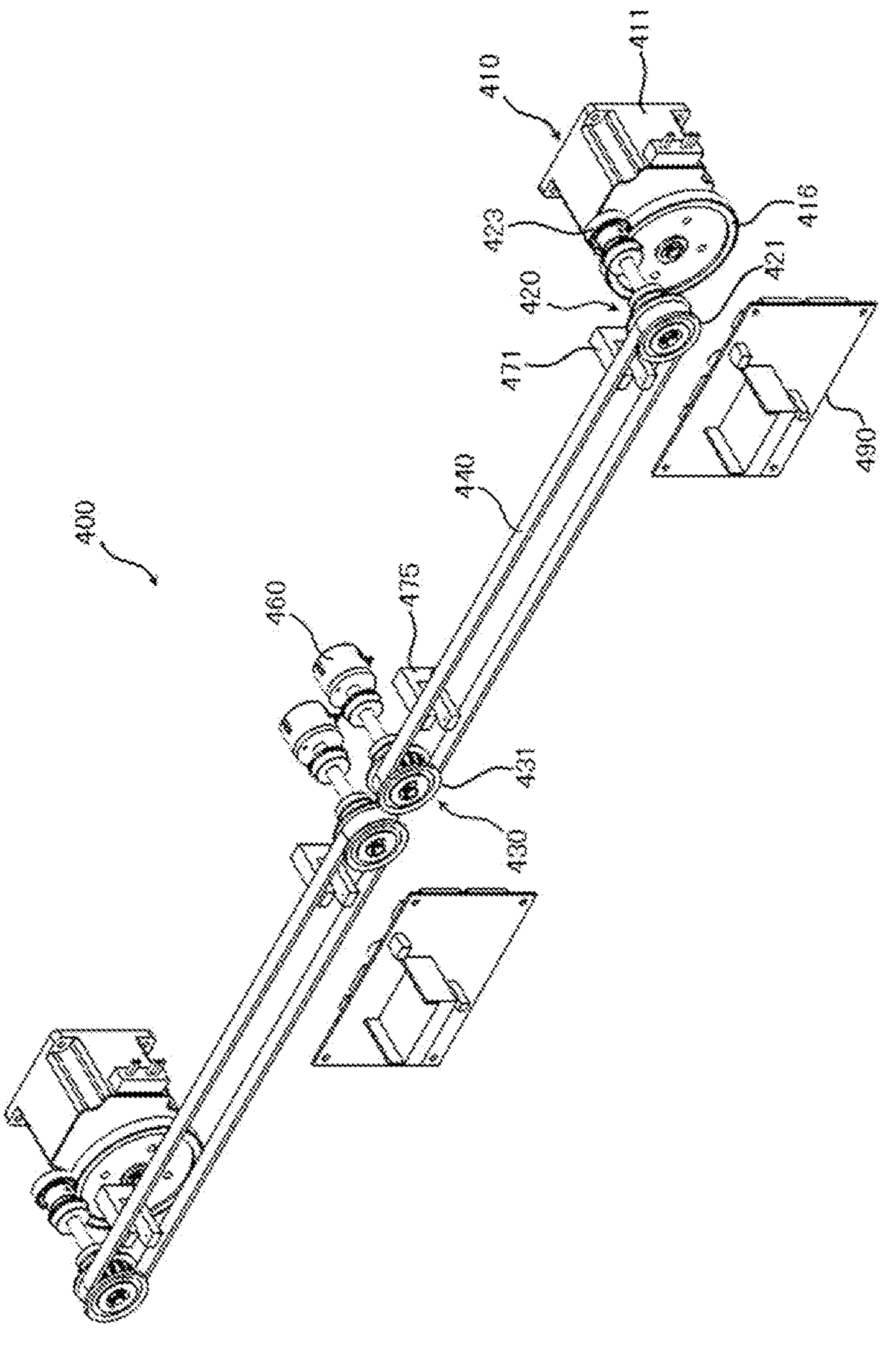
FIG. 25 is a schematic perspective view of the driving unit shown in FIG. 2 according to an embodiment of the present invention.
Figure 26:
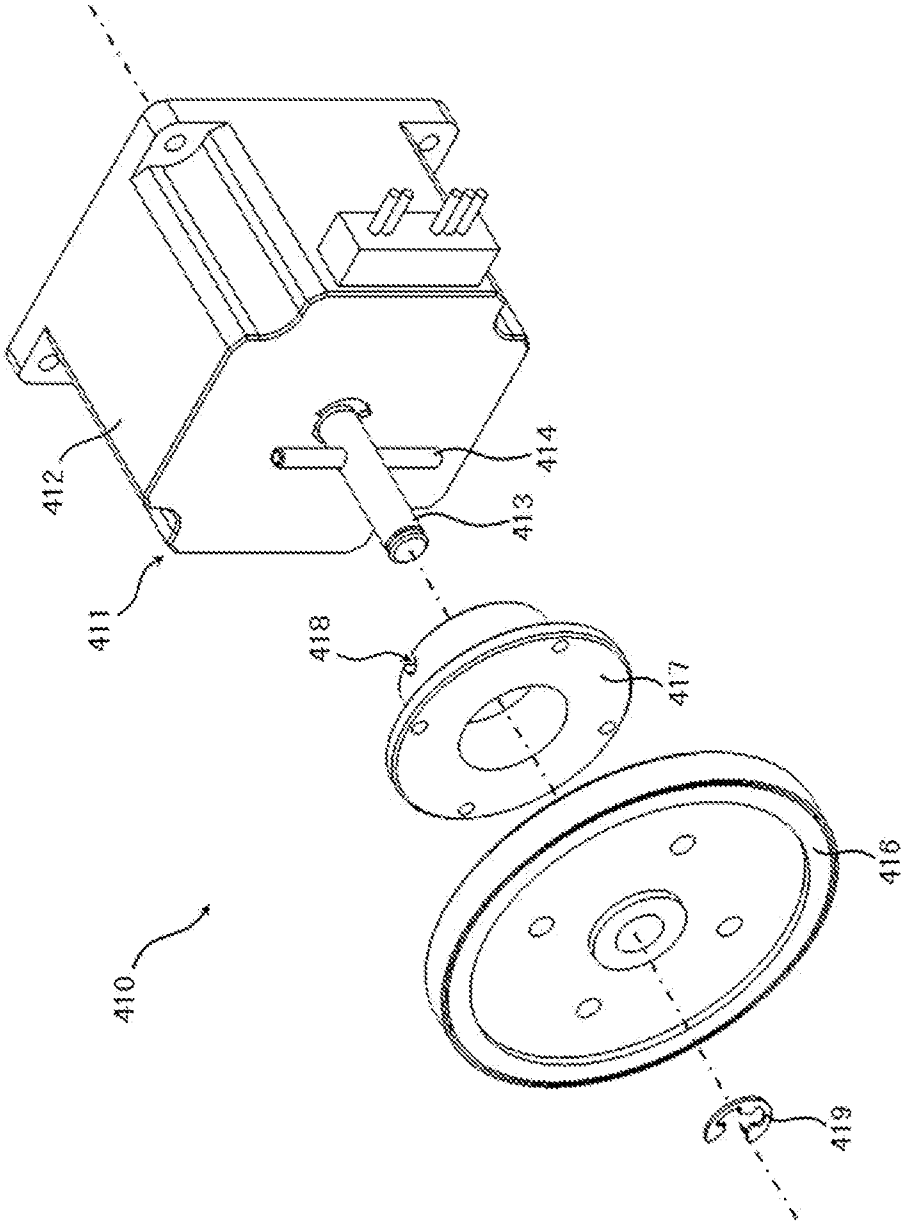
FIG. 26 is a schematic exploded view of a motor assembly in the driving unit shown in FIG. 25 according to an embodiment of the present invention.
Figure 27:
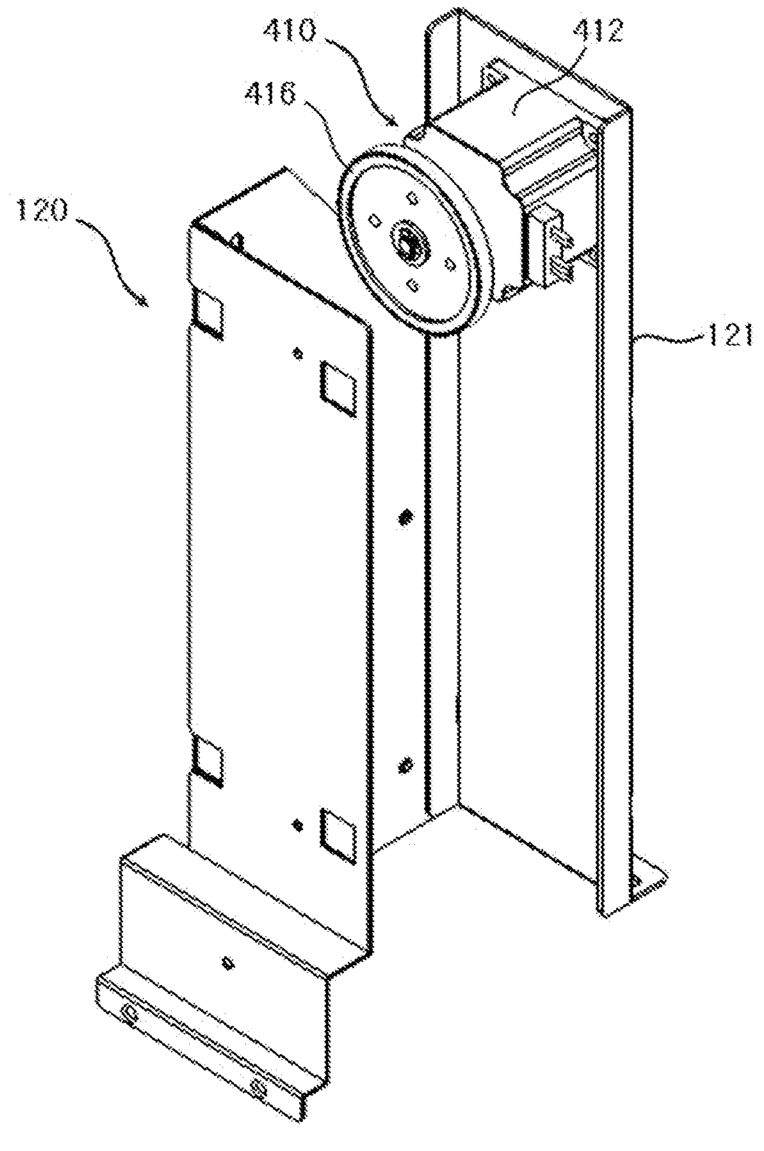
FIG. 27 is a perspective view of the motor assembly shown in FIG. 26 fixed in the right column of the frame according to an embodiment of the present invention.
Figure 28:
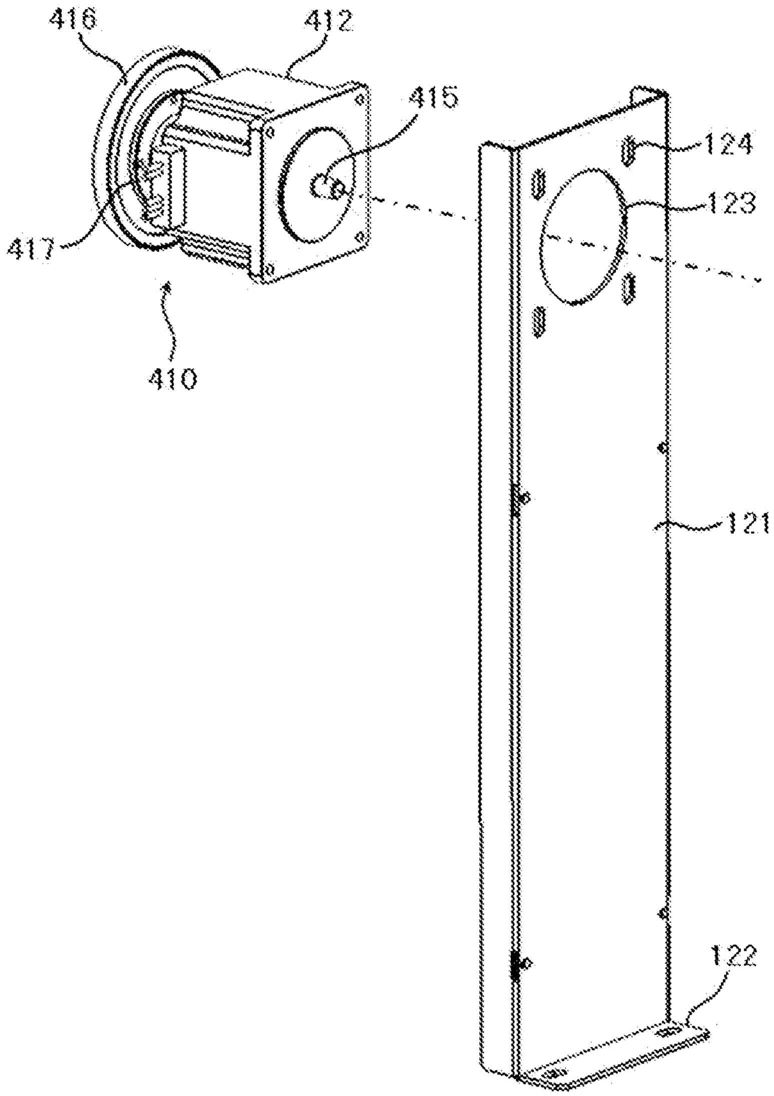
FIG. 28 is a rear exploded view of the motor assembly and the right column of the frame according to an embodiment of the present invention.
Figure 29:
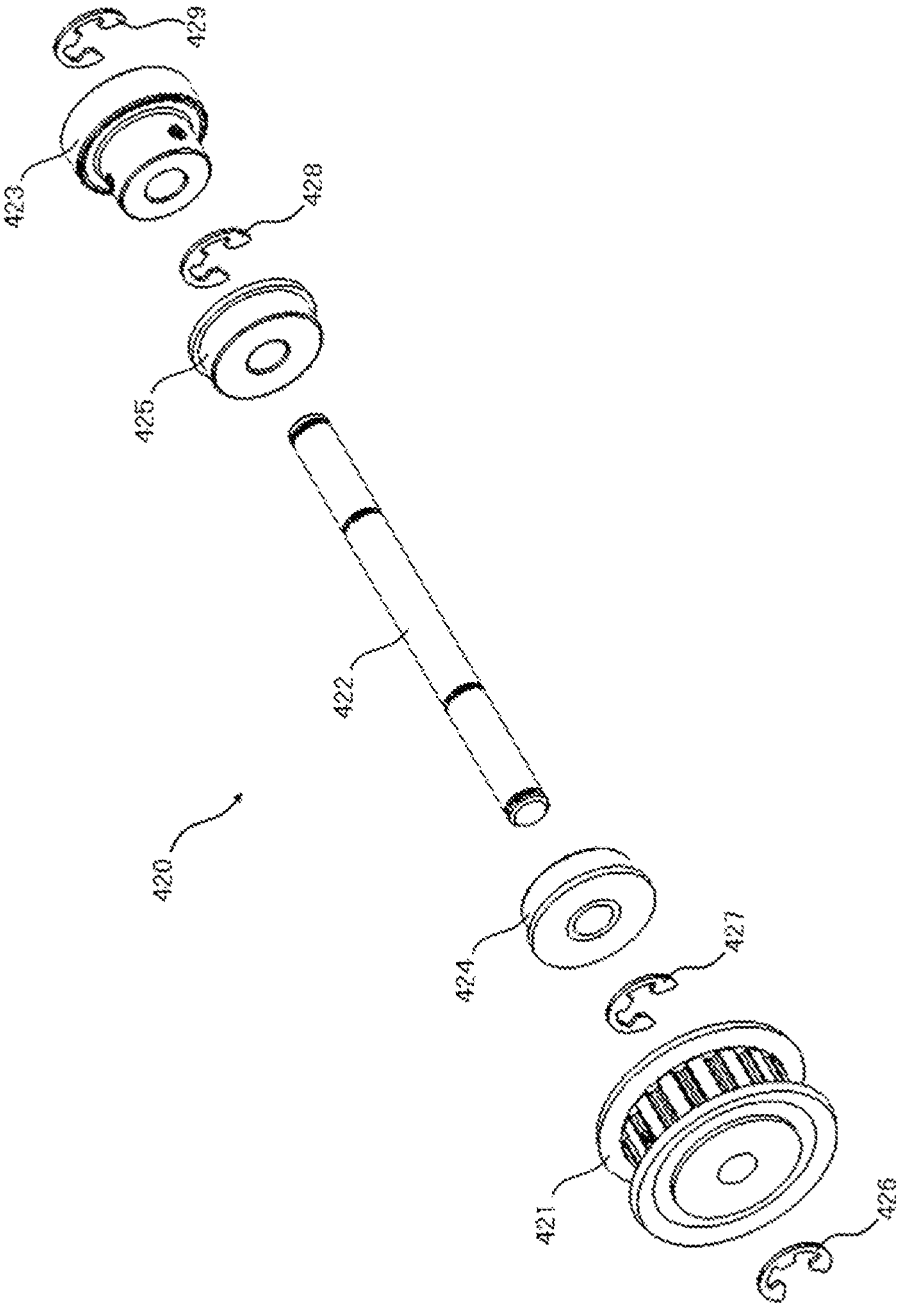
FIG. 29 is a schematic exploded view of a drive pulley assembly in the driving unit shown in FIG. 25 according to an embodiment of the present invention.
Figure 30:
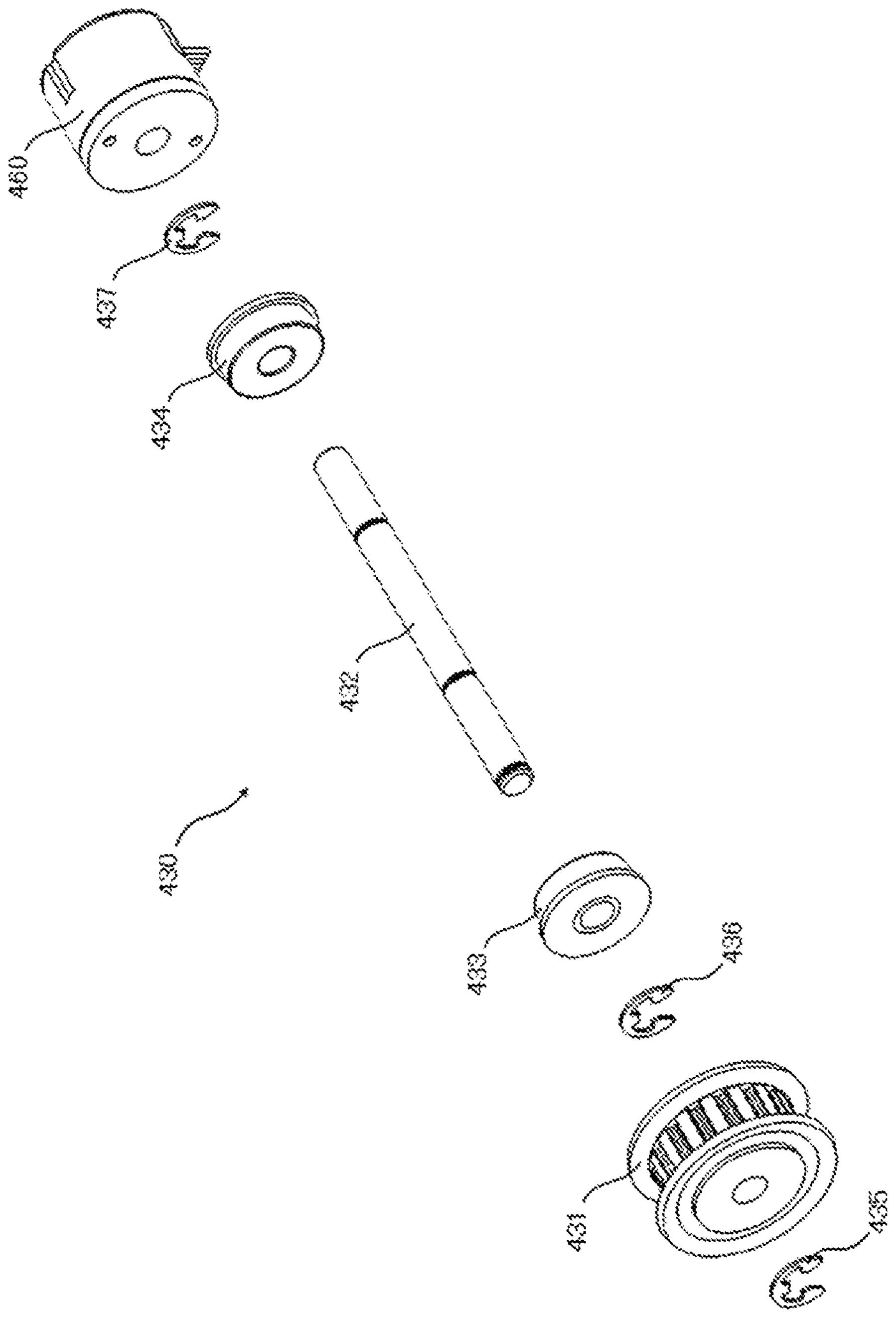
FIG. 30 is a schematic exploded view of an idle pulley assembly in the driving unit shown in FIG. 25 according to an embodiment of the present invention.
Figure 31:
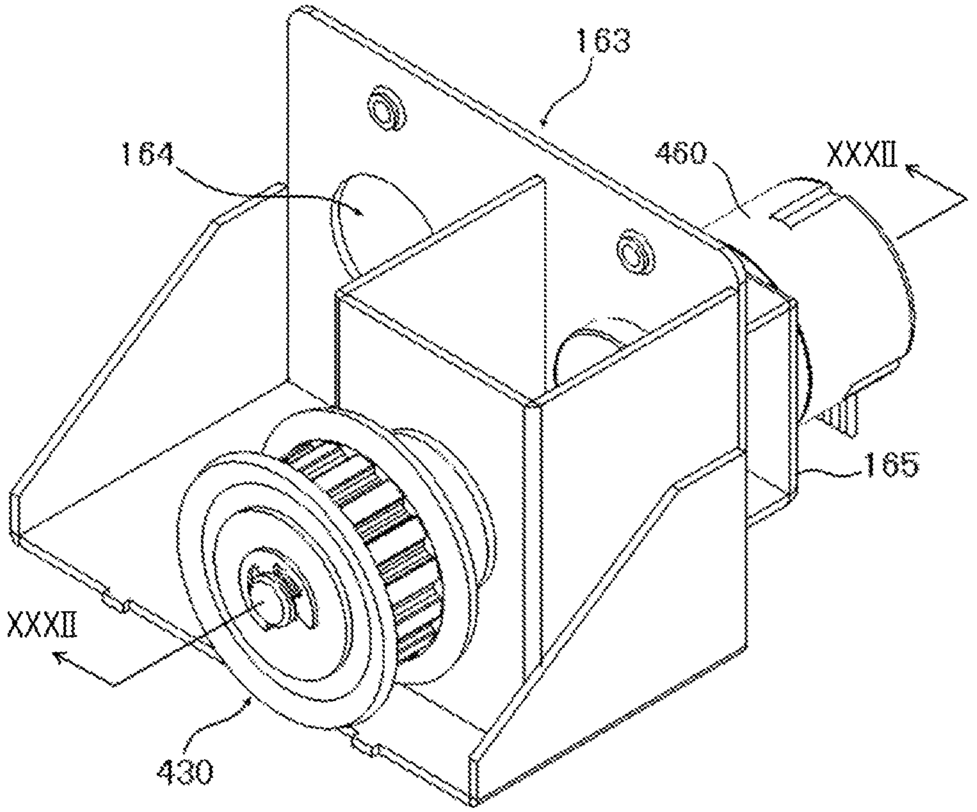
FIG. 31 is a schematic perspective view of the idle pulley assembly shown in FIG. 30 seated in the idle pulley support according to an embodiment of the present invention.
Figure 32:
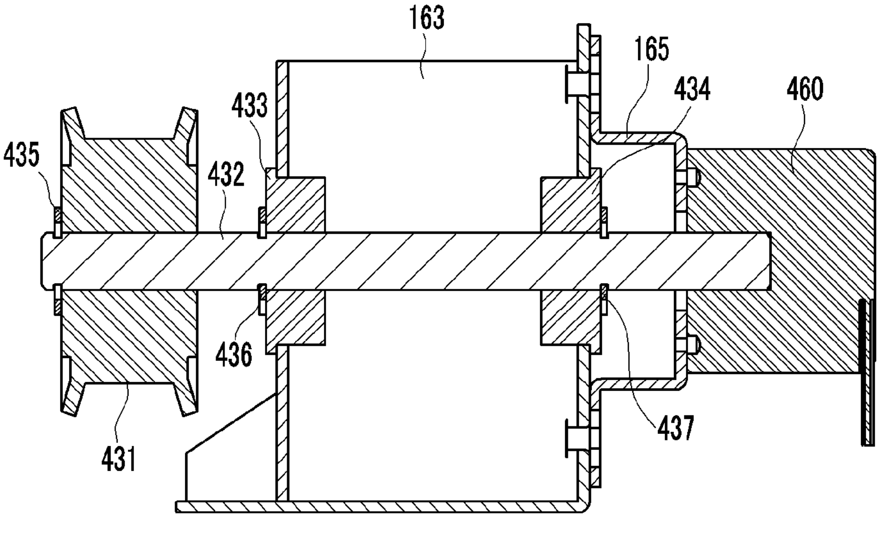
FIG. 32 is a schematic sectional view of the idle pulley assembly and the idle pulley support shown in FIG. 31 taken along line XXXII-XXXII according to an embodiment of the present invention.
Figure 33:
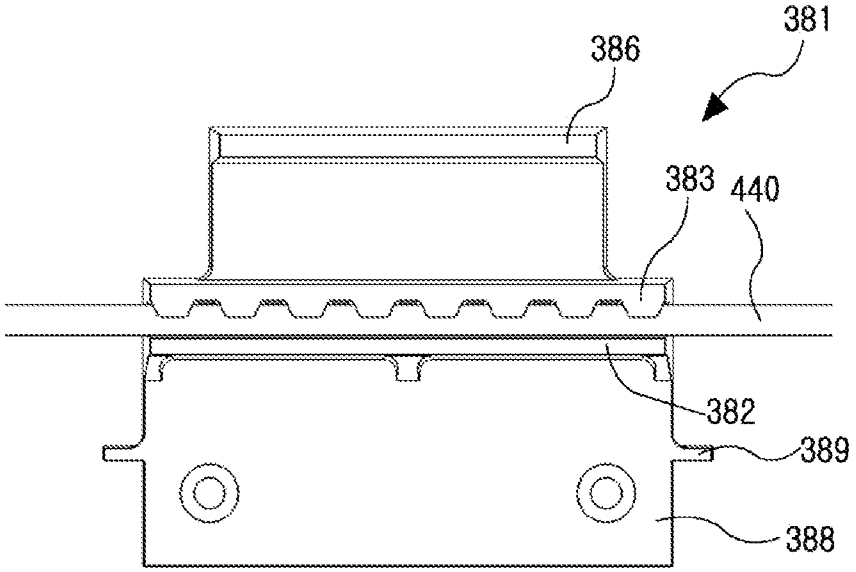
FIG. 33 is a schematic rear view of a belt in the driving unit shown in FIG. 25 being caught in the belt catcher according to an embodiment of the present invention.
Figure 34:
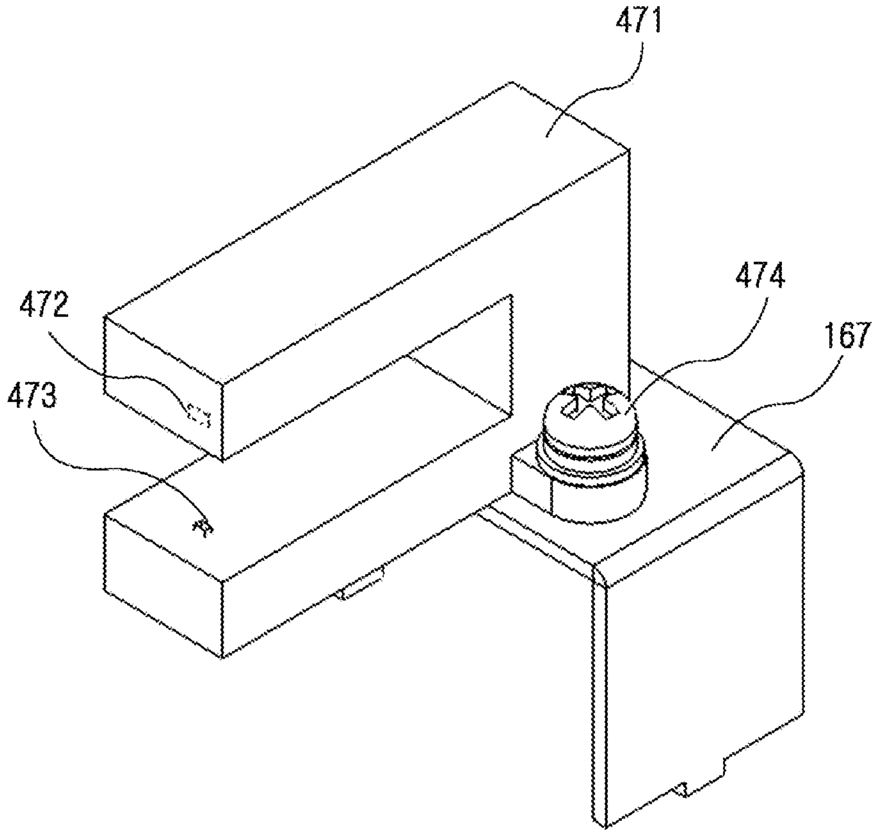
FIG. 34 is a schematic perspective view of a photosensor in the driving unit shown in FIG. 25 mounted on the photosensor support according to an embodiment of the present invention.
Figure 35:
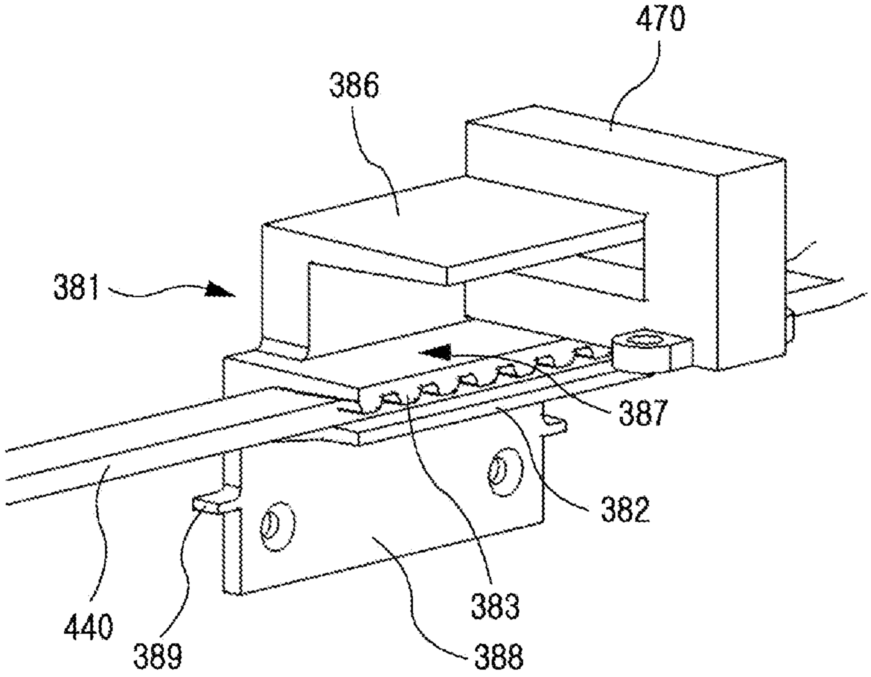
FIG. 35 is a schematic perspective view of the belt catcher, the belt, and the photosensor according to an embodiment of the present invention.
Figure 36:
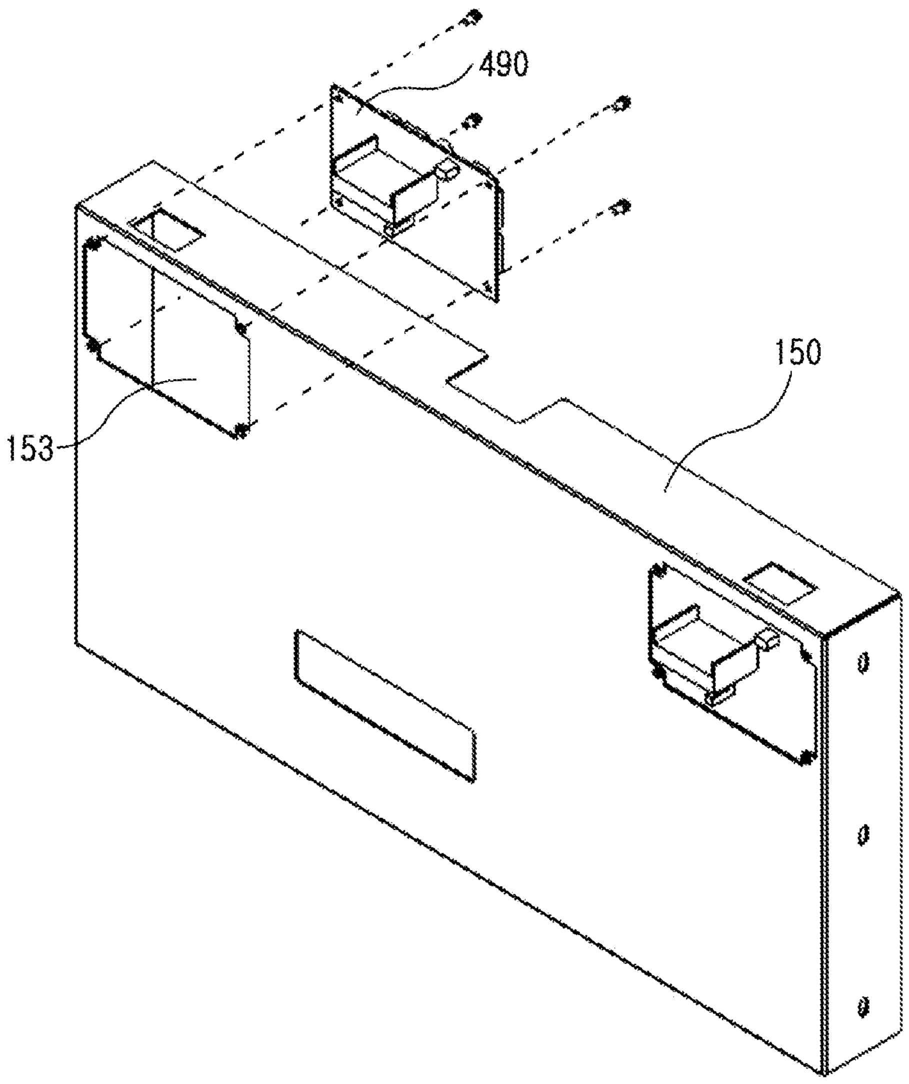
FIG. 36 is a schematic exploded view of a drive printed circuit board in the driving unit shown in FIG. 25 and the rear plate of the frame according to an embodiment of the present invention.

FIG. 25 is a schematic perspective view of the driving unit shown in FIG. 2 according to an embodiment of the present invention, FIG. 26 is a schematic exploded view of a motor assembly in the driving unit shown in FIG. 25 according to an embodiment of the present invention, FIG. 27 is a perspective view of the motor assembly shown in FIG. 26 fixed in the right column of the frame according to an embodiment of the present invention, FIG. 28 is a rear exploded view of the motor assembly and the right column of the frame according to an embodiment of the present invention, FIG. 29 is a schematic exploded view of a drive pulley assembly in the driving unit shown in FIG. 25 according to an embodiment of the present invention, FIG. 30 is a schematic exploded view of a idle pulley assembly in the driving unit shown in FIG. 25 according to an embodiment of the present invention, FIG. 31 is a schematic perspective view of the idle pulley assembly shown in FIG. 30 seated in the idle pulley support according to an embodiment of the present invention, FIG. 32 is a schematic sectional view of the idle pulley assembly and the idle pulley support shown in FIG. 31 taken along line XXXII-XXXII according to an embodiment of the present invention, FIG. 33 is a schematic rear view of a belt in the driving unit shown in FIG. 25 being caught in the belt catcher according to an embodiment of the present invention, FIG. 34 is a schematic perspective view of a photosensor in the driving unit shown in FIG. 25 mounted on the photosensor support according to an embodiment of the present invention, FIG. 35 is a schematic perspective view of the belt catcher, the belt, and the photosensor according to an embodiment of the present invention, and FIG. 36 is a schematic exploded view of a drive printed circuit board in the driving unit shown in FIG. 25 and the rear plate of the frame according to an embodiment of the present invention.

Referring to FIG. 25, the driving unit 400 according to embodiments of the present invention may include a pair of left and right driving subunits configured to drive the left inner sliding door 360 and the right inner sliding door 330, respectively. Since the left driving subunit may have a substantially bilateral symmetry with the right driving subunit, the description of the driving unit 400 will be made as if the left driving subunit does not exist.

The driving unit 400 may include a motor assembly 410, an driving pulley assembly 420, an idle pulley assembly 430, a belt 440, a magnetic sensor 460, a pair of photosensors 471 and 475, and a drive printed circuit board 490. The driving pulley assembly 420 may be coupled to the motor assembly 410 to transmit power generated by the motor assembly 410 to the belt 440. The right inner sliding door 330 which in turn is coupled to the belt 440 may be moved by the belt 440 through the belt catcher 381 coupled to the right inner sliding door 330 and the belt 440. The idle pulley assembly 430 may be rotated by the belt 440, and the rotation of the idle pulley assembly 430 may be detected by the magnetic sensor 460. The pair of photosensors 471 and 475 may be configured to detect the belt catcher 381, and thus the right inner sliding door 330.

Referring to FIG. 26 to FIG. 28, the motor assembly 410 may include an actuator, for example, a motor 411. The motor 411 may be a stepping motor, but embodiments of the present invention are not limited thereto. The motor 411 may include a motor body 412 and a main shaft 413, and may further include a locking pin 414 and a rear shaft 415. The main shaft 413 may have a circumferential groove near its end, and the locking pin 414 may be pinned in the main shaft 413 near the motor body 412.

The motor assembly 410 may further include a motor gear 416, a motor shaft hub 417, and an e-ring 419, which may be coupled to the main shaft 413 of the motor 411. The motor gear 416 and the motor shaft hub 417 may be affixed to each other by fasteners. The motor gear 416 may be a toothless gear, but embodiments of the present invention are not limited thereto. The motor shaft hub 417 may have a recess 418 that may engage with the locking pin 414 of the motor 411, and the e-ring 419 may clamp the main shaft 413 in the circumferential groove of the main shaft 413. The motor shaft hub 417 and the motor gear 416 may be fixed to the main shaft 413 between the locking pin 414 and the e-ring 419.

Referring to FIG. 27 and FIG. 28, the motor assembly 410 may be fixed to the rear plate 121 of the right column 120 by fasteners passing through the peripheral supporting holes 124 such that a rear surface of the motor body 412 faces a front surface of a front surface of the rear plate 121. The rear shaft 415 and a surrounding portion of the rear surface of the motor assembly 410 may be exposed through the center supporting hole 123 of the rear plate 121.

Referring to FIG. 29, the driving pulley assembly 420 may include a shaft 422 and a driving pulley 421 and a pulley gear 423 that may be fixed to the shaft 422 at respective ends of the shaft 422 by fasteners, for example, pins. The pulley gear 423 may engage with the motor gear 416 to transmit the rotational power from the motor gear 416 to the shaft 422. The pulley gear 423 may be a toothless gear, but embodiments of the present invention are not limited thereto. The driving pulley

421 may be coupled to the belt 440. The driving pulley assembly 420 may further include a pair of bearings 424 and 425 coupled to the shaft 422 between the driving pulley 421 and the pulley gear 423. The shaft 422 may have a plurality of circumferential grooves in which e-rings 426, 427, 428 and 429 configured to prevent the movement of the driving pulley 421, the pulley gear 423, and the pair of bearings 424 and 425 along the shaft 422 may clamp the shaft 422.

Referring to FIG. 30, the idle pulley assembly 430 may include a shaft 432 and an idle pulley 431 that may be fixed to the shaft 432 at an end of the shaft 432 by a fastener, for example, a pin. The idle pulley 431 may be coupled to the belt 440. The idle pulley assembly 430 may further include a pair of bearings 433 and 434 coupled to the shaft 432. The shaft 432 may have a plurality of circumferential grooves in which e-rings 435, 436 and 437 configured to prevent the movement of the idle pulley 431 and the pair of bearings 433 and 434 along the shaft 432 may clamp the shaft 432.

The magnetic sensor or the magnetic encoder 460 may be coupled to the shaft 432 of the idle pulley assembly 430 near an end of the shaft 432 opposite the idle pulley 431, and may detect the rotational angle of the idle pulley 431. However, the magnetic sensor 460 may be coupled to the driving pulley assembly 420.

Referring to FIGS. 31 and 32, the idle pulley assembly 430 and the magnetic sensor 460 may be coupled to the idle pulley support 163 of the top assembly 160 in the frame 100 so that the idle pulley support 163 may support the idle pulley assembly 430 and the magnetic sensor 460. In detail, the bearings 433 and 434 of the idle pulley assembly 430 may be placed in the through holes 164 of the idle pulley support 163, the shaft 432 of the idle pulley assembly 430 may pass through the through hole 166 of the magnetic sensor support 165, and the magnetic sensor 460 may be fixed to the magnetic sensor support 165 by fasteners. Likewise, the driving pulley assembly 420 may be coupled to the driving pulley support 161 of the top assembly 160 in the frame 100. In detail, the bearings 424 and 425 of the driving pulley assembly 420 may be seated in the through holes 162 of the driving pulley support 161 so that the driving pulley support 161 may support the driving pulley assembly 420.

Referring to FIG. 33 and FIG. 23, the belt 440 may be inserted into the recess 385 of the belt catcher 381 such that the belt 440 is clamped by the belt catcher 381. Referring to FIG. 25, the pair of the photosensors 471 and 475 may include an outer photosensor 471 disposed near the driving pulley 421 and an inner photosensor 475 disposed near the idle pulley 431. Referring to FIG. 34, each of the photosensors 471 and 475, for example, the outer photosensor 471 may have a shape of a bracket including an upper branch and a lower branch. The outer photosensor 471 may include a light emitter 472 and a light receiver 473 provided in the upper branch and the lower branch, respectively. However, the positions of the light emitter 472 and the light receiver 473 may be reversed.

Referring to FIG. 35, when the belt catcher 381 approaches to the outer photosensor 471 and the detection piece 386 is interposed between the light emitter 472 and the light receiver 473, the detection piece 386 may block the light emitted from the light emitter 472 such that the light receiver 473 does not receive the light. Then, the outer photosensor 471 may generate a signal corresponding thereto, and it may be determined from the signal that the right inner sliding door 330 is near the position of the outer photosensor 471.

Referring to FIG. 36, the drive printed circuit board 490 may be fixed to a rear surface of the rear plate 150 of the frame 100 so that a front surface of the drive printed circuit board 490 may be exposed through the upper through hole 152 or 153.

Touch Panel Assembly

Next, the touch panel assembly 500 according to embodiments of the present invention is described in detail with reference to FIG. 37.

Figure 37:
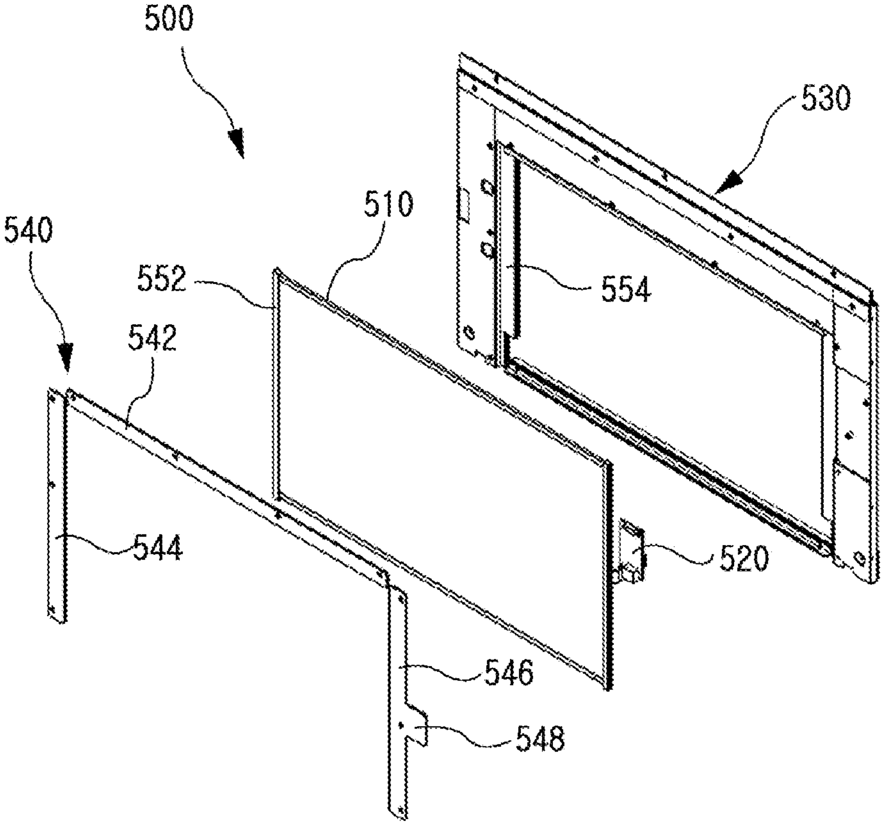
FIG. 37 is a schematic exploded view of the touch panel assembly shown in FIG. 2 according to an embodiment of the present invention.

FIG. 37 is a schematic exploded view of the touch panel assembly shown in FIG. 2 according to an embodiment of the present invention.

Referring to FIG. 37, the touch panel assembly 500 may include a touch panel 510, a control board 520, a rear frame 530, a front frame 540, and a plurality of cushioning members 552 and 554. The touch panel 510 may be placed between the rear frame 530 and the front frame 540, and edges of the touch panel 510 may be covered by the cushioning members 552 and 554. The control board 520 may be fixed on the rear frame 530 that may have a depression configured to receive the control board 520. Although the control board 520 is shown to be disposed right to the touch panel 510 in FIG. 37, embodiments of the present invention are not limited thereto. The front frame 540 may include a plurality of pieces, for example, a top piece 542, and a pair of lateral pieces 544 and 546. One of the pair of lateral pieces 544 and 546, for example, a right lateral piece 546 may include an extension 548 to fasten the control board 520.

Operation of Display Device

Now, operations of the display device 1000 according to embodiments of the present invention are described in detail with reference to FIG. 38A to FIG. 46.

Figure 38A:
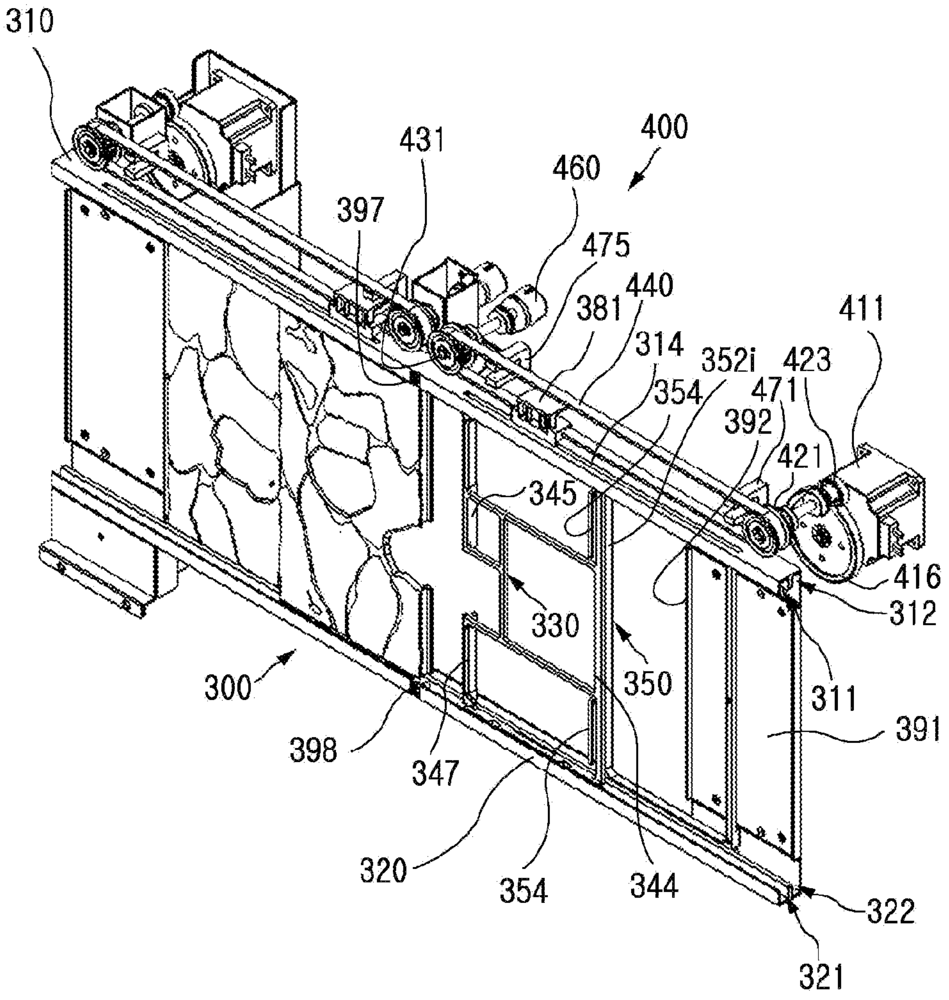
FIG. 38A is a schematic perspective view of portions of the display device shown in FIG. 1 to FIG. 37 illustrating the operations of the display device according to an embodiment of the present invention.
Figure 38B:
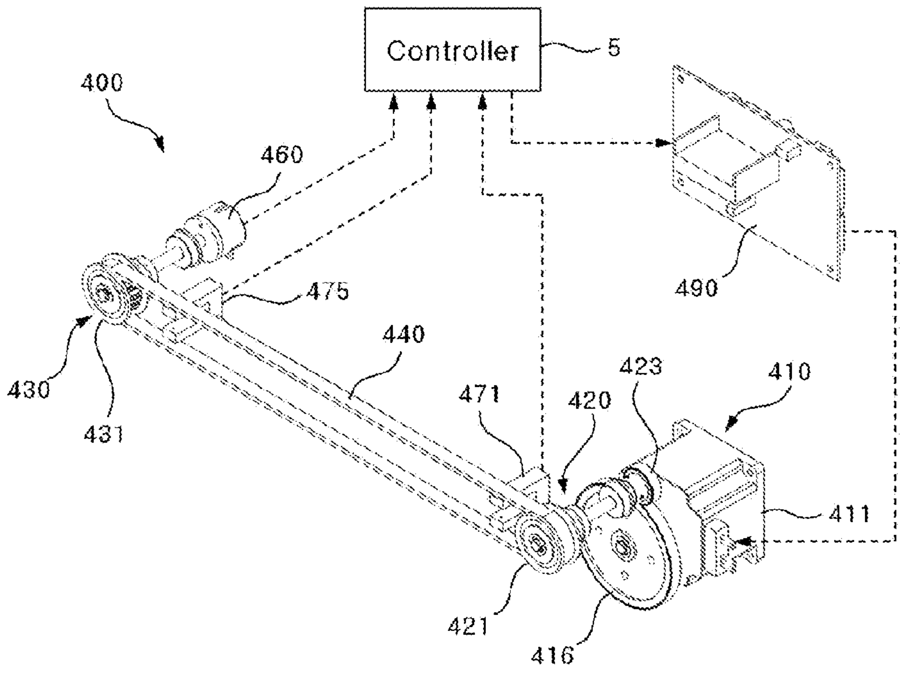
FIG. 38B is a schematic perspective view of the driving unit of the display device shown in FIG. 1 to FIG. 37 illustrating the operations of the driving unit according to an embodiment of the present invention.
Figure 43:
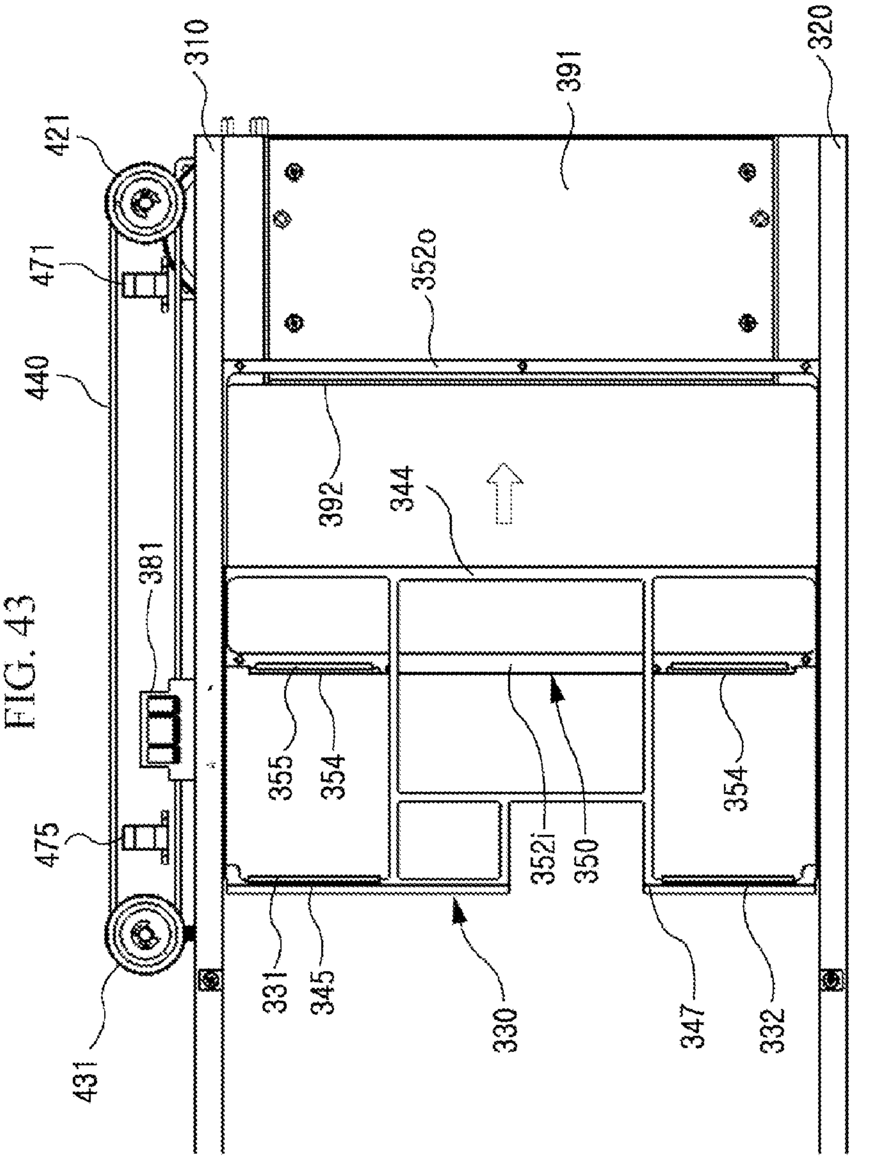
Figure 44:
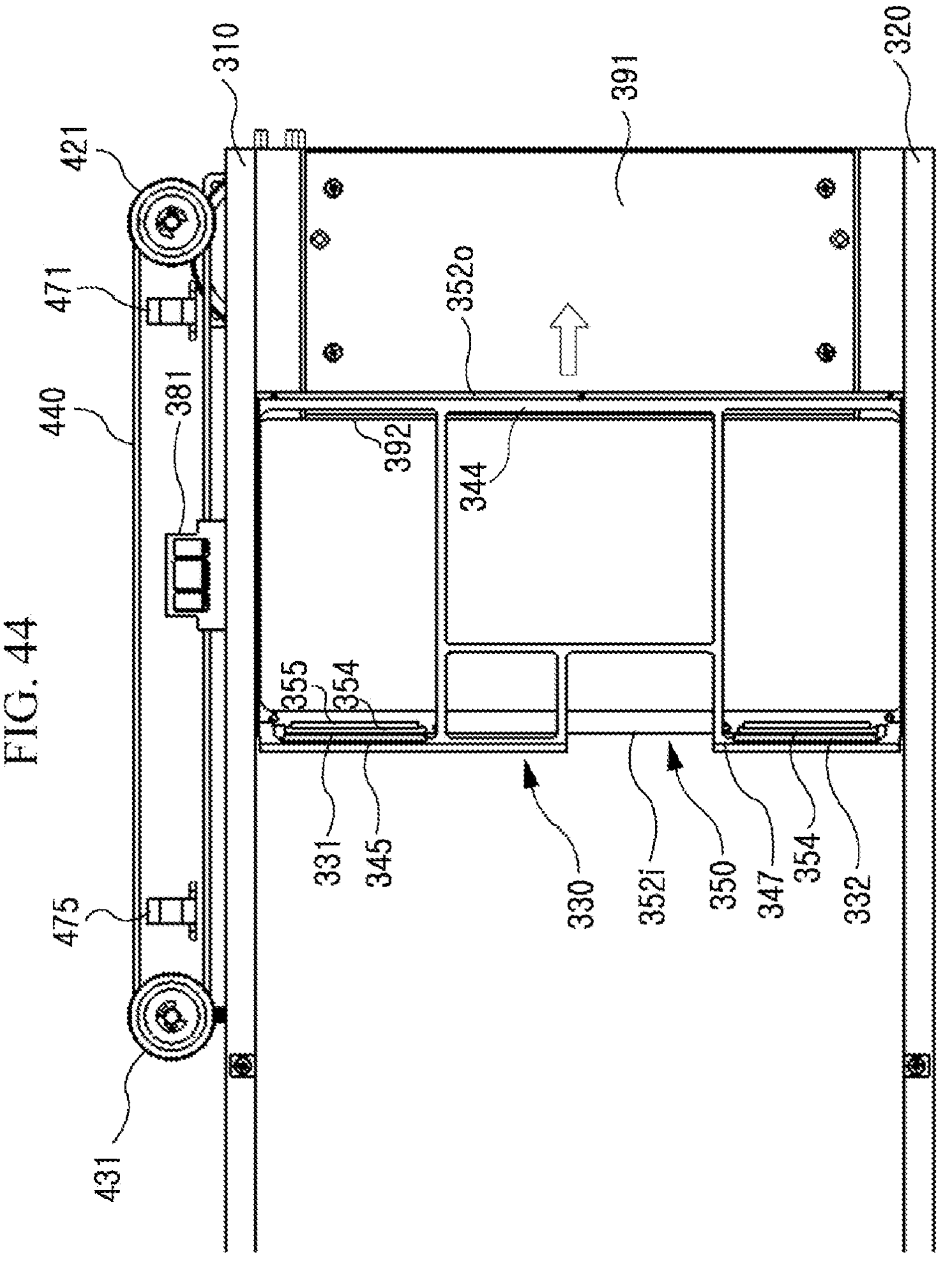
Figure 45:
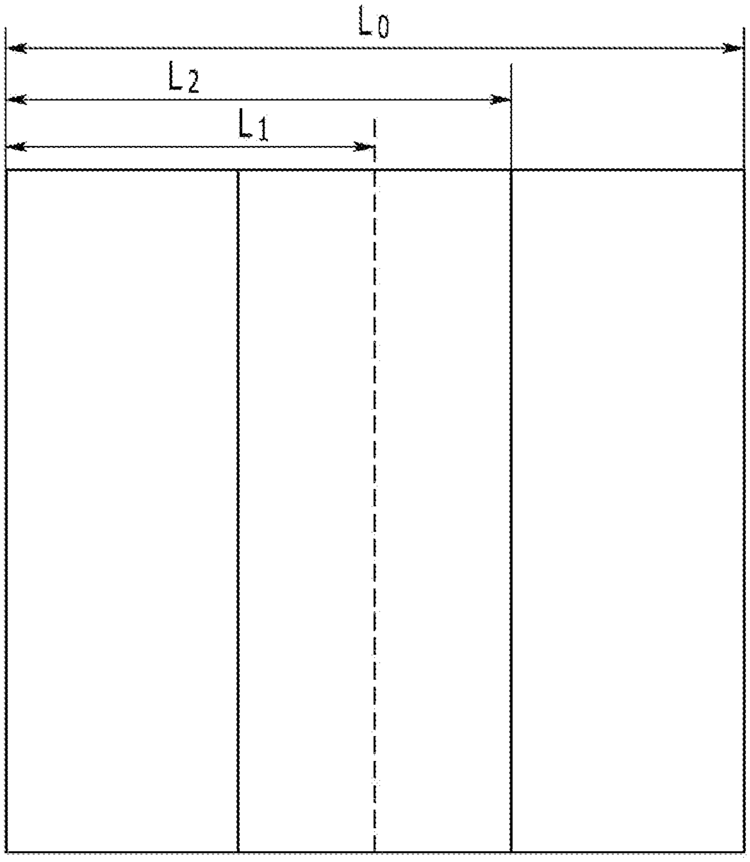
FIG. 45 is a schematic diagram comparing a double sliding door system with a single sliding door system.
Figure 46:
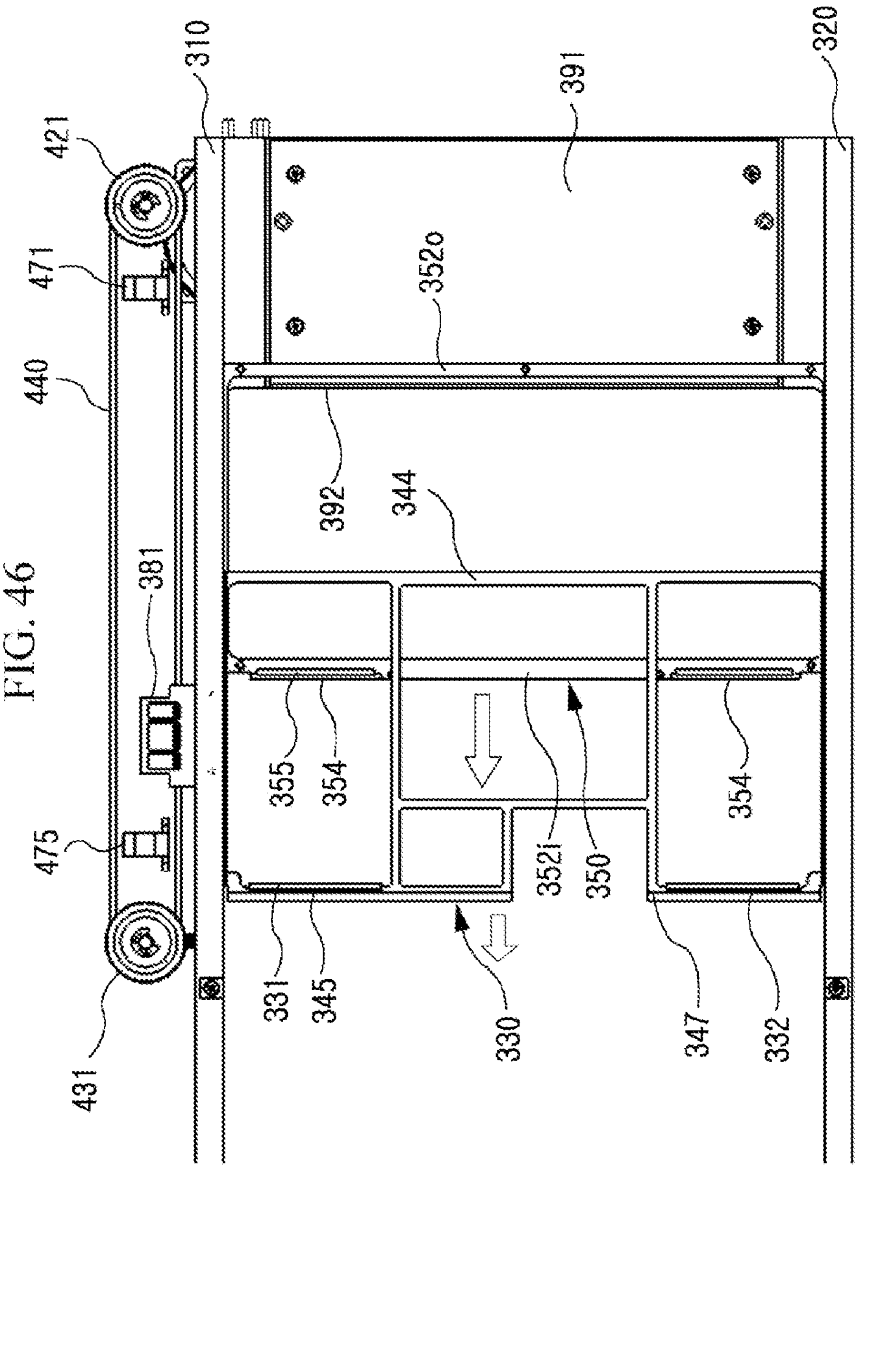
FIG. 46 is a schematic front view of the shutter assembly and the driving unit in the display device shown in FIG. 38 illustrating the operations of the display device according to an embodiment of the present invention.

FIG. 38A is a schematic perspective view of portions of the display device shown in FIG. 1 to FIG. 37 illustrating the operations of the display device according to an embodiment of the present invention, FIG. 38B is a schematic perspective view of the driving unit of the display device shown in FIG. 1 to FIG. 37 illustrating the operations of the driving unit according to an embodiment of the present invention, FIG. 39 to FIG. 44 and FIG. 46 are schematic front views of the shutter assembly and the driving unit in the display device shown in FIG. 38A illustrating the operations of the display device according to an embodiment of the present invention, and FIG. 45 is a schematic diagram comparing a double sliding door system with a single sliding door system.

Referring to FIG. 38A, FIG. 38B, and FIG. 2, the shutter assembly 300 according to embodiments of the present invention have a multiple sliding door structure, for example, a double sliding door structure including the inner sliding door 330 and the outer sliding door 350 that may move along the front guide channels 311 and 321 and the rear guide channels 312 and 322, respectively, or vice versa. The inner sliding door 330 may be driven by the driving unit 400, and the outer sliding door 350 follows the inner sliding door 330 by means of catching member(s), for example, the catching protrusions 345, 347 and 354.

The driving unit 400 may include an actuator and a power transmission member configured to transmit the driving force from the actuator to the inner sliding door 330. The driving force from the actuator, i.e., the motor 411, may be transmitted to the inner sliding door 330 via the belt catcher 381 as well as the power transmission member including the gears 416 and 423 and the belt 440. The magnetic sensor 460 may detect the rotation of the idle pulley 431 to inform of the position of the inner sliding door 330. Furthermore, the photosensors 471 and 475 respectively disposed near a left limit position and a right limit position of the inner sliding door 330 may inform whether the inner sliding door 330 reaches the limit positions. The motor 411 may be driven by the drive printed circuit board 490 that may include a motor driver. The drive printed circuit board 490 may be controlled by a controller 5 configured to receive the signals from the magnetic sensor 460 and the photosensors 471 and 475 and to determine the position of the inner sliding door 330 and to determine the error of the driving unit 400. The controller 5 may determine a target position of the inner sliding door 330 and may send a corresponding signal to the motor driver. The controller may be provided on a the drive printed circuit board 490.

Figure 39:
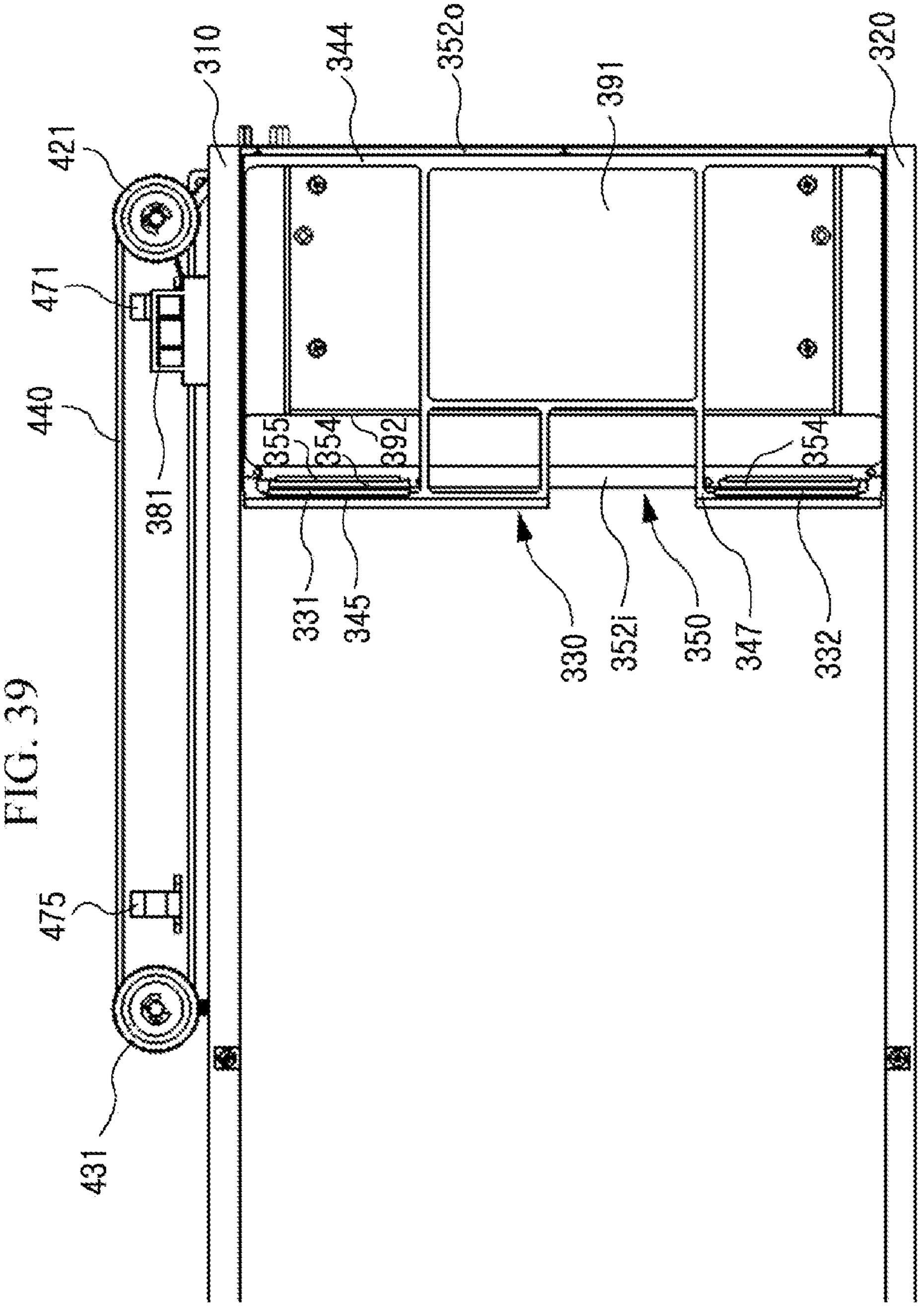
FIG. 39 to FIG. 44 are schematic front views of the shutter assembly and the driving unit in the display device shown in FIG. 38 illustrating the operations of the display device according to an embodiment of the present invention.
Figure 40:
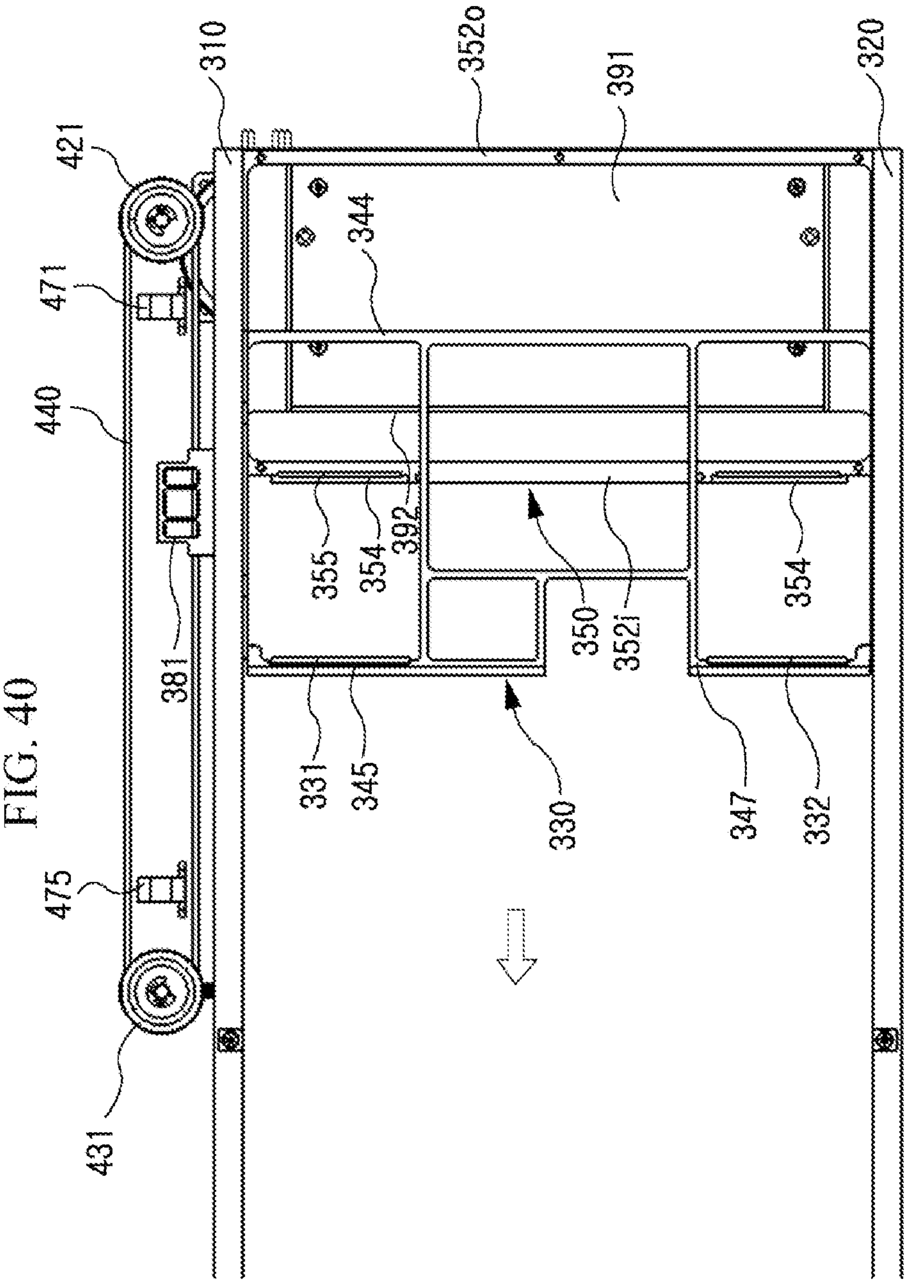
Figure 41:
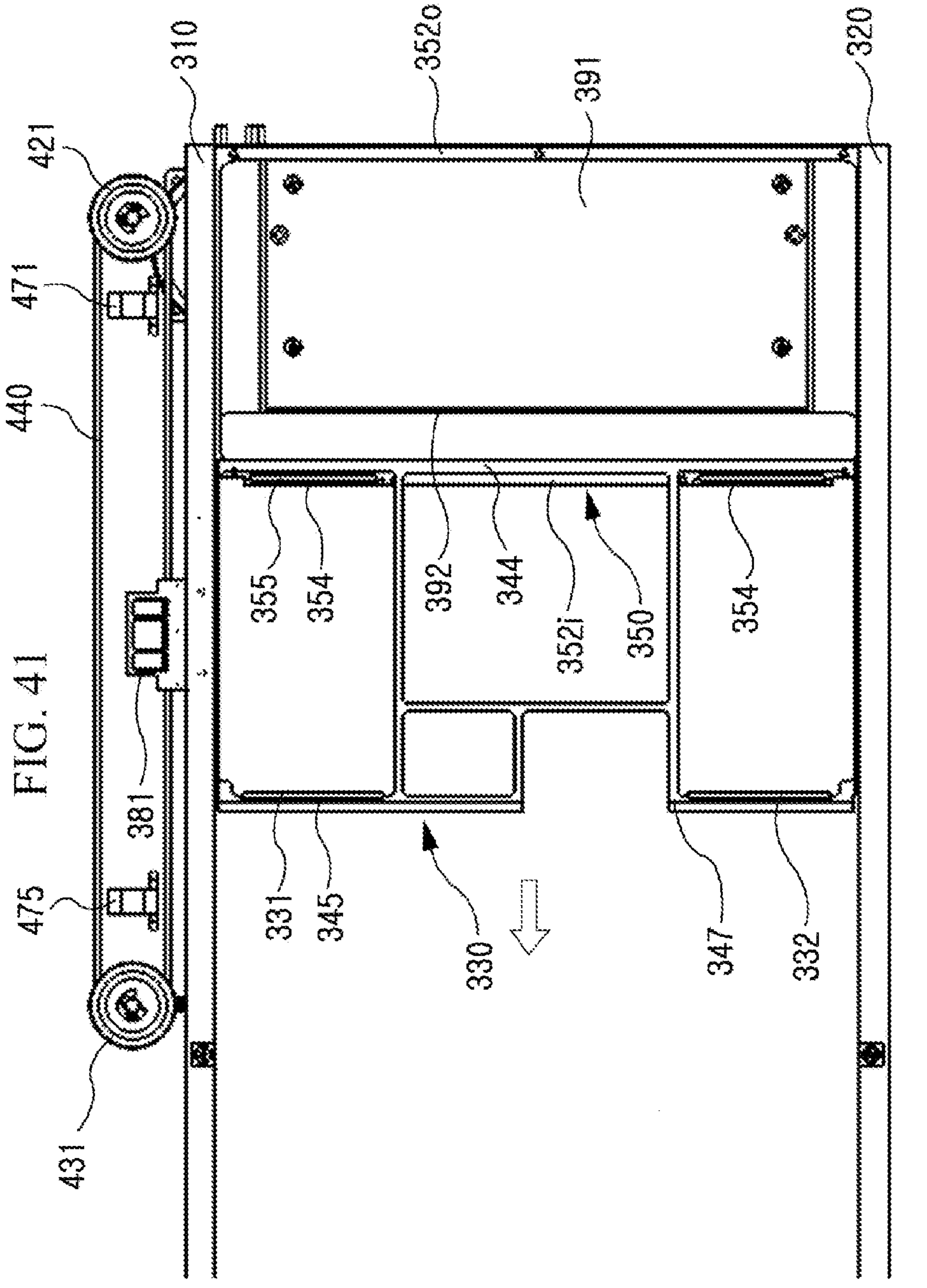
Figure 42:
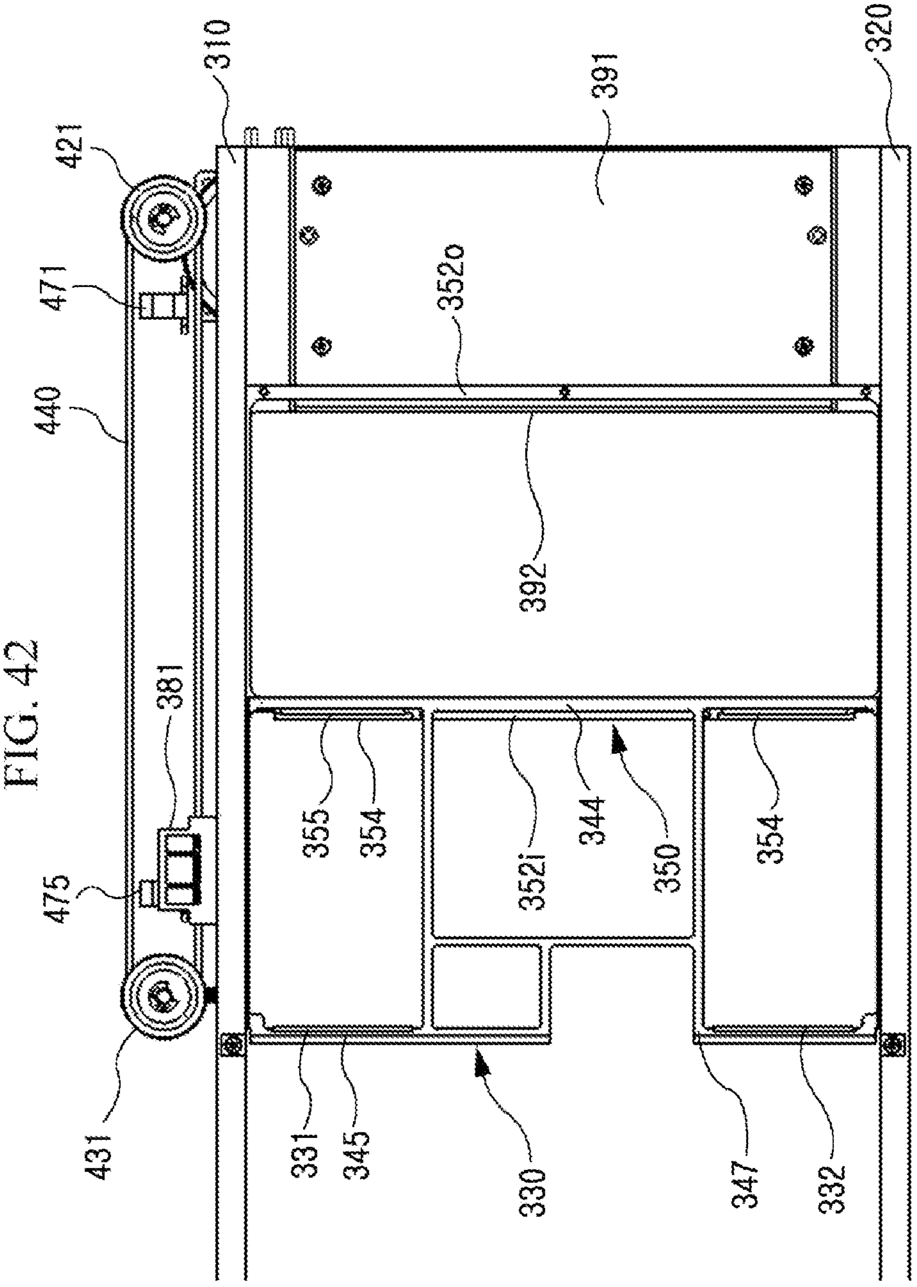

Referring to FIG. 39 and FIG. 40, the inner sliding door 330 may be driven by the driving unit 400 to start to move leftward when the inner sliding door 330 is expected to move from the rightmost position to the leftmost position. Referring to FIG. 40 and FIG. 41, the outer sliding door 350 may not move until the outer bar 344 of the inner sliding door 330 meets the catching protrusions 354 of the outer sliding door 350. Referring to FIG. 41 and FIG. 42, the outer sliding door 350 may follow the inner sliding door 330 thereafter. The inner sliding door 330 may stop when it is determined that the inner sliding door 330 arrives at the left limit position, and then the outer sliding door 350 may also stop.

When the starting position of the inner sliding door 330 is the leftmost position, and the target position is the rightmost position, the inner sliding door 330 may be driven to start to move rightward while the outer sliding door 350 remains it rest state as shown in FIG. 43. Referring to FIG. 44, the inner sliding door 330 and the outer sliding door 350 may move together to their target positions after the catching protrusions 345 and 347 of the inner sliding door 330 contact the catching protrusions 354 of the outer sliding door 350. Referring to FIG. 41 and FIG. 42, the outer sliding door 350 may follow the inner sliding door 330 thereafter. The inner sliding door 330 may stop when it is determined that the inner sliding door 330 arrives at the left limit position, and then the outer sliding door 350 may also stop.

The multiple sliding door structure of the shutter assembly 300 may allow a wider open area than a single sliding door structure. Referring to FIG. 45, when a length $L_0$ is given for a door system, a double sliding door system may have a maximum open length $L_1$ equal to about two thirds of the given length $L_0$, while a single sliding door system may have a maximum open length L1 equal to about a half of the given length $L_0$. Therefore, various rendering effects for a game may be obtained by applying a multiple sliding door system.

In order to conduct a variety of rendering effects for a game, the shutter assembly 300 may be precisely controlled. For example, the positions of both the sliding doors 330 and 350 may be precisely controlled in order to allow a game player to see images on the display panel 210 through the holes 336 and 337 because an image or a character to be shown to the player is aligned with the holes 336 and 337. However, since the outer sliding door 350 is not driven independently, its position may not be unpredictable.

Referring to FIG. 42, the outer sliding door 350 and the inner sliding door 330 may be stuck together and may move at substantially the same speed after the outer bar 344 of the inner sliding door 330 meets the catching protrusions 354 of the outer sliding door 350 in a movement from right to left. In this case, when the inner sliding door 330 stops, the outer sliding door 350 may also stop at the same time.

However, referring to FIG. 42 and FIG. 45, the outer sliding door 350 may move faster than the inner sliding door 330 after the outer bar 344 of the inner sliding door 330 meets the catching protrusions 354 of the outer sliding door 350 in a movement. In this case, the stop of the outer sliding door 350 may lag behind the stop of the inner sliding door 330, or the outer sliding door 350 may not stop until the catching protrusions 354 of the outer sliding door 350 strikes the catching protrusions 345 and 347 of the inner sliding door 330 even though the inner sliding door 330 stops.

In the former case, it may be expected that the position of the outer sliding door 350 differs from the position of the inner sliding door 330 by a distance equal to about a width of the inner sliding door 330. However, in latter case, the position of the outer sliding door 350 may vary in a range from the same position as the inner sliding door 330 to the position differing from the position of the inner sliding door 330 by a distance equal to about a width of the inner sliding door 330. Therefore, the movements of the sliding doors 330 and 350 may be controlled like the former case.

A mechanism for obtaining expectable positions of the sliding doors 330 and 350 according to embodiments of the present invention is described in detail with reference to FIG. 47 and FIG. 48.

Figure 47:
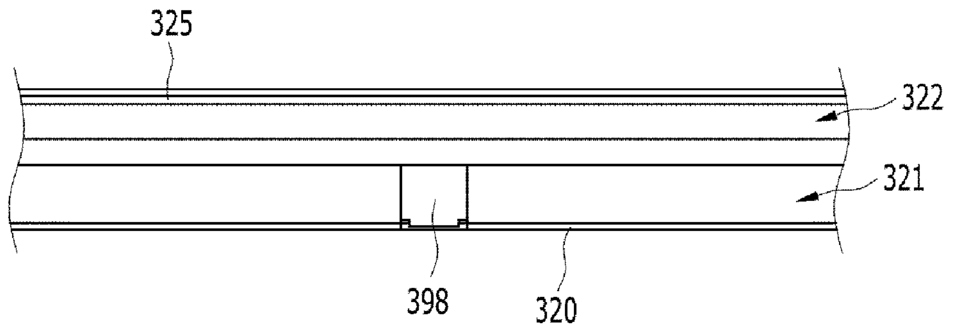
FIG. 47 and FIG. 48 are schematic top views of a track for the sliding doors according to embodiments of the present invention.
Figure 48:
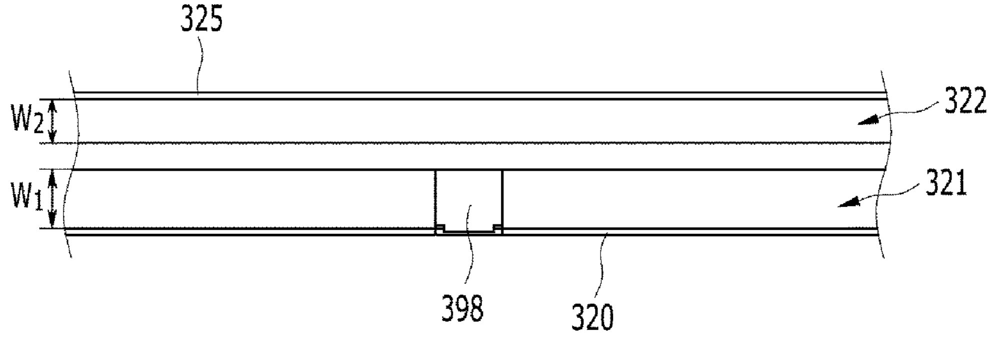

FIG. 47 and FIG. 48 are schematic top views of a track for the sliding doors according to embodiments of the present invention.

The moving speed of the outer sliding door 350 may depend on the friction between the outer sliding door 350 and the guide channels 312 and 322. Therefore, the moving speed of the doors 330 or 350 may be controlled by adjusting the friction between the outer sliding door 350 and the guide channels 312 and 322. For example, the friction between the outer sliding door 350 and the rear guide channels 312 and 322 may be set to be greater than the friction between the inner sliding door 330 and the front guide channels 311 and 321 so that the outer sliding door 350 may not move faster than the inner sliding door 330. Since the rollers 333, 334, 356 and 357 directly contact the guide channels 311, 312, 321 and 322, the friction between rollers 333, 334, 356 and 357 and the guide channels 311, 312, 321 and 322 may be adjusted.

According to an embodiment of the present invention, the walls of at least one of the rear guide channels 312 and 322 may be formed of a material having coefficient of friction greater than coefficient of friction of a material of the walls of the front guide channels 311 and 321.

According to another embodiment of the present invention, referring to FIG. 47, an additional member 325 giving relatively large coefficient of friction to the outer sliding door 350, for example, an oilless bearing may be added to an inner surface of at least one of the rear guide channels 312 and 322.

According to another embodiment of the present invention, referring to FIG. 48, a width of at least one of the rear guide channels 312 and 322 may be narrower than the front guide channels 311 and 321 so that the outer sliding door 350 may move relatively hard compared with the inner sliding door 330.

According to another embodiment of the present invention, the rollers 356 and 357 of the outer sliding doors 350 and 370 may include a material having coefficient of friction greater than coefficient of friction of a material of the rollers 333 and 334 of the inner sliding doors 330 and 360.

Overall Configuration of Gaming Machine

A gaming machine according to embodiments of the present invention is described in detail.

First, a mechanical structure of a gaming machine according to embodiments of the present invention is described in detail with reference to FIG. 49 to FIG. 55.

Figure 49:
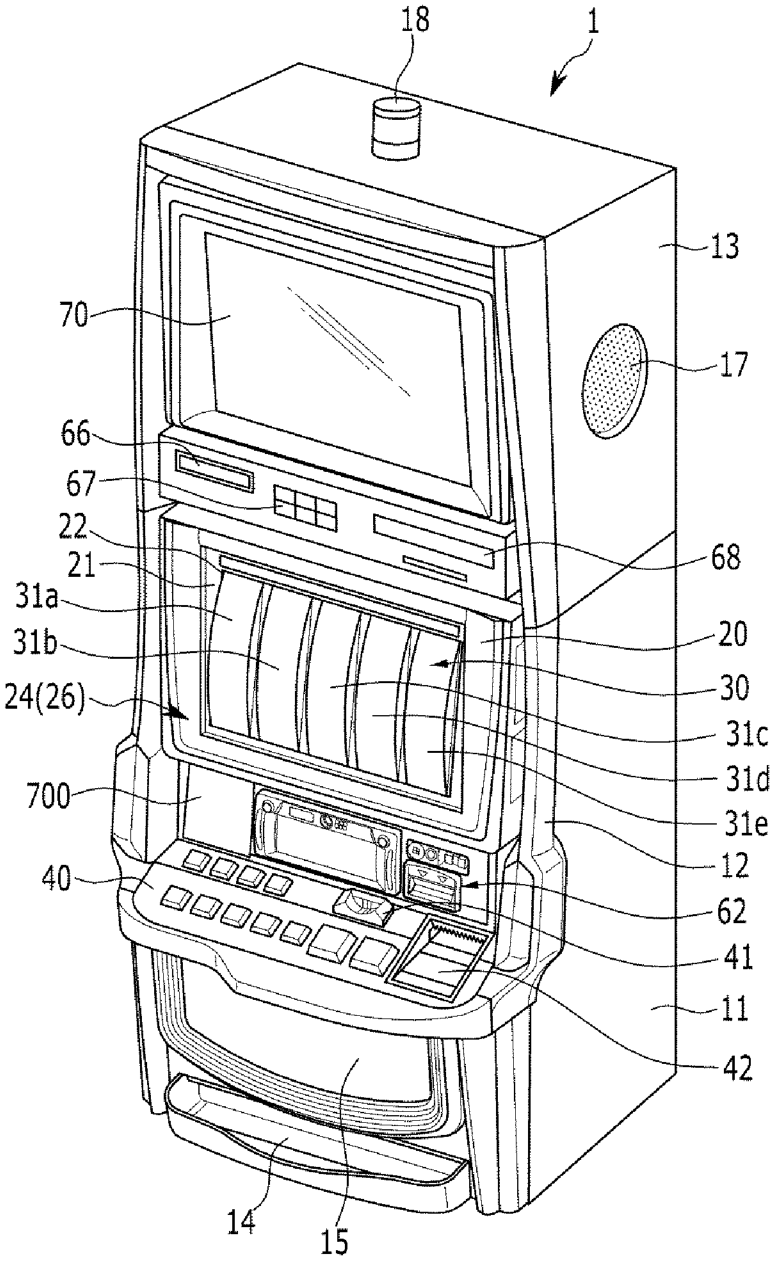
FIG. 49 is a schematic perspective view of a slot machine according to an embodiment of the present invention.
Figure 50:
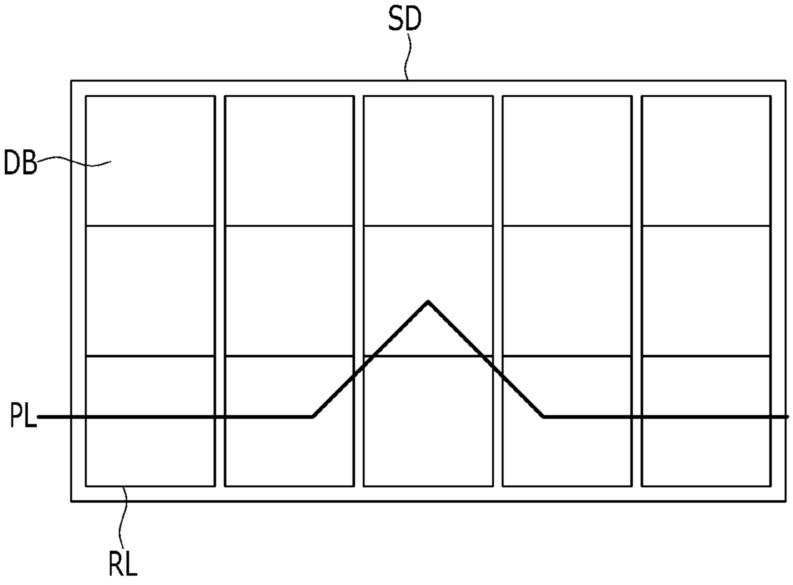
FIG. 50 is a schematic front view of a display window of a primary display in the slot machine shown in FIG. 49 according to an embodiment of the present invention.
Figure 51:
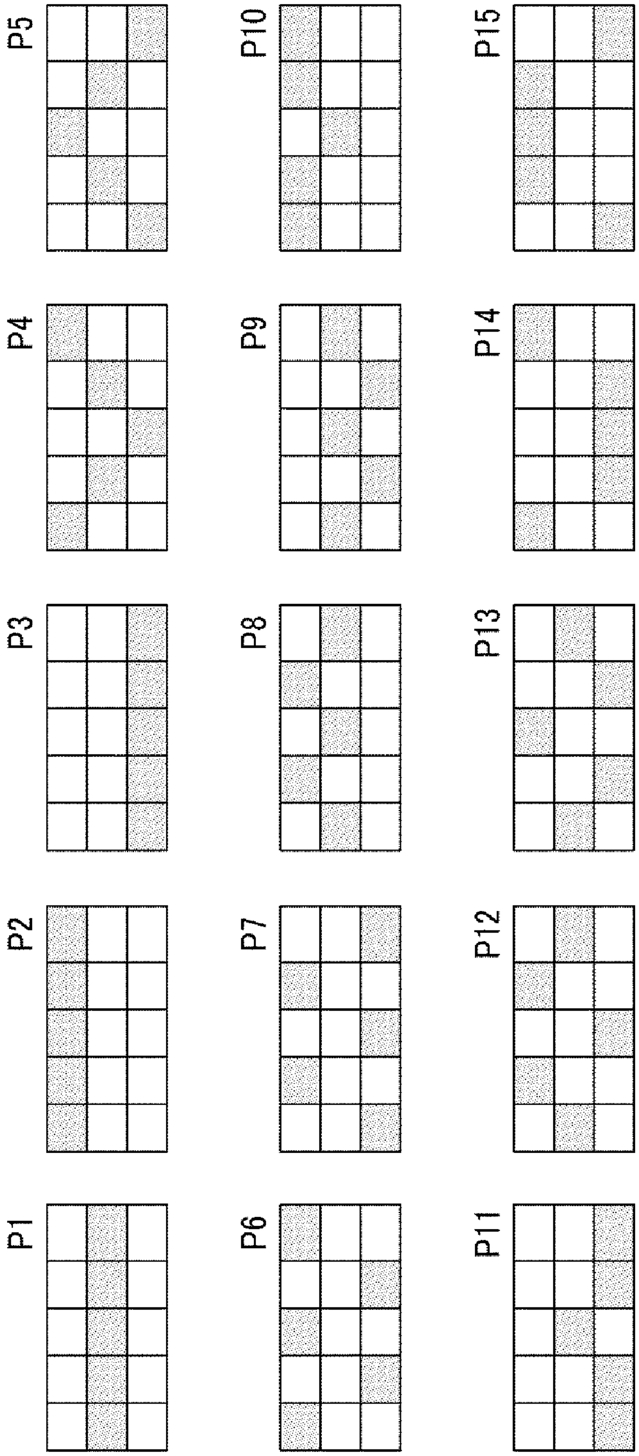
FIG. 51 and FIG. 52 are schematic diagrams showing exemplary paylines according to an embodiment of the present invention.
Figure 52:
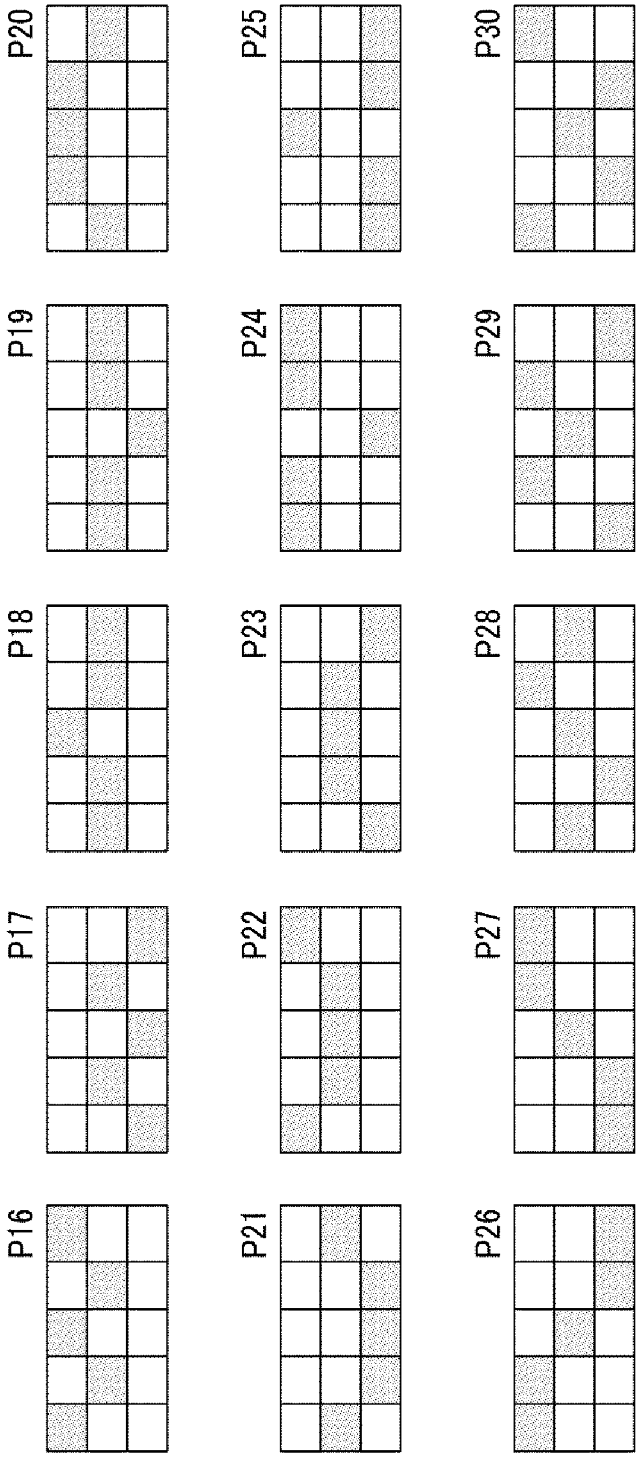
Figure 55:
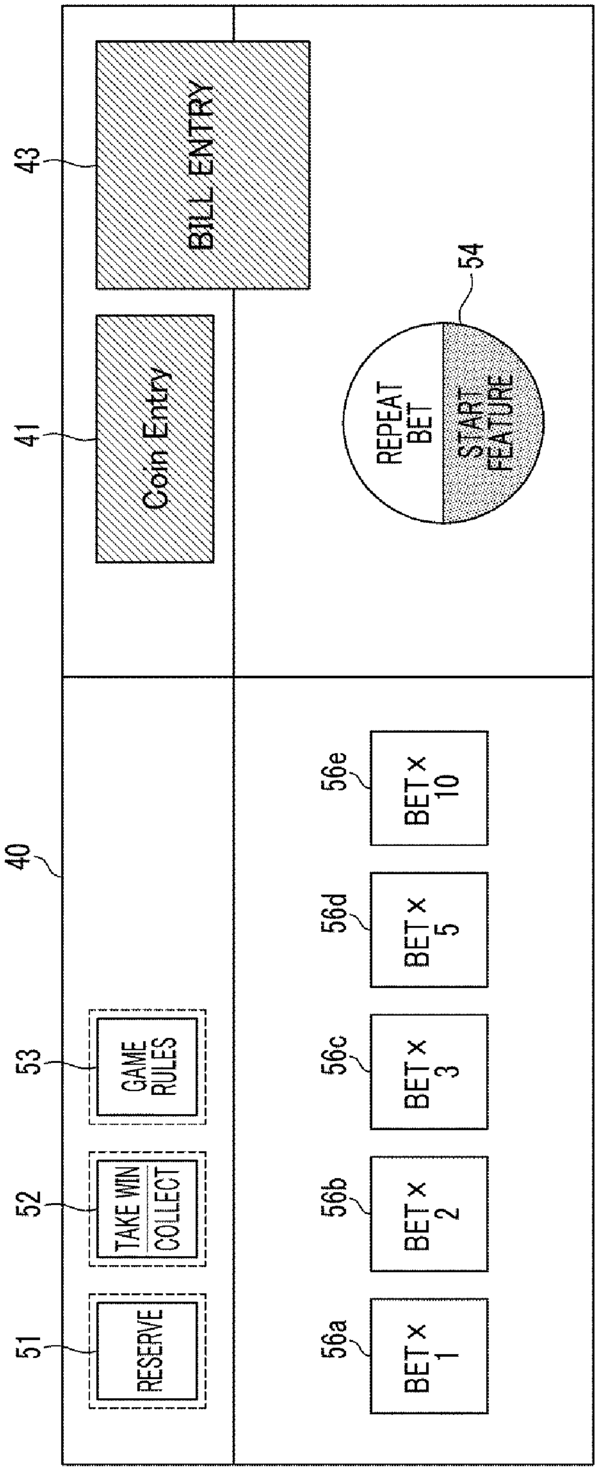
FIG. 55 is a layout view of a control panel in the slot machine shown in FIG. 49 according to an embodiment of the present invention.

FIG. 49 is a schematic perspective view of a slot machine according to an embodiment of the present invention, FIG. 50 is a schematic front view of a display window of a primary display in the slot machine shown in FIG. 49 according to an embodiment of the present invention, FIG. 51 and FIG. 52 are schematic diagrams showing exemplary paylines according to an embodiment of the present invention, FIGS. 53 and 54 are symbol code tables according to an embodiment of the present invention, and FIG. 55 is a layout view of a control panel in the slot machine shown in FIG. 49 according to an embodiment of the present invention.

Referring to FIG. 49, a gaming machine, for example, a slot machine 1 may include a cabinet 11, a top box 13 disposed on the cabinet 11, and a main door 12 disposed in front of the cabinet 11.

A primary display 20 including a reel assembly 30 is provided in the main door 12. According to an embodiment of the present embodiment, the reel assembly 30 may include five reels 31*a* to 31*e*. Each of the reels 31*a* to 31*e* may include a drum (not shown) that has a peripheral surface bearing plural types of symbols. The primary display 20 further includes a reel cover 21 disposed in front of the reel assembly 30 and having a display window 22 that exposes a portion of the reels 31*a* to 31*e*. The reel cover 21 is provided with a display panel 24 that may include a transparent liquid crystal display panel (not shown). The primary display 20 may further include a touch panel (not shown) for receiving touch input instruction of a game player.

Referring to FIG. 50, a given number of symbols, for example, three symbols on each of the reels 31*a* to 31*e* may be shown on the display window 22 when the reels 31*a* to 31*e* are at rest. Therefore, a symbol matrix including five columns and three rows is shown on the display window 22, where a pair of a column and a row define a symbol block DB.

FIG. 50 also shows an exemplary payline PL that may be displayed on the display panel 24 and may pass through a display block DB in each column. When a combination of the symbols on the payline PL in a game satisfies a predetermined condition, a player wins the game. For example, if all the symbols in a combination are the same, the gaming machine 1 awards a prize to the player. Such a combination of the symbols that provides a win is referred to as a "winning combination." The payline PL shown in FIG. 50 is merely an example, and various paylines may be drawn and two or more paylines may be selected by a player.

FIG. 51 and FIG. 52 show a variety of paylines PL1-PL30. An exemplary play line P1, P2 or P3 shown in FIG. 51 connects five blocks in the second, first, or third row, respectively, and another exemplary payline P11 shown in FIG. 51 connects four lower blocks in the first, second, fourth, and fifth columns and a middle block in the third column Another exemplary payline P21 shown in FIG. 52 connects lower blocks in the second, third, and fourth columns and middle blocks in the first and fifth columns at the second row.

In addition to a win with the payline PL (referred to as a "line win"), there is another type of win referred to as "scatter win" that is given when a scatter symbol among the plural types of the symbols is shown on the display window 22.

Referring to FIG. 53, a symbol sequence including a plurality of symbols is marked on each of the reels 31*a* to 31*e*. Each symbol in the symbol sequence may be assigned to a code, and may include a picture (hereinafter referred to as "a picture symbol") or may include no picture (hereinafter referred to as "a blank symbol"). The picture symbols may include symbols denoted by, for example, "7," "BAR," "DOUBLE BAR," or "TRIPLE BAR," a scatter symbol (denoted by "BONUS"), and a specific symbol (denoted by "CHANCE"). For example, the symbol sequence may include eleven picture symbols and eleven blank symbols each being located between adjacent two picture symbols. Codes ranging from "00" to "21" may be assigned to the eleven picture symbols and the eleven blank symbols. In an example symbol code table shown in FIG. 53, the "BAR," blank, "7," blank, "TRIPLE BAR," blank, "BONUS," blank, "DOUBLE BAR," blank, "TRIPLE BAR," blank, "DOUBLE BAR," blank, "7," blank, "DOUBLE BAR," blank, "BAR," blank, "7," and blank symbols to which the codes from "00" to "21" are respectively assigned are marked on the first reel 31*a* (reel 1). Further, as shown in FIG. 53, "CHANCE" symbol may be marked on only the third reel 31*c* (reel 3). A gaming machine spins the reels 31*a* to 31*e* according to a player's input, and randomly determines a code for each of the reels 31*a* to 31*e*. After a certain time period elapses, the gaming machine stops each of the reels 31*a* to 31*e* to locate the symbol corresponding to the determined code at one row (for example, the middle row) of the symbol matrix. Accordingly, the symbols are rearranged in the symbol matrix.

In another example symbol code table shown in FIG. 54, "WILD" symbol is marked on each of the reels 31*a* to 31*e*, instead of a predetermined symbol, for example the "7" symbol. The blank symbol adjacent to the "WILD" symbol may be substituted to the "WILD" symbol. The "WILD" symbol may establish its own winning combination, or may be substituted to a certain symbol to combine with the certain symbol of the pay line and establish the winning combination. Alternatively, the "WILD" symbol may be not marked on all of the reels 31*a* to 31*e*, but be marked to only some of the reels 31*a* to 31*e*.

The arrangement of the symbols may determine a mode of a subsequent game, the mode selected from a normal mode and a chance mode.

The display panel 24 on the reel cover 21 displays a betting amount, a credit amount and a payout amount in respective areas which do not overlap the symbol arrangement. The credit amount indicates the number of coins that are owned by the player and deposited inside the slot machine 1. The payout amount indicates the number of coins to be paid out to the player when a winning combination is established.

Although the slot machine 1 employs the mechanical reels 31*a* to 31*e* in the present embodiment, video reels or a combination of the mechanical reels and the video reels may be used as well, alternatively.

An IC card reader 62 is disposed below the primary display 20. The IC card reader 62 receives an IC card which stores predetermined data such as player identification information and game log data related with the games previously played by the player. Also, the IC card may store data equivalent to coins, bills, or credits owned by the player. The IC card reader 62 reads and writes data from and to the inserted IC card. The IC card reader 62 includes an LCD for displaying the data read from the IC card.

In front of a lower end of the IC card reader 62 are provided a control panel 40, on which includes various buttons, a coin entry 41, and a bill entry 43. For example, referring to FIG. 55, a RESERVE button 51, a COLLECT button 52, and a GAME RULES button 53 are disposed on an upper left area of the control panel 40. 1-BET button 56*a*, 2-BET button 56*b*, 3-BET button 56*c*, 5-BET button 56*d*, and 10-BET button 56*e* are disposed on a lower left area of the control panel 40. Also, a START button 54 is disposed on the lower center area of the control panel 40. The coin entry 41 is disposed upper center area, and the bill entry 43 is disposed right area of the control panel 40.

The RESERVE button 51 is used when the player temporarily leaves the seat or when the player wants to ask a staff of the game facility to exchange money. Alternatively, the RESERVE button 51 may be used to store remaining credits into an IC card inserted into the IC card reader 62. The COLLECT button 52 is used to instruct the slot machine 1 to pay out credited coins to a coin tray 15. The GAME RULES button 53 is used when the player is not acquainted with game rules or manipulation method. When the GAME RULES button 33 is pressed, various types of help information are displayed on a secondary display 70.

The BET buttons 56*a* to 56*e* are used to set the betting amount. Each time the 1-BET button 56*a* is pressed, one credit is bet for each active pay line from the current credits owned by the player. When the 2-BET button 56*b* is pressed, the game is started on condition that two credits are bet for each active pay line. When the 3-BET button 56*c* is pressed, the game is started on condition that three credits are bet for each active pay line. When the 5-BET button 56*d* is pressed, the game is started on condition that five credits are bet for each active pay line. When the 10-BET button 56*e* is pressed, the game is started on condition that ten credits are bet for each active pay line. The START button 54 is used to instruct the initiation of spinning the reels 31*a* to 31*e* under the previously set betting condition.

The coin entry 41 receives coins and guides the inserted coins into a hopper inside the cabinet 11. The bill entry 43 receives a bill and validates the legitimacy of the inserted bill to accept only a legitimate bill into the cabinet 11.

On a lower front face of the main door 13 and below the control panel 40, there are provided a belly glass 14 on which a character of the slot machine 1 or the like is drawn, and a coin tray 15 receiving coins paid out from the cabinet 11.

Referring back to FIG. 49, a secondary display 70 that may include the display device 1000 shown in FIG. 1 to FIG. 48 is provided at the front face of the top box 13. The secondary display 70 may provide rendering effect for enhancing the amusement of the game, and displays information of game rules and manipulation methods. Also, a speaker 17 and a lamp 18 are provided on the side and top faces, respectively, of the top box 13. The slot machine 1 augments the amusement of the game by providing sound effect or flashing light through the speaker 17 or the lamp 18, respectively.

Below the secondary display 70, there are provided a ticket printer 66, a keypad 67, and a data display 68.

The ticket printer 66 prints, on a ticket, a bar code containing the credit data, date and time, and an ID number of the slot machine 1 to output the barcode imprinted ticket. The player can exchange the barcode imprinted ticket with bills or the like at a predetermined location of a gaming facility (e.g., from a casher in a casino).

The keypad 67 includes a plurality of keys allowing the player to input instructions pertinent to the issuance of the ticket. The data display 68, which is implemented using a fluorescent display, LEDs, or the like, displays data input by the player through the keypad 67.

Electrical Configuration of Slot Machine

Now, electrical structure of the slot machine 1 shown in FIG. 49 is described in detail with reference to FIG. 56 to FIG. 59.

Figure 56:
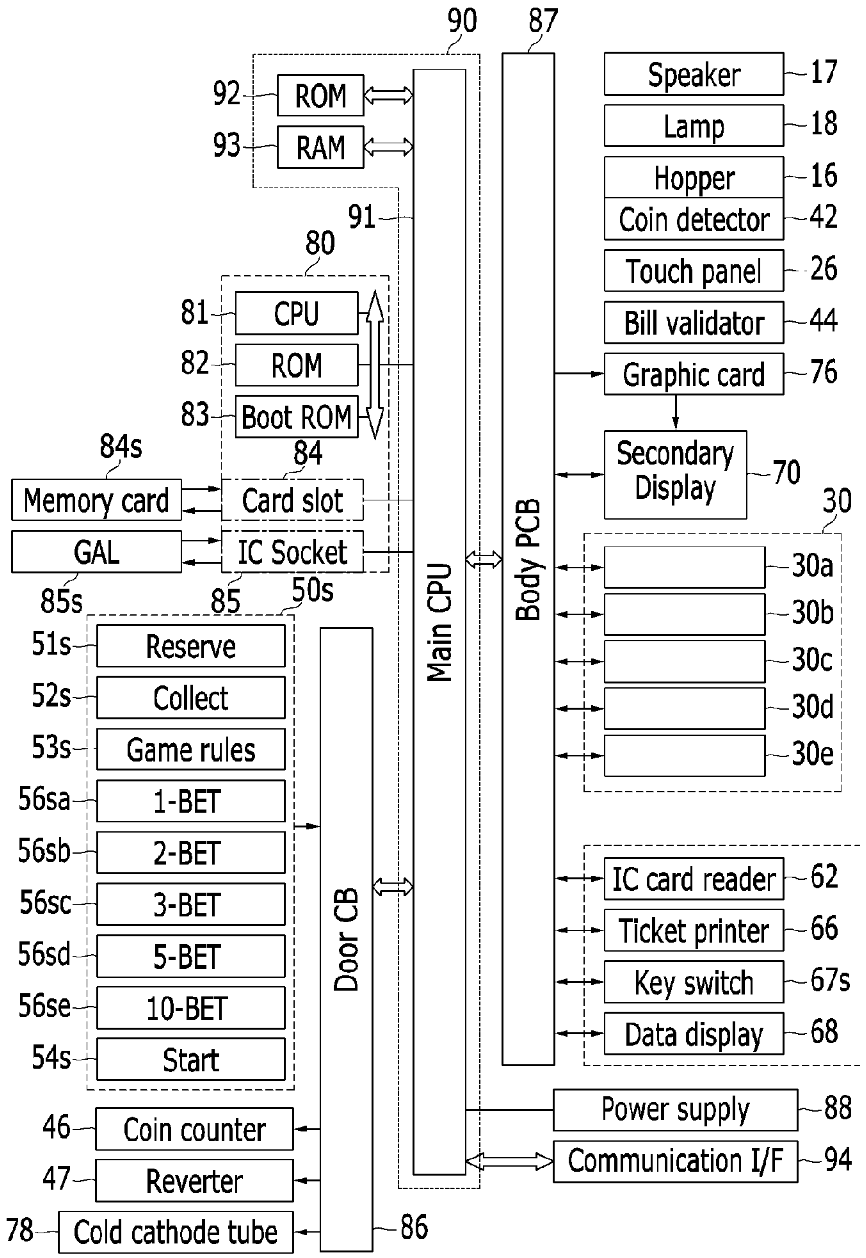
FIG. 56 is an electrical block diagram of the slot machine shown in FIG. 49 according to an embodiment of the present invention.
Figure 57:
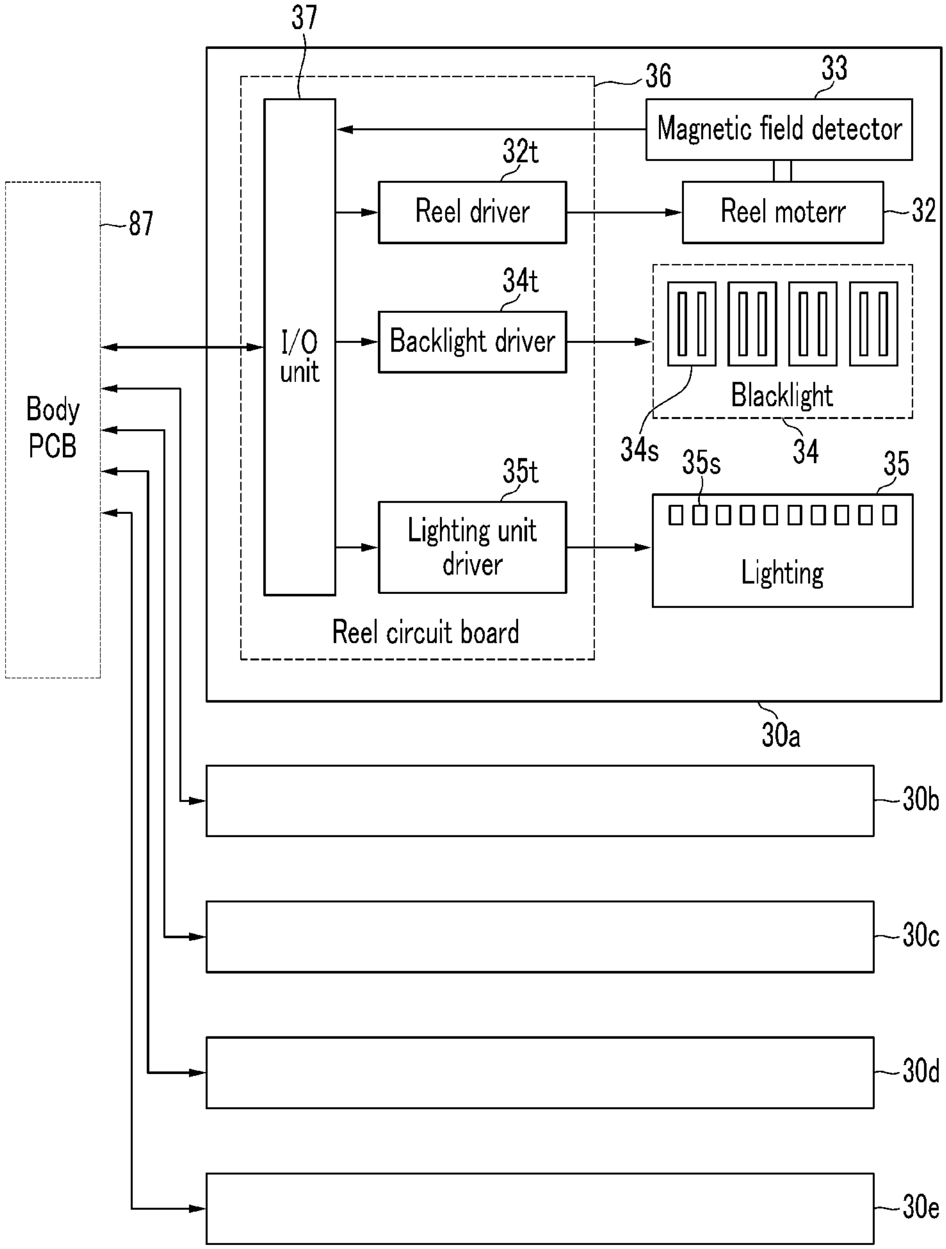
FIG. 57 is a block diagram of an electrical circuit of the reel assembly according to an embodiment of the present invention.
Figure 58:
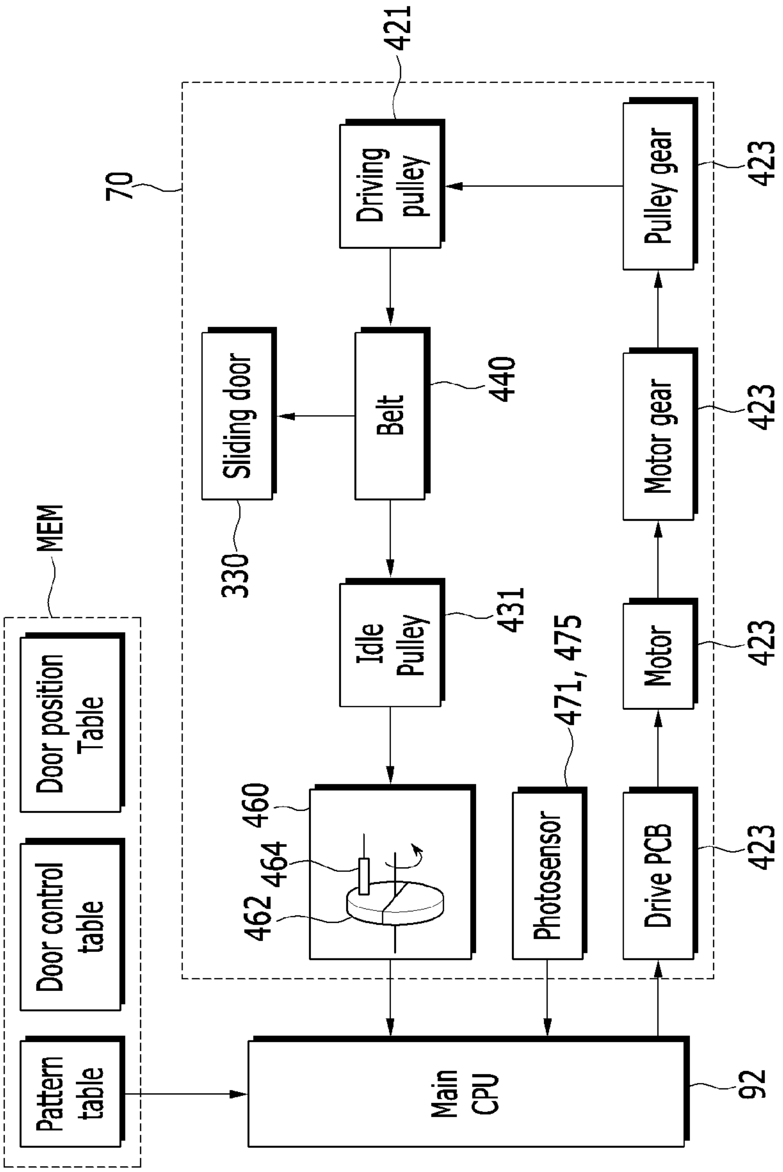
FIG. 58 is a block diagram of the second display according to an embodiment of the present invention.
Figure 59:
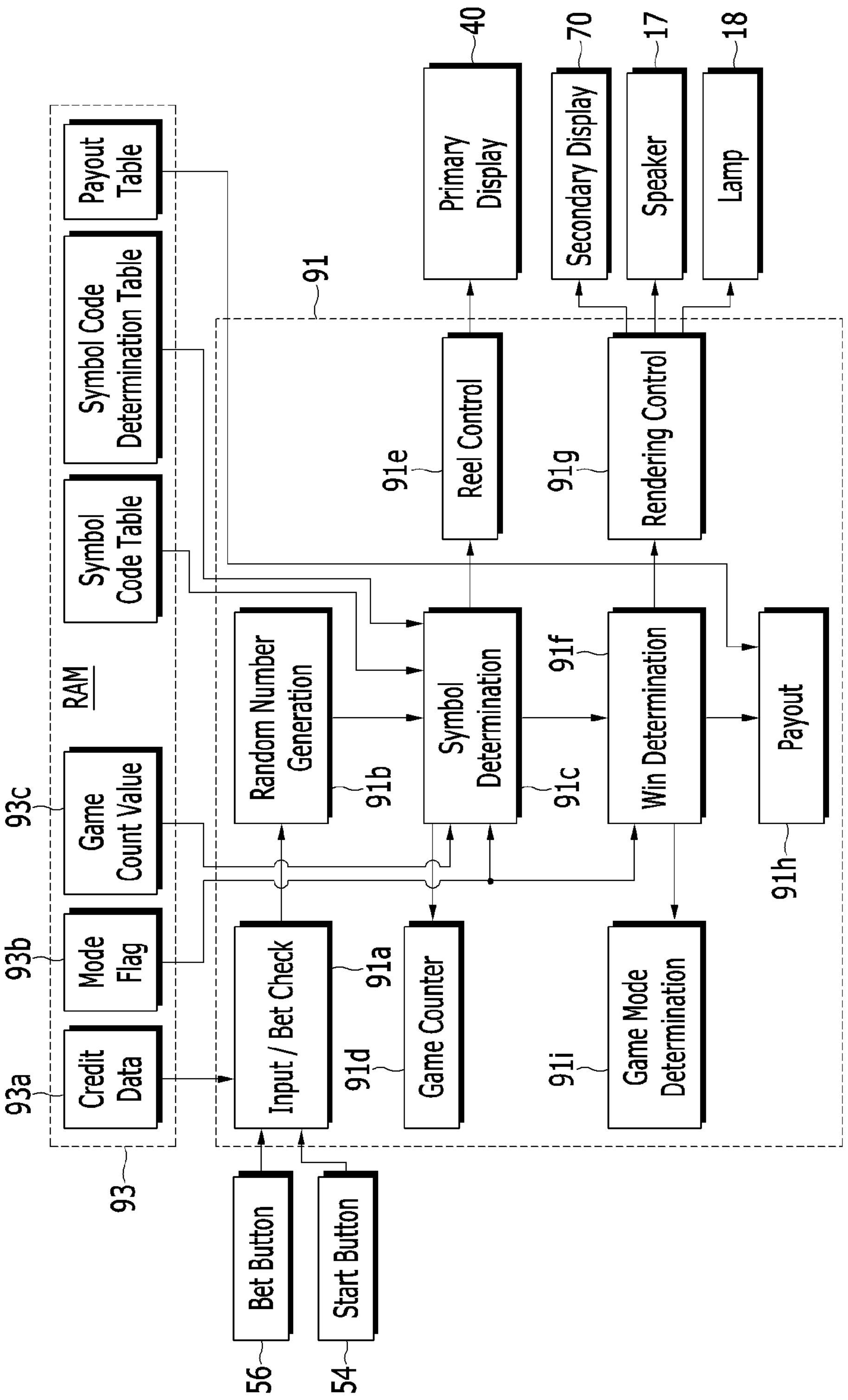
FIG. 59 is a functional block diagram of the game program executed by a main CPU of a motherboard in the slot machine shown in FIG. 49 according to an embodiment of the present invention.

FIG. 56 is an electrical block diagram of the slot machine shown in FIG. 49 according to an embodiment of the present invention, FIG. 57 is a block diagram of an electrical circuit of the reel assembly according to an embodiment of the present invention, FIG. 58 is a block diagram of the second display according to an embodiment of the present invention, and FIG. 59 is a functional block diagram of the game program executed by a main CPU of a motherboard in the slot machine shown in FIG. 49 according to an embodiment of the present invention.

Referring to FIG. 56, the slot machine 1 includes a gaming board 80, a motherboard 90, and a door PCB 86, and a body PCB 87.

A gaming board 80 includes a CPU 81, a ROM 82 accessible by the CPU 81 through an internal bus, and a boot ROM 83 accessible by the CPU 81 by an internal bus. The gaming board 80 additionally includes a card slot 84 which can receive and communicate with a memory card 84*s*, and an IC socket 85 provided correspondingly to a Generic Array Logic (GAL) 85*s*.

The memory card 84*s* includes a non-volatile memory and stores a game program and a game system program.

The card slot 84 is configured to receive and eject the memory card 84*s*, and is connected to a motherboard 90 by an IDE bus. The details of the game performed in the slot machine 1 can be changed by replacing the memory card 84*s* with another one, or by withdrawing the memory card 84*s* from card slot 84, writing another program into the memory card 84*s*, and then inserting the memory card 84*s* into the card slot 84 again.

The GAL 85*s*, which is a type of a Programmable Logic Device (PLD) having a fixed OR array structure, has a plurality of input ports and output ports. When the GAL 85*s* receives certain data through the input ports, it outputs data corresponding to the input data through the output ports.

The IC socket 85 is configured in such a manner that the GAL 85*s* can be inserted into the IC socket 85 or detached from the IC socket 85, and connected to a motherboard 90 by a PCI bus.

The CPU 81, the ROM 82, and the boot ROM 83 interconnected by the internal bus are connected to the motherboard 90 by the PCI bus. The PCI bus enables signal transmission between the motherboard 90 and the gaming board 80, and supply of power from the motherboard 90 to the gaming board 80.

The ROM 82 stores an authentication program. The boot ROM 83 stores a preliminary authentication program, a boot code to be used by the CPU 81 for activating the preliminary authentication program, and the like. The authentication program is a tamper check program for authenticating the originality of the game program and the game system program. The preliminary authentication program is a program for authenticating the originality of the authentication program. The authentication program and the preliminary authentication program are written in a sequence of proving that the subject program has not been tampered.

The motherboard 90, which may be implemented using a commonly available general main board, executes the game program and the game system program. The motherboard 90 includes a main CPU 91, a ROM 92, a RAM 93, and a communication interface 94.

The ROM 92, which may be a flash memory, may be configured to store a program to be executed by the main CPU 91 such as BIOS, along with another data to be maintained permanently. When being executed by the main CPU 91, the BIOS performs initialization of peripheral devices. Also, the BIOS starts to load the game program and the game system program stored in the memory card 54 through the gaming board 80. The ROM 92 may be rewritable. However, write-protected one might be used as the ROM 92 as well.

The RAM 93 stores data and programs which are used during the operation of the main CPU 91. For example, when the game program, the game system program, or the authentication program is to be loaded, the RAM 93 can store such programs. Also, the RAM 93 is provided with working space for the execution of the programs. Examples of the space include a space for storing the number of bets, the payout amount, the credit amount, and the like can be maintained during the execution of the game. Also, plurality of tables defining symbols, symbol codes, winning combinations, and their probabilities are maintained during the execution of the game. Further, the RAM 93 stores symbol code determination tables which stores mapping information between symbol codes and random number which can used for determining symbols based on random numbers. In particular, the RAM 93 maintains a mode flag indicating the gaming mode, along with a game and a game counter of which count value indicates the number of executed chance mode games or the number of possibly remaining chance mode games.

Also, the RAM 93 stores count values of a plurality of counters, which include a bet counter, a payout amount counter, a credit amount counter, and a chance mode game counter which counts the number of chance mode games. Alternatively, however, some of the count values can be maintained in an internal register of the main CPU 91.

The communication interface 94 facilitates data communication of the main CPU 91 with an external controller of, for example, a server through a communication channel.

Besides, the motherboard 90 is connected to the door PCB 86 and the body PCB 87 by USB communications. The motherboard 90 is also connected to a power supply 88. The main CPU 91 of the motherboard 90 boots up and operates using the power supplied from the power supply 88, and passes over some of the power to the gaming board 80 through the PCI bus so as to boot up the CPU 81. The door PCB 86 and the body PCB 87 are connected to input devices such as a switch and a sensor, and peripheral devices of which operation are controlled by the main CPU 91. Also, the door PCB 86 is connected with a control panel 40, a coin counter 46, a reverter 47, and a cold cathode tube 78.

The control panel 40 has a reserve switch 51*s*, a collect switch 52*s*, a game rule switch 53*s*, a start switch 54*s*, a 1-BET switch 56 as, a 2-BET switch 56*bs*, a 3-BET switch 56*cs*, a 5-BET switch 56*ds*, and a 10-BET switch 56*es*, each of which is provided correspondingly to respective buttons 51 to 54 and 56*a* to 56*e*. The switches 51*s* to 54*s* and 56 as to 56*es* detects pressing of the respective buttons 51 to 54 and 56*a* to 56*e* to output signals to the main CPU 91.

The coin counter 46 and the reverter 47 are disposed in the coin entry 41. The coin counter 46 validates legitimacy of coins inserted into the coin entry 41 in terms of material, shape, or the like. The coin counter 46 outputs a signal to the main CPU 91 when detecting a legitimate coin. Meanwhile, illegitimate coins are discharged to the coin tray 15. The reverter 47, which operates based upon a control signal from the main CPU 91, distributes the legitimate coins validated by the coin counter 46 into either a hopper 16 or a cash box (not shown in the drawing). The coins are guided into the hopper 16 when the hopper 16 is not filled with coins. Contrarily, however, the coins are guided into the cash box when the hopper 16 is filled with coins.

The cold cathode tube 78, which is disposed on the rear face of the secondary display 70, functions as a backlight and illuminates based on a control signal from the main CPU 91.

The body PCB 87 is connected with the speaker 17, the lamp 18, the hopper 16, a coin detector 42, the touch panel 26, a bill validator 44, the reel assembly 30, the IC card reader 62, a graphic card 76, the ticket printer 66, a key switch 67*s*, and the data display 68.

The lamp 18 flashes based upon a control signal from the main CPU 91. The speaker 17 outputs a sound such as BGM based upon the control signal from the main CPU 91.

The hopper 16, which operates based upon a control signal from the main CPU 91, pays out coins of the designated payout amount to the coin tray 15 through a coin payout exit formed between the belly glass 14 and the coin tray 15. The coin detector 42 detects coins paid out from the hopper 16 to output a detection signal to the main CPU 91.

The touch panel 26 detects a position touched by the player to provide the main CPU 91 with a position sense signal corresponding to the detected position. The bill validator 44 in the bill entry 43 provides, upon detection of a legitimate bill, the main CPU 91 with a bill detection signal corresponding to the bill amount.

The graphic card 76 controls video display of the secondary display 70 and the display panel 24 of the primary display 20 in response to a control signal from the main CPU 91. The graphic card 76 includes a Video Display Processor (VDP) generating video data, and a video RAM temporarily storing the video data. The video data may be originated from the game program stored in the RAM 93.

The IC card reader 62 reads out data stored in the IC card inserted into the card slot 176 to provide the read-out data to the main CPU 91. Also, the IC card reader 62 writes data received the main CPU 91 into the ID card.

The ticket printer 66 prints on a ticket the barcode containing information of the credit amount stored in the RAM 93, date and time, the identification number of the slot machine 1, and the like, in response to the control signal from the main CPU 91 to output the barcode imprinted ticket.

The key switch 67*s*, which is disposed behind the keypad 67, outputs a key detection signal to the main CPU 91 when the keypad 67 is pressed by the player.

The data display 68 displays information related the input through the keypad 67 in response to a control signal from the main CPU 91.

The body PCB 87 is also electrically connected to the reel assembly 30, which includes first thorough fifth reel units 30*a* to 30*e*, each of the reel unit 30*a* to 30*e* including the reels 31*a* to 31*e*, respectively.

Referring to FIG. 57, each of the reel units 30*a* to 30*e* includes a reel circuit board 36. The reel circuit board 36 includes an input/output (I/O) unit 37 capable of communicating with the body PCB 87, a reel driver 32*t* connected to the I/O unit 37, a backlight driver 34*t*, and a lighting unit driver 35*t*.

To the I/O unit 37 is connected a magnetic field detector 33, which includes a magnetic sensor for sensing magnetic field intensity to output a magnetic detection signal proportional to the magnetic field intensity, and sensor fixation means for fixing the magnetic sensor to a predetermined position. The magnetic sensor detects the intensity of the magnetic field generated by a magnet which is connected to a rotating axis of a reel motor 32 to rotate with the reel 31*a*.

The reel driver 32*t* supplies electric power to the reel motor 32. The backlight driver 34*t* supplies electric power individually to each light source 34*s* in a backlight unit 34. The lighting unit driver 35*t* supplies electric power individually to each light source 35*t* of a lighting unit 35.

Since a second thorough a fifth reel units 30*b* to 30*e* have the same configuration as a first reel unit 30*a*, detailed description thereof will be omitted.

The body PCB 87, which is connected to the main CPU 92, may be also electrically connected to the secondary display 70. Therefore, referring to FIG. 58, the main CPU 92 may be also connected to the secondary display 70, particularly to the magnetic sensor 460 and the photosensors 471 and 475 of the driving unit 400 shown in FIG. 38B. As described above, the magnetic sensor 460 detects the rotation of the idle pulley 431 coupled to the belt 440 and generates a magnetic sensor signal corresponding thereto.

The magnetic sensor 460 may include a discotic magnet 462 configured to rotate along with the idle pulley 431 and a magnetic field detection member 464 configured to detect magnetic field and to generate the magnetic sensor signal. The magnetic field detection member 464 may be disposed near a circumference of the magnet 462, and thus the magnetic field at the position of the magnetic field detection member 464 may be different for different rotational angles of the magnet 462 and the idle pulley 431. Therefore, different values of the magnetic sensor signal generated by the magnetic field detection member 464 may indicate different positions of the sliding door 330.

According to another embodiment of the present invention, a single value of the magnetic sensor signal may indicate a few different positions of the sliding door 330 when the moving distance of the sliding door 330 is greater than the circumference of the idle pulley 431. In this case, a counter (not shown) may be added to count the rotation number of the magnet 462 such that a combination of the rotational angle and the rotation number of the magnet 462 may have one-to-one correspondence with the position of the sliding door.

The information about the relation between the magnitude of the magnetic sensor signal and the position of the sliding door 330 or between a combination of the magnitude of the magnetic sensor signal and the count number and the position of the sliding door 330 may be stored as a door position table in a memory MEM.

The body PCB 87 and thus the main CPU may be also electrically connected to the drive printed circuit board 490 of the driving unit 400 shown in FIG. 38B. The main CPU 91 determines the position of the sliding door 330 based on the signal from the magnetic sensor 460, and controls the motor 411 to move the sliding door 330 to a target position and to stop at the target position for a target duration via the motor gear 416, the pulley gear 423, the driving pulley 421, and the belt 440.

The shutter system of the secondary display 70 may be used in conducting a rendering effect of a game or indicating a sign for a game. For example, the second display 70 may be configured to inform that a result of a game triggers a bonus game by a predetermined expectation degree before the result of the game is displayed.

A plurality of patterns of moving pictures and corresponding movements of the sliding door 330 may be used in rendering effect. The information about the patterns of the moving pictures may be stored as a pattern table in the memory MEM, and the information about the movements of the sliding door 330, for example, the positions of the sliding door 330 and resting durations of the sliding door 330 may be stored as a door control table in the memory MEM. The main CPU 92 may select one of the pattern data stored in the pattern table and one of the door control data stored in the door control table based on the result of the game. The main CPU 92 may control the display panel 210 to display images based on the selected pattern data, and may control the movement of the first sliding door based on the selected door control data.

The magnetic sensor 460 and the photosensors 471 and 475 may be used in checking the driving unit 400.

There are a plurality of types of errors of the driving unit 400, which may be detectable by using the magnetic sensor 460 and the photosensors 451 and 457. Hereinafter, the photosensor 471 near the driving pulley 421 is referred to as "an origin sensor," and the photosensor 475 near the idle pulley 431 is referred to as "an limit sensor." For example, when the motor 411 does not operate, the sliding door 430 does not move, or the belt 440 is loosened to be taken away, it may be detected by the magnetic sensor 460 and/or the limit sensor 475. In addition, the magnetic sensor 460 and/or the limit sensor 475 also may detect whether the sliding door 431 does not reach its target position, and whether the sliding door 430 is separated from the belt 440.

When initializing the driving unit 400, first, the sliding door 430 is fully closed. If the origin sensor 471 turns off, it is determined that it is in a normal state. However, if the origin sensor 471 turns on, it is determined that there is a defect in the origin sensor 471. On the other hand, it is determined that the limit sensor 475 is in a normal state if it turns on, but it is determined that the limit sensor 475 is in an abnormal state if it turns off. The magnetic sensor 460 may be determined to be normal if the value of the magnetic sensor signal varies. When the value of the magnetic sensor signal does not vary, the magnetic sensor 460 is normal if the limit sensor 475 turns on at the beginning, while the magnetic sensor 460 is abnormal otherwise. If it is determined that there are errors in both the limit sensor 475 and the magnetic sensor 460, there may be an error in the moor 411.

Next, the sliding door 430 is fully opened, and then the error detection condition may be opposite to the previous case. That is, the origin sensor 471 is determined to be normal when it turns on, but abnormal if the origin sensor 471 turns off. On the other hand, the limit sensor 475 is determined to be normal if it turns off, but abnormal if it turns on. The magnetic sensor 460 may be determined to be normal if the detected position of the sliding door 330 is not far from the motor 411. When the value of the magnetic sensor signal does not vary, the magnetic sensor 460 is normal if the limit sensor 475 turns on at the beginning, while the magnetic sensor 460 is abnormal otherwise. If it is determined that there are errors in both the origin sensor 471 and the magnetic sensor 460, there may be an error in the moor 411.

During a normal operation of the driving unit 400, the sliding door 430 is fully closed. If the origin sensor 471 turns off, it is determined that it is in a normal state. However, if the origin sensor 471 turns on, it is determined that there is a defect in the origin sensor 471. On the other hand, it is determined that the limit sensor 475 is in a normal state if it turns on, but it is determined that the limit sensor 475 is in an abnormal state if it turns off. When the sliding door 430 is fully opened, the origin sensor 471 is determined to be normal when it turns on, but abnormal if the origin sensor 471 turns off, and the limit sensor 475 is determined to be normal if it turns off, but abnormal if it turns on. At this time, the magnetic sensor 460 may be determined to be abnormal if the detected position of the sliding door 330 is far from the motor 411.

When the power is supplied to the slot machine 1, the main CPU 91 reads the authenticated game program and game system program from the memory card 84*s* through the gaming board 80 and writes the programs into the RAM 93. The game program is executed in a state being loaded into the RAM 93 in such a manner.

According to an embodiment, the game program includes a input/bet check 91*a*, a random number generation 91*b*, a symbol determination 91*c*, a game counter 91*d*, a reel control 91*e*, a win determination 91*f*, a rendering control 91*g*, a payout 91*h*, and a game mode determination 91*i* to execute respective processing.

The bet/input check 91*a*, in an idle state where the reels 31*a* to 31*e* stop, continuously checks whether any of the BET buttons 56*a* to 56*e* or the START button 79 is pressed. After the BET buttons 56*a* to 56*e* or the START button 79 is pressed, the bet/input check 91*a* checks whether there remains any credit for the player on the basis of credit data 93*a* stored in the RAM 93. If the player has at least one remaining credit, the bet/input check 91*a* call the random number generation 91*b*.

Subsequently, the random number generation 91*b* generates random numbers to be used for the symbol determination 91*c*. In the present embodiment, the random number generation 91*b* generates five random numbers, each of which is directed to respective one of the first though the fifth reel units 30*a* to 30*e*.

After five random numbers are completely extracted, the symbol determination 91*c* determines a to-be-stopped symbol for each of the reel units 30*a* to 30*e* with reference to the symbol code determination table stored in the RAM 93. The symbol determination 91*c* uses the five random numbers to determine five to-be-stopped symbols for the reel units 30*a* to 30*e* to be shown in the display window 22 of the primary display 20 for each of the reels 31*a* to 31*e*.

In particular, the symbol determination 91*c* checks the current gaming mode with reference to mode flag 93*b* stored in the RAM 93, and differentiates the symbol determination process between the normal mode and the chance mode. In the normal mode, the symbol determination 91*c* applies a fixed symbol code determination table to determine the symbol using the random number according to a fixed scheme. Contrarily, however, the symbol determination 91*c* consecutively changes the symbol code determination table for each unit game to vary the symbol determination process. The consequence of varying the symbol code determination table is that winning combinations including at least one specific symbol increases as the chance mode games continue. Possible number of chance mode games available in a single session is limited to a certain limit, e.g., eight. In order to limit the number of chance mode games, a game counter 91*d* counts the number of chance mode games already performed or possibly remaining in the session, and a game count value 93*c* is stored in the RAM 93. The game counter 91*d* may reside in the symbol determination 91*c*, alternatively.

The reel control 91*e* provides controls the reel assembly 30 by providing stop position information corresponding to the determined symbols, so that the reels 31*a* to 31*e* spins and stops at position designated by the stop position information. Thus, the symbols scrolls along with the spinning of the reels 31*a* to 31*e* and then stops in such a manner that the determined symbols are arranged in central position vertically in the display window 22 of the primary display 20.

Meanwhile, the win determination 91*f* determines whether any winning combination is established in the rearranged symbols. In case that a winning combination is established in the rearranged symbols, the rendering control 91*g* controls the primary display 20 and the other devices such as the speaker 17, the lamp 18, the secondary display 70 to output production effect. The production effect includes video and audio effect, backlight change, and lighting effect. Also, the payout 91*h* determines payout amount depending on the established winning combination to payout the amount the player obtained.

Meanwhile, whenever the unit game is completed, the game mode determination 91*i* determines the gaming mode of the next unit game. The game mode determination 91*i* changes the normal mode into the chance mode when a trigger event occurs in the rearranged symbols. On the other hands, the game mode determination 91*i* changes the chance mode into the normal mode when an exit condition is satisfied. In the other cases, the game mode determination 91*i* maintains the previous gaming mode. Meanwhile, the game mode determination 91*i* can be implemented inside win determination 91*f*.

Next, a game mode according to an embodiment of the present invention is described in detail with reference to FIG. 60.

Figure 60:
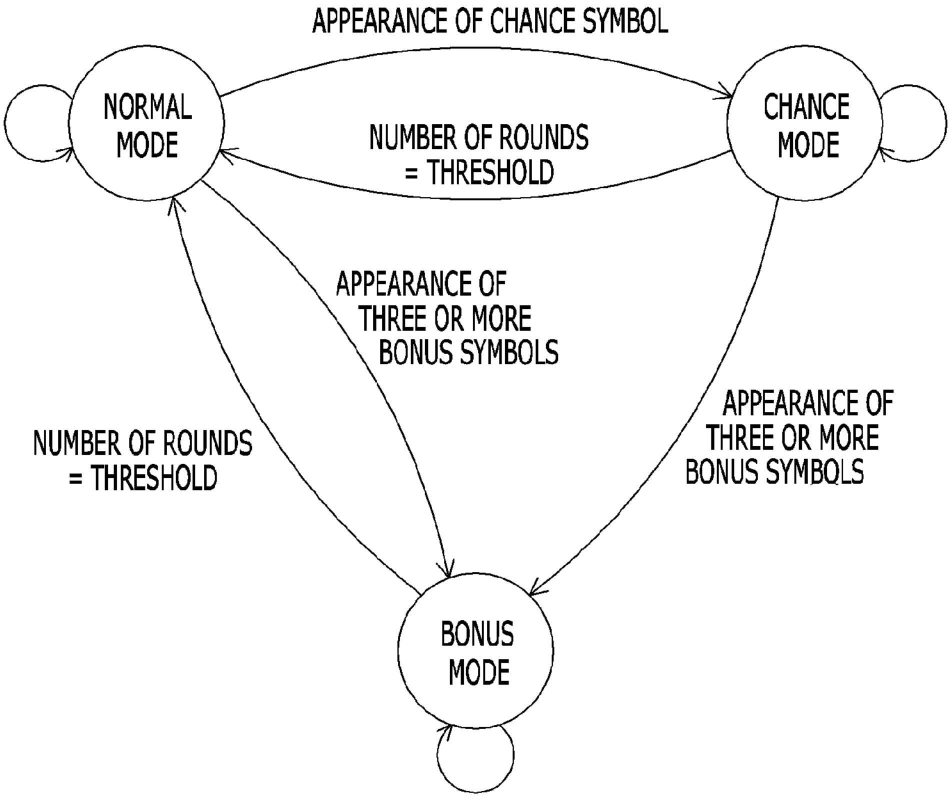
FIG. 60 shows a state machine of a gaming mode in a gaming machine according to an embodiment of the present invention.

FIG. 60 shows a state machine of a gaming mode in a gaming machine according to an embodiment of the present invention.

According to an embodiment of the present invention, a gaming machine executes a game in any one mode of a normal mode, a chance mode and a bonus mode, and switches one mode to another mode. Generally, the gaming machine starts a game (i.e., a normal mode game) in the normal mode as a base game, and maintains the normal mode unless a trigger event occurs. When a game result of the normal mode game satisfies the trigger event for the chance mode, the gaming machine switches the normal mode to the chance mode and starts a game (i.e., a chance mode game) in the chance mode. Further, when a game result of the normal mode game or the chance mode game satisfies the trigger event for the bonus mode, the gaming machine switches the normal mode or chance mode to the bonus mode and starts a game (i.e., a bonus mode game) in the bonus mode. The trigger event for the chance mode may be appearance of a specific symbol ("CHANCE"), and the trigger event for the bonus mode may be appearance of three or more scatter symbols ("BONUS"). The chance mode game or the bonus mode game is an additional game that is advanced from the normal mode game according to the game result of the normal mode game.

The gaming machine switches the chance mode to the normal mode when an ending condition of the chance mode is satisfied in the chance mode. The chance mode may be switched to the normal mode when the number of rounds executed in the chance mode is equal to a threshold. Further, the gaming machine switches the bonus mode to the normal mode when an ending condition of the bonus mode is satisfied in the bonus mode. The bonus mode may be switched to the normal mode when the number of rounds executed in the bonus mode is equal to a threshold.

Gaming Operations

Hereinafter, gaming operations in game modes according to embodiments of the present invention are described in detail with reference to FIG. 61 to FIG. 105. For easy description, a left pair of sliding doors (360 and 370 of FIG. 26) are shown and described as one left sliding door 71, and a right pair of sliding doors (330 and 350 of FIG. 26) are shown and described as one right sliding door 72.

Normal Mode Game

Figure 61:
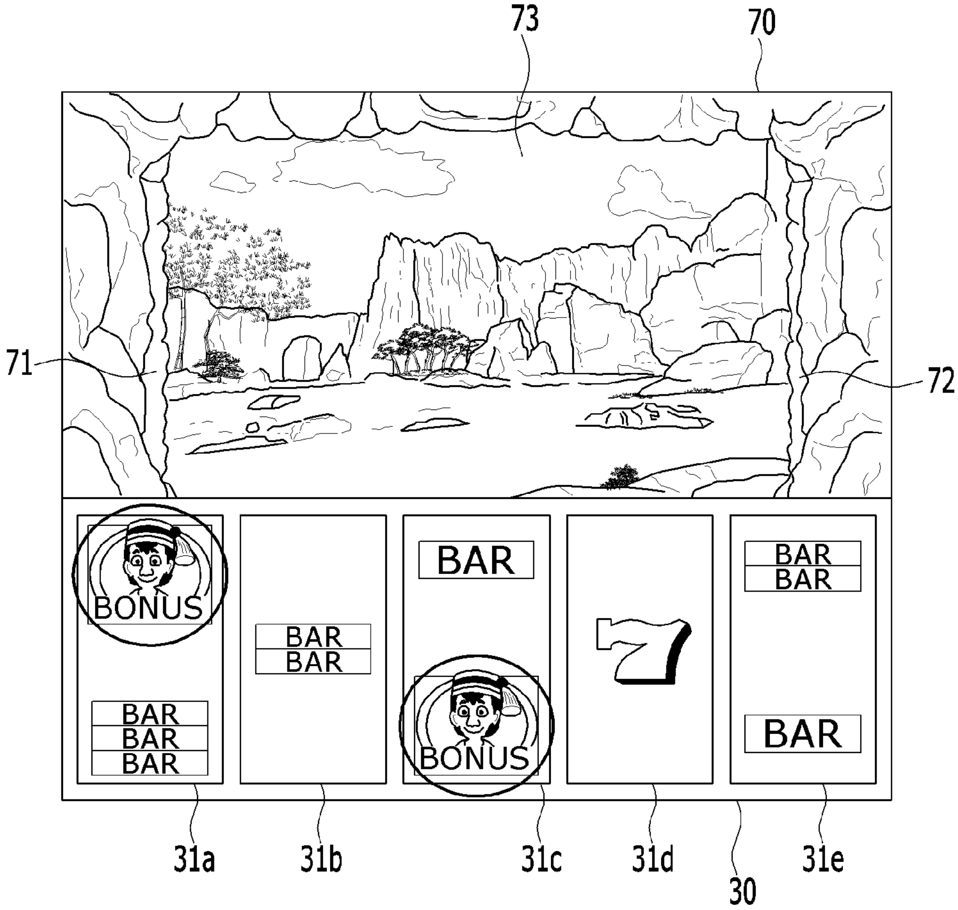
FIG. 61 and FIG. 62 show an example of a normal mode game according to an embodiment of the present invention.
Figure 62:
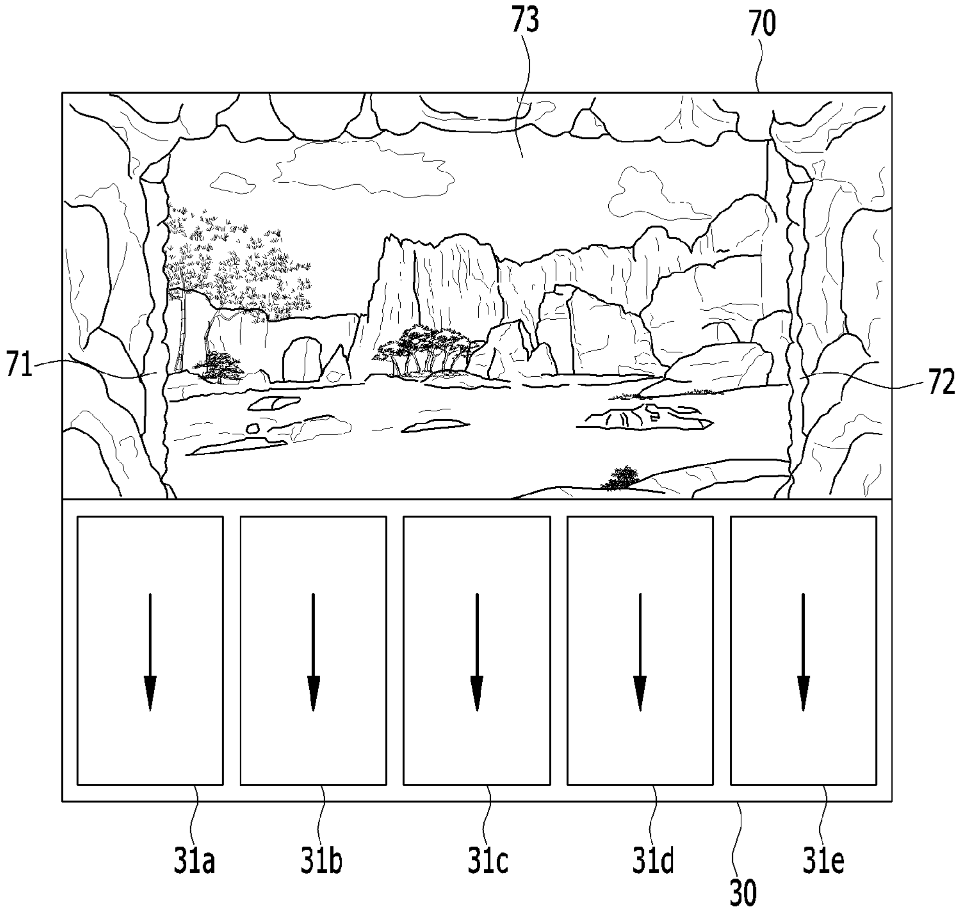
Figure 67:
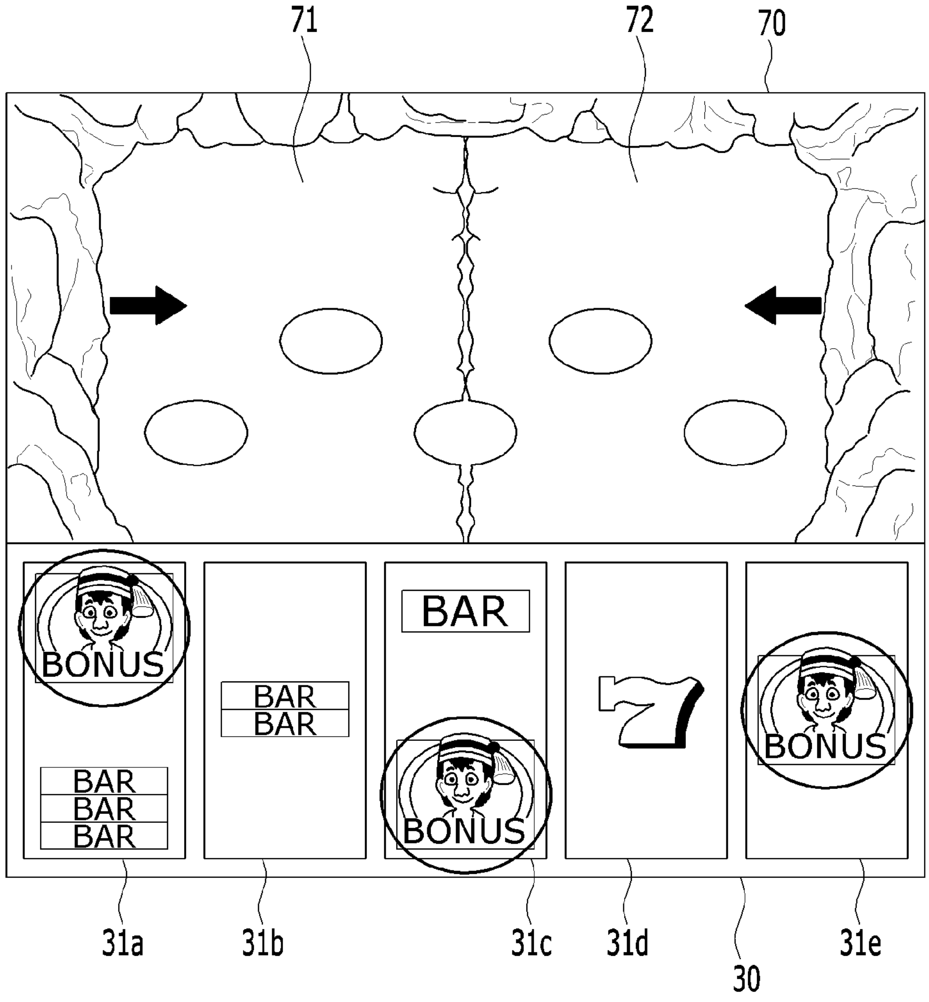
FIG. 67 shows a trigger of a bonus mode game according to an embodiment of the present invention.
Figure 68:
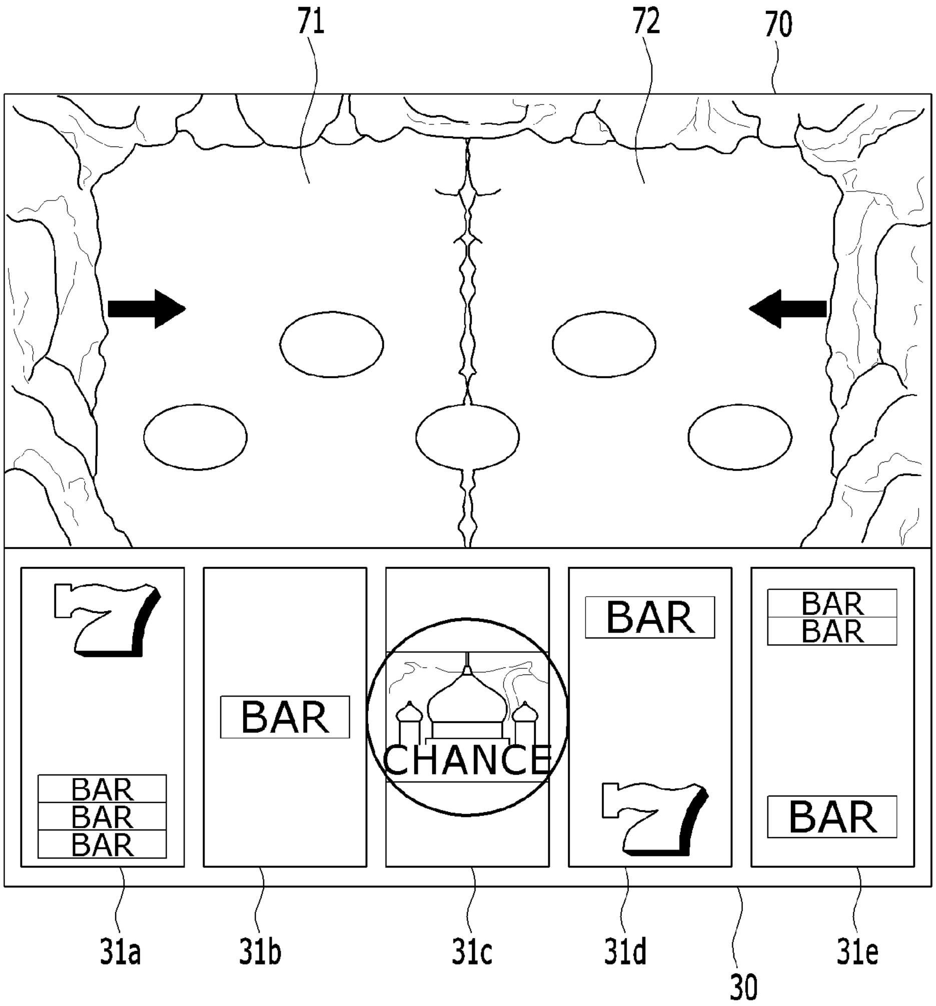
FIG. 68 shows a trigger of a chance mode game according to an embodiment of the present invention.

FIG. 61 and FIG. 62 show an example of a normal mode game according to an embodiment of the present invention, FIG. 63 shows an example of a symbol code determination table for a normal mode game according to an embodiment of the present invention, FIG. 64 to FIG. 66 show examples of control data and image data according to an embodiment of the present invention, FIG. 67 shows a trigger of a bonus mode game according to an embodiment of the present invention, and FIG. 68 shows a trigger of a chance mode game according to an embodiment of the present invention.

Referring to FIG. 61, a plurality of reels 31*a* to 31*e* stop in a primary display 100 before a normal mode game is executed. Further, sliding doors 71 and 72 are opened in a secondary display 70, and the secondary display 70 displays a background image for the normal mode game of a display panel 73. For example, the background image may include a tree image and a rocky mountain image. The player bets a desired amount of credits, and starts the normal mode game. The player may bet the credits by pressing at least one of BET buttons (56*a* to 56*e* of FIG. 8), and may start the normal mode game by pressing a START button (54 of FIG. 8). When betting the credits, the player may select at least one of a plurality of pay lines such that the pay lines can be partially activated depending on the player's select. Alternatively, all the pay lines may be effective or activated irrespectively of the player's select.

If the player starts the normal mode game, the reels 31a to 31e starts to spin as shown in FIG. 62. Thus, symbols of symbol sequences scroll along with the spinning of the reels 31a to 31e. After a certain time period elapses, the reels 31a to 31e stop spinning to rearrange the symbols on the symbol matrix. Three symbols of each symbol sequence appear on each of the reels 31a to 31e of the primary display 30 when each of the reels 31a to 31e stops. The gaming machine may randomly determine symbols to be stopped on each of the reels 31a to 31e based on the random number for each reel. In this case, the gaming machine may generate random numbers for the reels 31a to 31e, determine codes corresponding to the random numbers, and determine the symbols to be arranged in the middle row of the symbol matrix based on the determined codes.

In one embodiment, a symbol code determination table for matching a code and a random number is stored in a memory. The memory may be a RAM (93 of FIG. 9), a ROM (92 of FIG. 9), or other storage devices. In an example shown in FIG. 63, the symbol code determination table stores each code and a range of random numbers corresponding to each code in table form. Accordingly, the gaming machine may determine the code corresponding to the generated random number based on the symbol code determination table stored in the memory. The range of random numbers corresponding to each code may determined by a probability of a winning combination for each symbol being satisfied, a probability of a bonus mode game being triggered (hereinafter referred to as "a bonus probability"), and/or a probability of a chance mode game being triggered (hereinafter referred to as "a chance probability").

The gaming machine determines whether a combination of the symbols arranged on each pay line, i.e., a game result of the normal mode game satisfy a winning combination. The winning combination is a combination where the combination of symbols arranged on the pay line becomes a beneficial state for the player. The beneficial state is a state where credits corresponding to the winning combination are to be awarded the player, a state where a bonus mode game is to be triggered, or the like. Various winning combinations are predefined for all symbols. For example, when at least three identical symbols are continuously arranged from the first column on the pay line, the winning combination for the identical symbol is satisfied. The credits to be paid out may be varied according to a type of the identical symbol and/or the number of continuous identical symbols.

The gaming machine opens or closes the sliding doors 71 and 72 to expose an object image displayed on the display panel 73 of the secondary display 70. Operations of the sliding doors 71 and 72 and the object image are varied according to a game result of the normal mode game. The game result of the normal mode game is any one of various types of game results. The gaming machine stores a plurality of rendering pattern data which respectively correspond to the various types of game results in a memory. The memory may be a RAM 93, a ROM 92, or other storage devices.

Referring to FIG. 64, the plurality of rendering pattern data include a plurality of control data for controlling the sliding doors 71 and 72 and a plurality of display data which correspond to the plurality of control data respectively, and the plurality of control data correspond to the various types of game results respectively. The plurality of control data and the plurality of display data define a plurality of rendering patterns. Accordingly, the gaming machine determines the game result by the symbol code determination table, and then selects a control data and an display data (i.e., a rendering pattern data) corresponding to the determined game result among the plurality of control data and the plurality of display data stored in the memory. If at least two rendering patterns correspond to the determined game result, the gaming machine may randomly determine any one among the at least two rendering patterns. Next, the gaming machine renders the rendering pattern by opening or closing the sliding doors 71 and 72 and displaying the object image on the display panel 73 according to the selected control data and display data, before the gaming result is displayed on the reels 31a to 31e. The object image may be a character image, an article image, or a symbol image, etc.

Referring to FIG. 65, each control data may include at least one position data for determining positions of the sliding doors 71 and 72. The at least one position data may correspond to a position data for fully closing the sliding doors 71 and 72, a position data for fully opening the sliding doors 71 and 72, and/or at least one position data for partially opening the sliding doors 71 and 72. Each control data may further include at least one timing data corresponding to the at least one position data, and the timing data represents a timing when the sliding doors 71 and 72 are moved to positions indicated by the position data. Accordingly, the gaming machine can move positions of the sliding doors 71 and 72 to positions indicated by the position data at a time indicated by the timing data.

Referring to FIG. 66, each display data includes at least one object image, a display position data representing a position where the object image is displayed on the display panel 73, and a display timing representing a timing when the object image is displayed on the display panel 73. Furthermore, the position data and the timing data of the corresponding control data may be associated with the display position data and the display timing data of the corresponding display data. Accordingly, the gaming machine can display the object data on a position indicated by the display position data at a time indicated by the displaying timing data, and move the sliding doors 71 and 72 to expose at least part of the display panel 73. As a result, the gaming machine can render the rendering pattern.

In one embodiment, regardless of the pay lines, when a combination of symbols rearranged on the reels 31a to 31e, i.e., the game result satisfies a predetermined condition, a bonus mode game that is an additional game advanced from the normal mode game is triggered. In an example shown in FIG. 67, when scatter symbols ("BONUS") with a number greater than a predetermined number (for example, 3) are arranged on the reels 31a to 31e, the bonus mode game is triggered. In one embodiment, when the bonus mode game is triggered, left and right sliding doors 71 and 72 are closed in a secondary display 70. Further, the gaming machine may output a sound for notifying a trigger of the bonus mode game.

In another embodiment, when a specific symbol (i.e., "CHANCE" symbol) is arranged on a predefined position of the reels 31a to 31e, a chance mode game that is an additional game advanced from the normal mode game is triggered. In an example shown in FIG. 68, when the specific symbol ("CHANCE") stops on the middle row of the third reel 31c, the chance mode game is triggered. In one embodiment, when the chance mode game is triggered by the specific symbol ("CHANCE"), left and right sliding doors 71 and 72 are closed in a secondary display 70. Further, the gaming machine may output a sound for notifying a trigger of the chance mode game. Furthermore, the gaming machine may chance a color of the reel 31*a* to 31*e* by controlling light sources (34*s* of FIG. 10) of a backlight unit (34 of FIG. 10).

A bonus probability of the chance mode game may be higher than a probability of the bonus mode game being triggered in the normal mode game. That is, the gamine machine may increase a probability with which the scatter symbol ("BONUS") stops on each of the reels 31*a* to 31*e* in the chance mode game compared to the normal mode game. In one embodiment, the probability is randomly determined when the chance mode game is triggered.

As described above, the gaming machine according to an embodiment of the present invention can provide the chance mode game or the bonus mode game as well as a payout according to a result of the normal mode game. As a result, the player can continuously play the game to trigger the chance or bonus mode game in which the additional benefit and/or a visual rendering effect are provided. Further, since the gaming machine can provide various rendering effects according to the game result, the player can be interested in the game.

Next, a normal mode game according to various embodiments of the present invention is described in detail with reference to FIG. 69 to FIG. 81.

Figure 69:
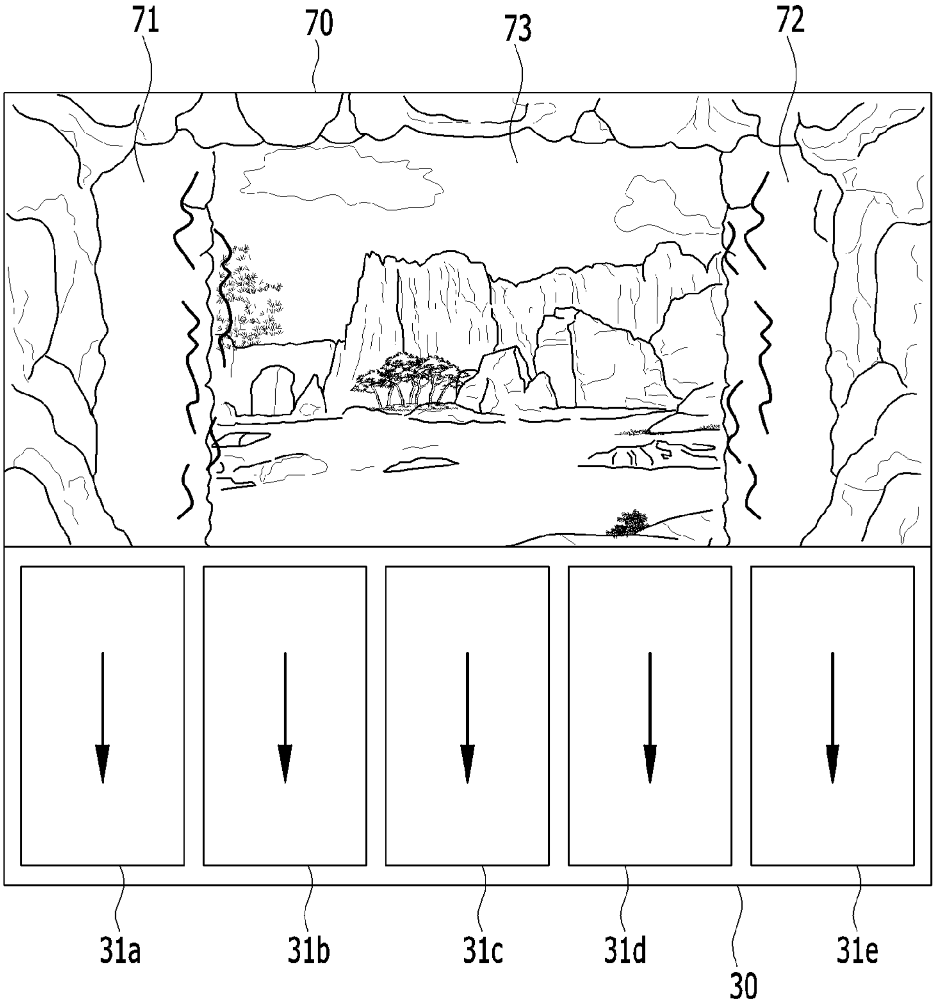
FIG. 69 shows a start of an example of a normal mode game according to an embodiment of the present invention.

FIG. 69 shows a start of an example of a normal mode game according to an embodiment of the present invention.

Referring to FIG. 61 again, sliding doors 71 and 72 of a secondary display are opened when a normal mode game is executed. When the normal mode game is executed by the player, a controller (i.e., a main CPU 91 of FIG. 9) of a gaming machine starts to spin reels 31*a* to 31*e* and raffles the sliding doors 71 and 72 of a secondary display, as shown in FIG. 69. The controller displays a background image on a display panel 73 of the secondary display 70. Further, the controller randomly determines any one rendering pattern among a plurality of rendering patterns for the normal mode game according to a game result to be displayed, and selects a rendering pattern data including a control data and an image data for the determined rendering pattern from a memory.

The rendering patterns may include, for example, rendering patterns showing a sign of a bonus mode game being triggered (hereinafter referred to as "bonus sign rendering patterns"), rendering patterns showing a sign of a chance mode game being triggered (hereinafter referred to as "chance sign rendering patterns"), or rendering patterns for determining credits to be paid out to the player (hereinafter referred to as "payout rendering patterns"), etc. The controller of the gaming machine may control the sliding doors 71 and 72 and the display panel 73, to render a rendering pattern according to the selected rendering pattern data.

As such, since the gaming machine provides the various rendering patterns and randomly selects the rendering patterns, the player can continuously play the game to experience the various rendering patterns.

First, the bonus sign rendering patterns are described with reference to FIG. 70 to FIG. 78. The bonus sign rendering patterns may include various types of bonus sign rendering patterns according to various embodiments, and each type may include a plurality of bonus sign rendering patterns having the different bonus probabilities.

FIG. 70 to FIG. 78 show examples of bonus sign rendering patterns in a normal mode game according to an embodiment of the present invention.

Type 1 of Bonus Sign Rendering Pattern

Figure 70:
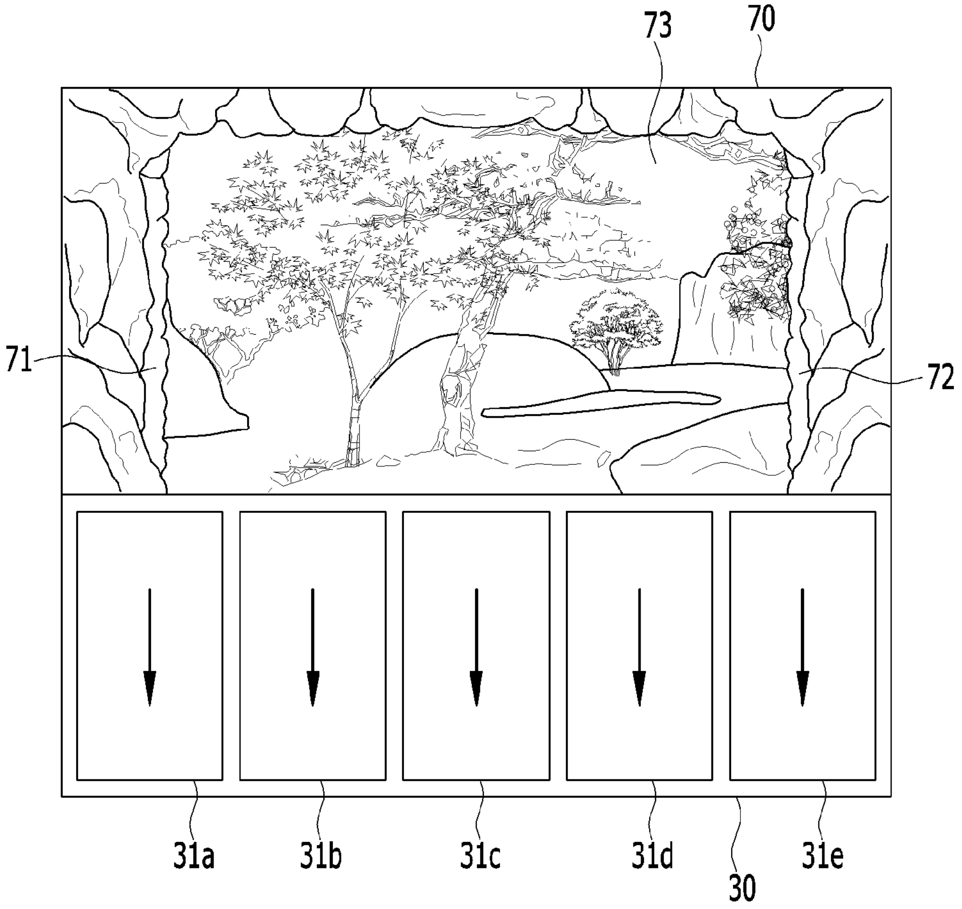
FIG. 70 to FIG. 78 show examples of bonus sign rendering patterns in a normal mode game according to an embodiment of the present invention.
Figure 71:
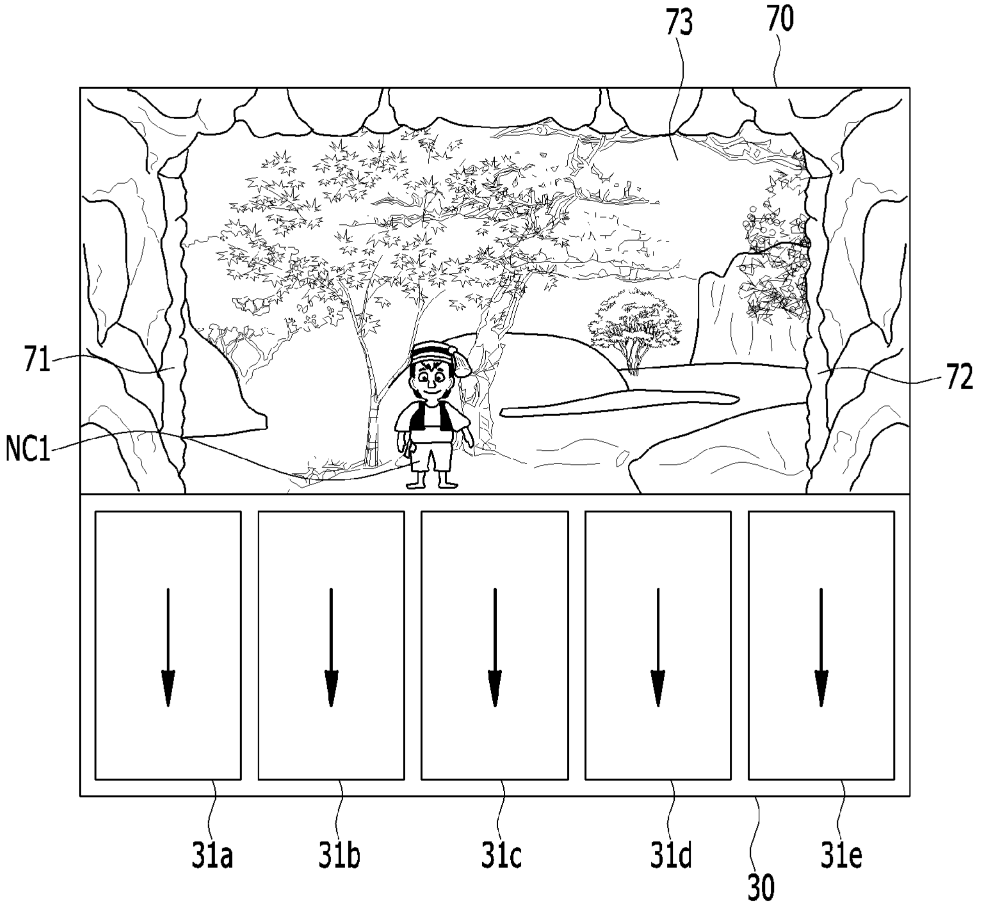

The type 1 of bonus sign rendering patterns may include a plurality of rendering patterning including a rendering pattern 1, a rendering pattern 2, and a rendering pattern 3. When the normal mode game is started, symbols to be rearranged on reels 31*a* to 31*e* (i.e., a game result) are randomly determined based on a symbol code determination table. A controller of a gaming machine selects any one of the plurality of rendering patterns. That is, the controller selects a control data and an image data among a plurality of control data and a plurality of image data for the plurality of rendering patterns. Next, a background image, which is displayed on a display panel 73 of the secondary display 70, slides to the right as shown in FIG. 70 and FIG. 71. In this case, the reels 31*a* to 31*e* are continuously spinning.

If the determined rendering pattern is the rendering pattern 1, the background image slides to the right such that an entire image of a left part of the background image appears, as shown in FIG. 70. The left part may be, for example, a tree image. When the rendering pattern 1 is rendered, the bonus probability of the normal mode game is set to a probability 1. After the rendering pattern 1 is rendered, three or more scatter symbols ("BONUS") can appear on the stopped reels 31*a* to 31*e* with the probability 1. That is, the bonus mode game can be triggered with the possibility 1 in the current normal mode game. The probability 1 may be, for example, 10%.

If the determined rendering pattern is the rendering pattern 2, the background image slides to the right such that an object image NC1 corresponding to a main character is display on the entire image of the left part, as shown in FIG. 71. For example, the main character NC1 may be Ali Baba in the story of "Ali Baba and the Forty Thieves." When the rendering pattern 2 is rendered, the bonus probability of the normal mode game is set to a probability 2 that is higher than the probability 1. After the rendering pattern 2 is rendered, the three or more scatter symbols ("BONUS") can appear on the stopped reels 31*a* to 31*e* with the probability 2. That is, the bonus mode game can be triggered with the possibility 2 in the current normal mode game. For example, the probability 2 may be 33%.

Figure 72:
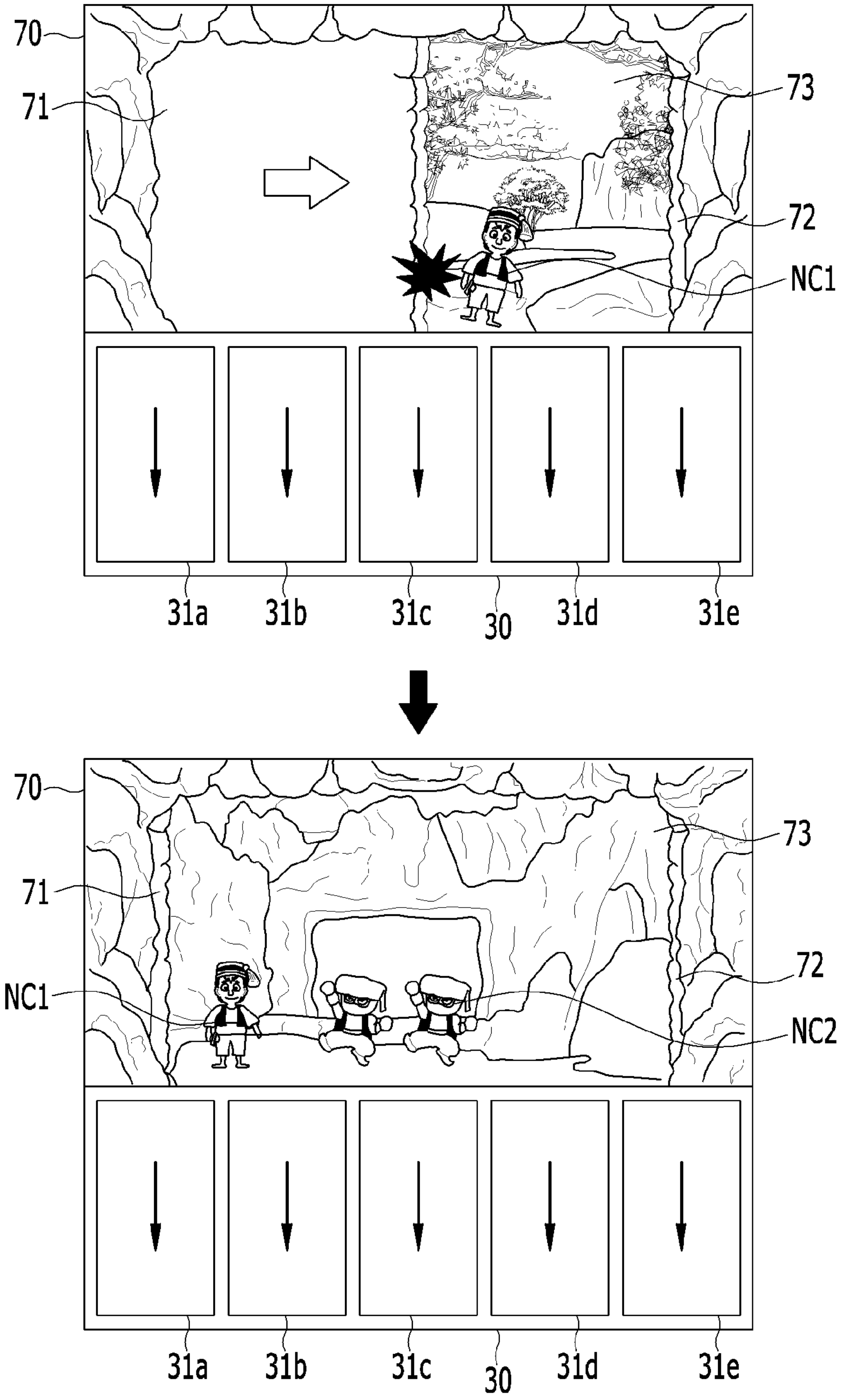

If the determined rendering pattern is the rendering pattern 3, the gaming machine renders the rendering pattern 2 and then closes the left sliding door 71 as shown in FIG. 72. As a result, the left sliding door 71 bumps into the main character NC1 and the main character NC1 moves to the right. Subsequently, the background image BG1 slides to the left such that an entire image of a right part of the background image appears, as shown in FIG. 72. The right part may be a rocky mountain image. An object image NC2 corresponding to opponent characters may be displayed on the right part. That is, the main character NC1 moved to the right meets opponent characters NC2. For example, the opponent characters NC2 may be thieves in the story of "Ali Baba and the Forty Thieves." When the rendering pattern 3 is rendered, the bonus probability of the normal mode game is set to a probability 3 that is higher than the probability 2. After the rendering pattern 3 is rendered, three or more scatter symbols ("BONUS") can stop on the reels 31*a* to 31*e* with the probability 3. For example, the probability 3 may be 100%. That is, the bonus mode game can be always triggered if the rendering pattern 3 is rendered.

For example, when the controller determines that the scatter symbol ("BONUS)" is arranged on the first reel 31*a*, the rendering mode 1 may be rendered. That is, the probability 1 may be a probability of at least two scatter symbols ("BONUS") being arranged on remaining four reels 31*b* to 31*e*. When the controller determines that the two scatter symbols ("BONUS)" are arranged on two reels among the first to third reels 31*a* to 31*c*, the rendering mode 2 may be rendered. That is, the probability 2 may be a probability of at least one symbol ("BONUS") being arranged on remaining two reels 31*d* and 31*e*. When the controller determines that the three scatter symbols ("BONUS)" are arranged on three reels among the reels 31*a* to 31*e*, the rendering mode 3 may be rendered.

Type 2 of Bonus Sign Rendering Pattern

Figure 73:
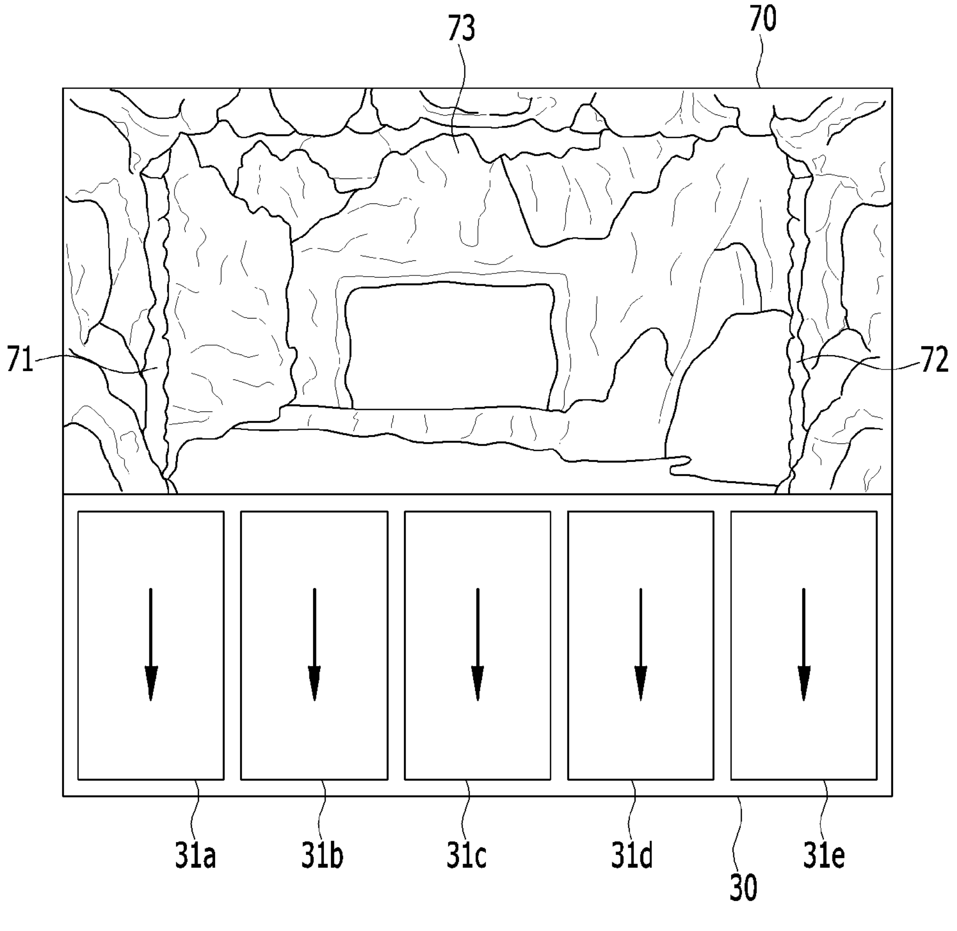
Figure 74:
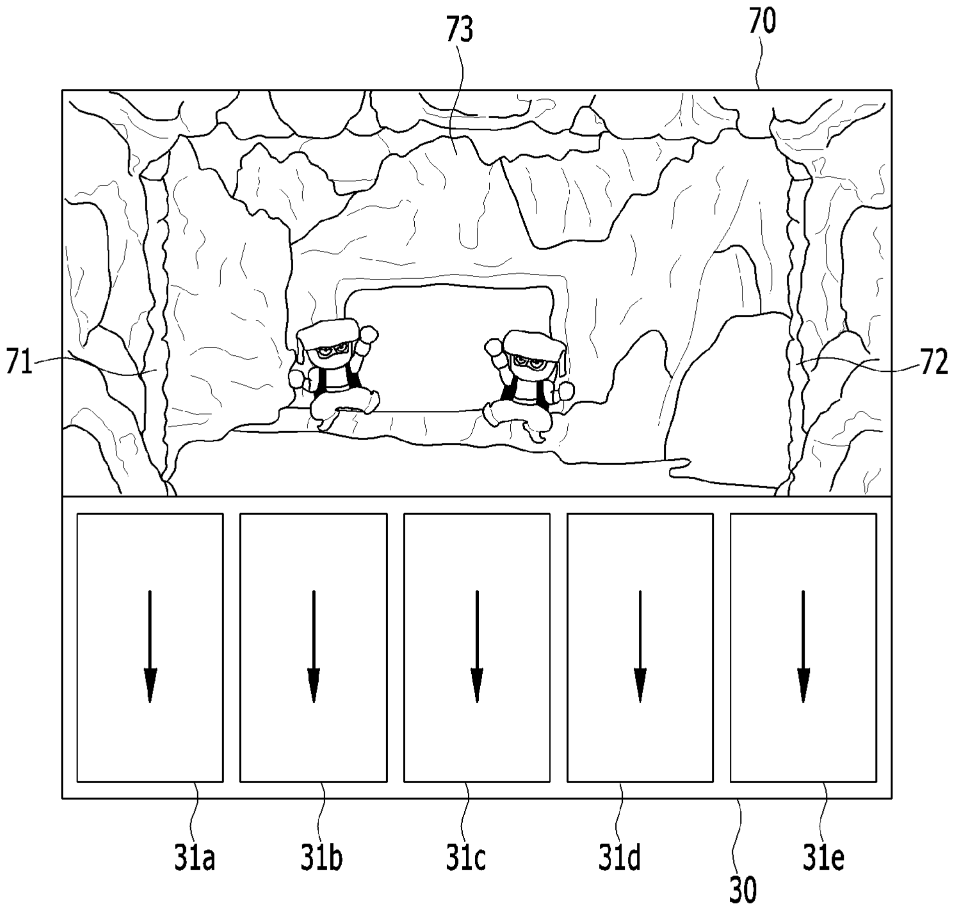

The type 2 of bonus sign rendering patterns may include a plurality of rendering patterning including a rendering pattern 4, a rendering pattern 5, and a rendering pattern 6. When the normal mode game is started, symbols to be rearranged on reels 31*a* to 31*e* (i.e., a game result) are randomly determined based on a symbol code determination table. A controller of a gaming machine selects any one of the plurality of rendering patterns. That is, the controller selects a control data and an image data among a plurality of control data and a plurality of image data for the plurality of rendering patterns. Next, a background image BG2, which is displayed on a display panel 73 of the secondary display 70, slides to the left as shown in FIG. 73 and FIG. 74. In this case, the reels 31*a* to 31*e* are continuously spinning.

If the determined rendering pattern is the rendering pattern 4, the background image BG2 slides to the left such that an entire image of a right part of the background image appears, as shown in FIG. 73. The right part may be, for example, a rocky mountain image. When the rendering pattern 4 is rendered, the bonus probability of the normal mode game is set to a probability 4. After the rendering pattern 4 is rendered, three or more scatter symbols ("BONUS") can stop on the reels 31*a* to 31*e* with the probability 4. The probability 4 may be, for example, 10%.

If the determined rendering pattern is the rendering pattern 5, the background image BG2 slides to the left such that an object image corresponding to opponent characters NC3 together with the entire image of the right part appears, as shown in FIG. 74. For example, the opponent characters NC3 may be thieves in the story of "Ali Baba and the Forty Thieves." When the rendering pattern 5 is rendered, the bonus probability of the normal mode game is set to a probability 5 that is higher than the probability 4. After the rendering pattern 5 is rendered, three or more scatter symbols ("BONUS") can stop on the reels 31*a* to 31*e* with the probability 5. For example, the probability 5 may be 33%.

Figure 75:
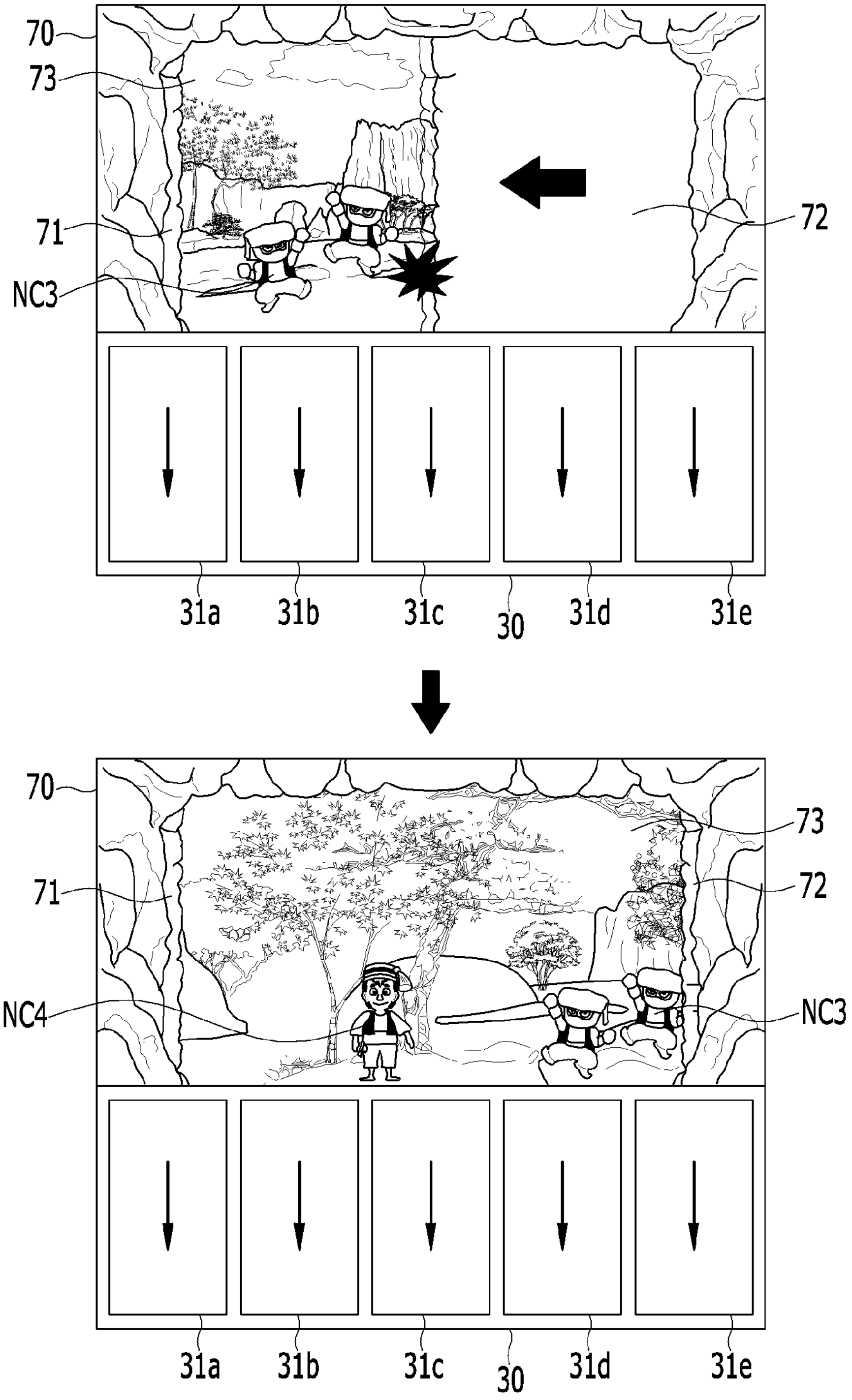

If the determined rendering pattern is the rendering pattern 6, the controller renders the rendering pattern 5 and then closes the right sliding door 72 as shown in FIG. 75. As a result, the right sliding door 72 bumps into the opponent characters NC3 and the opponent characters NC3 move to the left. Subsequently, the background image slides to the right such that an entire image of a left part of the background image appears, as shown in FIG. 75. The left part may be a tree image. An object image NC4 corresponding to a main character may be displayed on the right part. That is, the opponent characters NC3 moved to the left meet the main character NC4. The main character NC4 may be, for example, Ali Baba in the story of "Ali Baba and the Forty Thieves." When the rendering pattern 6 is rendered, the bonus probability of the normal mode game is set to a probability 6 that is higher than the probability 5 of the rendering pattern. After the rendering pattern 6 is rendered, three or more scatter symbols ("BONUS") can stop on the reels 31*a* to 31*e* with the probability 6. For example, the probability 6 may be 100%.

For example, when the controller determines that the scatter symbol ("BONUS)" is arranged on the first reel 31*a*, the rendering mode 4 may be rendered. When the controller determines that the two scatter symbols ("BONUS)" are arranged on two reels among the first to third reels 31*a* to 31*c*, the rendering mode 5 may be rendered. When the controller determines that the three scatter symbols ("BONUS)" are arranged on three reels among the reels 31*a* to 31*e*, the rendering mode 6 may be rendered.

Type 3 of Bonus Sign Rendering Pattern

Figure 76:
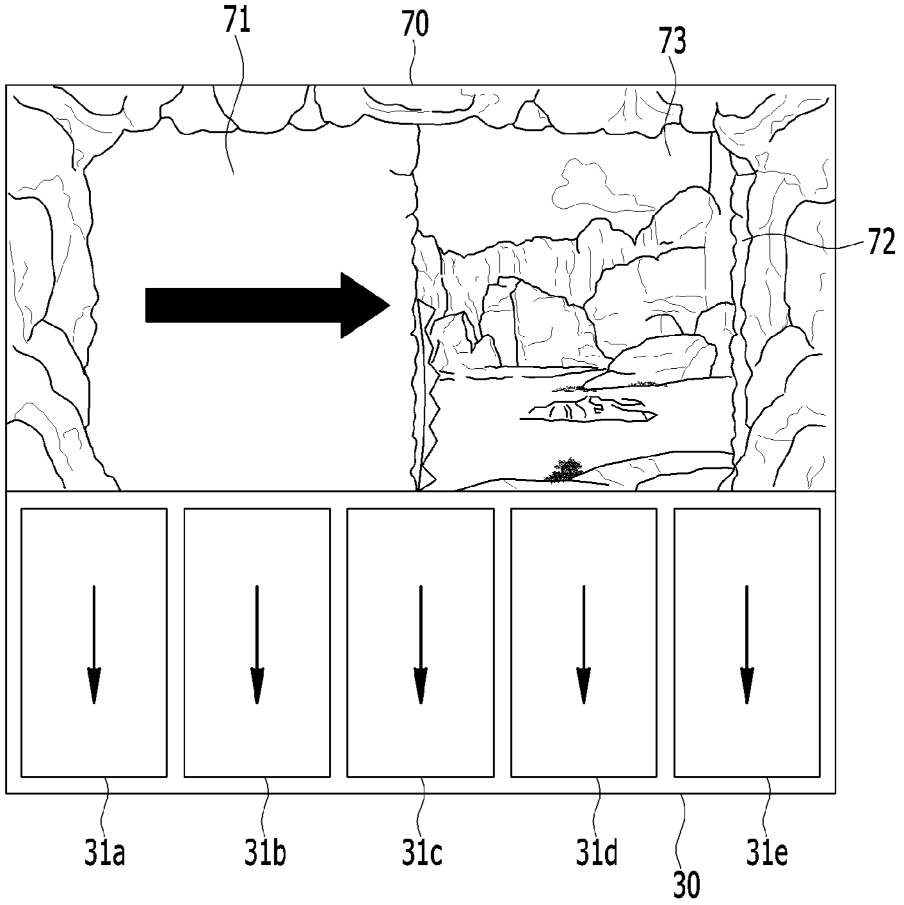

The type 3 of bonus sign rendering patterns may include a plurality of rendering patterning including a rendering pattern 7 and a rendering pattern 8. When the normal mode game is started, symbols to be rearranged on reels 31*a* to 31*e* (i.e., a game result) are randomly determined based on a symbol code determination table. A controller of a gaming machine selects any one of the plurality of rendering patterns. That is, the controller selects a control data and an image data among a plurality of control data and a plurality of image data for the plurality of rendering patterns. Next, one side sliding door, for example a left sliding door 71 of a secondary display 70 is closed, as shown in FIG. 76. In this case, the reels 31*a* to 31*e* are continuously spinning.

Figure 77:
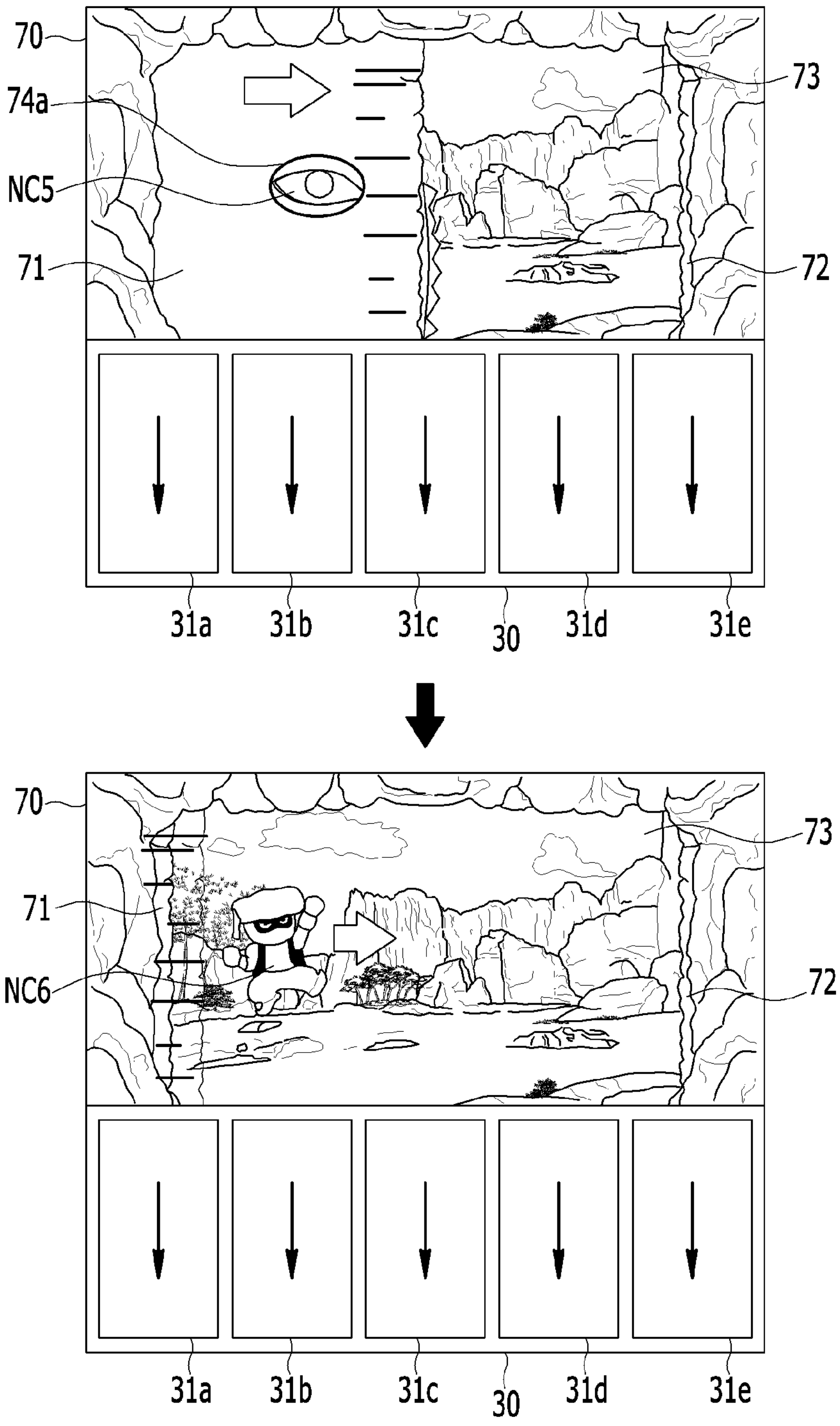

If the determined rendering pattern is the rendering pattern 7, an object image NC5 is displayed on a display panel 73 of the secondary display 70, and appears through at least one hole 74*a* of the left sliding door 71, as shown in FIG. 77. For example, the object image NC5 may be an eye of an opponent character. Subsequently, the left sliding door 71 is opened and an object image corresponding to a character NC6 is displayed on the display panel 73. The character NC6 may be, for example, a head thief or Morgiana in the story of "Ali Baba and the Forty Thieves." After the rendering pattern 7 is rendered, three or more scatter symbols ("BONUS") can stop on the reels 31*a* to 31*e* with the probability 7. For example, the probability 7 may be 33%.

Figure 78:
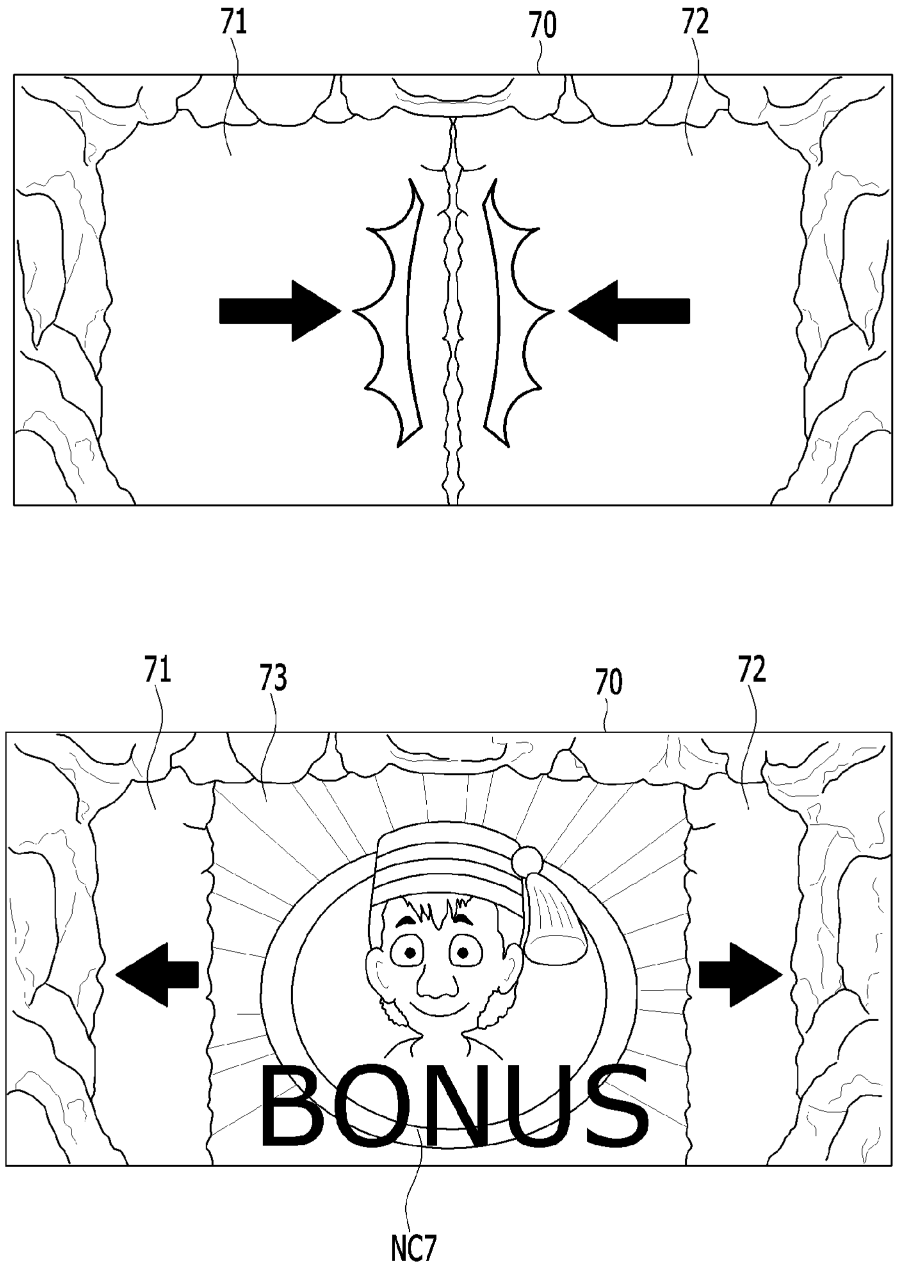

If the determined rendering pattern is the rendering pattern 8, the left sliding door 71 is opened in a moment, and then the left and right sliding doors 71 and 72 are closed, as shown in FIG. 78. Subsequently, the left and right sliding doors 71 and 72 are opened and an object image NC7 representing a bonus mode appears on the display panel 73. For example, the object image NC7 representing the bonus mode may be "BONUS" symbol. When the rendering pattern 8 is rendered, the bonus probability of the normal mode game is set to a probability 8 that is higher than the probability 7. After the rendering pattern 8 is rendered, three or more scatter symbols ("BONUS") can stop on the reels 31*a* to 31*e* with the probability 8. For example, the probability 8 may be 100%. That is, the bonus mode game can be always triggered if the rendering pattern 8 is rendered.

For example, when the controller determines that the two scatter symbols ("BONUS)" are arranged on two reels among the first to third reels 31*a* to 31*c*, the rendering mode 7 may be rendered. When the controller determines that the three scatter symbols ("BONUS)" are arranged on three reels among the reels 31*a* to 31*e*, the rendering mode 8 may be rendered.

As described above, the gaming machine according to the above embodiment can show a sign of a bonus mode game being triggered by using the sliding doors 71 and 72. Accordingly, the player can play the game with the expectation that the bonus mode game will be triggered.

Next, the chance sign rendering pattern is described in detail with reference to FIG. 79.

Figure 79:
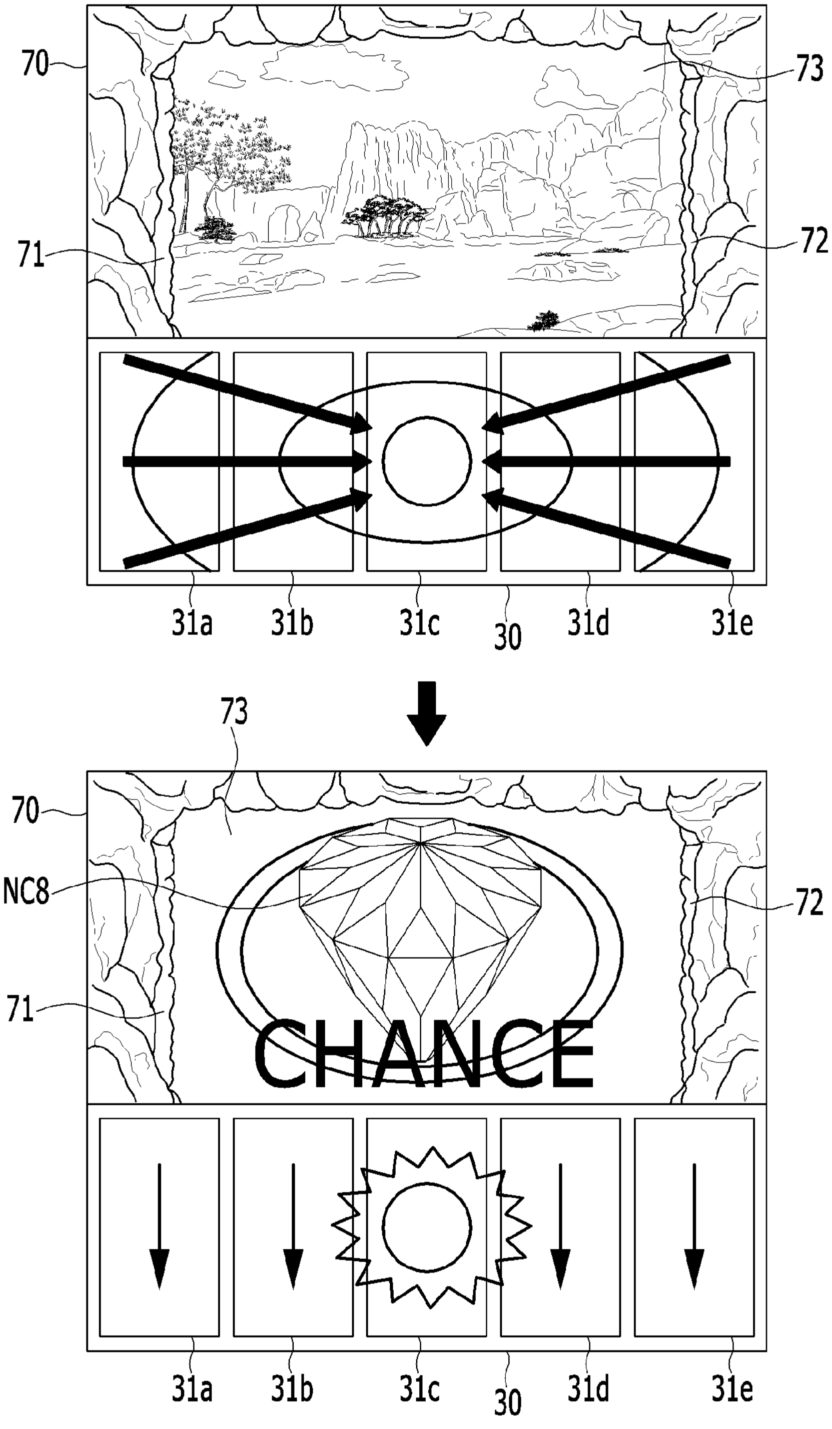
FIG. 79 shows an example of a chance sign rendering patterns in a normal mode game according to an embodiment of the present invention.

FIG. 79 shows an example of a chance sign rendering patterns in a normal mode game according to an embodiment of the present invention.

Chance Sign Rendering Pattern

When symbols to be rearranged on reels 31*a* to 31*e* (i.e., a game result) that are randomly determined based on a symbol code determination table satisfy a triggering condition of a chance mode game, a controller of a gaming machine may select a control data and an image data for a chance sign rendering pattern among a plurality of control data and a plurality of image data. Then, a display panel 73 of a secondary display 70 and reels 31*a* to 31*e* are darkened, and then a backlight unit (34 of FIG. 10) of the reels 31*a* to 31*e* controls a light to be focused on a center of the reel 31*a* to 31*e*, as shown in FIG. 79. Subsequently, an object image NC8 representing a chance mode appears on a display panel 73 of the secondary display 70, and the backlight unit 34 focuses the light on the center of the reels 31*a* to 31*e*. For example, the object image NC8 representing the chance mode may be "CHANCE" symbol. After the chance sign rendering pattern is rendered, a specific symbol ("CHANCE") stops on the middle row of the third reel 31*c*. That is, the chance mode game is triggered after the chance sign rendering pattern is rendered.

As described above, the gaming machine according to the above embodiment can notify the player of a trigger of the chance mode game using the sliding doors 71 and 72. Accordingly, the gaming machine can provide the player with a visual effect when the chance mode game is triggered.

Next, the payout rendering patterns are described in detail with reference to FIG. 80 and FIG. 81. The payout rendering patterns may include various types of payout rendering patterns according to various embodiments.

Figure 80:
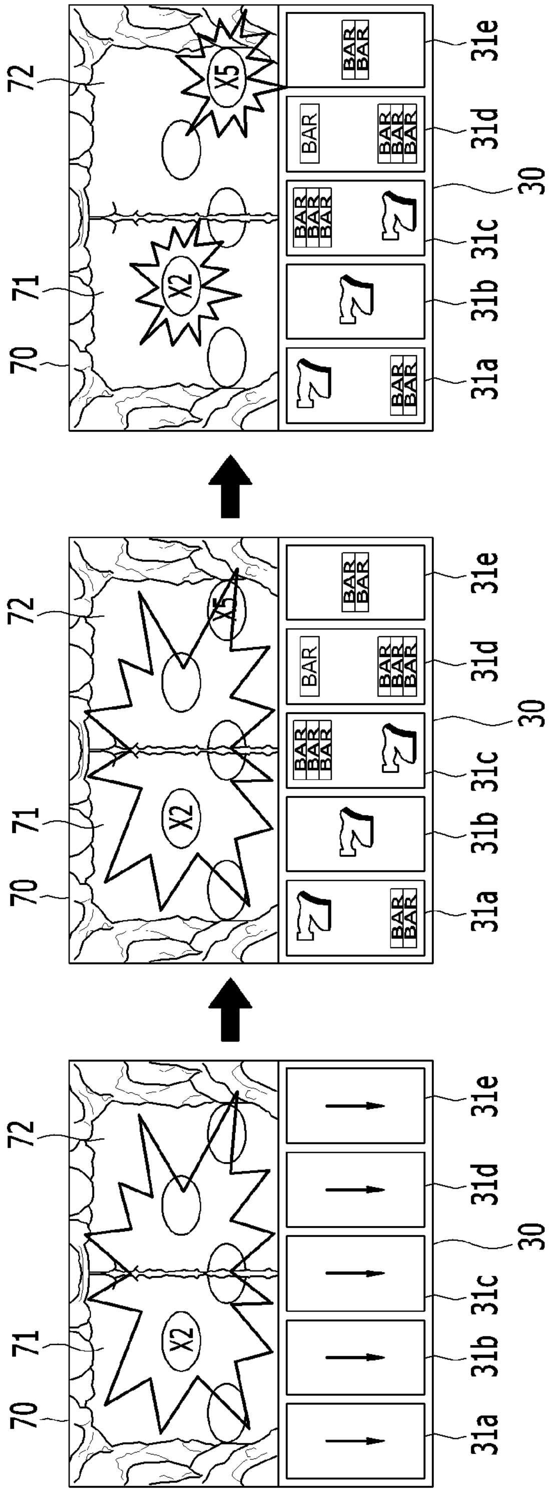
FIG. 80 and FIG. 81 show examples of payout rendering patterns in a normal mode game according to an embodiment of the present invention.
Figure 81:
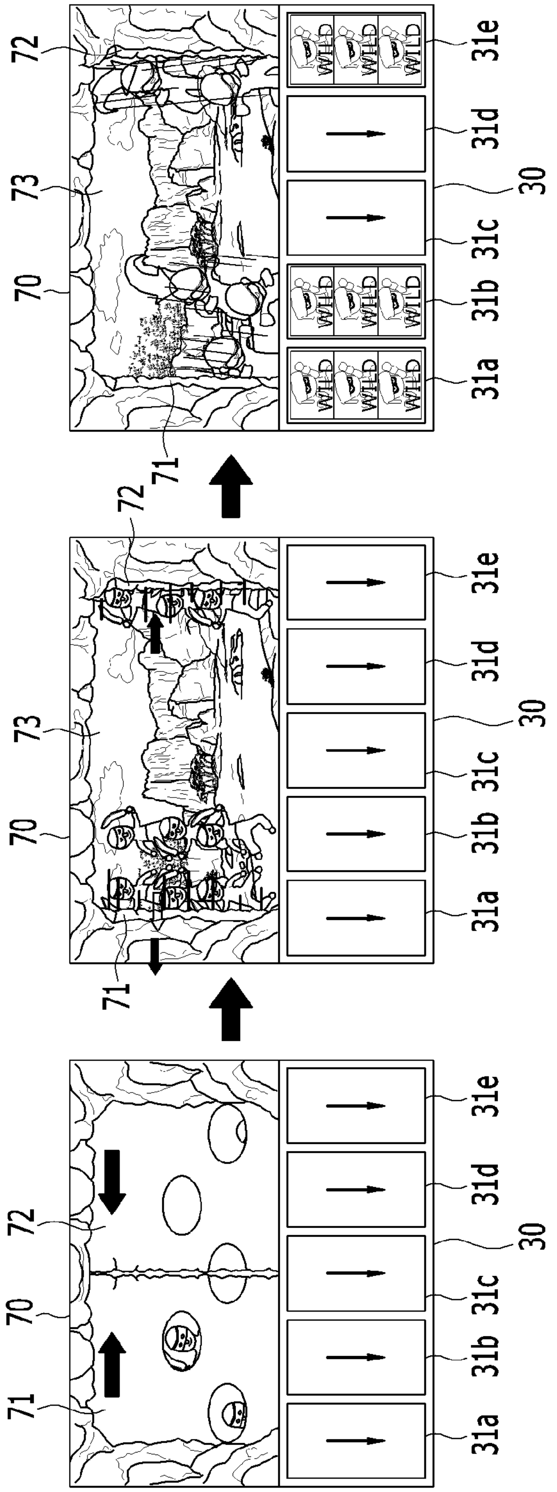

FIG. 80 and FIG. 81 show examples of payout rendering patterns in a normal mode game according to an embodiment of the present invention.

Type 1 of Payout Rendering Pattern

When symbols to be rearranged on reels 31*a* to 31*e* (i.e., a game result) that are randomly determined based on a symbol code determination table do not include a particular symbol such as a scatter symbol ("BONUS"), a specific symbol ("CHANCE"), or a "WILD" symbol, a controller of a gaming machine may select a control data and an image data for a type 1 of payout rendering pattern among a plurality of control data and a plurality of image data. Then, left and right sliding doors 71 and 72 are closed and at least one hole 74*b* and/or 74*e* appears on the sliding doors 71 and 72, as shown in FIG. 80. When a plurality of holes 74*b* and 74*e* appears, the holes 74*b* and 74*e* may sequentially appear on the sliding doors 71 and 72. In this case, an effect that an earthquake hits the sliding doors 71 and 72 such that at least one rock on the sliding doors 71 and 72 crumbles and the at least one hole 74*b* and/or 74*e* appears may be rendered. Further, a roulette having images representing a plurality of payout ratios rotates on a display panel 73 of a secondary display 70, and some of the payout ratios are shown through the hole.

Subsequently, the reels 31*a* to 31*e* stop to spin, and the rotation speed of the roulette is gradually reduced. When the reels 31*a* to 31*e* are stopped, a winning combination of the symbols is determined by the symbols arranged on the reels 31*a* to 31*e*. After the rotation of the roulette is stopped, the payout ratio shown through the at least one hole is applied to a payout according to the winning combination. For example, assuming that a payout ratio corresponding to two times ("×2") and a payout ratio corresponding to five times ("×5"), ten times the payout according to the winning combination is awarded to the player. If no payout ratio is shown through the at least one hole, only the payout according to the winning combination is awarded to the player.

Type 2 of Payout Rendering Pattern

When symbols to be rearranged on reels 31*a* to 31*e* (i.e., a game result) that are randomly determined based on a symbol code determination table include "WILD" symbols with a number greater than a predetermined number, a controller of a gaming machine may select a control data and an image data for a type 2 of payout rendering pattern among a plurality of control data and a plurality of image data. Then, left and right sliding doors 71 and 72 are closed and characters appear or disappear on a display panel 73 of a second display device 70, as shown in FIG. 81. When the characters are displayed on the display panel 73, faces of the characters are shown through holes 74*a* to 74*e* of the sliding doors 71 and 72.

Subsequently, the sliding doors 71 and 72 are open, and the characters whose faces are shown through the holes 74*a* to 74*e* are displayed at locations corresponding to the holes 74*a* to 74*e* on the display panel 73. Next, the characters jump into reels corresponding to the locations among the reels 31*a* to 31*e* such that the "WILD" symbols are stopped on the reels into which the characters jump. The three "WILD" symbols may be stopped on each of the reels into which the characters jump. Subsequently, the remaining reels are stopped, and a winning combination is determined by the "WILD" symbols and symbols arranged on the remaining reels. A payout according to the winning combination is determined and is awarded to the player.

As described above, the gaming machine according to the above embodiment can provide the player with the additional benefit along with a visual effect using the sliding doors 71 and 72. Accordingly, the player can be interested in the game through the visual effect.

Bonus Mode Game

Next, a bonus mode game according to embodiments of the present invention is described in detail with reference to FIG. 82 to FIG. 91.

Referring to FIG. 67 again, when three or more scatter symbols ("BONUS") are arranged on reels 31*a* to 31*e*, a bonus mode game is triggered, and left and right sliding doors 71 and 72 are closed in a secondary display 70. The gaming machine provides various bonus types for the bonus mode game. Accordingly, a controller of the gaming machine randomly determines any one of the various bonus types, and selects a rendering pattern data corresponding to the determined bonus type among a plurality of rendering pattern data for the bonus mode game stored in a memory. The rendering pattern data may include a control data for controlling the sliding doors 71 and 72 and an image data corresponding to the control data, as described in the normal mode game.

Subsequently, the controller opens the sliding doors 71 and 72 according to the selected rendering pattern data. When the sliding doors 71 and 72 are opened, an image corresponding to the selected rendering pattern data is displayed on a display panel 73 of the secondary display 70. The controller may control the sliding doors 71 and 72, the display panel 73 and the reels 31*a* to 31*e*, to render an effect according to the selected rendering pattern data. Further, the bonus mode game may include at least one free round. The free round can be executed without actual betting of the player (i.e., without reducing credits of the player), and the bet amount used for determining the win prize of the free round may be that of the normal mode game executed just before the bonus mode game.

Hereinafter, the various bonus types for the bonus mode game are described. The controller of the gaming machine controls the sliding doors 71 and 72 and the display panel 73 to render an effect according to the selected rendering pattern data.

Bonus Type 1

Figure 82:
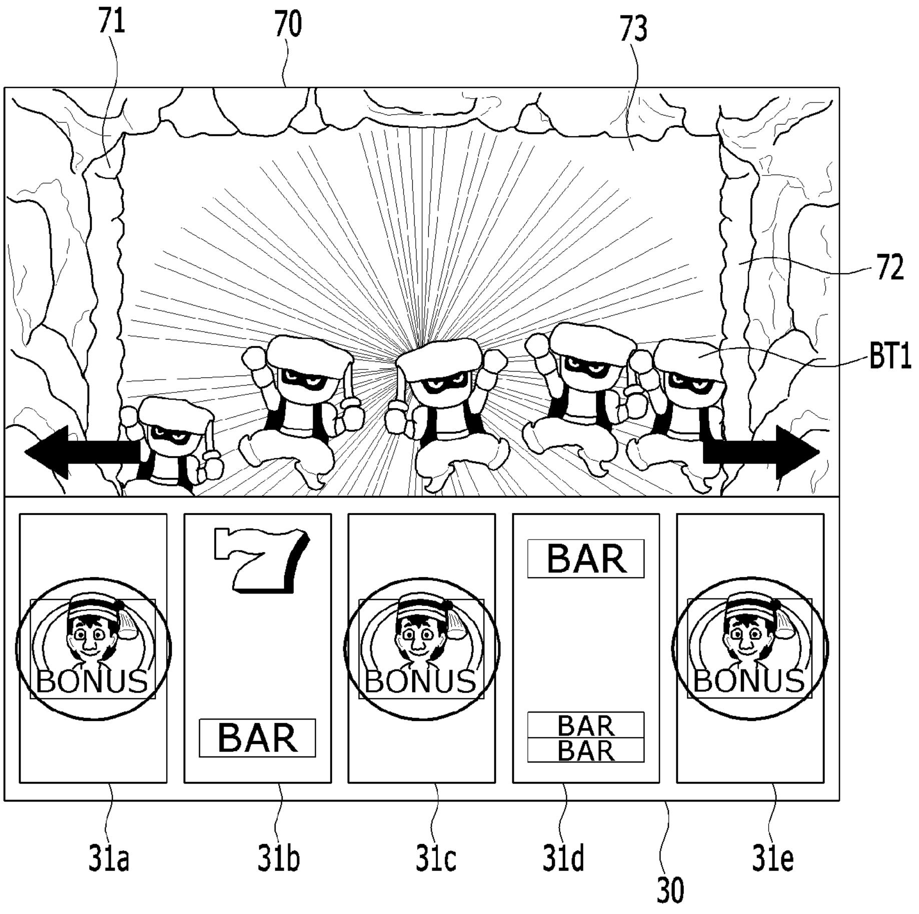
FIG. 82 shows an example of a rendering pattern for a bonus mode game according to an embodiment of the present invention.
Figure 83:
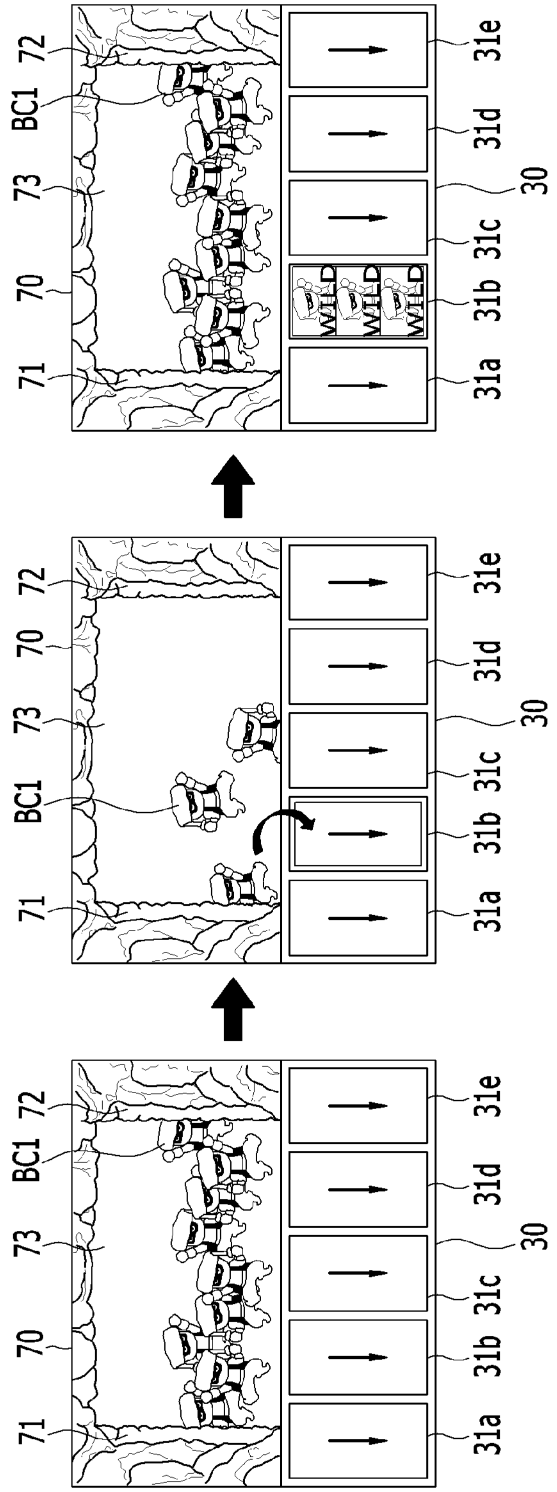
FIG. 83 shows an example of a bonus mode game according to the rendering pattern shown in FIG. 82.

FIG. 82 shows an example of a rendering pattern for a bonus mode game according to an embodiment of the present invention, and FIG. 83 shows an example of a bonus mode game according to the rendering pattern shown in FIG. 82.

When the bonus type 1 is determined, an object image BT1 for notifying the bonus type 1 is displayed on the display panel 73 and are shown through the open sliding doors 71 and 72, as shown in FIG. 82. For example, the object image BT1 may be an image that a plurality of characters appear, and the characters may be thieves in the story of "Ali Baba and the Forty Thieves." After the image is displayed, the gaming machine provides the player with the bonus mode game including a plurality of free rounds.

In each free round, reels 31*a* to 31*e* starts to spin and an object image corresponding to the characters BC1 is displayed on the display panel 73, as shown in FIG. 83. In certain free round, an effect that the characters BC1 jump into at least one of the reels 31*a* to 31*e* which are spinning may be rendered on the display panel 73. Subsequently, "WILD" symbols are stopped on the reel into which the characters BC1 jump, and then the remaining reels are stopped. In this case, the controller may render the effect that the characters BC1 jump into the reel when the "WILD" symbol is determined to stop on the reel based on the symbol code determination table. The controller determines a winning combination by the "WILD" symbols and symbols arranged on the remaining reels, and provides the player with a payout according to the winning combination. On the other hand, in the free round in which the effect that the characters jump into at least one of the reels 31*a* to 31*e* is not rendered, the gaming machine determines a winning combination by symbols arranged on the reels 31*a* to 31*e*.

The controller counts the number of executed free rounds each time the free round is executed, and ends the bonus mode game and returns to a normal mode game when the number of free rounds reaches a predetermined number, for example seven. Further, in each free round, the controller may randomly determine whether to render or not an effect that the characters jump into at least one of the reels 31*a* to 31*e*. In this case, the gaming machine may predefine an expected value of credits that are awarded to the player during the bonus mode game, and may set a range of random numbers corresponding to the effect that the characters jump into at least one of the reels 31*a* to 31*e* according to the expected value. Accordingly, the gaming machine may generate a random number each time the free round is executed, and may perform the effect when the random number is within the range of the random numbers.

Bonus Type 2

Figure 84:
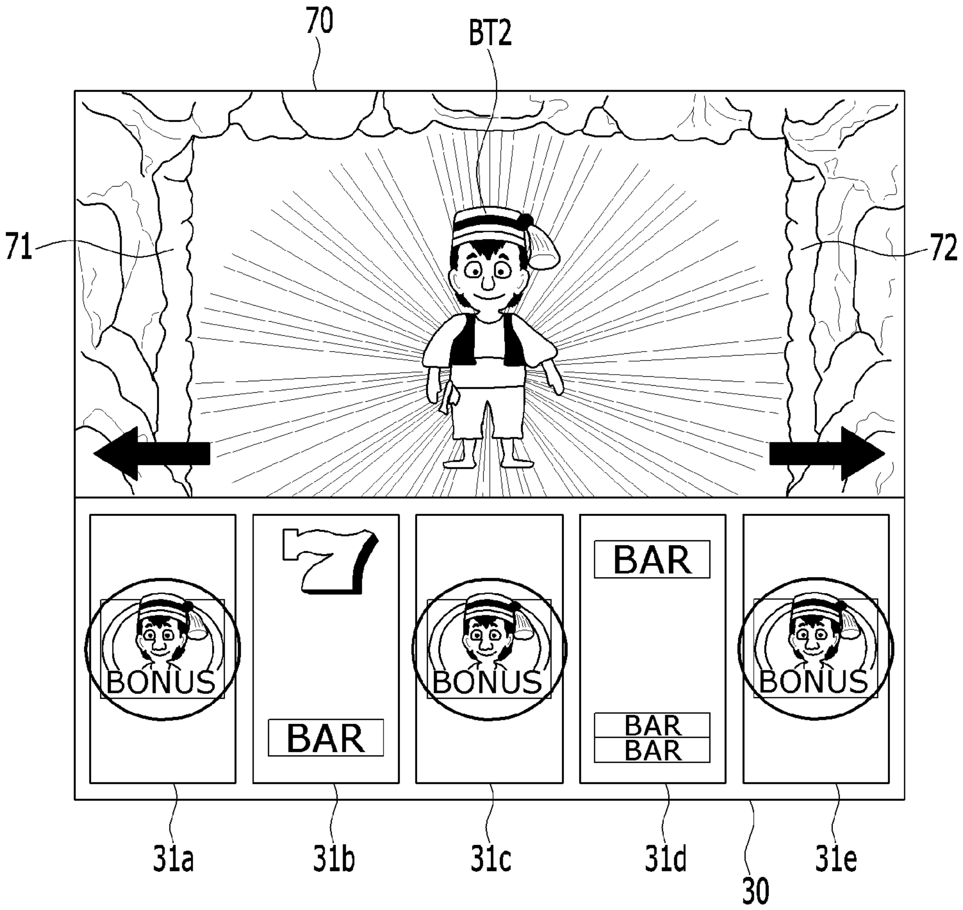
FIG. 84 shows another example of a rendering pattern for a bonus mode game according to an embodiment of the present invention.
Figure 85:
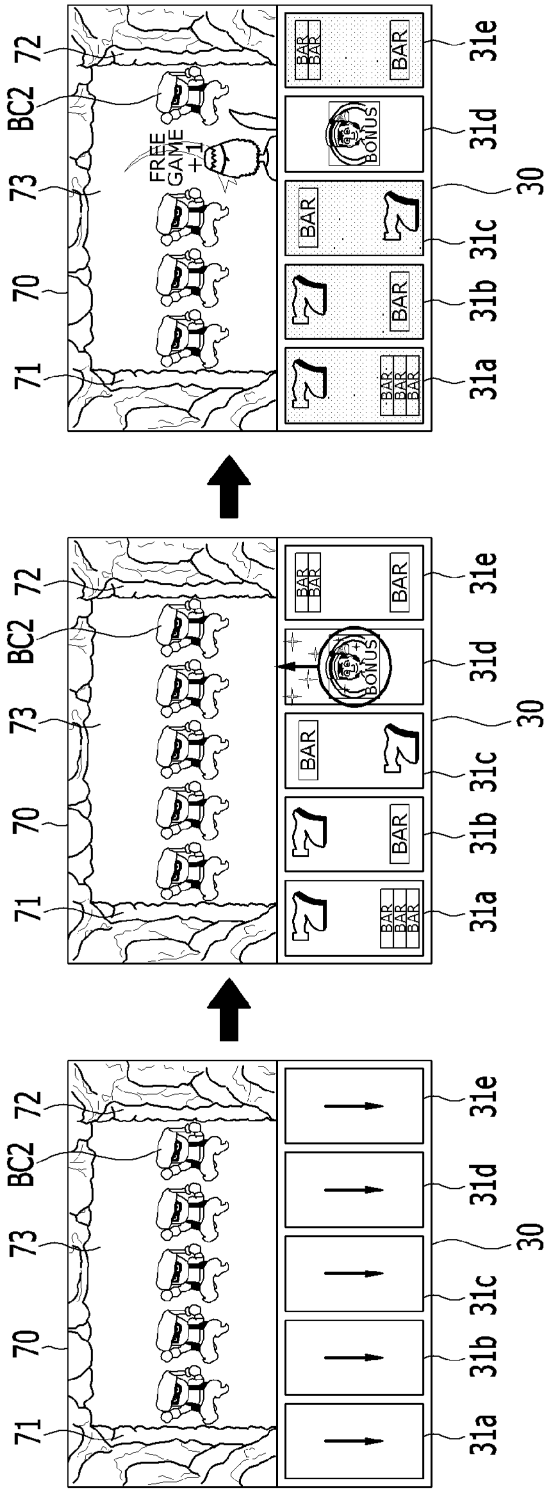
FIG. 85 shows an example of a bonus mode game according to the rendering pattern shown in FIG. 84.

FIG. 84 shows another example of a rendering pattern for a bonus mode game according to an embodiment of the present invention, and FIG. 85 shows an example of a bonus mode game according to the rendering pattern shown in FIG. 84.

When the bonus type 2 is determined, an object image BT2 for notifying the bonus type 2 is displayed on the display panel 73 and are shown through the open sliding doors 71 and 72, as shown in FIG. 85. For example, the object image BT2 may be an image that a main character appears, and the main character may be Ali Baba in the story of "Ali Baba and the Forty Thieves." After the object image BT2 is displayed, the controller provides the player with the bonus mode game including a plurality of free rounds.

In each free round, reels 31*a* to 31*e* starts to spin and an object image corresponding to opponent characters BC2 is displayed on the display panel 73, as shown in FIG. 85. For example, the opponent characters BC2 may be thieves in the story of "Ali Baba and the Forty Thieves." In addition, the opponent characters BC2 may correspond to the reel 31*a* to 31*e*, respectively. In certain free round, the scatter symbol ("BONUS") may be stopped on at least one of the reels 31*a* to 31*e* when the reels 31*a* to 31*e* stop. Subsequently, the gaming machine renders an effect that a light is emitted from a symbol block on which the scatter symbol is stopped to the opponent character BC2 corresponding to the reel on which the scatter symbol is stopped. Next, an effect that the main character BC3 defeats the opponent character BC2 and a benefit is provided from the defeated opponent character BC3 is rendered on the display panel 73. The benefit may be a payout of credits and additional free round. In addition, the gaming machine determines a winning combination by symbols arranged on the remaining reels, and provides the player with a payout according to the winning combination.

The controller counts the number of executed free rounds each time the free round is executed, and ends the bonus mode game and returns to a normal mode game when the number of free rounds reaches a predetermined number, for example eight. Further, in each free round, the controller may randomly determine the symbols to be stopped on the reels 31*a* to 31*e*. In this case, the controller may predefine an expected value of credits that are awarded to the player during the bonus mode game, and may set a range of random numbers corresponding to each symbol of a symbol code determination table according to the expected value.

Bonus Type 3

Figure 86:
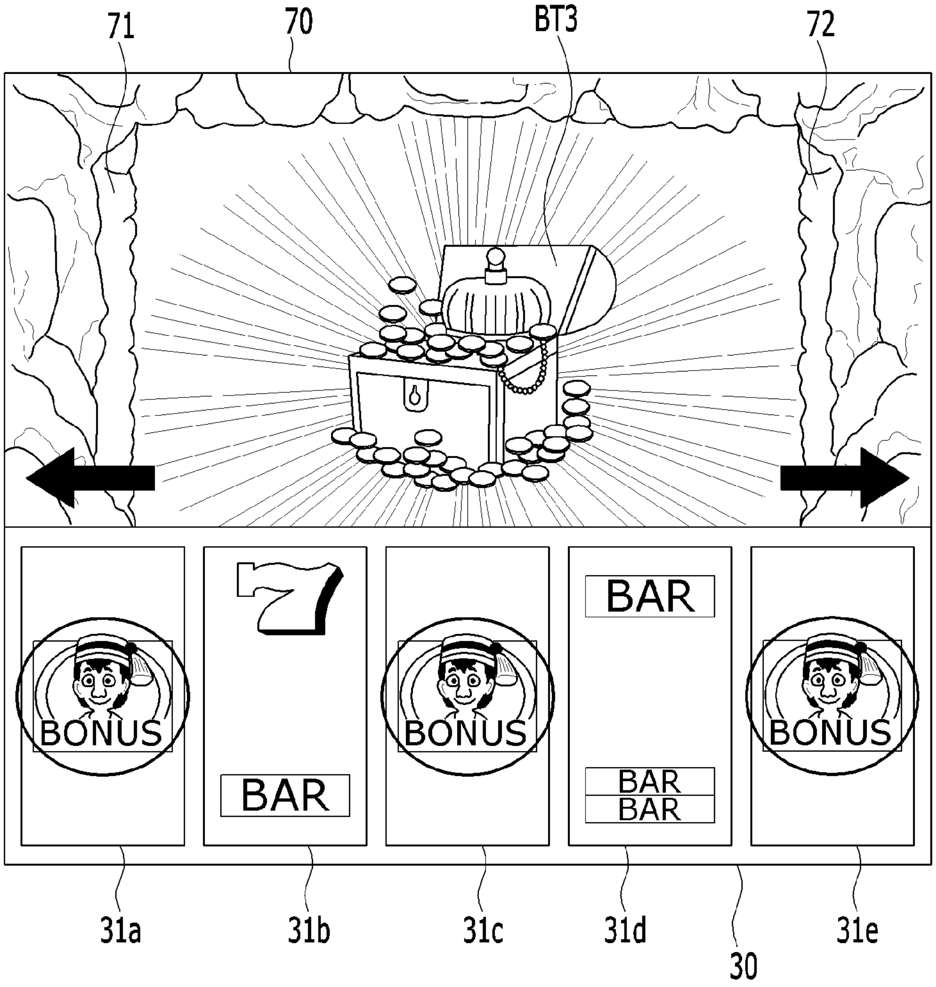
FIG. 86 shows yet another example of a rendering pattern for a bonus mode game according to an embodiment of the present invention.

FIG. 86 shows yet another example of a rendering pattern for a bonus mode game according to an embodiment of the present invention, FIG. 87 to FIG. 90 show examples of a bonus mode game according to the rendering pattern shown in FIG. 86, and FIG. 91 shows an example of symbol code determination tables for a bonus mode game according to an embodiment of the present invention.

When the bonus type 3 is determined, an object image BT3 corresponding to the bonus type 3 is displayed on the display panel 73 and are shown through the open sliding doors 71 and 72, as shown in FIG. 86. For example, the object image BT3 may an image that a treasure chest appears. After the object image BT3 is displayed, the gaming machine provides the player with the bonus type 3 of bonus mode game. The bonus type 3 of the bonus mode game may be a board game including a plurality of cells that form a course on which a character moves, and may include a plurality of free rounds. The character can move from a start cell to a goal cell during the plurality of free rounds.

Figure 87:
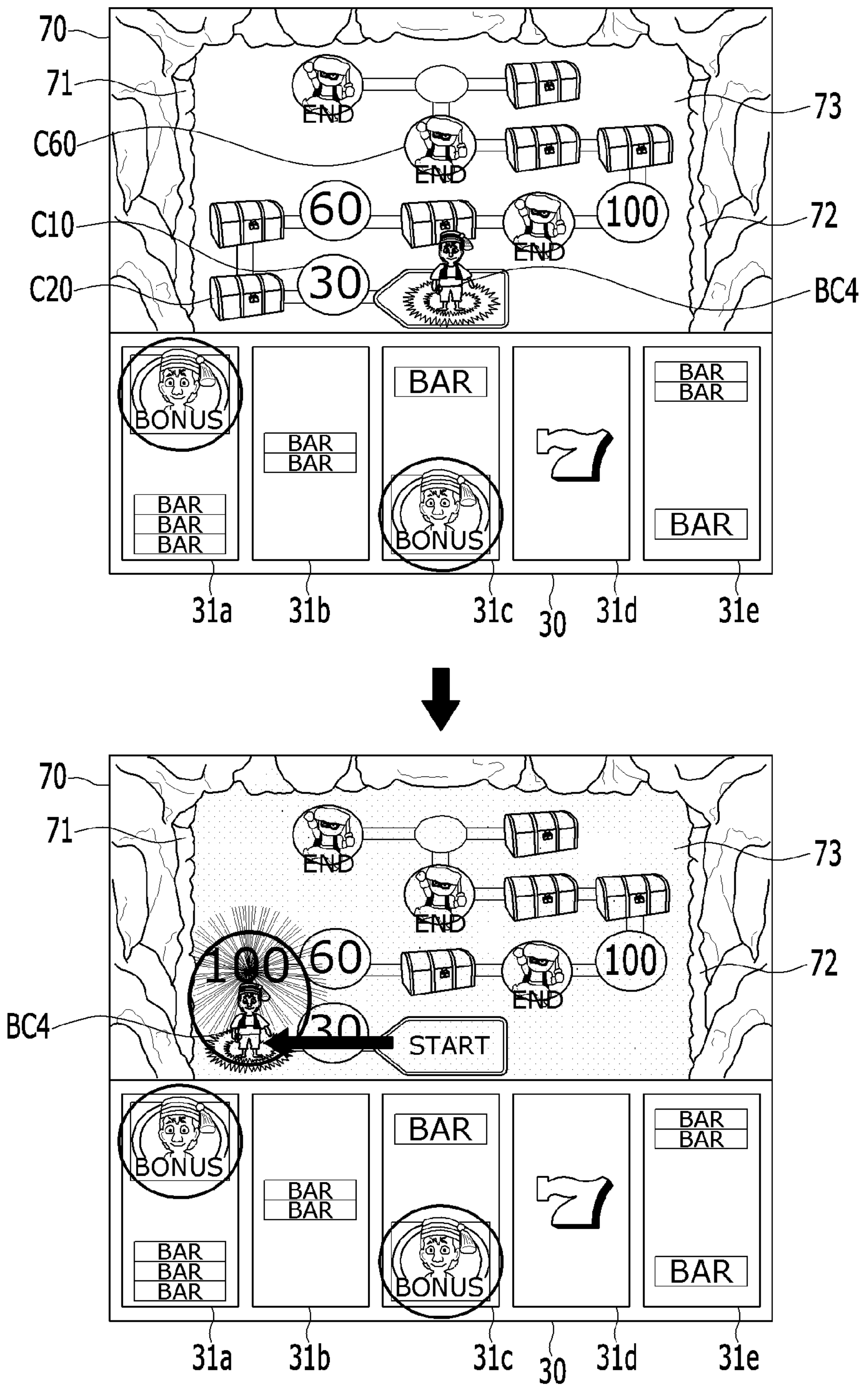
FIG. 87 to FIG. 90 show examples of a bonus mode game according to the rendering pattern shown in FIG. 86.

In each free round, a map including a plurality of cells that form the course and the character BC4 located at a current cell are displayed on a display panel 73 of the secondary display 70, as shown in FIG. 87. When reels 31*a* to 31*e* stop after spinning, at least one scatter symbol ("BONUS") may be appeared on the reels 31*a* to 31*e*. The controller moves the character BC4 from the current cell to a destination cell by the number of the scatter symbol(s). For example, when two scatter symbols are appeared on the reels 31*a* to 31*e*, the character BC4 is moved by two cells. Subsequently, the controller provides the player with an event set to the destination cell. If the destination cell is a cell C10 to which a fixed credit value is set, the controller awards credits corresponding to the fixed credit value to the player. After a plurality of free rounds are performed, the character may arrive at a cell corresponding to a goal point of the course. Then, the controller awards credits of the goal point to the player. The credits of the goal point may be greater than credits of the other cells.

If the destination cell at which the character arrives is a cell C20 to which a treasure chest is set, the gaming machine randomly determines a content of the treasure chest and opens the treasure chest to provide the content to the player. The content of the treasure chest may be a fixed credit value, moving by predetermined cells, etc.

Figure 88:
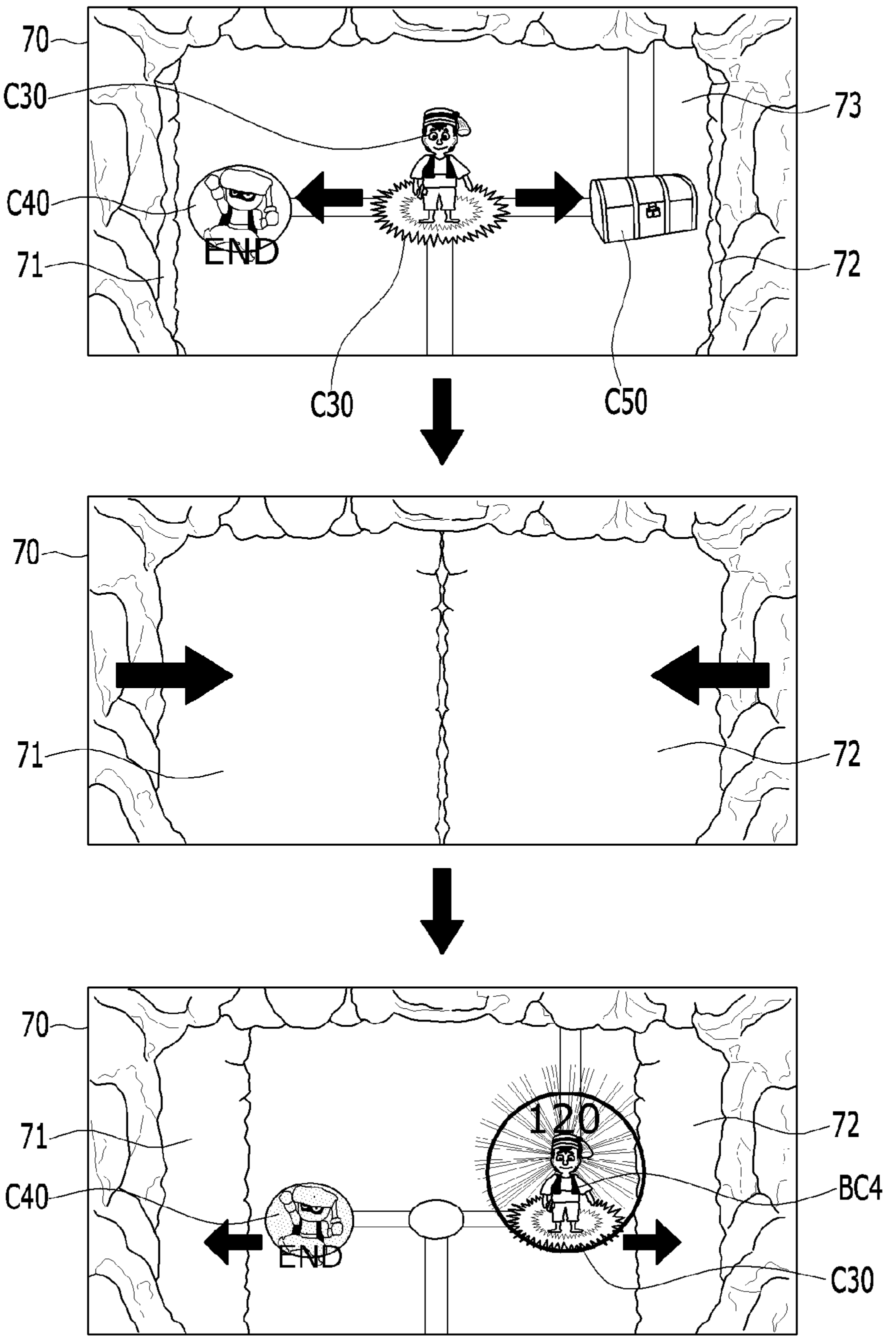

If the destination cells is a cell C30 corresponding to a turning point, the controller closes the sliding doors 71 and 72, as shown in FIG. 88. The character is moved to any one of at least two cells including a cell C40 to which an end of the game is set and a cell C50 to which the fixed credit value or the treasure chest is set. The controller randomly determines any one of the at least two cells, and moves the character to the determined cell after opening the sliding doors 71 and 72.

In one embodiment, if the destination cell is an end cell C60 to which an end of the game is set, the gaming machine ends the bonus mode game.

Figure 89:
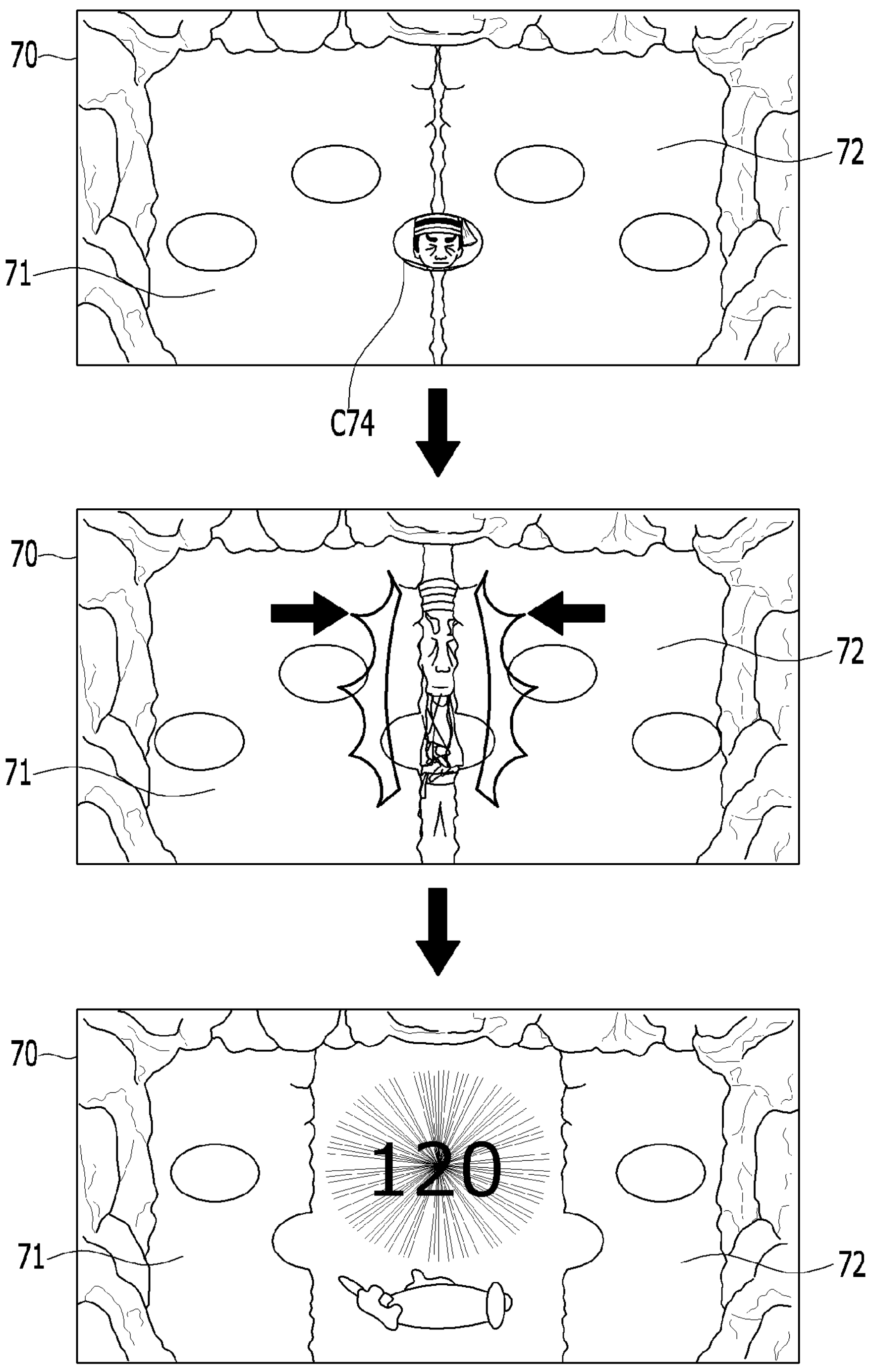

In another embodiment, the gaming machine renders an ending event and determines whether to end the bonus mode game according to a result of the ending event. Referring to FIG. 89, the gaming machine closes the sliding doors 71 and 72 when the character BC4 arrives at the end cell C60, and provides at least one free sub-round. In each free sub-round, the controller renders an effect that a character is displayed on the display panel 73 and gradually appears through a hole 74*c* located between the left and right sliding doors 71 and 72.

If the player presses a certain button, for example a START button (54 of FIG. 8) when the character appears through the hole 74*c*, the sliding doors 71 and 72 attempt to sandwich the character by being opened and closed. When an effect that the character is defeated by being sandwiched by the sliding doors 71 and 72 is rendered, the controller awards predetermined credits to the player and executes a next free sub-round. If a character is successfully defeated in the last free sub-round, the controller does not end the bonus mode game and continuously executes a next free round of the bonus mode game at the end cell C60. If the player fails to defeat character, the controller notifies the player of the end of the bonus mode game and returns to a normal mode game. The character may be, for example, a thief in the story of "Ali Baba and the Forty Thieves," and the character appeared in the last free sub-round may be a head thief.

Figure 90:
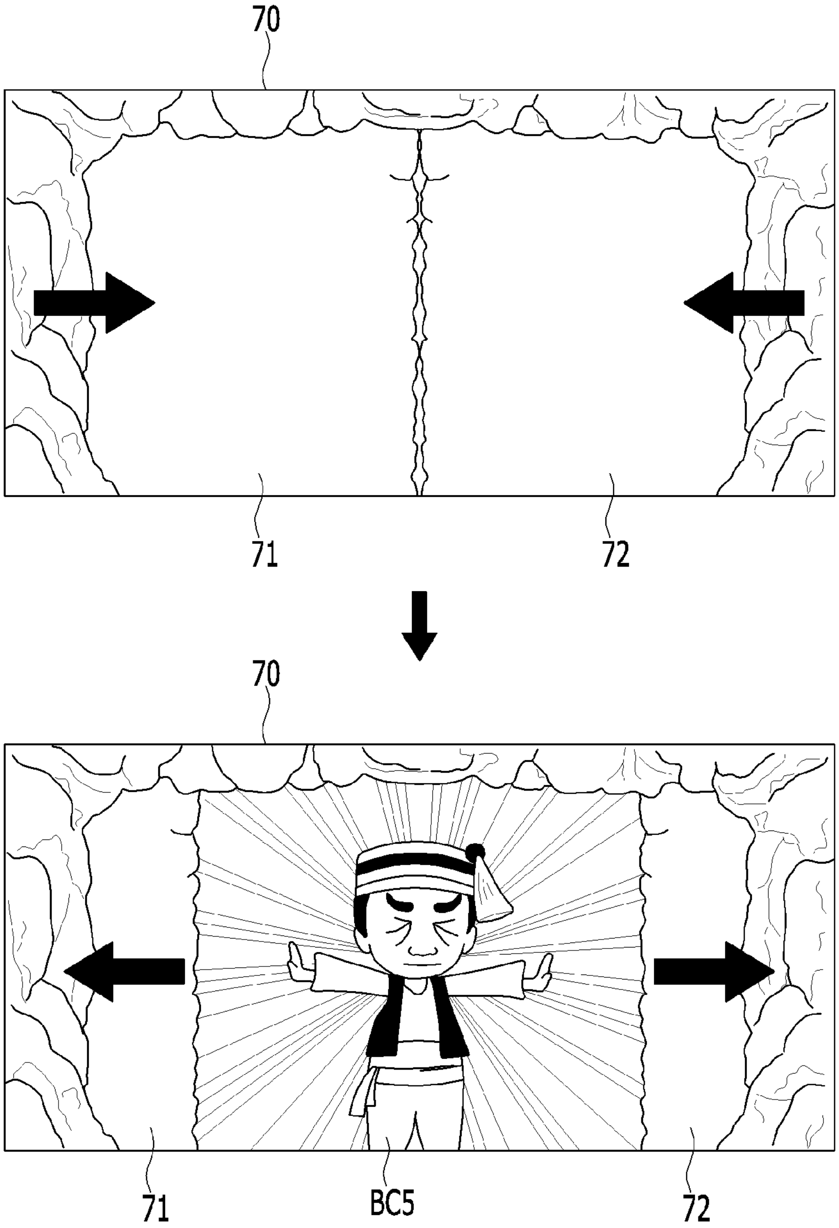

In yet another embodiment, when the character arrives at the end cell C60, the controller closes the sliding doors 71 and 72 and randomly determines whether to end the bonus mode game. If the controller determines to continue the bonus mode game, it renders an effect that an object image corresponding to a character BC5 opens the sliding doors 71 and 72, as shown in FIG. 90. Accordingly, the gaming machine continuously executes a next free round of the bonus mode game at the end cell C60. If the gaming machine determines to end the bonus mode game, it notifies the player of the end of the bonus mode game and returns to the normal mode game.

In yet another embodiment, the controller predefines an expected value of credits that to be awarded to the player during the bonus type 3 of bonus mode game, and can set events and payouts for cells of the map according to the expected value.

In one embodiment, the gaming machine stores a plurality of symbol code determination tables corresponding to a plurality of bonus types in a memory, as shown in FIG. 91. The memory may be a RAM (93 of FIG. 9), a ROM (92 of FIG. 9), or other storage devices. The controller may select the symbol code determination table for the determined bonus type from the memory when selecting the rendering pattern data from the memory. In the symbol code determination table for the bonus type 1, a range (BL1P~BU1Q, BL2P~BU2Q, BL3P~BU3Q, BL4P~BU4Q, or BL5P~BU5Q) of random numbers for the "WILD" symbol is wider than a range (NL1P~NU1Q, NL2P~NU2Q, NL3P~NU3Q, NL4P~NU4Q, or NL5P~NU5Q) of random numbers for the scatter symbol in FIG. 63. Accordingly, a probability of the "WILD" symbol being stopped can be increased in the bonus type 1. In the symbol code determination tables for the bonus types 2 and 3, a range (BL1F~BU1G, BL2F~BU2G, BL3F~BU3G, BL4F~BU4G, or BL5F~BU5G) of random numbers for the scatter symbol ("BONUS") is wider than a range (NL1F~NU1G, NL2F~NU2G, NL3F~NU3G, NL4F~NU4G, or NL5F~NU5G) of random numbers for the scatter symbol in FIG. 63. Accordingly, a probability of the scatter symbol being stopped can be increased in the bonus type 2 or 3.

In another embodiment, the game machine predefines an expected value of credits to be awarded during each bonus type of bonus mode game, and set a probability of each bonus type being determined to be inversely proportional to the expected value. For example, the gaming machine may set the expected value of the bonus type 3 to the greatest value and the expected value of the bonus type 3 to the least value. Further, the gaming machine may set the probability of the bonus type 3 being determined to the lowest value and the probability of the bonus type 1 being determined to the highest value.

As described above, the gaming machine according to the above embodiment can provide various visual effects and additional benefits in the bonus mode game. As a result, the player can continuously play the game to trigger the bonus mode game in which the additional benefits and the visual rendering effects are provided. Further, the player can continuously play the game to experience the various types of bonus mode games that are randomly determined.

Chance Mode Game

Next, a chance mode game according to embodiments of the present invention is described in detail with reference to FIG. 92 to FIG. 105.

Figure 92:
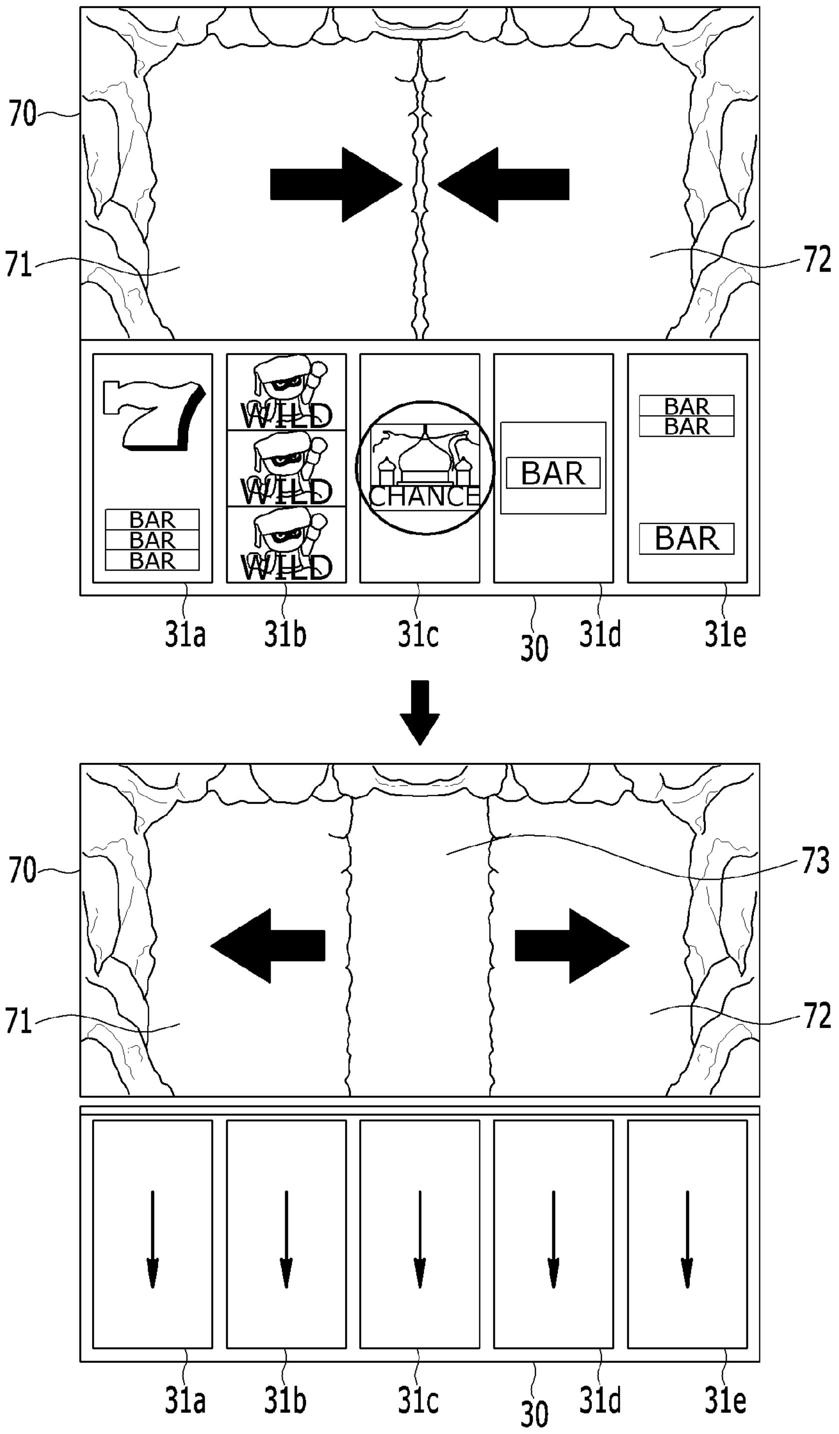
FIG. 92 shows an example of a chance mode game according to an embodiment of the present invention.

FIG. 92 shows an example of a chance mode game according to an embodiment of the present invention, and FIG. 93 shows an example of symbol code determination tables for a chance mode game according to an embodiment of the present invention.

Referring to FIG. 68 again, when a specific symbol ("CHANCE") is arranged on a predefined position of the reels 31*a* to 31*e*, a chance mode game is triggered, and left and right sliding doors 71 and 72 are closed in a secondary display 70. A gaming machine provides various chance types for the chance mode game. Accordingly, the gaming machine determines any one among the various chance types. In one embodiment, the gaming machine may randomly determine a game result of the chance mode game, and determines a chance type corresponding to the game result among the various chance types. In another embodiment, the gaming machine may randomly determine a chance type among the various chance types regardless of the game result. After determining the chance type, the gaming machine selects a rendering pattern data of a rendering pattern corresponding to the determined chance type among a plurality of rendering pattern data stored in a memory. The rendering pattern data may include a control data for controlling the sliding doors 71 and 72 and an image data corresponding to the control data, as described in the normal mode game.

Subsequently, the controller starts to spin reels 31*a* to 31*e* and opens the sliding doors 71 and 72 halfway according to the selected rendering pattern data, as shown in FIG. 92. In this case, each of the left and right sliding doors 71 and 72 may be opened halfway or only one of the left and right sliding doors 71 and 72 may be fully opened. Further, the controller controls a backlight unit (34 of FIG. 10) for the reels 31*a* to 31*e* to make the player look up the secondary display 70. For example, the controller may turn on light sources (34*s* of FIG. 10) that correspond to lower rows of the first and fifth reels 31*a* and 31*e*, a middle row of the second and fourth reels 31*b* and 31*d*, and an upper row of the third reel 31*c* among light sources 34*s* of the backlight unit 34. The controller of the gaming machine may control the sliding doors 71 and 72 and the display panel 73, to render a rendering pattern according to the selected rendering pattern data.

The chance types may include, for example, chance types showing a sign of a bonus mode game being triggered (hereinafter referred to as "chance types for bonus sign"), chance types for determining credits to be paid out to the player (hereinafter referred to as "chance types for payout"), chance types showing a probability of a bonus mode game being triggered (hereinafter referred to as "chance types for bonus probability"), or chance types showing an event (hereinafter referred to as "chance types for event"), etc.

The chance mode game may include a plurality of chance rounds, for example ten chance rounds. Accordingly, the gaming machine may randomly determine the plurality of chance types (i.e., a plurality of game results) for the plurality of chance rounds when the chance mode game is executed. Alternatively, the controller may select a chance type (i.e., a game result) for each chance round when each chance round is executed. The chance round may be executed without actual betting of the player (i.e., without reducing credits of the player), and the bet amount used for determining the win prize of the chance round may be that of the normal mode game executed just before the chance mode game. Alternatively, the chance round may be executed with actual betting of the player. The gaming machine counts the number of executed chance rounds each time the chance round is executed, and ends the chance mode game and returns to a normal mode game when the number of chance rounds reaches a predetermined number, for example ten. Further, if the bonus mode game is triggered in a certain chance round, the gaming machine ends the chance mode game and executes the bonus mode game.

In the chance mode game, symbols to be arranged on the reels 31*a* to 31*e* (i.e., a game result) may be determined by codes that are randomly determined based on the symbol code determination tables for the chance mode game. In detail, the gaming machine stores a plurality of symbol code determination tables in a memory, as shown in FIG. 93. The memory may be a RAM (93 of FIG. 9), a ROM (92 of FIG. 9), or other storage devices. Each of the symbol code determination tables has a higher bonus probability than the symbol code determination table for the normal mode game. That is, a range (CL1F~CU1G, CL2F~CU2G, CL3F~CU3G, CL4F~CU4G, or CL5F~CU5G) of random numbers for the scatter symbol is wider than a range (NL1F~NU1G, NL2F~NU2G, NL3F~NU3G, NL4F~NU4G, or NL5F~NU5G) of random numbers for the scatter symbol in FIG. 63. Further, the bonus probabilities may different between the symbol code determination tables. In one embodiment, the gaming machine may randomly select the symbol code determination table among the symbol code determination table stored in the memory, and may apply the selected symbol code determination table to the determined chance type. In another embodiment, the gaming machine may select the symbol code determination table corresponding to the determined chance type among the symbol code determination table stored in the memory.

As such, since the gaming machine provides the various chance types and randomly selects the chance types, the player can continuously play the game to experience the various chance types. Further, since the gaming machine can provide various rendering effects according to the various chance types, the player can be interested in the game.

Hereinafter, the various chance types for the chance mode game are described. The controller of the gaming machine controls the sliding doors 71 and 72 and the display panel 73 to render an effect according to the selected rendering pattern data.

First, the chance types for bonus sign are described with reference to FIG. 94 to FIG. 96. The chance types for bonus sign may include various chance types according to various embodiments.

FIG. 94 to FIG. 97 show examples of a chance type for bonus sign in a chance mode game according to an embodiment of the present invention.

Chance Type 1 for Bonus Sign

Figure 94:
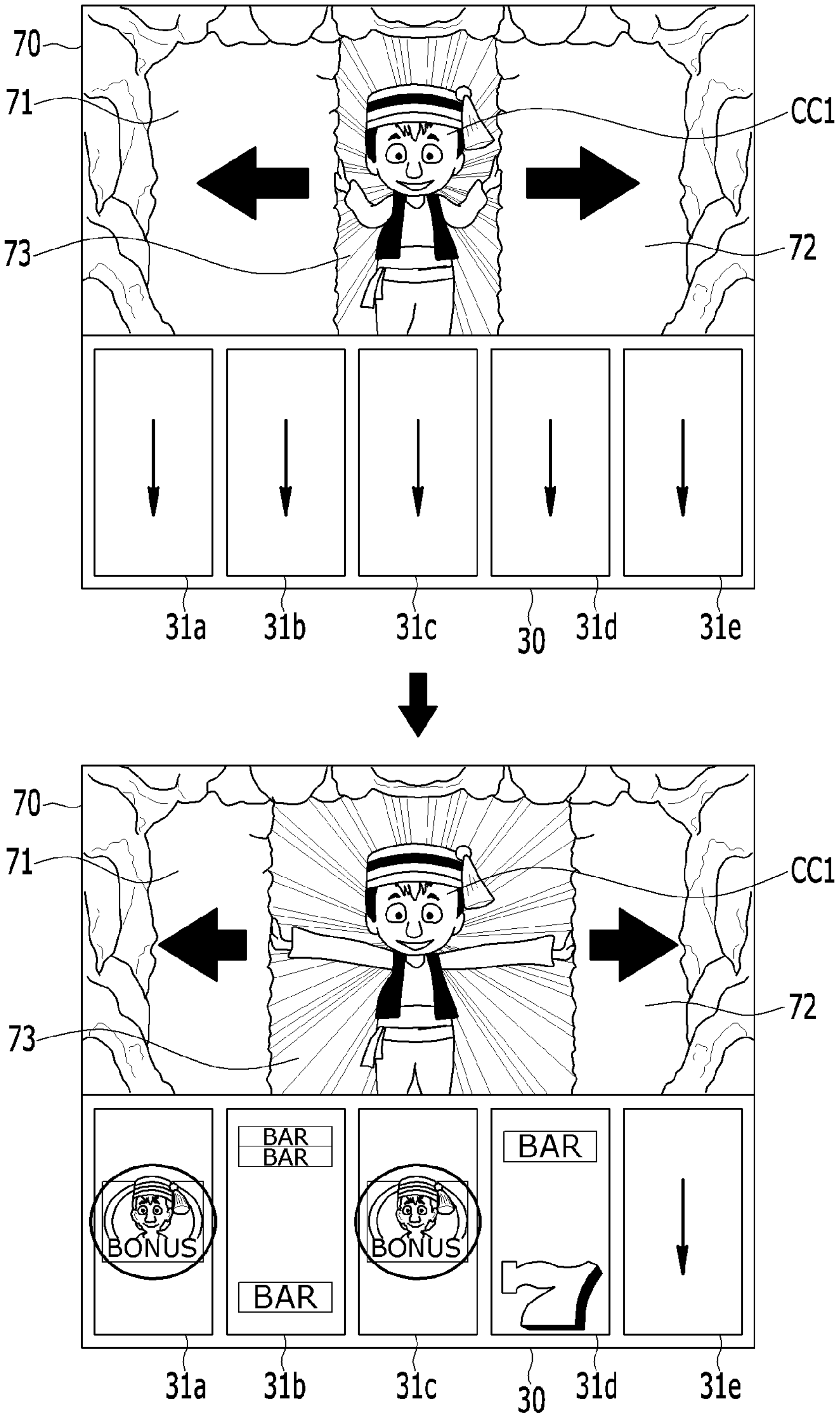
FIG. 94 to FIG. 97 show examples of a chance type for bonus sign in a chance mode game according to an embodiment of the present invention.

When the chance type 1 for bonus sign is determined, a controller of a gaming machine displays an object image corresponding to a character CC1 on a display panel 73, and attempts to fully open the sliding doors 71 and 72 while reels 31*a* to 31*e* are spinning, as shown in FIG. 94. As the sliding doors 71 and 72 are gradually opened, the reels 31*a* to 31*e* sequentially stop such that scatter symbols ("BONUS") appears on some of the stopped reels 31*a* to 31*e*. When the character CC1 opens the sliding doors 71 and 72 fully, the three scatter symbols ("BONUS") are arranged on the three stopped reels 31*a* to 31*e*, for example the first, third and fifth reels 31*a*, 31*c* and 31*e*. As a result, a bonus mode game is triggered. On the other hand, when the two or less scatter symbols ("BONUS") are arranged on the reels 31*a* to 31*e*, the sliding doors 71 and 72 are closed again.

Chance Type 2 for Bonus Sign

Figure 95:
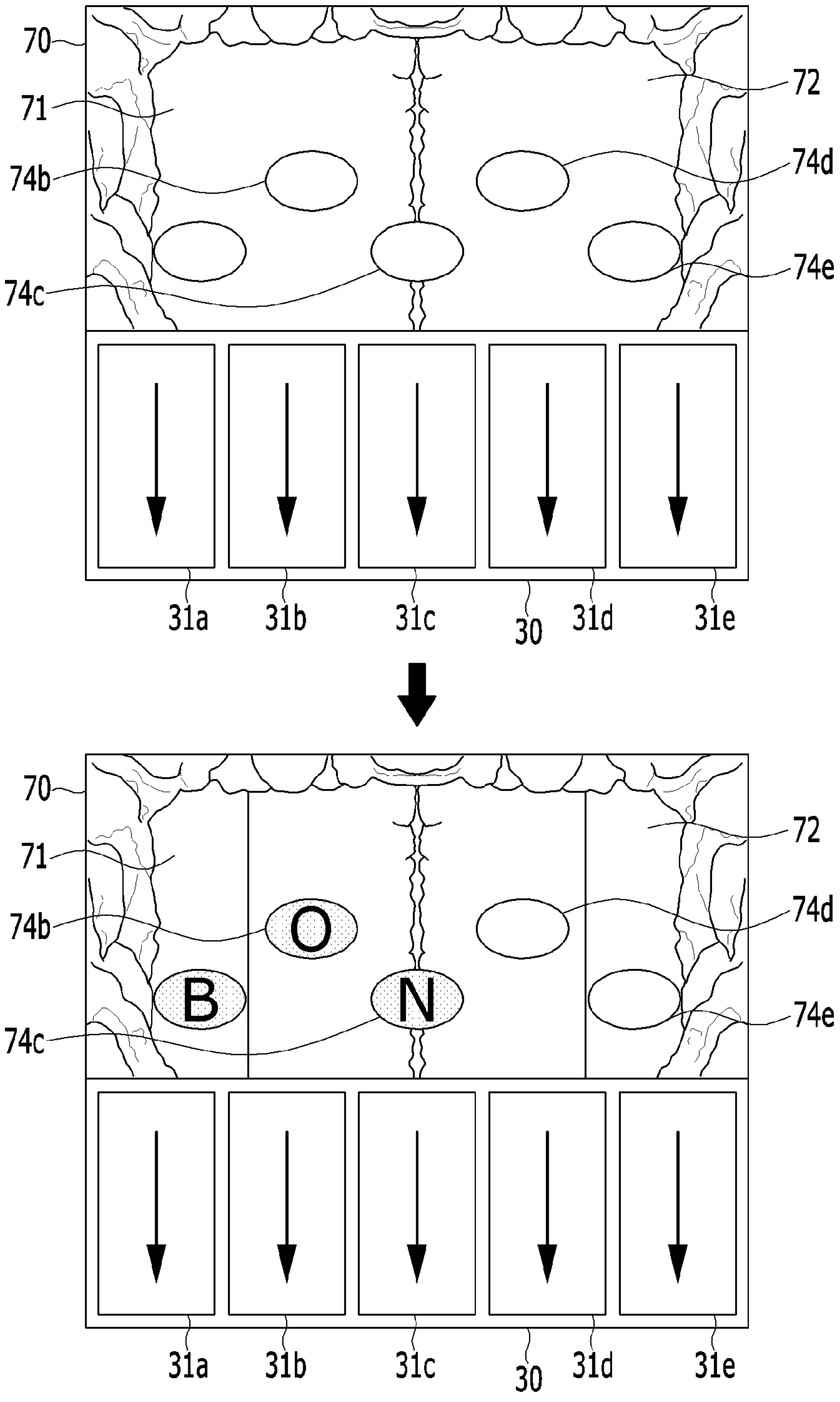
Figure 96:
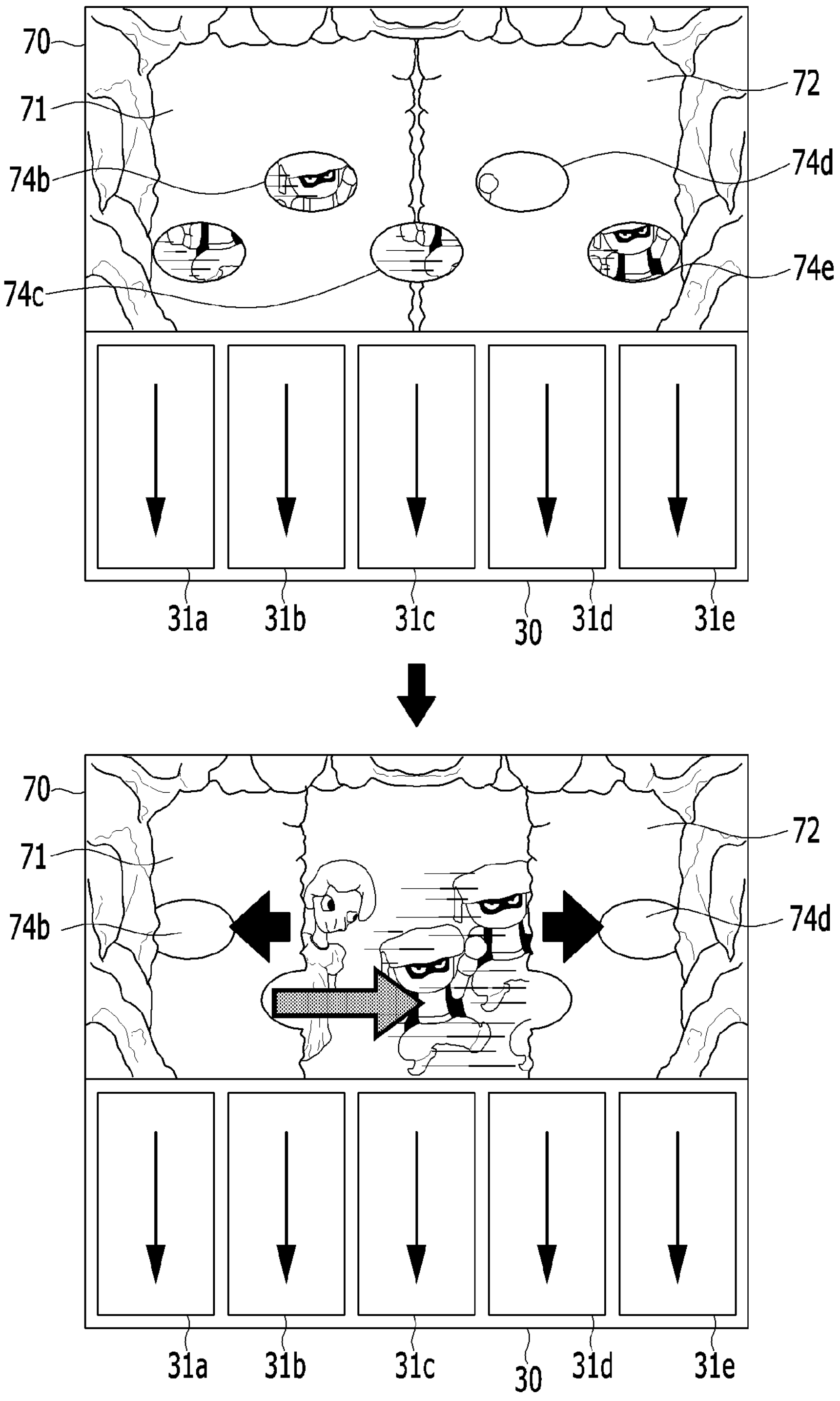

When the chance type 2 for bonus sign is determined, a controller closes the sliding doors 71 and 72 while reels 31*a* to 31*e* are spinning, and a plurality of holes 74*a* to 74*e* appear on the sliding doors 71 and 72, as shown in FIG. 95. In this case, an effect that an earthquake hits the sliding doors 71 and 72 may be rendered such that rocks on the sliding doors 71 and 72 crumble and the holes 74*a* to 74*e* appear. When alphabets "B," "O," "N," "N," and "S" corresponding to "BONUS" are displayed on a display panel 73 of a second display device 70 and appeared through the holes 74*a* to 74*e*, the three scatter symbols ("BONUS") are arranged on the three stopped reels 31*a* to 31*e*. As a result, the bonus mode game is triggered.

Chance Type 3 for Bonus Sign

When the chance type 3 for bonus sign is determined, a plurality of holes 74*a* to 74*e* appear on the sliding doors 71 and 72 like the type 2 of bonus sign rendering pattern. Subsequently, the controller renders an effect that opponent characters pass the holes 74*a* to 74*e* on a display panel 73 of a second display device 70, as shown in FIG. 96. Next, the controller opens the sliding doors 71 and 72 halfway, and renders an effect that an object image corresponding to a particular character CC2 runs after an object image corresponding to the opponent characters CC3 when determining to trigger the bonus mode game. Accordingly, the three scatter symbols ("BONUS") are arranged on the three stopped reels 31*a* to 31*e*. The particular character CC2 and the opponent character CC3 may be, for example, Morgiana and thieves in the story of "Ali Baba and the Forty Thieves," respectively. On the other hand, an effect that a head thief runs after the thieves may be rendered when the bonus mode game is not triggered.

As described above, the gaming machine according to the above embodiment can show a sign of a bonus mode game being triggered by using the sliding doors 71 and 72. Accordingly, the player can play the game with the expectation that the bonus mode game will be triggered. Further, the player can continuously play the game to trigger the chance mode game in which the bonus mode game can be triggered with a high probability.

Figure 97:
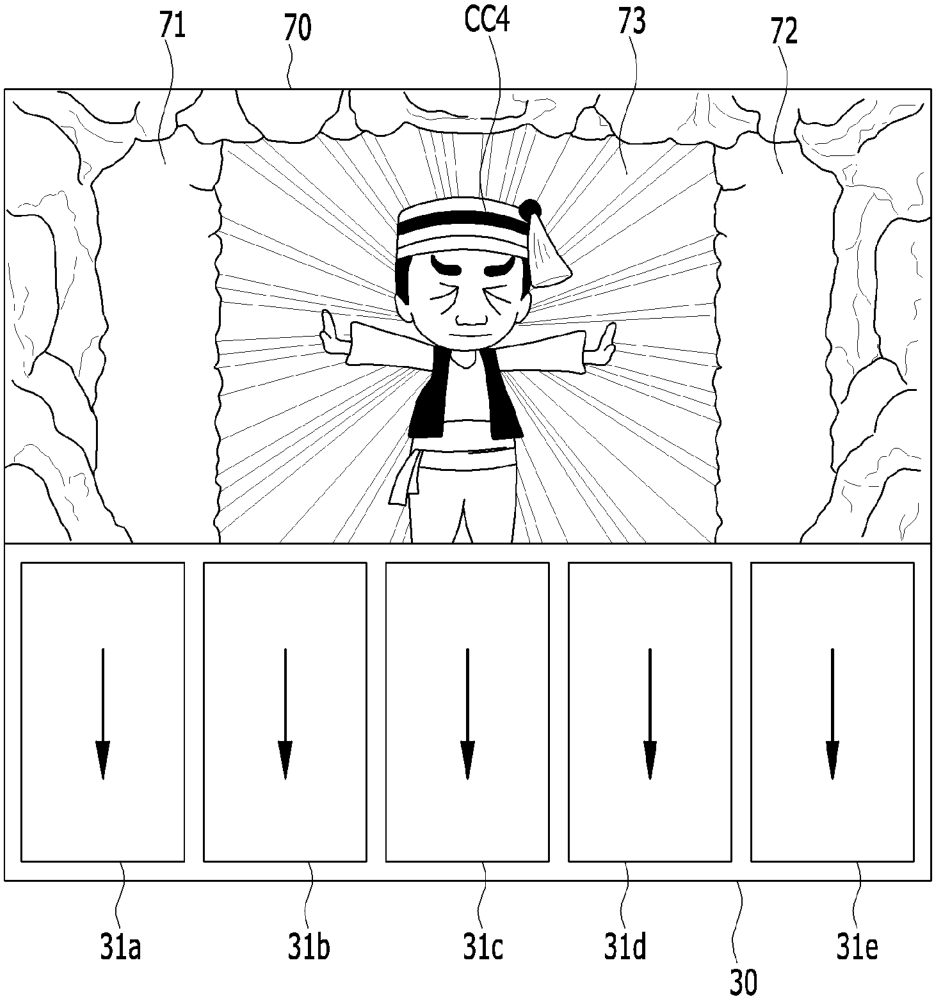

In another embodiment, the gaming machine can notify the player of the trigger of the bonus mode game without the bonus sign rendering pattern. Referring to FIG. 97, when the symbols to be arranged on reels 31*a* to 31*e* satisfy a condition for triggering the bonus mode game, the gaming machine displays an object image corresponding to a character CC4 on the display panel 73 and renders an effect that the character appears the open sliding doors 71 and 72. The character CC4 may be, for example, Ali Baba.

Next, the chance types for bonus probability are described with reference to FIG. 98 to FIG. 100. The chance types for bonus probability may include various chance types according to various embodiments.

Figure 98:
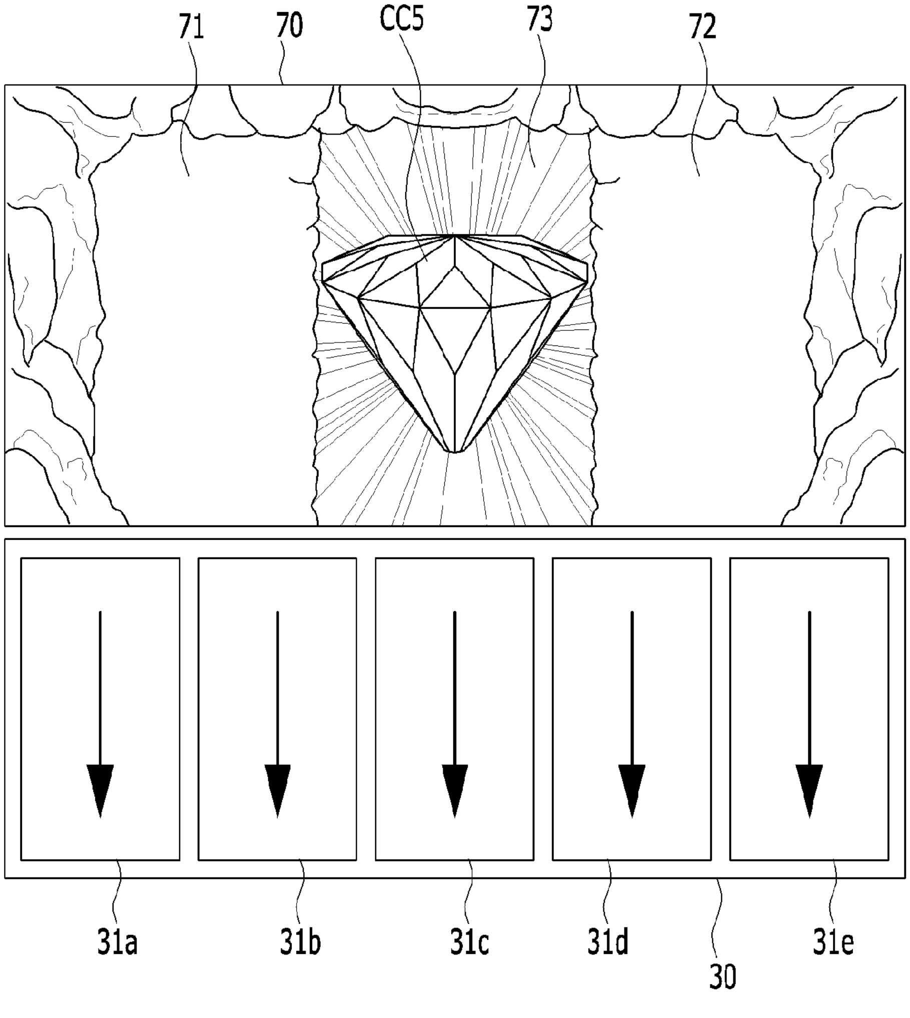
FIG. 98 to FIG. 100 show examples of a chance type for bonus probability in a chance mode game according to an embodiment of the present invention.
Figure 99:
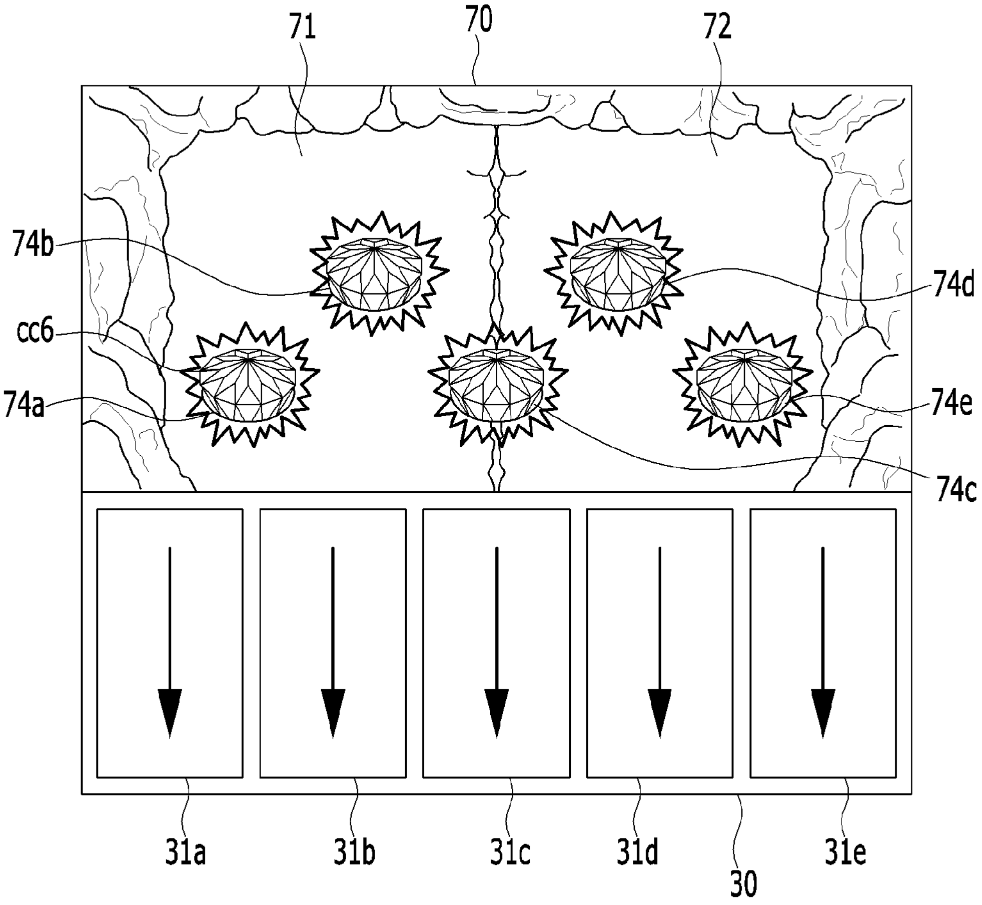
Figure 100:
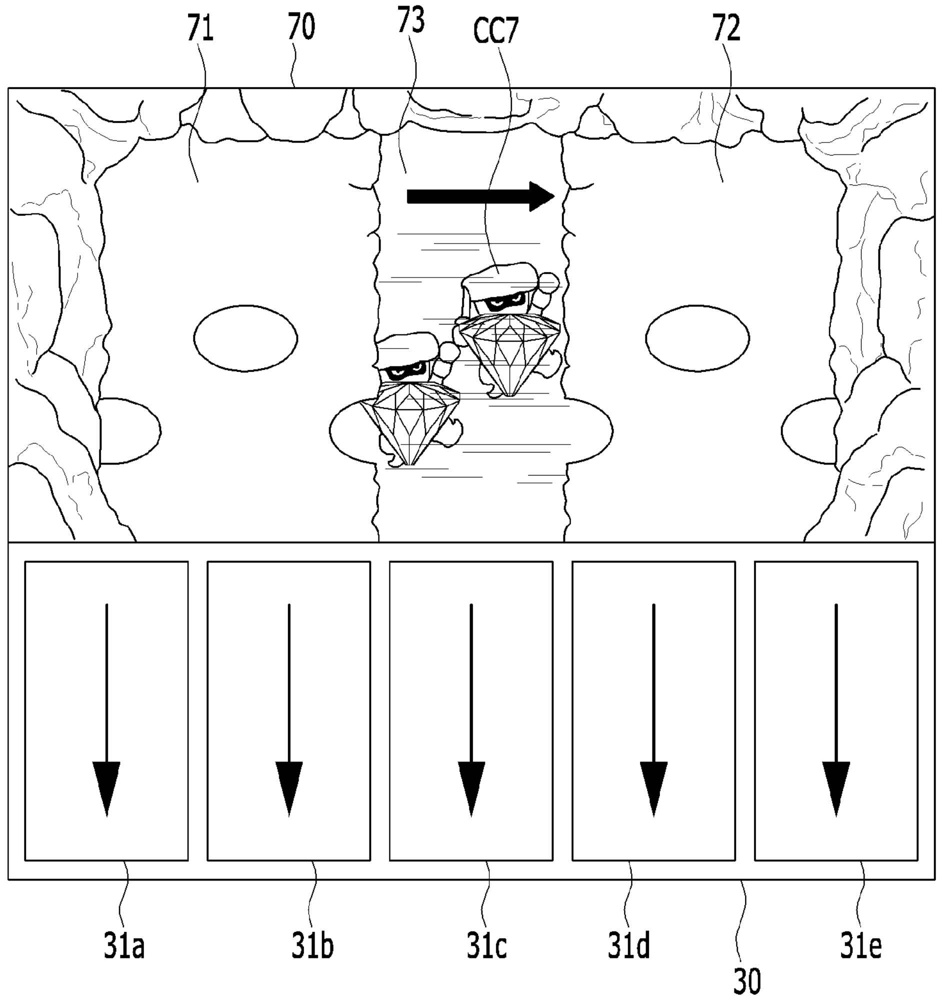

FIG. 98 to FIG. 100 show examples of a chance type for bonus probability in a chance mode game according to an embodiment of the present invention.

Chance Type 1 for Bonus Probability

When the chance type 1 for bonus probability is determined, a controller of a gaming machine displays an object image corresponding to a particular image CC5 on a display panel 50 of a secondary display 70, and renders an effect that a particular image CC5 comes from the inside, as shown in FIG. 98. The size of the particular image CC5 represents a bonus probability that is randomly determined by the gaming machine. The size of the particular image CC5 may be proportional to the bonus probability. The particular image CC5 may be, for example, a jewel image or an image for a particular symbol (e.g., "CHANCE"). The determined bonus probability, i.e., the determined symbol code determination table is applied to the chance round.

Chance Type 2 for Bonus Probability

When the chance type 2 for bonus probability is determined, a controller closes left and right sliding doors 71 and 72, and renders an effect that an object image corresponding to particular images CC6 are displayed on a display panel 73 of a secondary display 70 and appears through holes 74*a* to 74*e* of the sliding doors 71 and 72, as shown in FIG. 99. The number of the particular images CC6 represents a bonus probability that is randomly determined by the gaming machine. The number of the particular images CC6 may be proportional to the bonus probability. The particular image may be, for example, a jewel image or an image for a particular symbol (e.g., "CHANCE").

Chance Type 3 for Bonus Probability

When the chance type 3 for bonus probability is determined, a controller renders an effect that characters CC7 pass carrying jewels with them on a display panel 73, as shown in FIG. 100. The number of the passing characters CC7 represents a bonus probability that is randomly determined by the gaming machine. The number of the passing characters may be proportional to the bonus probability. The characters CC7 may be, for example, thieves in the story of "Ali Baba and the Forty Thieves."

As described above, the gaming machine according to the above embodiment can visually show a bonus probability in a chance round. Accordingly, the player can play the game with the expectation that the bonus mode game will be triggered with the shown bonus probability. Further, the player can continuously play the game to trigger the chance mode game in which the bonus mode game can be triggered with a high probability.

Next, the chance types for additional benefit are described with reference to FIG. 101 and FIG. 102. The chance types for additional benefit may include various chance types according to various embodiments.

Figure 101:
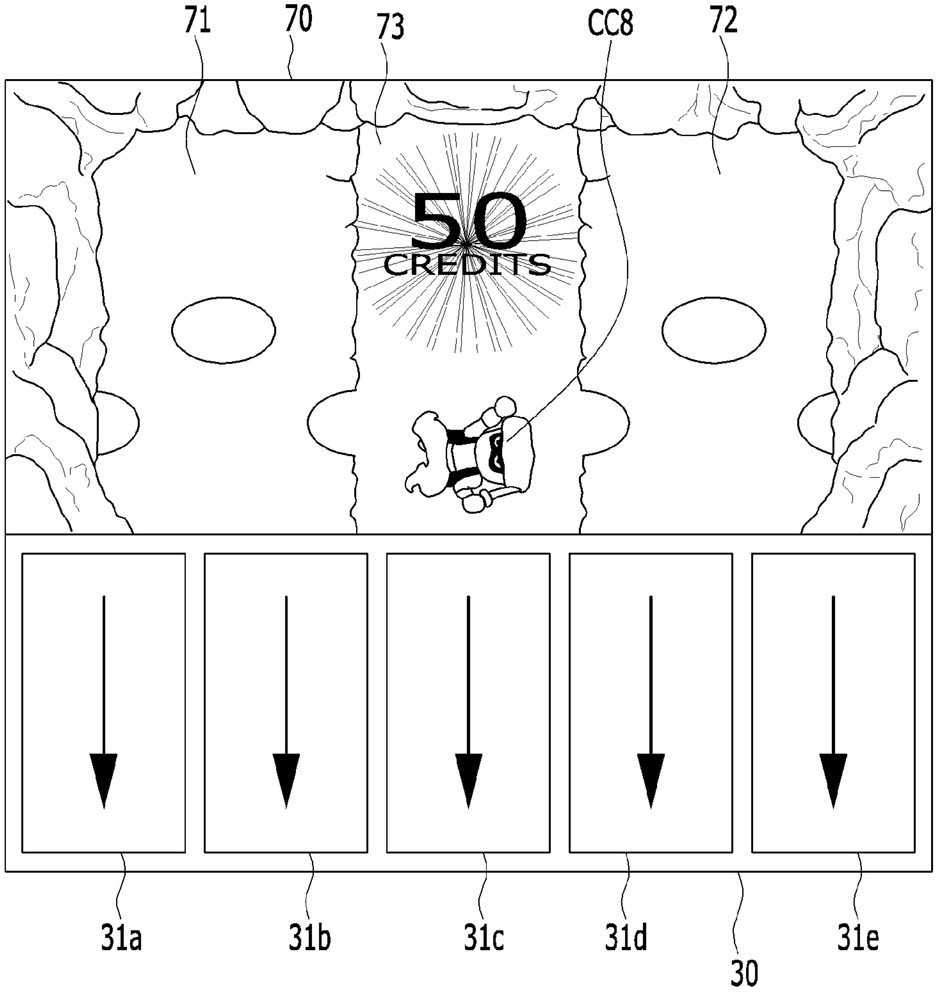
FIG. 101 and FIG. 102 show examples of a chance type for additional benefit in a chance mode game according to an embodiment of the present invention.
Figure 102:
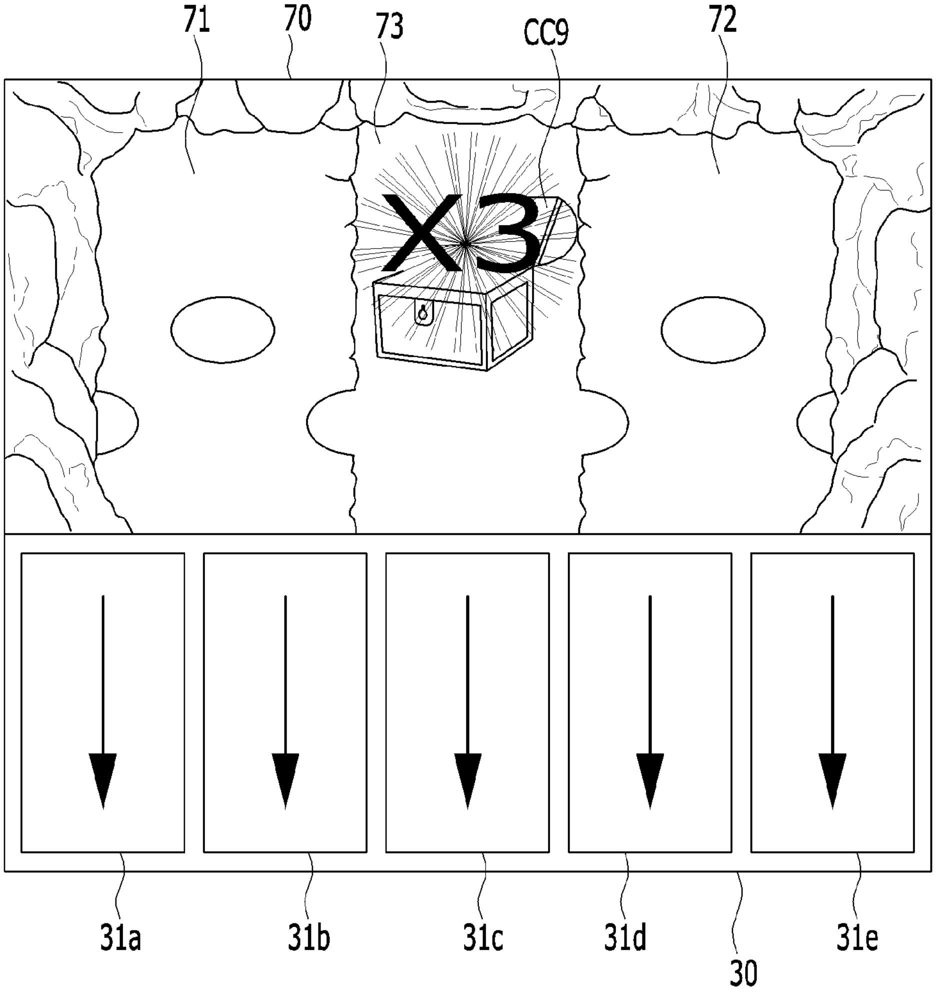

FIG. 101 and FIG. 102 show examples of a chance type for additional benefit in a chance mode game according to an embodiment of the present invention.

Chance Type 1 for Additional Benefit

When the chance type 1 for additional benefit is determined, a controller of a gaming machine displays an object image CC8 corresponding to a character on a display panel 73 of a secondary display 70, and renders an effect that the character CC8 is defeated and a fixed payout is provided, as shown in FIG. 101. The character CC8 may be, for example, a thief in the story of "Ali Baba and the Forty Thieves." The gaming machine awards to the player credits corresponding to the fixed payout as well as, if any, credits corresponding to a winning combination.

Chance Type 2 for Additional Benefit

When the chance type 2 for additional benefit is determined, the controller displays an object image CC9 corresponding to a treasure chest on a display panel 73 of a secondary display 70, and renders an effect that a payout ratio comes from the treasure chest CC9 is provided, as shown in FIG. 102. The gaming machine multiplies credits corresponding to a winning combination by the payout ratio, and provides the multiplied credits to the player.

As described above, the gaming machine according to the above embodiment can provide the player with the additional benefit along with a visual effect in a chance round. Accordingly, the player can continuously play the game to trigger the chance mode game that can receive the additional benefit.

Next, the chance types for event are described with reference to FIG. 103 to FIG. 105. The chance types for event may include various chance types according to various embodiments.

Figure 103:
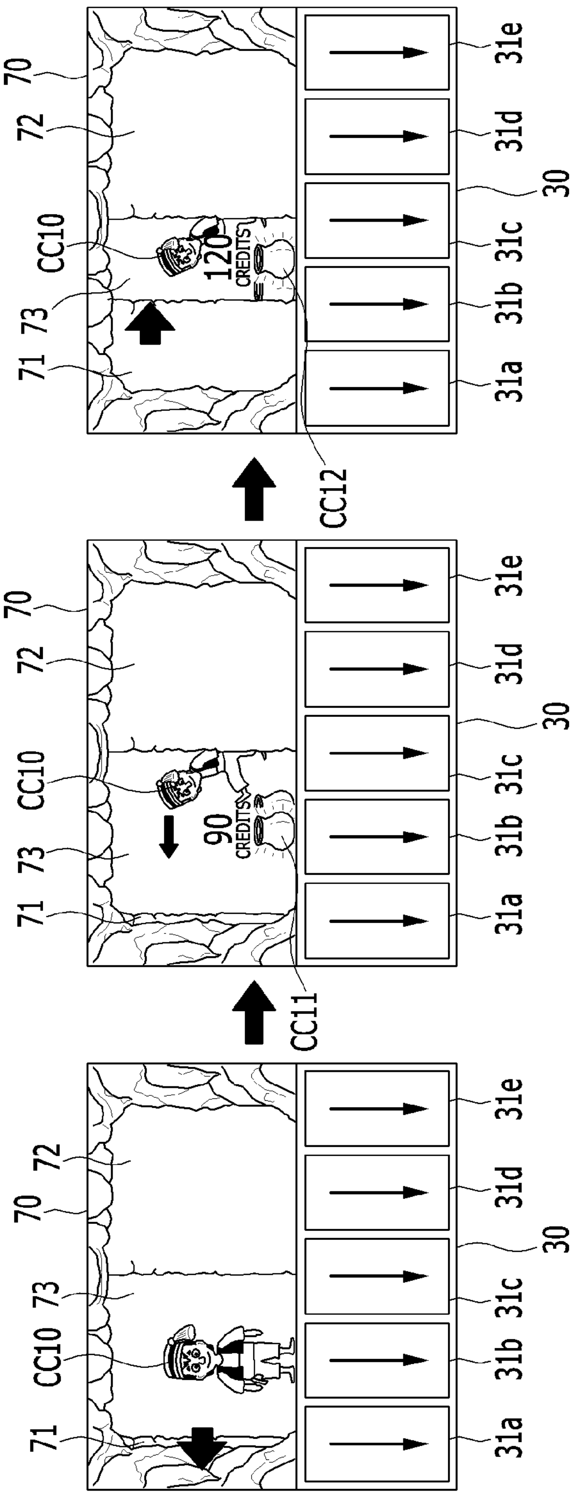
FIG. 103 to FIG. 105 show examples of a chance type for event in a chance mode game according to an embodiment of the present invention.
Figure 104:
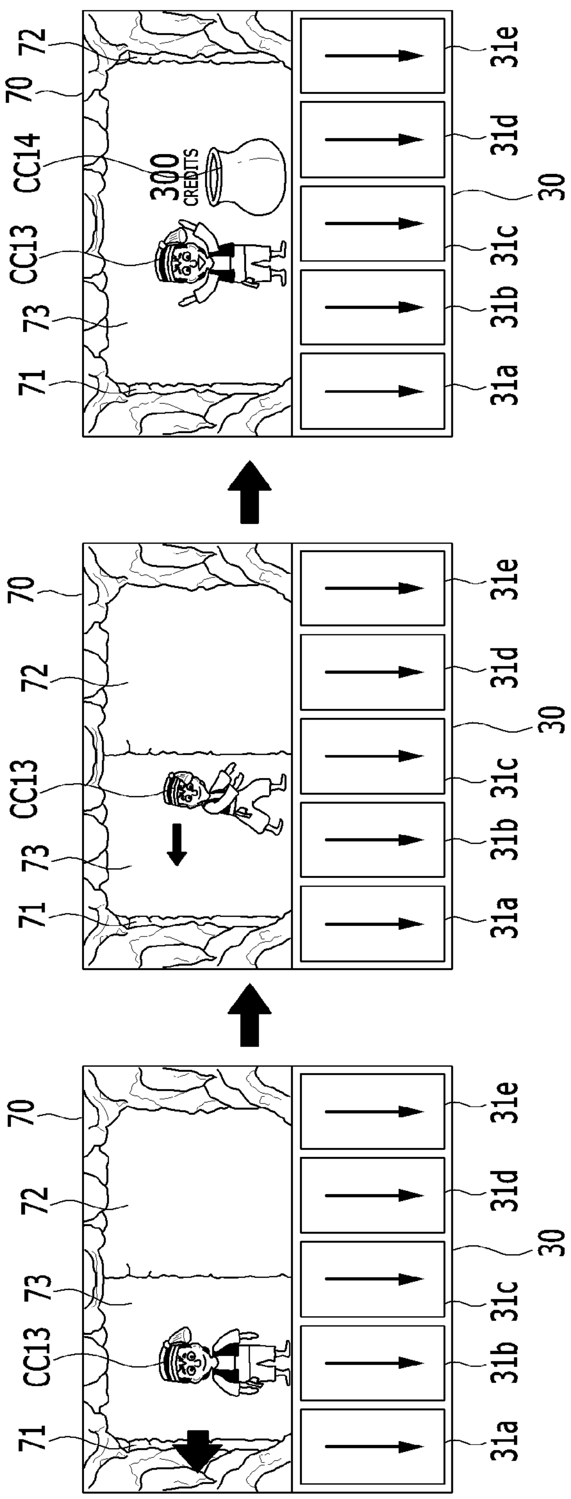
Figure 105:
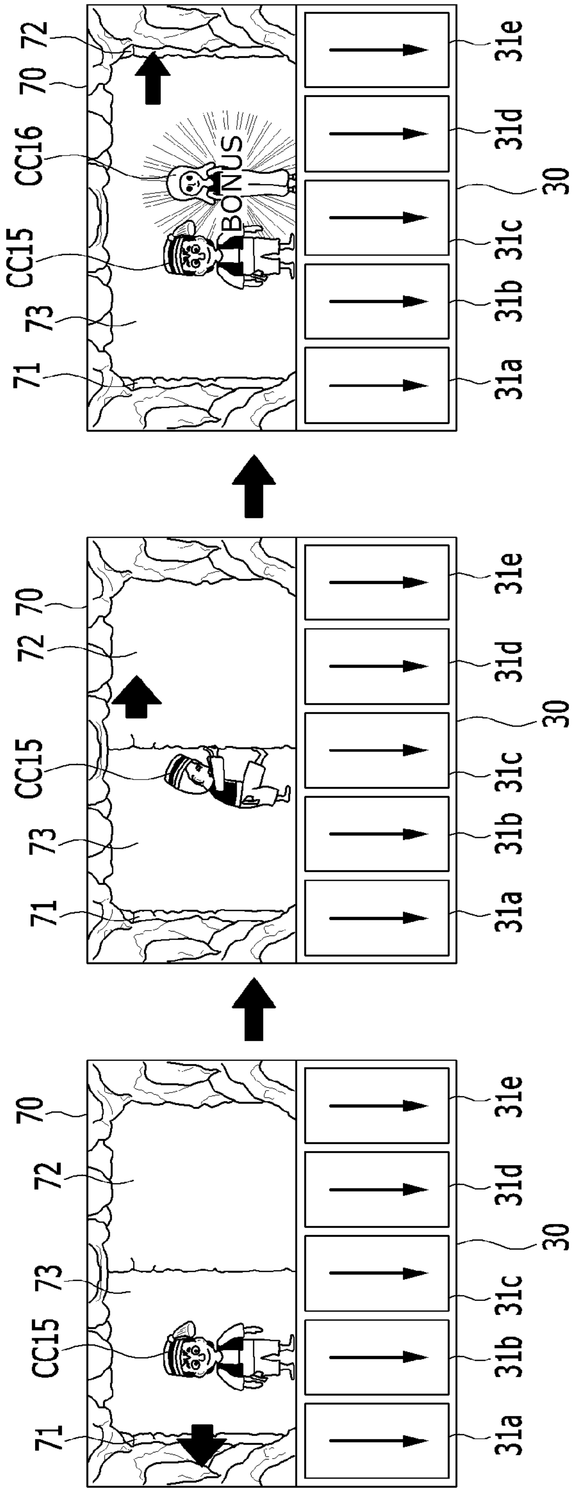

FIG. 103 to FIG. 105 show examples of a chance type for event in a chance mode game according to an embodiment of the present invention.

In the chance types for event, a gaming machine starts opens the sliding doors 71 and 72 halfway, by fully opening only one of the left and right sliding doors 71 and 72. It is assumed that the left sliding door 71 is opened and the right sliding door 72 is closed when reels 31*a* to 31*e* starts to spin.

Chance Type 1 for Event

When the chance type 1 for event is determined, a controller of a gaming machine displays an object image corresponding to a character CC10 on a display panel 73 of a secondary display 70, and renders an effect that the character CC10 appears through the open sliding door 71 while reels 31*a* to 31*e* are spinning, as shown in FIG. 103. Subsequently, an effect that the character CC10 tries to carry a treasure pouch CC11 or CC12 out of the closed sliding door 72 is rendered. Each time the character CC10 carries the treasure pouch CC11 or CC12 out of the closed sliding door 72, the payer obtains a payout from the treasure pouch CC11 or CC12. Further, the open sliding door 71 is gradually closed, and the chance round ends when the sliding door 71 is closed. The character CC10 may be, for example, Ali Baba.

Chance Type 2 for Event

When the chance type 2 for event is determined, a controller displays an object image corresponding to a character CC13 on a display panel 73 of a secondary display 70, and renders an effect that the character CC13 appears through the open sliding door 71 while reels 31*a* to 31*e* are spinning Subsequently, an effect that the character CC13 tries to pull something out of the closed sliding door 72 is rendered, as shown in FIG. 104. The right sliding door 72 is opened while the character CC13 pulls something out of the right sliding door 72. When the treasure pouch CC14 appears through the right sliding door 72 on the display panel 73, the payer obtains a payout from the treasure pouch C14. However, if other character appears through the right sliding door 72, the chance round is ended. The other character may be, for example, a thief.

Chance Type 3 for Event

When the chance type 3 for event is determined, a controller displays an object image corresponding to a character CC15 on a display panel 73 of a secondary display 70, and renders an effect that the character CC15 appears through the open sliding door 71 while reels 31*a* to 31*e* are spinning. Subsequently, an effect that the character CC15 tries to push the closed sliding door 72 such that rocks on the closed sliding doors crumble and holes 74*d* and 74*e* appear is rendered, as shown in FIG. 105. An effect that a female character or a male character is shown through the holes is rendered. When the character CC15 pushes and opens the sliding door 72, an object image corresponding CC16 to the female character or the male character is displayed on the display panel 73. If the female character appears, the gaming machine triggers a bonus mode game. If the male character appears, the gaming machine does not trigger a bonus mode game and ends the event rendering pattern. For example, the female character may be Morgiana, and the male character may be a thief.

As described above, the gaming machine according to the present embodiment can visually show an event in a chance round and provide a benefit to the player according to a result of the event. Accordingly, the player can play the game with the expectation that the additional benefit can be provided in the chance round. Further, the player can continuously play the game to trigger the chance mode game that can receive the additional benefit.

Gaming Method

Hereinafter, a gaming method in a gaming machine according to embodiments of the present invention will be described in detail with reference to FIG. 106 to FIG. 113.

Figure 106:
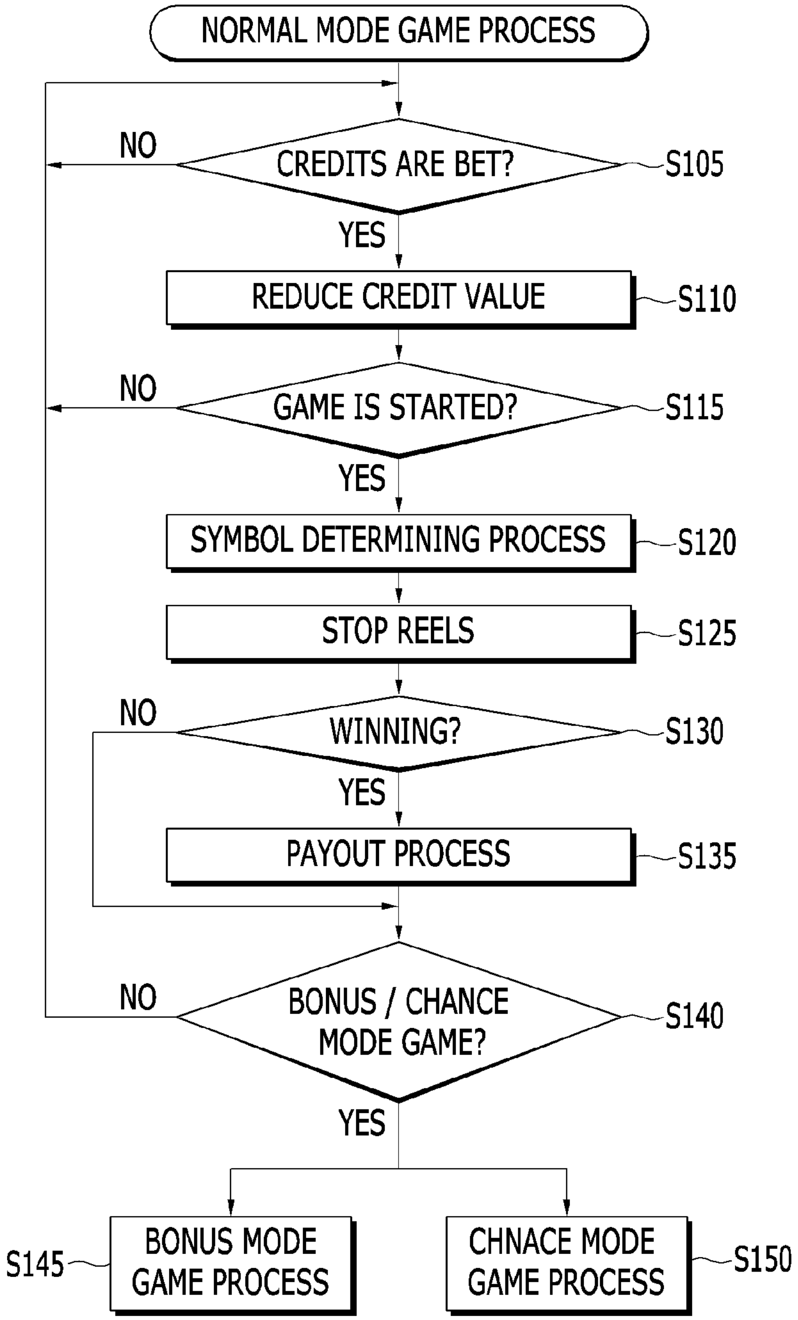
FIG. 106 is a flowchart of a normal mode game process according to an embodiment of the present invention.

FIG. 106 is a flowchart of a normal mode game process according to an embodiment of the present invention.

According to an embodiment of the present invention, a controller of the gaming machine performs the normal mode game process shown in FIG. 106 to execute the normal mode game.

Referring to FIG. 106, in the normal mode game process, the controller determines whether credits are bet by a player (S105). When the credits are not bet (S105: NO), the step S2105 is re-executed and the gaming machine is under a standby state until credits are bet.

When the credits are bet (5105: YES), the player's credit value is reduced by an amount of the betted credits (S110). If the amount of betted credits is larger than the credit value, the process (S110) of reducing the credit value is not carried out and the control performs the step S115. The controller determines whether a game is started by the player. The player may start the game by pressing a START button (54 of FIG. 8). If the game is not started (S115: NO), the normal mode game process is returned to the step S105. Further, if the game is not started (for example, if the game is not started and an instruction to end the game is input), the subtraction result from the step S110 is canceled.

If the game is started (S115: YES), the controller executes a symbol determining process (S120). In other words, the controller generates a random number for each of reels 31*a* to 31*e*, and determines symbols to be appeared on each of the reels 110 to 31*e* based on the generated random number and a symbol code determination table for the normal mode game. Accordingly, symbols to be stopped on each pay line are determined. Further, the controller starts to spin the reels 31*a* to 31*e*.

When a certain time period elapses after spinning of the reels 31*a* to 31*e* is started, the controller stops each of the reels 31*a* to 31*e* to locate the determined symbols on a symbol matrix of the reels 31*a* to 31*e* (S125). That is, the symbols are rearranged on the symbol matrix. On the basis of the combination of symbols stopped on the pay lines, the controller determines whether the combination of symbols is a winning combination or not (S130). When the combination is the winning combination (S130: YES), a payout process is executed (S135). In other words, if the combination is the winning combination, the controller calculates the amount of credits to be paid out according to a type of the winning combination.

When the payout process in the step S135 is executed or the combination is not the winning combination (S130: NO), the controller continues to determine whether the rearranged symbols satisfy a triggering condition of a chance mode game or a bonus mode game (S140). The controller may determine that the chance mode game is triggered when a special symbol ("CHANCE") is stopped on a middle row of the third reel 31*c*. The controller may determine that the bonus mode game is triggered when three or more scatter symbols ("BONUS") are rearranged on the reels 31*a* to 31*e*.

When the rearranged symbols satisfy the triggering condition of the chance mode game (S140: YES), the controller triggers the chance mode game and executes a chance mode game process (S145). In this case, the gaming machine may render a rendering pattern for notifying the trigger of the chance mode game, using sliding doors 71 and 72 and a display panel 73 of a secondary display. In the chance mode game process, the chance mode game with a higher bonus probability than the normal mode game is executed.

When the rearranged symbols satisfy the triggering condition of the bonus mode game (S140: YES), the controller triggers the bonus mode game and executes a bonus mode game process (S150). In this case, the gaming machine may render a rendering pattern for notifying the trigger of the bonus mode game, using sliding doors 71 and 72 and a display panel 73 of a secondary display 70. In the bonus mode game process, the bonus mode game including a plurality of free rounds is executed. If the triggering game is not satisfied (S140: NO), the process of the step S105 is executed.

Figure 107:
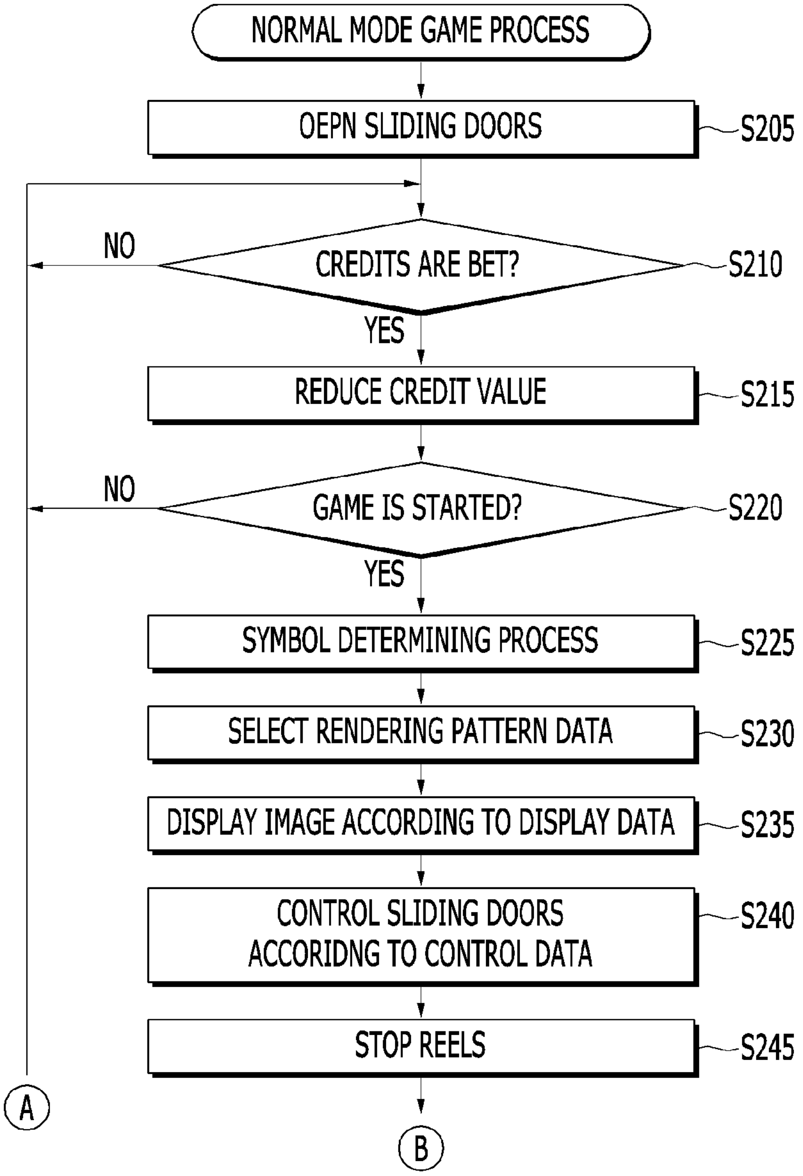
FIG. 107 and FIG. 108 are flowcharts of a normal mode game process according to another embodiment of the present invention.
Figure 108:
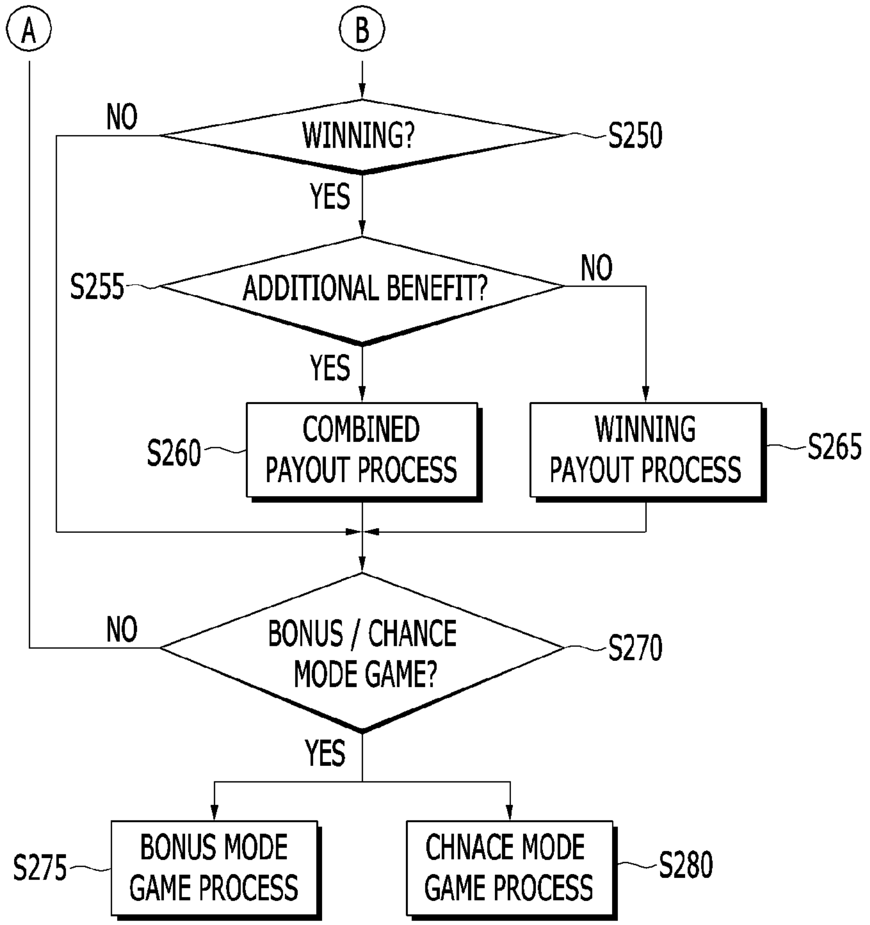

FIG. 107 and FIG. 108 are a flowchart of a normal mode game process according to another embodiment of the present invention.

According to another embodiment of the present invention, a controller of the gaming machine renders a rendering pattern using a display panel 73 and sliding doors 71 and 72 of a secondary display 70 when executing the normal mode game.

Referring to FIG. 107, the controller opens left and right sliding doors 71 and 72 in the secondary display 70 when the normal mode game is started (S205). The controller determines whether the credits are bet by the player (S210: YES), and reduces the player's credit value by an amount of the betted credits (S215). If the chance mode game is started (S220), the controller randomly determines symbols to be rearranged on reels 31*a* to 31*e* (i.e., a game result) based on a symbol code determination table (S225). The controller selects a rendering pattern data corresponding to a type of the game result among a plurality of rendering pattern data (S230), and starts to spin reels 31*a* to 31*e*. Next, the controller displays an image according to a display data of the selected rendering pattern data on a display panel 73 of the second display 70 while the reels 31*a* to 31*e* are spinning (S235). Further, the controller controls the sliding doors 71 and 72 according to a control data of the selected rendering pattern data while the reels 31*a* to 31*e* are spinning (S240).

Next, the controller stops each of the reels 31*a* to 31*e* to locate the symbols corresponding to the game result on a symbol matrix of the reels 31*a* to 31*e* (S245). Referring to FIG. 108, the controller determines whether the combination of symbols is a winning combination or not (S250). Further, the controller determines whether an additional benefit is provided according to a result of the determined rendering pattern (S255). If the combination is the winning combination (S250: YES) and the additional benefit is provided (S255: YES), the controller combines the additional benefit with a payout (credits) according to the winning combination and awards the combined payout to the player (S260). For example, the additional benefit may be a payout ratio and the combined payout may be the payout according to the winning combination multiplied by the payout ratio. If the combination is the winning combination (S250: YES) and the additional payout is not provided (S255: NO), the controller awards the credits according to the winning combination to the player (S265).

When the payout process in the step S260 or S265 is executed or the combination is not the winning combination (S250: NO), the controller continues to determine whether the rearranged symbols satisfy a triggering condition of a chance mode game or a bonus mode game (S270). When the rearranged symbols satisfy the triggering condition of the chance mode game (S270: YES), the controller triggers the chance mode game and executes a chance mode game process (S275). When the rearranged symbols satisfy the triggering condition of the bonus mode game (S270: YES), the controller triggers the bonus mode game and executes a bonus mode game process (S280). If the triggering condition is not satisfied (S270: NO), the process of the step S205 is executed.

Figure 109:
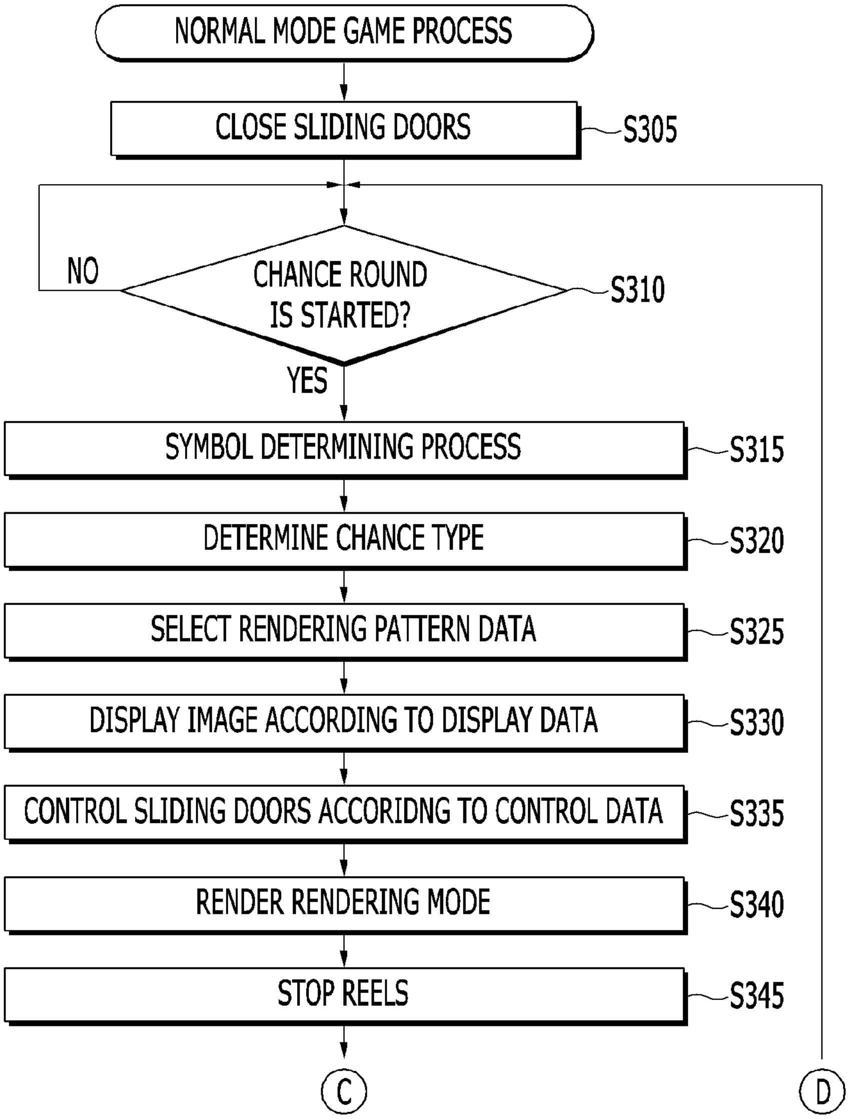
FIG. 109 and FIG. 110 are flowcharts of a chance mode game process according to an embodiment of the present invention.
Figure 110:
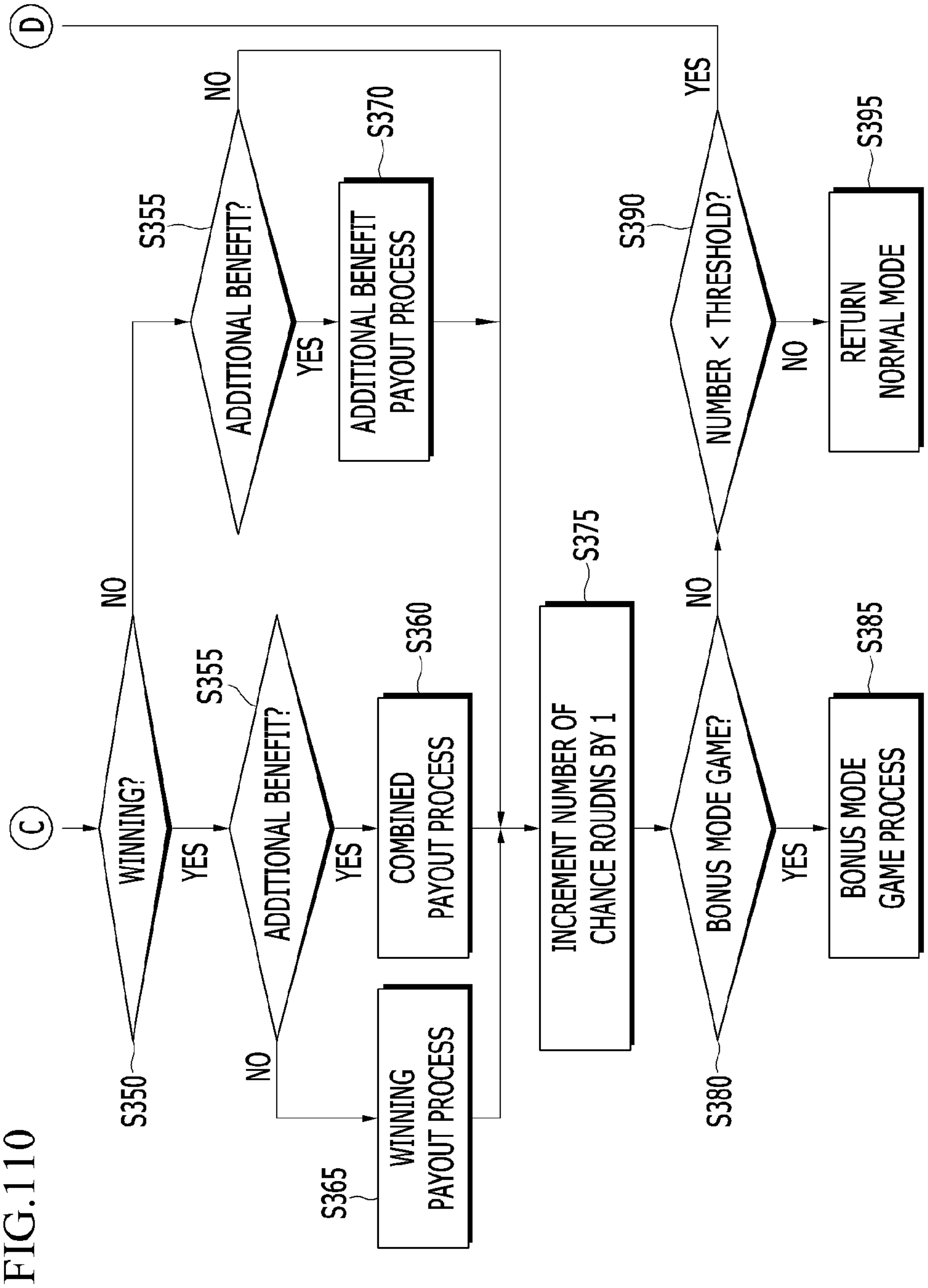

FIG. 109 and FIG. 110 are a flowchart of a chance mode game process according to an embodiment of the present invention.

According to an embodiment of the present invention, a controller of the gaming machine performs the chance mode game process shown in FIG. 109 and FIG. 110 to execute the chance mode game.

Referring to FIG. 109, the controller closes left and right sliding doors 71 and 72 in a secondary display 70 when the chance mode game is triggered (S305). When a chance round of the chance mode game is started (S310), the controller randomly determines symbols to be rearranged on reels 31*a* to 31*e* (i.e., a game result) based on a symbol code determination table for the chance mode game (S315), and determines a chance type corresponding to the game result among various chance types (S320). The controller may randomly determine the symbol code determination table among a plurality of symbol code determination tables for the chance mode game. Each symbol code determination table for the chance mode game may have a higher bonus probability than a default symbol code determination table for the normal mode game. The chance round may be started automatically or an input of the player.

The controller selects a rendering pattern data corresponding to the selected chance type among a plurality of rendering pattern data for the chance mode game (S325), and starts to spin reels 31*a* to 31*e*. Next, the controller displays an image according to a display data of the selected rendering pattern data on a display panel 73 of the second display 70 while the reels 31*a* to 31*e* are spinning (S330). Further, the controller controls the sliding doors 71 and 72 according to a control data of the selected rendering pattern data while the reels 31*a* to 31*e* are spinning (S335).

Next, the controller stops each of the reels 31*a* to 31*e* to locate the determined symbols on a symbol matrix of the reels 31*a* to 31*e* (S340). Referring to FIG. 110, the controller determines whether the combination of symbols is a winning combination or not (S345). Further, the controller determines whether an additional benefit is provided according to a result of the determined rendering pattern (S345). If the combination is the winning combination (S345: YES) and the additional benefit is provided (S350: YES), the controller combines the additional benefit with a payout according to the winning combination and awards the combined payout to the player (S355). If the combination is the winning combination (S345: YES) and the additional benefit is not provided (S350: NO), the controller awards the credits according to the winning combination to the player (S360). If the combination is not the winning combination (S345: NO) and the additional benefit is provided (S350: YES), the controller awards the additional benefit to the player (S365).

When the payout process in the step S355, S360 or S365 is executed or the combination is not the winning combination (S345: NO), the controller increments the number of executed chance round by 1 (S370). Further, the controller continues to determine whether an ending condition of the chance mode game is satisfied (S375 or S385). The controller determines whether the rearranged symbols satisfy a triggering condition of a bonus mode game (S375). When the rearranged symbols satisfy the triggering condition of the bonus mode game (S375: YES), the controller ends the chance mode game and executes a bonus mode game process (S380). If the triggering condition is not satisfied (S375: NO), the controller determines whether the number of executed chance rounds is less than a threshold (S385). When the number of executed chance rounds is less than the threshold (S385: YES), the controller starts a next chance round in the step S310. When the number of executed chance rounds is equal to the threshold (S385: NO), the controller ends the chance mode game and returns to the normal mode game (S390).

Figure 111:
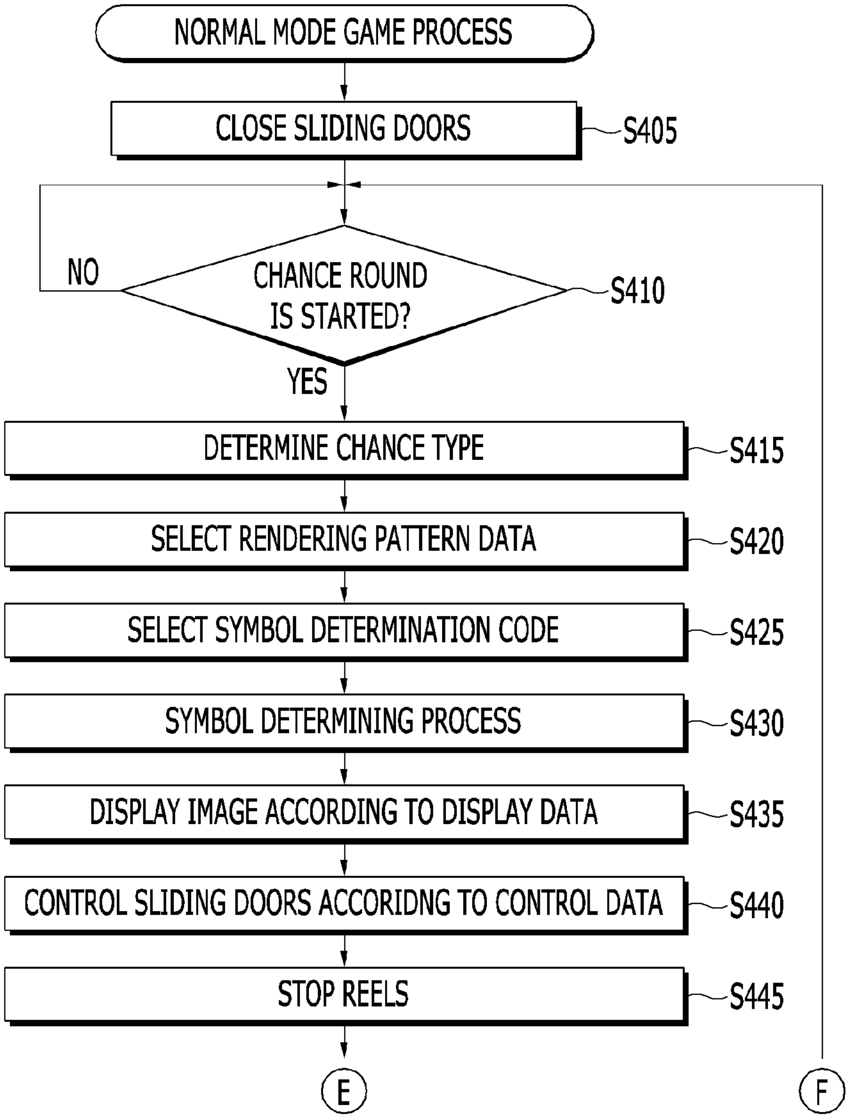
FIG. 111 and FIG. 112 are flowcharts of a chance mode game process according to another embodiment of the present invention.
Figure 112:
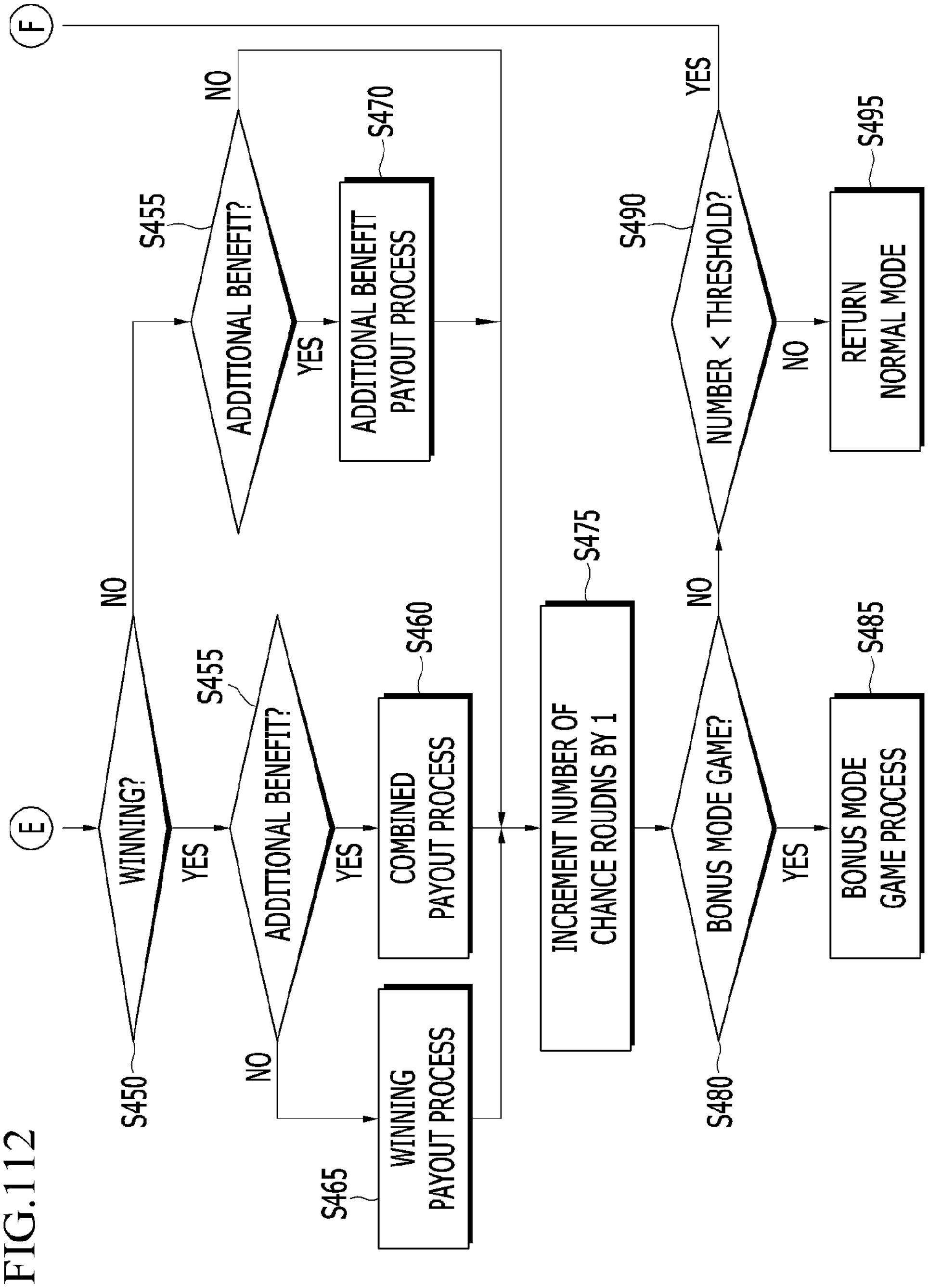

FIG. 111 and FIG. 112 are a flowchart of a chance mode game process according to another embodiment of the present invention.

Referring to FIG. 111, the controller closes left and right sliding doors 71 and 72 in a secondary display 70 when the chance mode game is triggered (S405). When a chance round of the chance mode game is started (S410), the controller randomly determines a chance type to be executed in a current chance round among a plurality of chance types (S415). The chance round may be started automatically or an input of the player. Further, the controller selects a rendering pattern data corresponding to the determined chance type among a plurality of rendering pattern data for the chance mode game (S420). Further, the controller selects a symbol code determination table corresponding to the determined chance type among a plurality of symbol code determination tables for the chance mode game (S425). Each symbol code determination table for the chance mode game has a higher bonus probability than a default symbol code determination table for the normal mode game.

Further, the controller starts to spin reels 31*a* to 31*e* and randomly determines symbols to be rearranged on reels 31*a* to 31*e* (i.e., a game result) based on the selected symbol code determination table for the chance mode game (S430). Further, the controller displays an image according to a display data of the selected rendering pattern data on a display panel 73 of the second display 70 while the reels 31*a* to 31*e* are spinning (S435). Further, the controller controls the sliding doors 71 and 72 according to a control data of the selected rendering pattern data while the reels 31*a* to 31*e* are spinning (S440).

Next, the controller stops each of the reels 31*a* to 31*e* to locate the symbols corresponding to the game result on a symbol matrix of the reels 31*a* to 31*e* (S445). Referring to FIG. 112, the controller determines whether the combination of symbols is a winning combination or not (S450). Further, the controller determines whether an additional benefit is provided according to a result of the determined rendering pattern (S455). If the combination is the winning combination (S450: YES) and the additional benefit is provided (S455: YES), the controller combines the additional benefit with a payout according to the winning combination and awards the combined payout to the player (S460). If the combination is the winning combination (S450: YES) and the additional benefit is not provided (S455: NO), the controller awards the credits according to the winning combination to the player (S465). If the combination is not the winning combination (S450: NO) and the additional benefit is provided (S455: YES), the controller awards the additional benefit to the player (S470).

When the payout process in the step S460, S465 or S470 is executed or the combination is not the winning combination (S450: NO), the controller increments the number of executed chance round by 1 (S475). Further, the controller continues to determine whether an ending condition of the chance mode game is satisfied (S480 or S490). The controller determines whether the rearranged symbols satisfy a triggering condition of a bonus mode game (S480). When the rearranged symbols satisfy the triggering condition of the bonus mode game (S480: YES), the controller ends the chance mode game and executes a bonus mode game process (S485). If the triggering condition is not satisfied (S480: NO), the controller determines whether the number of executed chance rounds is less than a threshold (S490). When the number of executed chance rounds is less than the threshold (S490: YES), the controller starts a next chance round in the step S410. When the number of executed chance rounds is equal to the threshold (S490: NO), the controller ends the chance mode game and returns to the normal mode game (S495).

Figure 113:
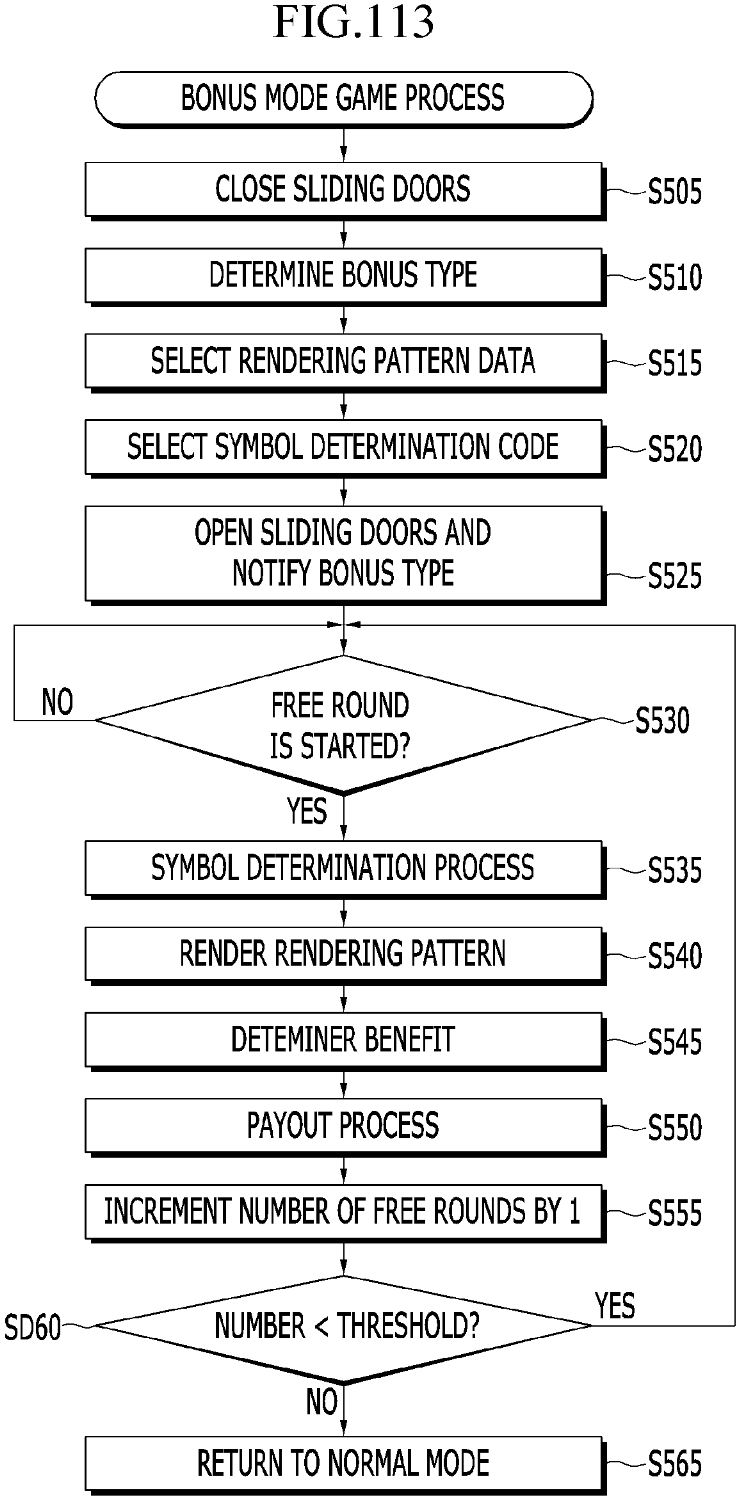
FIG. 113 is a flowchart of a bonus mode game process according to an embodiment of the present invention.

FIG. 113 is a flowchart of a bonus mode game process according to an embodiment of the present invention.

According to an embodiment of the present invention, a controller of the gaming machine performs the bonus mode game process shown in FIG. 113 to execute the bonus mode game.

Referring to FIG. 113, the controller closes left and right sliding doors 71 and 72 in a secondary display 70 when the bonus mode game is triggered (S505). The controller randomly determines a bonus type to be executed in the bonus mode game among a plurality of bonus types (S510). The controller selects a rendering pattern data corresponding to the determined bonus type among a plurality of rendering pattern data for the bonus mode game (S515). The controller selects a symbol code determination table corresponding to the determined bonus type among a plurality of symbol code determination tables for the bonus mode game (S520). Further, the controller opens left and right sliding doors 71 and 72 and displays an image for notifying the determined bonus type on a display panel 73 of the secondary display 70 (S525). In this case, the controller may open the sliding doors 71 and 72 fully.

Next, the controller starts a free round of the bonus mode game according to the determined bonus type (S530). The free round may be started automatically or an input of the player. Further, the controller starts to spin reels 31*a* to 31*e*, and executes a symbol determining process based on the selected symbol code determination table (S535). Further, the controller renders a rendering pattern according to the rendering pattern data corresponding to the determined bonus type using the display panel 73 and the reels 31*a* to 31*e* (S540). The controller may render any one of the rendering patterns exemplified in FIG. 38 to FIG. 47.

Next, the controller determines a benefit to be awarded to the player (S545), and provides the benefit to the player (S550). For example, the controller may determine the benefit (i.e., credits) according to "WILD" symbols and the other symbols arranged on the reels 31*a* to 31*e* in the bonus type 1, determine the benefit (i.e., credits) according to the defeated character and the symbols arranged on the reels 31*a* to 31*e* in the bonus type 2, and determine the benefit according to an event of a cell at which the character arrives by the number of the scatter symbols ("BONUS").

Further, the controller increments the number of executed free round by 1 (S555), and determines whether an ending condition of the bonus mode game is satisfied (S560). The controller determines whether the number of executed free rounds is less than a threshold (S560). When the number of executed chance rounds is less than the threshold (S560: YES), the controller starts a next free round in the step S530. When the number of executed free rounds is equal to the threshold (S560: NO), the controller ends the bonus mode game and returns to the normal mode game (S565).

Embodiments of the present invention can also be embodied as a computer readable program on a computer-readable recording medium. The computer readable recording medium is any data storage device that can store data that can be read thereafter by a computer. Examples of the computer readable recording medium include ROMs, RAMs, CD-ROMs, magnetic tapes, floppy disks, and optical data storage devices. The computer readable recording medium can also be distributed over a network coupled computer system so that the computer readable code is stored and executed in a distributed fashion.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A display device for a gaming machine, the display device comprising:

- a display panel configured to display images for a game;
- a shutter assembly configured to cover and uncover the display panel at least in part, the shutter assembly comprising a first sliding door configured to move along a first guide and a second sliding door configured to move along a second guide; and
- a driving unit configured to drive the first sliding door, wherein
- the shutter assembly is configured to make friction between the second sliding door and the second guide greater than friction between the first sliding door and the first guide.

2. The display device of claim 1, wherein each of the first sliding door and the second sliding door comprises a roller configured to contact the first guide or the second guide, and the roller of the second sliding door comprises a material having coefficient of friction greater than coefficient of friction of a material of the roller of the first sliding door.

3. The display device of claim 1, wherein one of the first sliding door and the second sliding door comprises a catching member configured to catch another of the first sliding door and the second sliding door such that the second sliding door follows movement of the first sliding door.

4. The display device of claim 3, wherein the shutter assembly further comprises a third sliding door configured to move along the first guide and driven by the driving unit and a fourth sliding door configured to move along the second guide, and the third sliding door and the fourth sliding door are arranged in a way reversed to the first sliding door and the second sliding door, respectively.

5. The display device of claim 3, wherein the shutter assembly is configured to make friction between the second sliding door and the second guide greater than friction between the first sliding door and the first guide.

6. The display device of claim 3, wherein the driving unit comprises a motor and a power transmission member that is configured to transmit power generated by the motor to the first sliding door and comprises a belt and a pair of pulleys coupled to the belt.

7. The display device of claim 6, wherein the shutter assembly further comprises a belt catcher coupled to the first sliding door and the belt, and the belt catcher comprises a pair of protrusions forming a recess to receive the belt, and at least one of the pair of protrusions comprises teeth.

8. The display device of claim 7, wherein the driving unit further comprises a photosensor comprising a light emitter and a light receiver, and the belt catcher further comprises a detection member configured to be disposed between the light emitter and the light receiver when the belt catcher overlaps the photosensor.

9. The display device of claim 7, wherein the driving unit further comprises a magnetic sensor coupled to one of the pair of pulleys, the magnetic sensor configured to detect rotation of the one of the pair of pulleys to inform of a position of the first sliding door.

10. The display device of claim 3, wherein the second sliding door comprises the catching member, and the catching member catches opposite edges of the first sliding door when the first sliding member moves in reverse directions.

11. The display device of claim 10, wherein the second sliding door moves along with the first sliding door when the first sliding door and the second sliding door substantially fully overlap each other, and the second sliding door stops otherwise.

12. The display device of claim 1, wherein the first sliding door guide comprises an upper guide channel between the belt and the first sliding door, the first guide channel has a trench, and the belt catcher fixed to the first sliding door through the trench.

13. A gaming machine comprising:

a display device configured to display images for a game;

an input device configured to receive input from a player;

a controller configured to execute the game and to control the display device;

wherein the display device comprises:

a display panel;

a shutter assembly configured to cover and uncover the display panel at least in part, the shutter assembly comprising a first sliding door configured to move along a first guide and a second sliding door configured to move along a second guide; and a driving unit configured to drive the first sliding door, wherein at least one of the first sliding door and the second sliding door comprises a catching member configured to catch another of the first sliding door and the second sliding door such that the second sliding door follows movement of the first sliding door after the catching member catches the another of the first sliding door and the second sliding door, wherein the second sliding door comprises the catching member, and the catching member catches opposite edges of the first sliding door when the first sliding member moves in reverse directions, wherein the second sliding door moves along with the first sliding door when the first sliding door and the second sliding door substantially fully overlap each other, and the second sliding door stops otherwise, and the shutter assembly is configured to make friction between the second sliding door and the second guide greater than friction between the first sliding door and the first guide.

14. The gaming machine of claim 13, wherein each of the first sliding door and the second sliding door comprises a roller configured to contact the first guide or the second guide, and the roller of the second sliding door comprises a material having coefficient of friction greater than coefficient of friction of a material of the roller of the second sliding door.

15. The gaming machine of claim 13, wherein one of the first sliding door and the second sliding door comprises a catching member configured to catch another of the first sliding door and the second sliding door such that the second sliding door follows movement of the first sliding door.

16. The display device of claim 13, wherein the shutter assembly further comprises a third sliding door configured to move along the first guide and driven by the driving unit and a fourth sliding door configured to move along the second guide, and the third sliding door and the fourth sliding door are arranged in a way reversed to the first sliding door and the second sliding door, respectively.

* * * * *